US005890905A

United States Patent [19]

Bergman

[11] Patent Number: 5,890,905

[45] Date of Patent: Apr. 6, 1999

[54] EDUCATIONAL AND LIFE SKILLS ORGANIZER/MEMORY AID

[76] Inventor: Marilyn M. Bergman, 9 Shirley Rd., Narberth, Pa. 19072

[21] Appl. No.: 640,428

[22] Filed: Apr. 30, 1996

Related U.S. Application Data

[63] Continuation-in-part of Ser. No. 376,965, Jan. 20, 1995, Pat. No. 5,601,432.

[51] Int. Cl.[6] .................................................... G09B 19/00

[52] U.S. Cl. .......................... 434/118; 494/107; 494/236; 494/365; 705/30; 705/35; 706/927; 345/326; 345/146

[58] Field of Search .................................... 434/118, 236, 434/258, 307 R, 362, 365, 107–109; 273/429–432, 454; 705/1, 30, 35, 28; 704/1, 2, 10; 706/927; 345/145–157, 161, 163, 167, 173, 326, 338, 340, 352, 473

[56] References Cited

U.S. PATENT DOCUMENTS

| | | |
|---|---|---|
| 4,862,390 | 8/1989 | Weiner . |
| 4,975,690 | 12/1990 | Torres . |
| 5,096,423 | 3/1992 | Goldwasser . |
| 5,169,342 | 12/1992 | Steele et al. . |
| 5,302,132 | 4/1994 | Corder . |
| 5,326,270 | 7/1994 | Ostby et al. . |
| 5,349,658 | 9/1994 | O'Rourke et al. . |
| 5,367,624 | 11/1994 | Cooper . |
| 5,384,910 | 1/1995 | Torres . |
| 5,393,236 | 2/1995 | Blackmer et al. . |
| 5,395,243 | 3/1995 | Lubin et al. . |
| 5,421,730 | 6/1995 | Lasker, III et al. . |
| 5,425,140 | 6/1995 | Bloomfield et al. . |
| 5,488,685 | 1/1996 | Palmer et al. . |
| 5,493,726 | 2/1996 | Mori . |
| 5,513,308 | 4/1996 | Mori . |
| 5,524,195 | 6/1996 | Clanton, III et al. . |
| 5,524,201 | 6/1996 | Shwarts et al. . |

FOREIGN PATENT DOCUMENTS 0542660 5/1993 European Pat. Off. .

OTHER PUBLICATIONS

IBM Technical Disclosure Bulletin, vol. 36, No. 4, Apr. 1, 1993, NY;US, pp. 433–435, "Automated Mouse Pointer Movement Function".

IBM Technical Disclosure Bulletin, vol. 37, No. 11 Nov. 1, 1994, NY;US, p. 515 "Space/Time Saving Reference Month".

IBM Technical Disclosure Bulletin, vol. 37, No. 04A Apr. 1994, NY;US, pp. 299–300, "Repulsive Pointer Grab with Hide and Lower Characteristics".

"Laureate" Fall 1994 Catalog by Laureate Learning Systems, Inc., pp. 1–37.

"Tech–NJ—Technology, Educators, & Children with disabilities—New Jersey" by Trenton State College School of Education Department of Special Education, Spring 1994, vol. 5, No. 1.

"Essential Steps—Software for Self–Sufficiency" by Bergman–Gordon Associates, Inc., 1991.

"Computer–Enhanced Self–Sufficiency: Parts 1 and 2" by Marilyn Bergman, Neuropsychology 1991, vol. 5, No. 1, pp. 17–23 and 25–78.

(List continued on next page.)

*Primary Examiner*—Joe H. Cheng

*Attorney, Agent, or Firm*—Ceasar, Rivise, Bernstein, Cohen & Pokotilow, Ltd.

[57] ABSTRACT

A compensatory assistive device for people with cognitive impairment (including but not limited to traumatic brain injury, stroke, electrocution, anoxia, mental retardation, dementia, amnesia, and learning disabilities) and/or physical disabilities (such as cerebral palsy) is provided via an interactive computer system that provides an easy-to-use money manager, directory, scheduler, telephone log, writer and information station using a graphical user interface configured with particular color associations, pointer travel limitations, simplified option selections and active view-screen limitations.

35 Claims, 212 Drawing Sheets

OTHER PUBLICATIONS

"Distinct Patterns of Use of a Multiple Function Computer Orthotic System by Two Individuals with Traumatic Brain Injury" by Bergman et al., NHIF 11th Annual National Symposium, Dec. 1992.

"The necessary of a clinical perspective in the design of computer prostheses" by Marilyn Bergman, The Journal of Head Trauma Rehabilitation, Jun. 1991, pp. 100–104.

"Computer Orthotic System Benefits Brain Injured Individuals", newsletters from Head Trauma Family Network, Oct. 1992.

"Customization of a Multiple Function Computer Orthotic System for Two Individuals With Differing Patterns of Chronic TBI" by Bergman et al., Abstract form JCEN, vol. 14, (1), Jan. 1992.

"A Computer Orthotic System to Support Multiple Functions for an Individual with TBI" by Bergman, et al., JCEN, vol. 13, (1), Feb. 1991, p. 105.

"Design and Implementation of a Text Writer: A Case Study of Computer Enhanced Self–Sufficiency in an Adult with Chronic TBI" by Bergman, NHIF, Nov. 1990, pp. 102–103.

"Essential Steps—Software for Self–Sufficiency" sale brochure by Mnemosyne, 1992.

EDUCATIONAL AND LIFE SKILLS ORGANIZER/MEMORY AID

This application is a Continuation-in-Part of application Ser. No. 08/376,965, filed Jan. 20, 1995, now U.S. Pat. No. 5,601,432 entitled EDUCATIONAL ORGANIZER, assigned to the same Assignee as the present invention and whose disclosure is incorporated by reference herein.

FIELD OF THE INVENTION

The invention pertains to devices that provide cognitively-impaired people with a compensatory assistance apparatus. In particular, the invention pertains to a graphically interactive computer system that allows the person, having the impairment, to read and respond to lessons, schedules, etc., while permitting access to an instructor for supervision purposes and access to a remotely-located storage/servicing entity via a modem line. In addition, this invention is applicable to the general population of people having a cognitive impairment by providing them with life skill organization and memory aids.

BACKGROUND OF INVENTION

Providing the cognitively-impaired person with an easy and fun way of learning and organizing tasks relies on the use of orthosis (the correction of mental or physical distortion) devices rather than prosthesis (replacement of missing body parts) devices. In other words, the learning disabled person is provided with prompts, cues, or other indicia which minimize or simplify a particular mental or physical distortion experienced by the person in order to facilitate the person's response to a particular task without the use of medical devices coupled to the person.

Desk-top personal computers provide the ideal technologic opportunity for implementation of an assistive device to enable cognitively or physically disabled students to accomplish an unlimited number of tasks. Examples of this are the software packages provided by Laureate Learning Systems, Inc., of Winooski, Vt. Laureate Learning Systems, Inc. provide talking software that allows the disabled student to develop abilities, develop language skills, treat aphasia (a total or partial loss of the power of using or understanding words, usually caused by brain damage or injury) and traumatic brain injury, and reading difficulties. Any computer system having a keyboard, mouse and/or touch-screen can support these software packages.

Other exemplary software packages dedicated to the development of learning disabled students is provided in the *TECH-NJ Technology, Educators, & Children with Disabilities-New Jersey*, Spring 1994, Vol. 5, No. 1.

The closest art available is a specially designed cognitive orthotic software system sold under the trademark "Essential Steps" by the Assignee of the present invention. This software system provides users with acquired brain injury and other cognitive impairments a comprehensive, easy-to-use computer that, among other things: manages time, schedules appointments and activities, budgets and manages money, provides a daily journal in an easily reviewable format, logs and reviews telephone calls and maintains a personal telephone directory. This system uses on-screen cues and directions, guided sequences, single keystroke functions, arousal alert, voice output for cueing and voice input for responding. However, this system, among other things, is not designed for assisting cognitively impaired students with school-related activities, allows the student only a limited number (and a limited size) of files to save, and does not allow the student to partition tasks into steps having their own completion dates. Finally, this system does not use a graphical user interface for simplifying the user response to avoid having the user memorize command strings.

OBJECTS OF THE INVENTION

Accordingly, it is the general object of this invention to overcome the disadvantages of the prior art.

It is an object of this invention to provide a compensatory assistive device for persons with cognitive impairment (including but not limited to traumatic brain injury, stroke, electrocution, anoxia, mental retardation, dementia, amnesia, and learning disabilities), and/or physical disabilities (such as cerebral palsy).

It is yet another object of this invention to provide an easy-to-use computer orthotic software system that eliminates the need for the disabled person to memorize command strings (e.g., to boot the system, print documents) and storage hierarchies (e.g., directories, files).

It is still yet a further object of this invention to provide an easy-to-use computer orthotic software system that can be easily modified thereby allowing customization for the varied and specific needs of the disabled person.

It is even yet a further object of this invention to provide an easy-to-use computer orthotic software system that is operable on a standard personal computer which can be used in a network, in a notebook computer, and/or linked by modem for support and backup.

It is another object of this invention to provide a computer orthotic software system having highly simplified functions with on-screen instructions and cues, consistent screen design, single "click" selection with pointing devices and use of color associations.

It is yet a further object of this invention to provide an organized and structured money manager for direct use by people with a cognitive impairment without the need for assistance.

It is even yet a further object of this invention to provide an organized and structured directory and telephone log for direct use by people with a cognitive impairment without the need for assistance.

It is still a further object of this invention to provide an organized and structured scheduler for direct use by people with a cognitive impairment without the need for assistance.

It is still another object of this invention to provide an organized and structured writer for direct use by people with a cognitive impairment without the need for assistance.

SUMMARY OF THE INVENTION

These and other objects of the instant invention are achieved by providing a compensatory assistive apparatus for a user (e.g., a student, an employee, a patient, etc.) with cognitive impairment (including but not limited to traumatic brain injury, stroke, electrocution, anoxia, mental retardation, dementia, amnesia, and learning disabilities), and/or physical disabilities (such as cerebral palsy) which allows the user to make entries and files therein. The apparatus comprises a first computer having a monitor and a graphical user interface that displays only one application on the monitor at any time. The graphical user interface requires the exiting of the application before entering another application. Within each application that is displayed on the monitor there is a predetermined number of user prompts and working information at predetermined locations on the monitor using predetermined colors. The graphical user interface uses a movable pointer which the graphical user interface restricts in displacement in all directions in the displayed application so that the movable pointer always remains in the view of the user. Furthermore, the graphical user interface displays a guidance icon that graphically instructs the user what the user must do to respond. In addition, the graphical user interface automatically saves all files and entries created by the user to the first computer without user intervention. The graphical user interface further comprises a money manager module that permits the user to manage bank accounts (e.g., to record deposit/withdraw transactional information regarding, and to balance, checking accounts and savings accounts as well as for writing checks or simply viewing the balance of checking and savings accounts, etc.). The apparatus has an input means for inputting data to the first computer and for controlling the pointer. The apparatus also has an output means for outputting data from the first computer.

DESCRIPTION OF THE DRAWINGS

Other objects and many of the attendant advantages of this invention will be readily appreciated as the same becomes better understood by reference to the following detailed description when considered in connection with the accompanying drawings wherein.

DETAILED DESCRIPTION OF THE PREFERRED EMBODIMENT

Figure 1A:
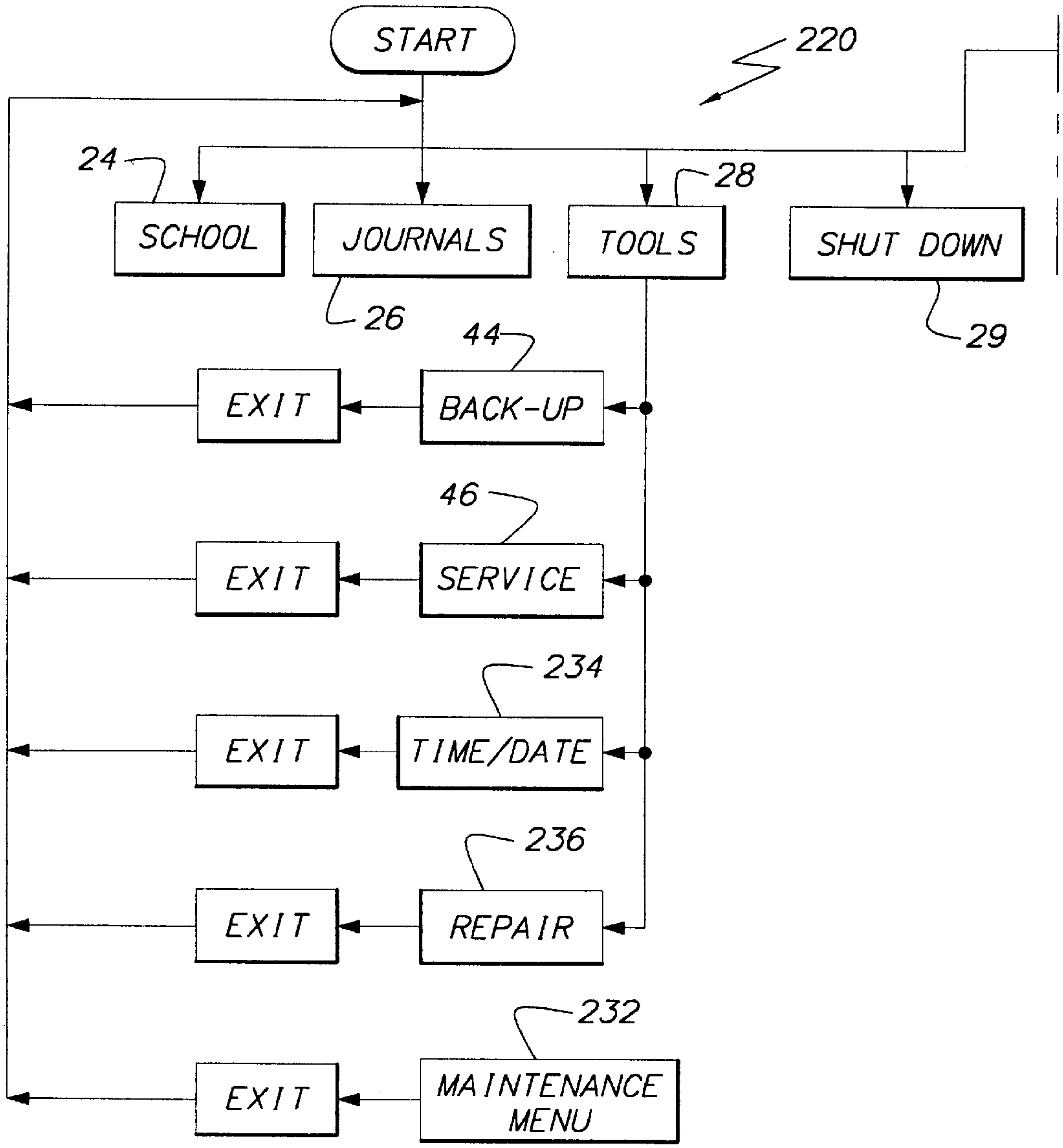
FIGS. 1A–1E is a block diagram of the Main Menu of the Educational & Life Skills Organizer/Memory Aid.
Figure 1B:
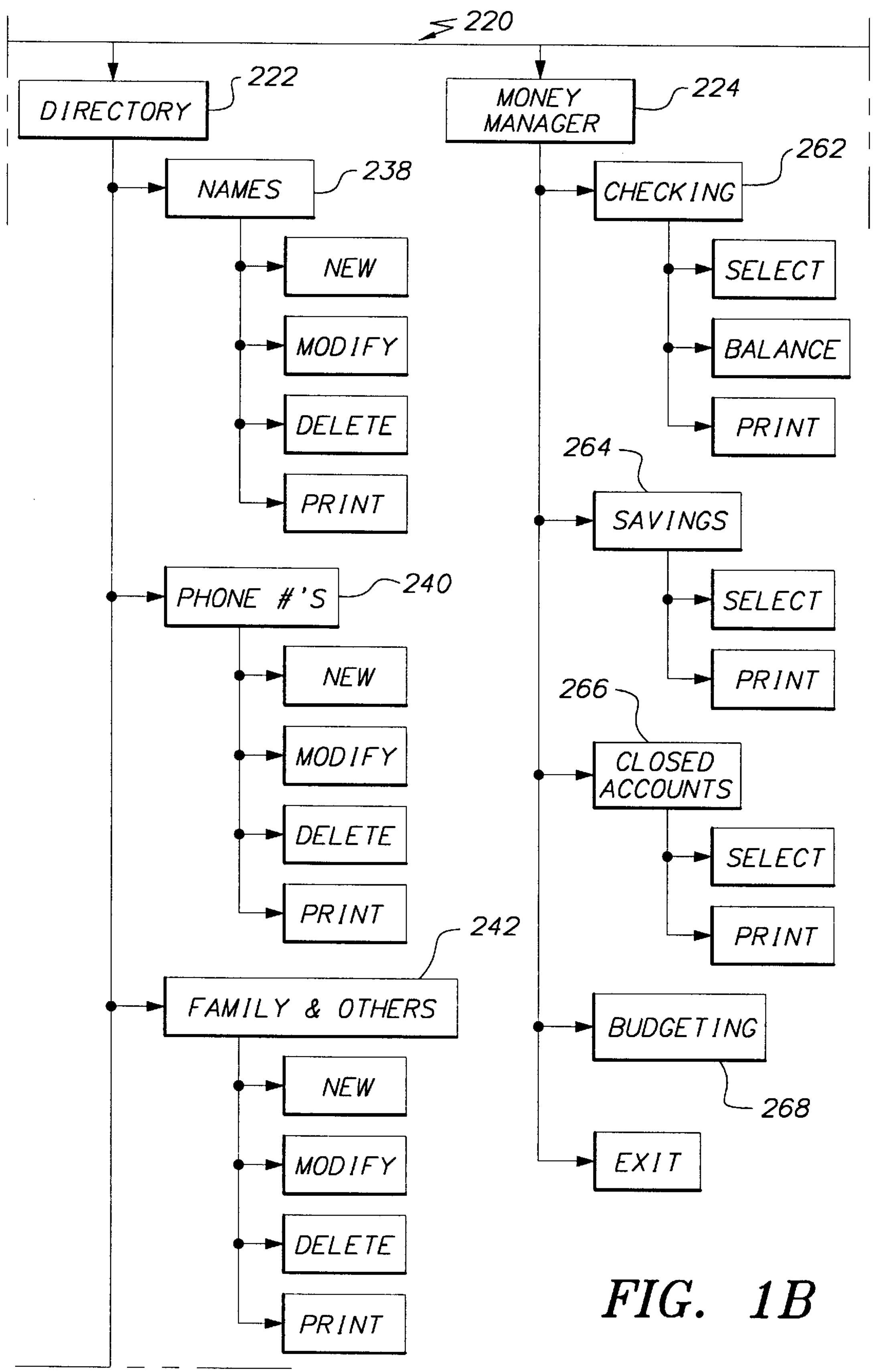
Figure 1C:
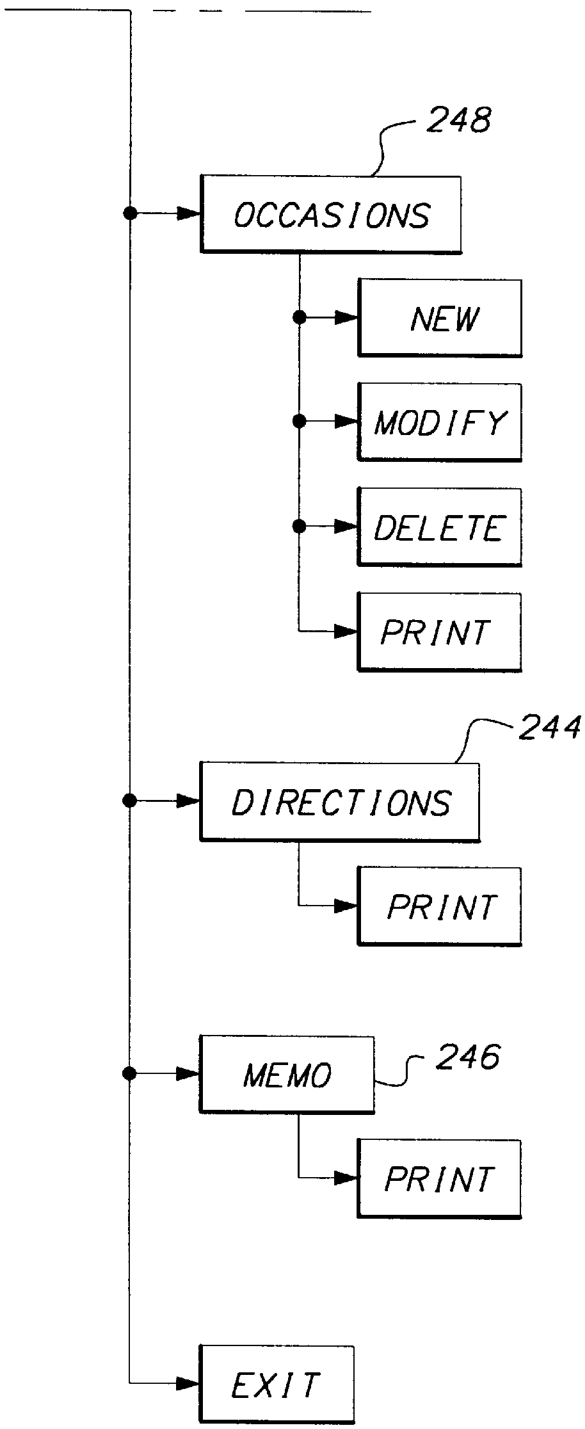
Figure 1D:
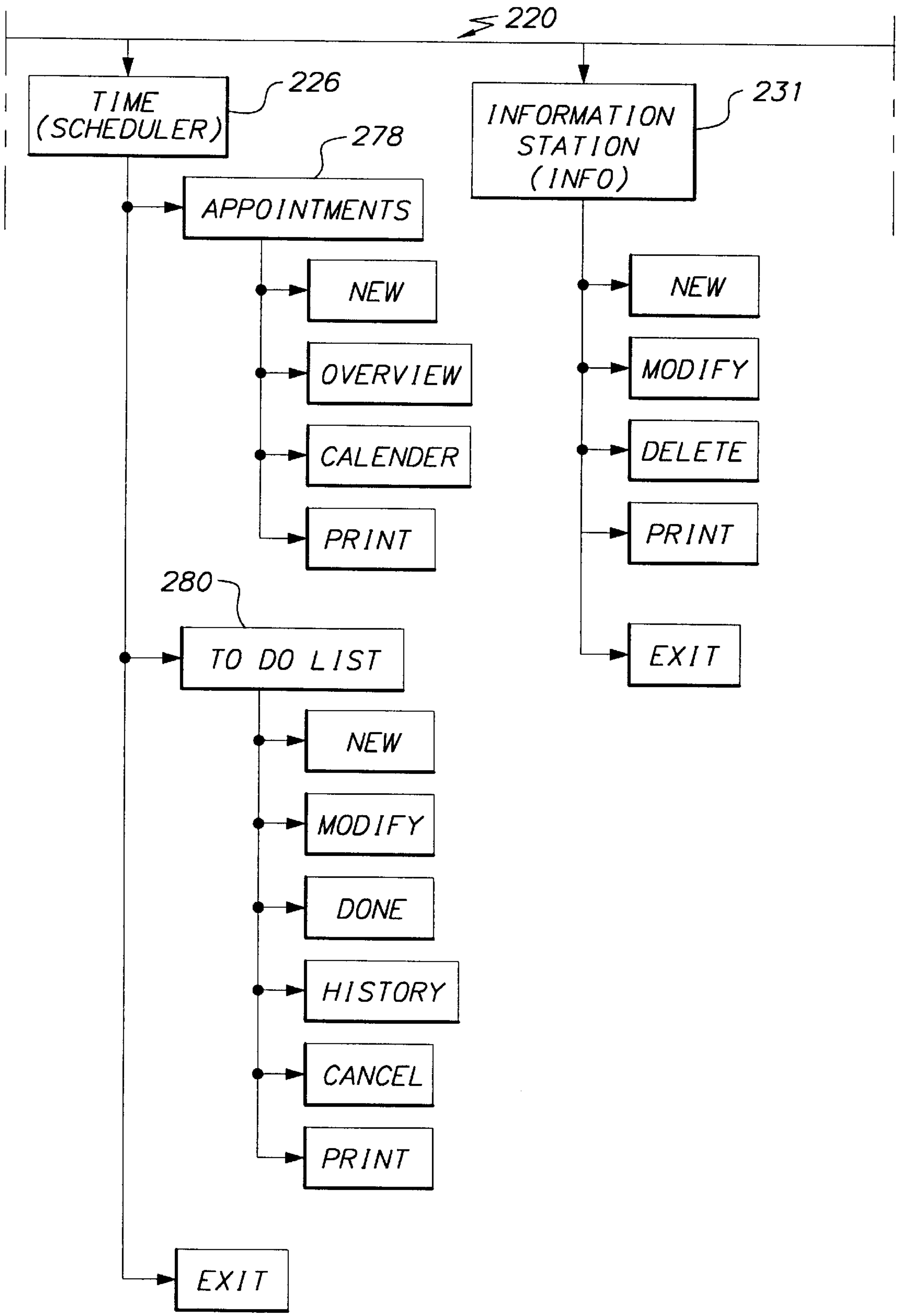
Figure 1E:
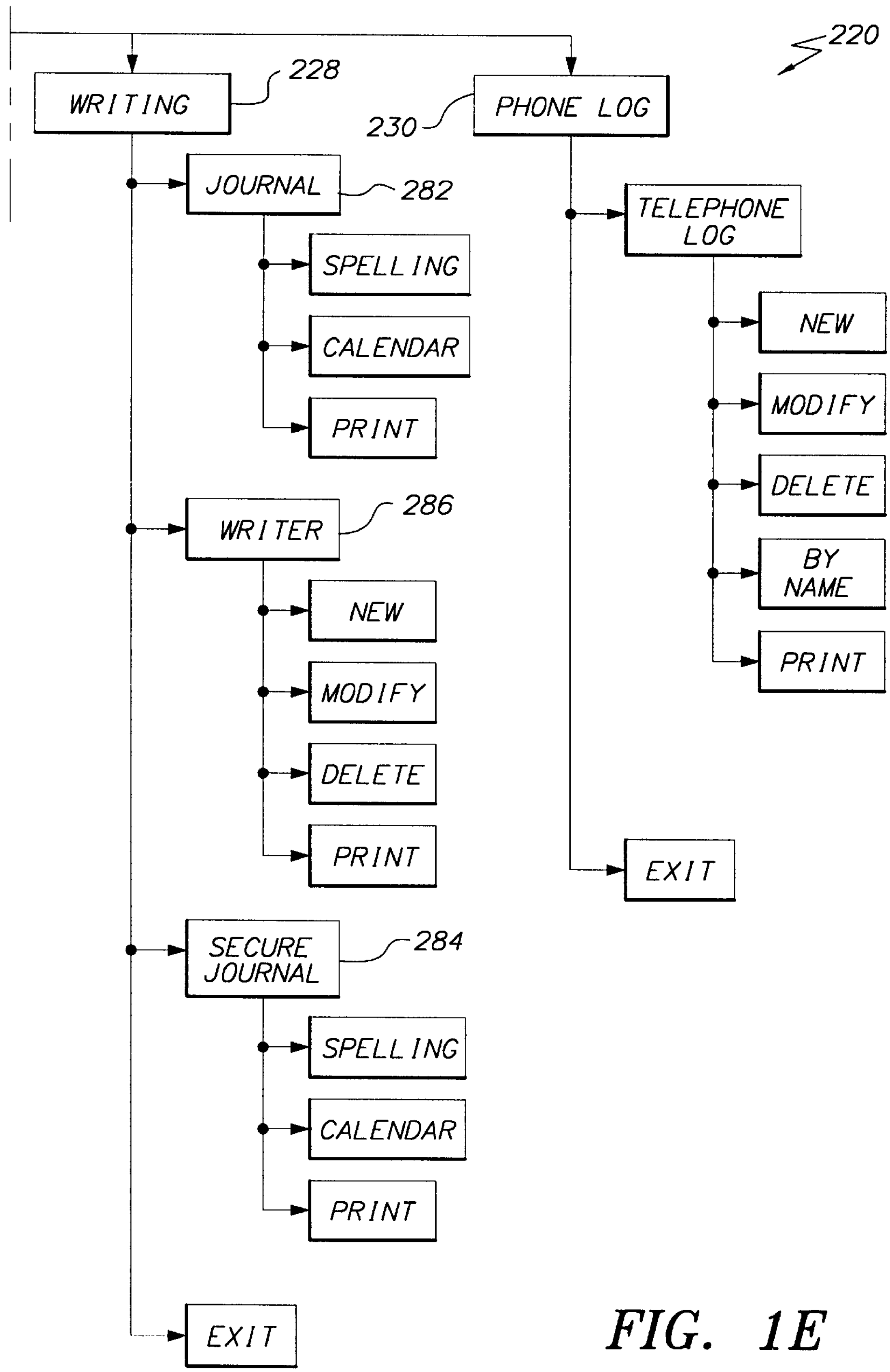

Referring now in detail to the various figures of the drawing wherein like reference characters refer to like parts, there is shown at 220 in FIGS. 1A–1E, the Educational & Life Skills Organizer/Memory Aid of the present invention. The Educational & Life Skills Organizer/Memory Aid 220 is supported by the same apparatus disclosed in FIG. 1 (and its corresponding text) of application Ser. No. 08/376,965 whose disclosure is incorporated by reference herein. As such, reference numbers between 1–84 refer to those items disclosed in application Ser. No. 08/376,965. It should be noted that the Educational & Life Skills Organizer/Memory Aid 220 comprises the Educational Organizer 20 of application Ser. No. 08/376,965 with the addition of a Directory Module 222, a Money Manager Module 224, a Time (Scheduler) Module 226, a Writing Module 228 and a Phone Log Module 230 and an Information Station Module 231.

The Educational & Life Skills Organizer/Memory Aid 220 (FIGS. 1A–1E) is a multi-subject organizer appropriate for the person having the cognitive impairment, i.e., the primary user (hereinafter known simply as "the user"), who is able to read and record in written language. In addition, the Educational & Life Skills Organizer/Memory Aid 220 is also designed for use by secondary users, i.e., the teacher, therapist, supervisor, parent, spouse, or companion who programs the higher level functions; and the tertiary users, i.e., the providers/administrators. As will also be discussed later, a Maintenance Menu 232 (FIGS. 2A–2B) is provided for use by only the secondary and the tertiary users for controlling the operation of the Educational & Life Skills Organizer/Memory Aid 220 at every station; the primary users have no access to the Maintenance Menu 232.

Figure 74:
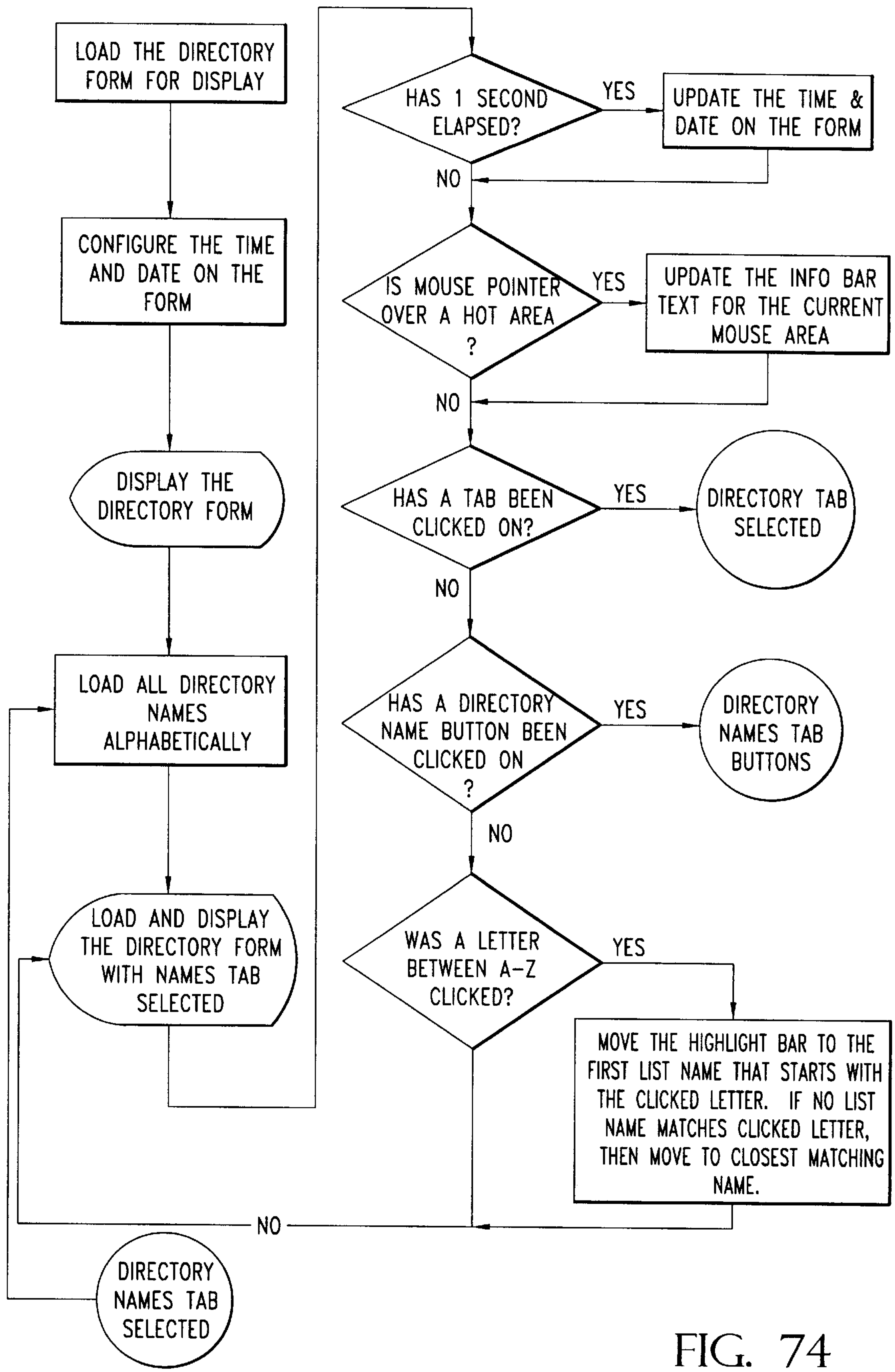
FIGS. 74–100 constitute the flow chart for the Directory module.
Figure 75:
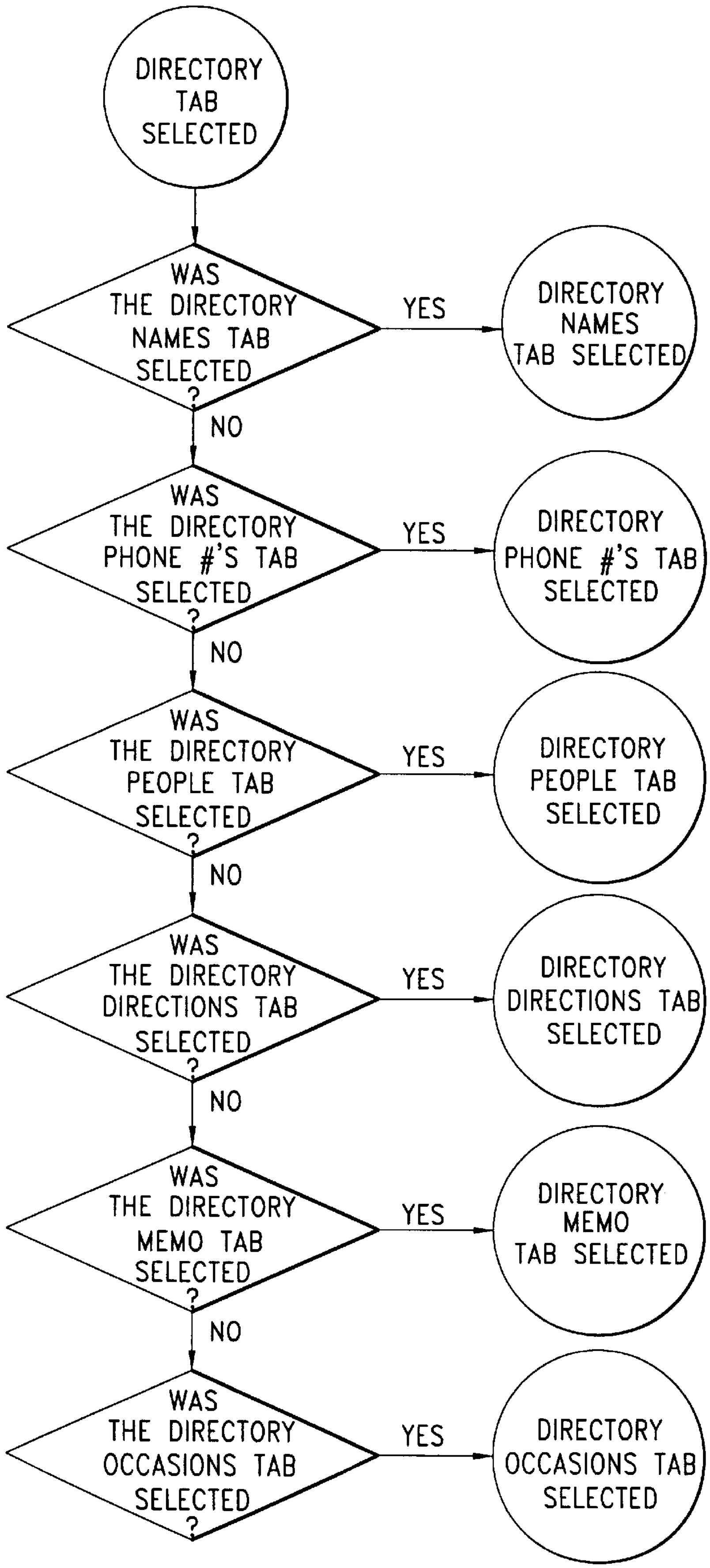
Figure 76:
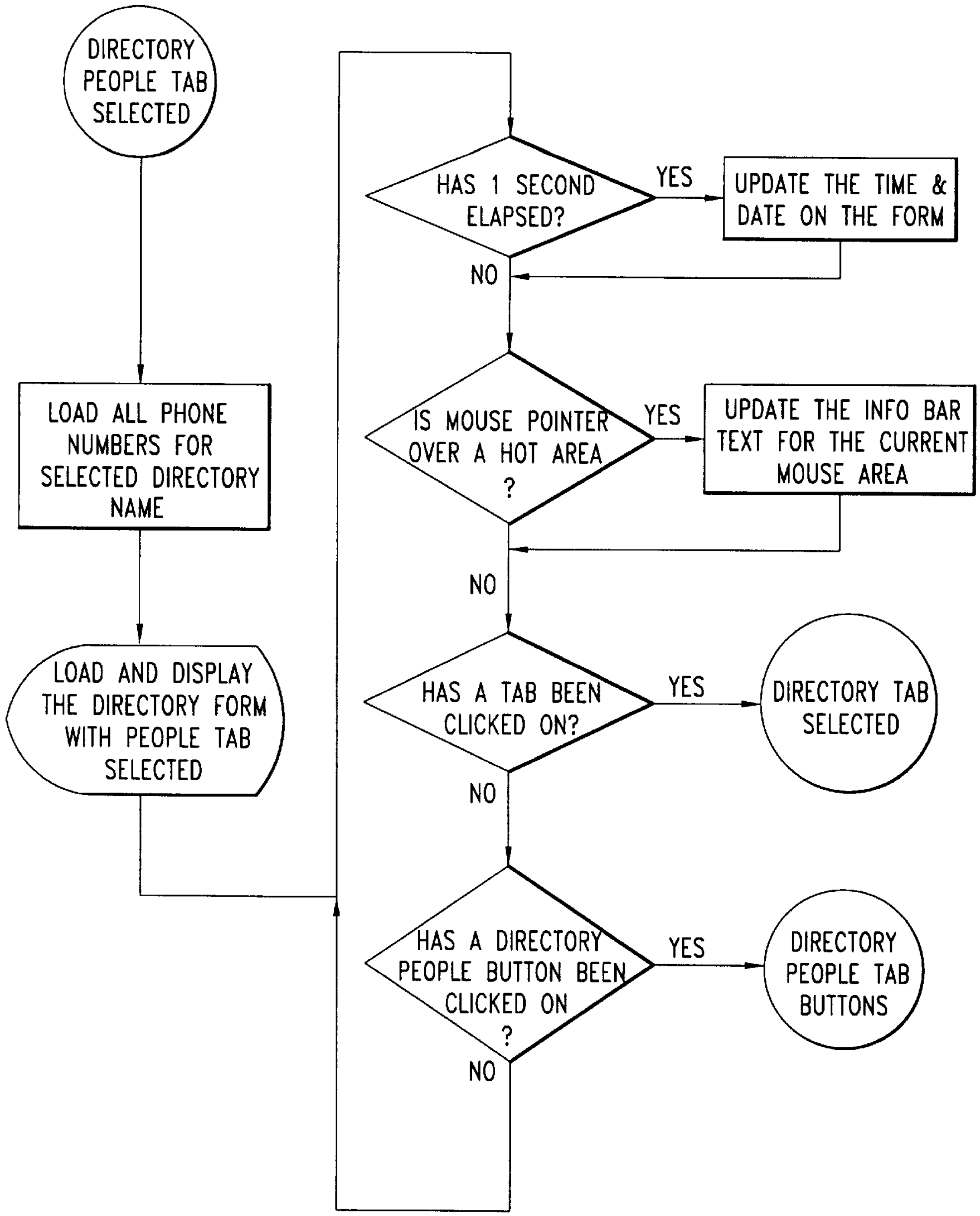
Figure 77:
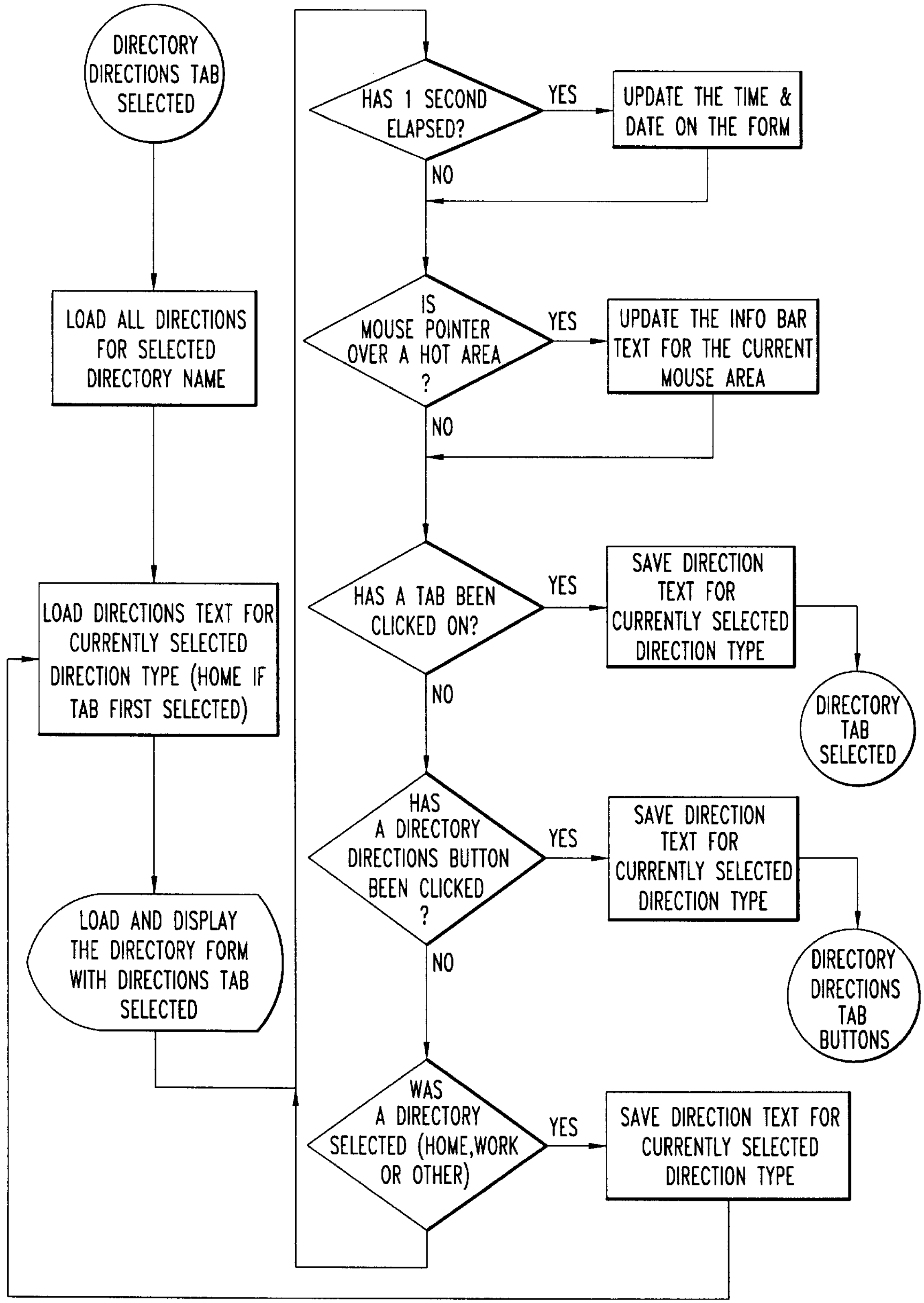
Figure 78:
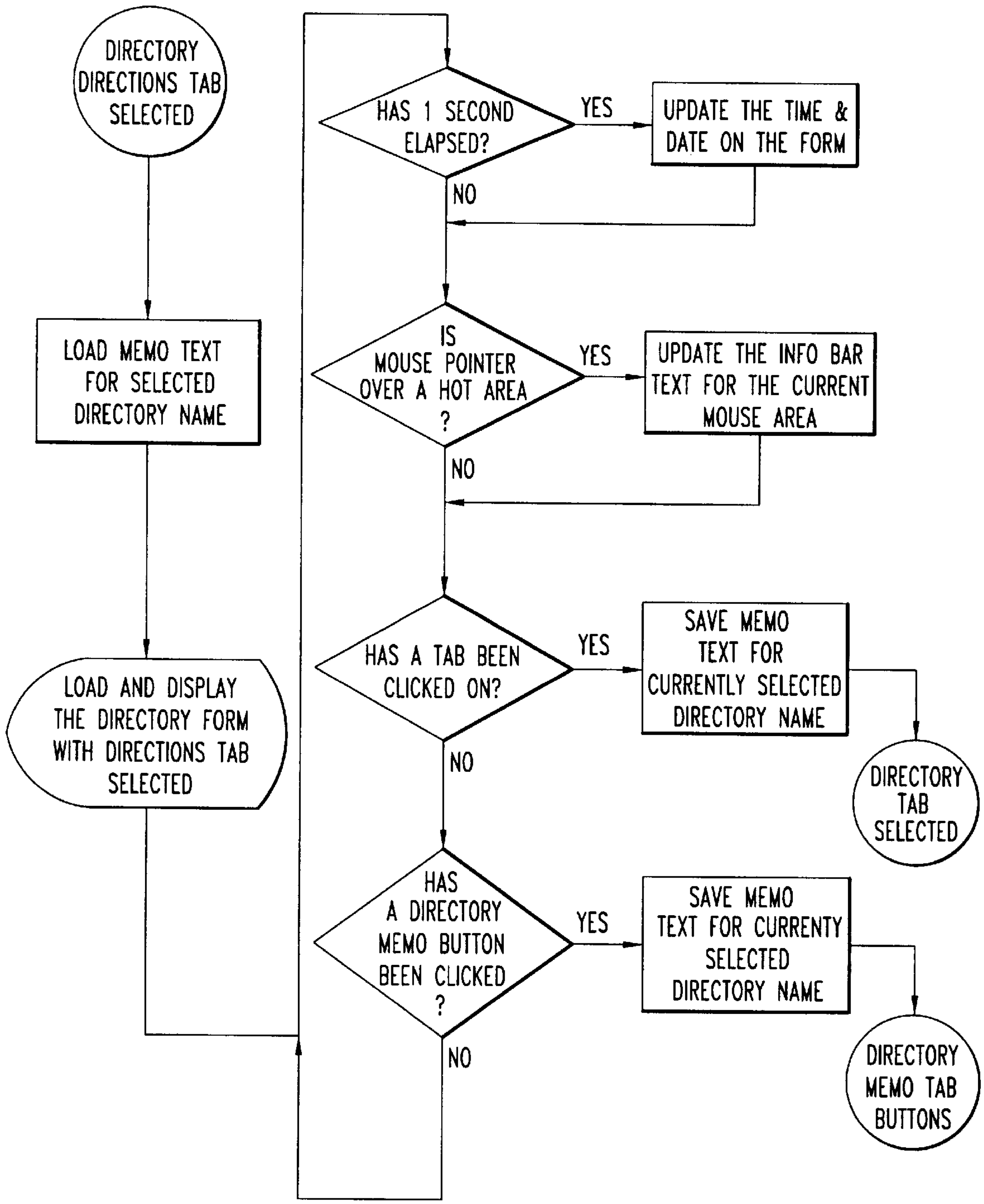
Figure 79:
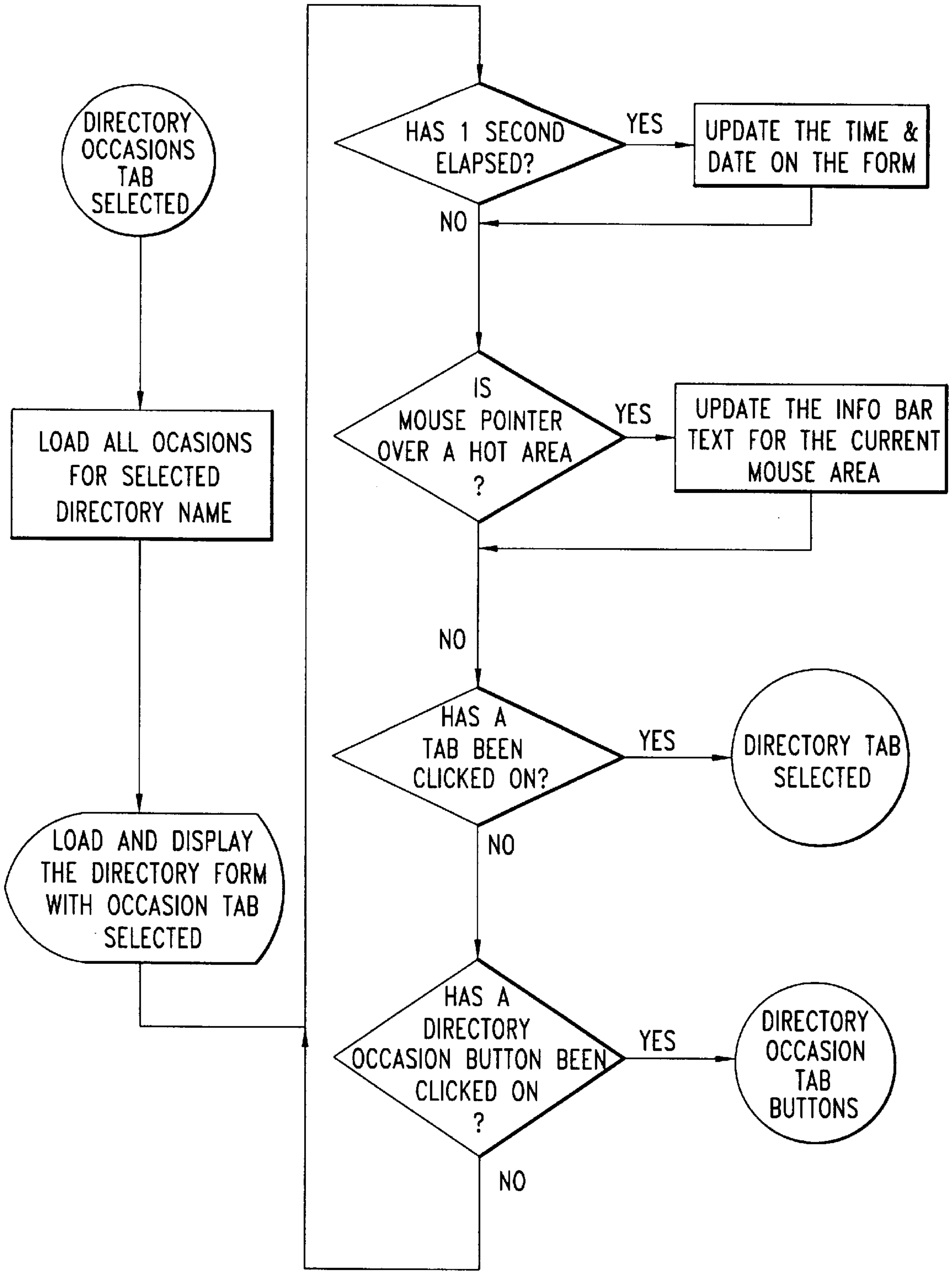
Figure 80:
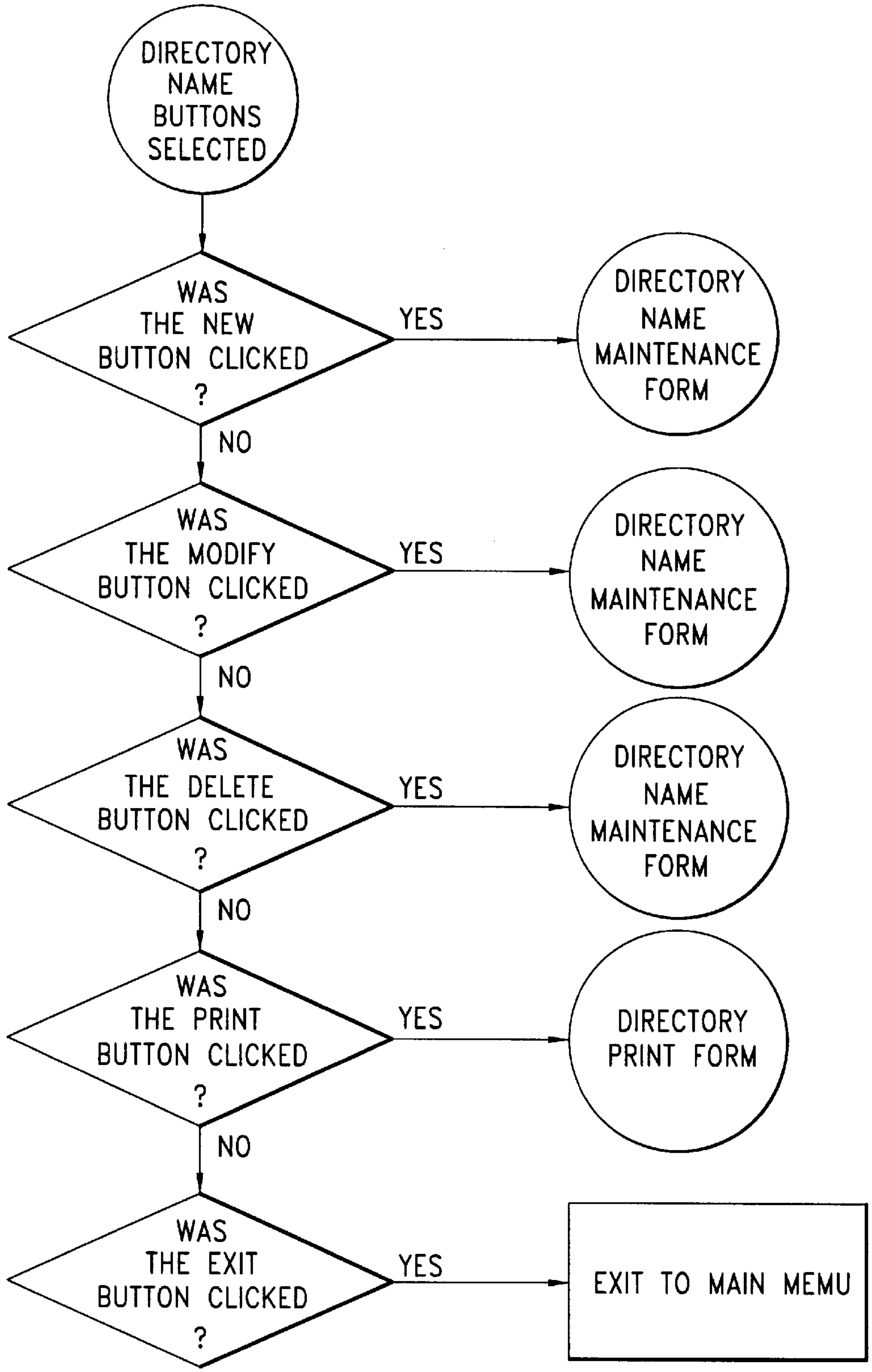
Figure 81:
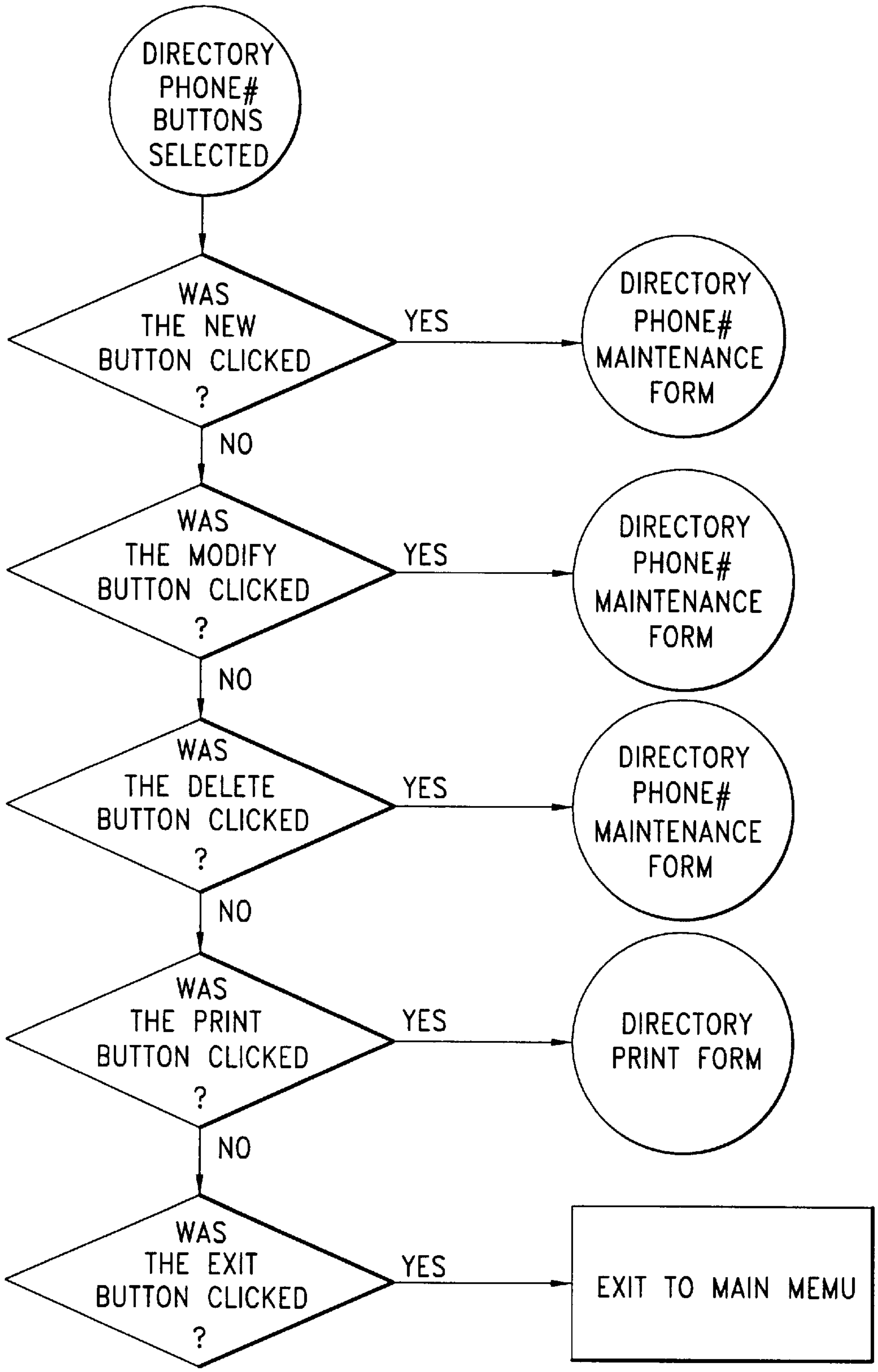
Figure 82:
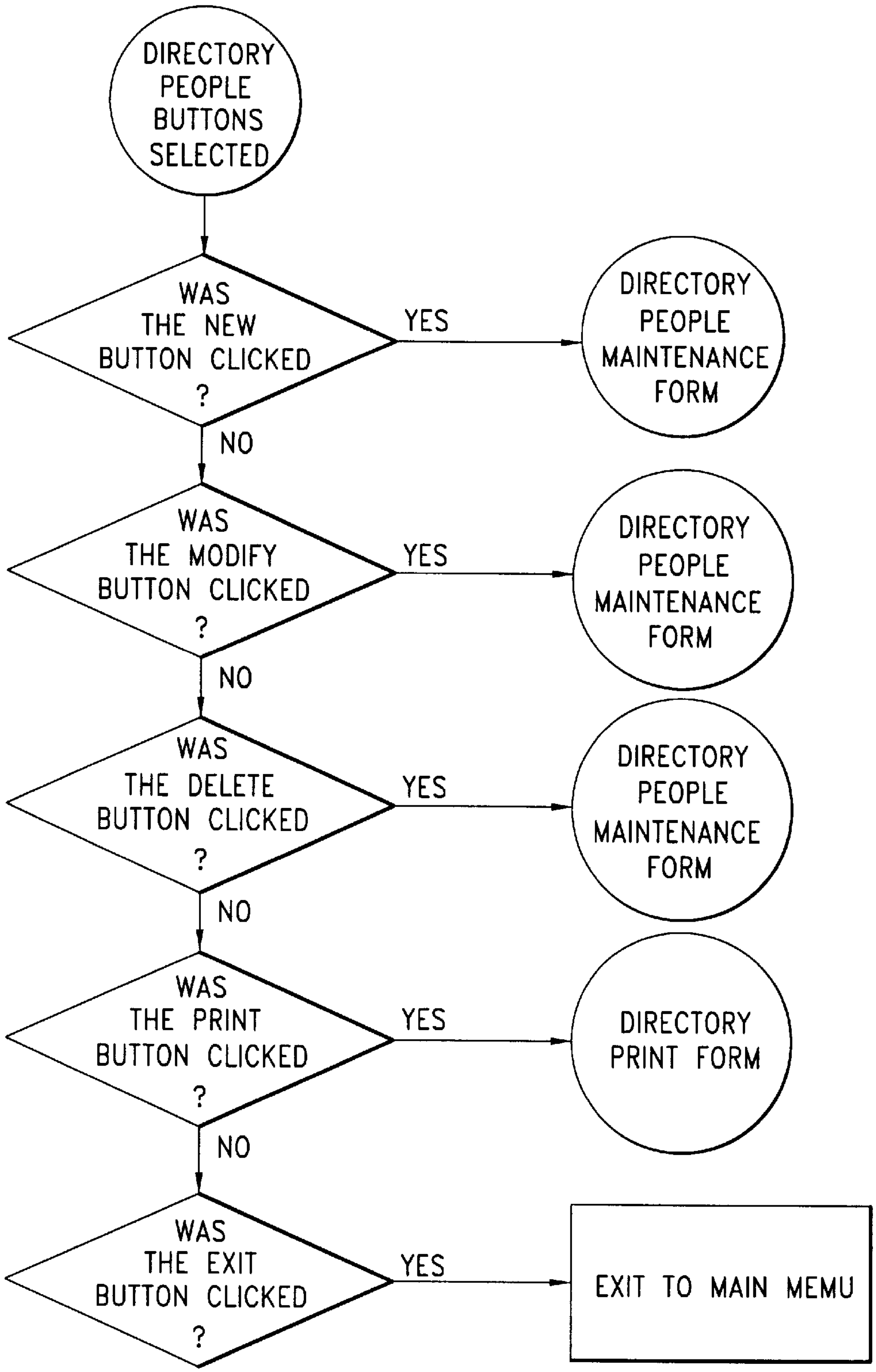
Figure 83:
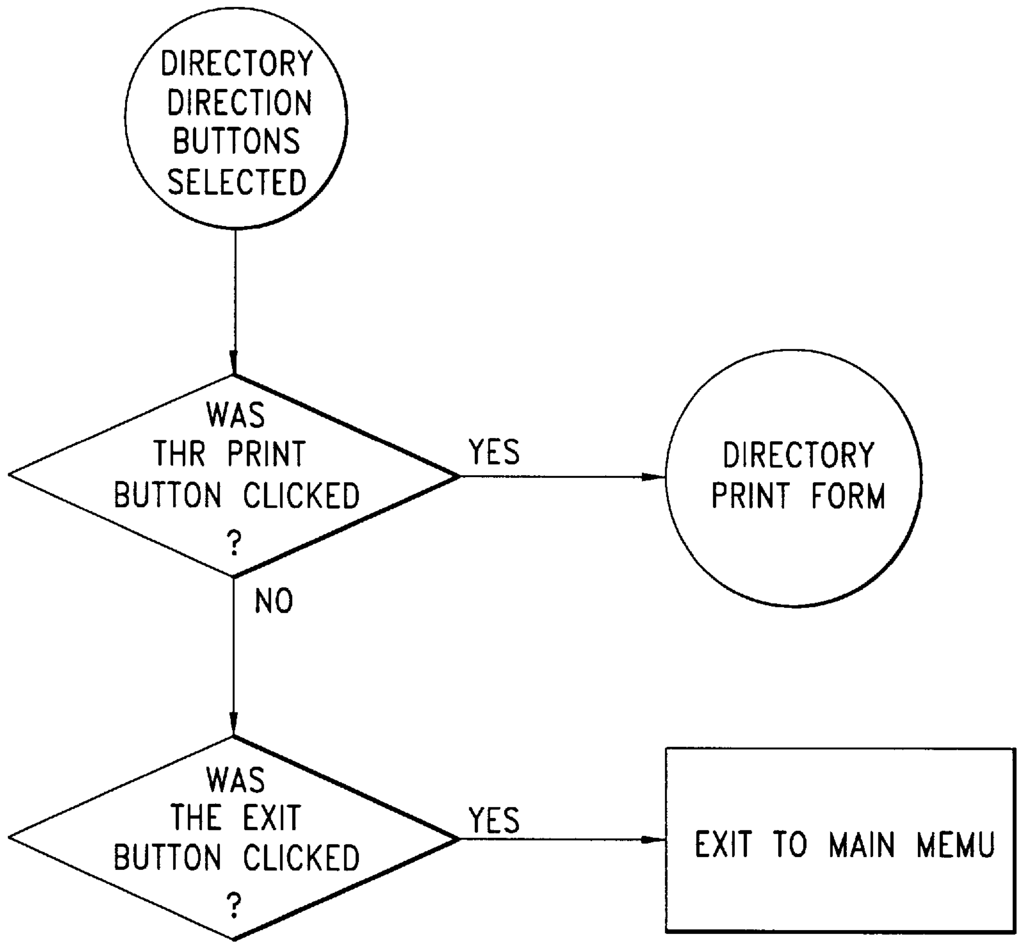
Figure 84:
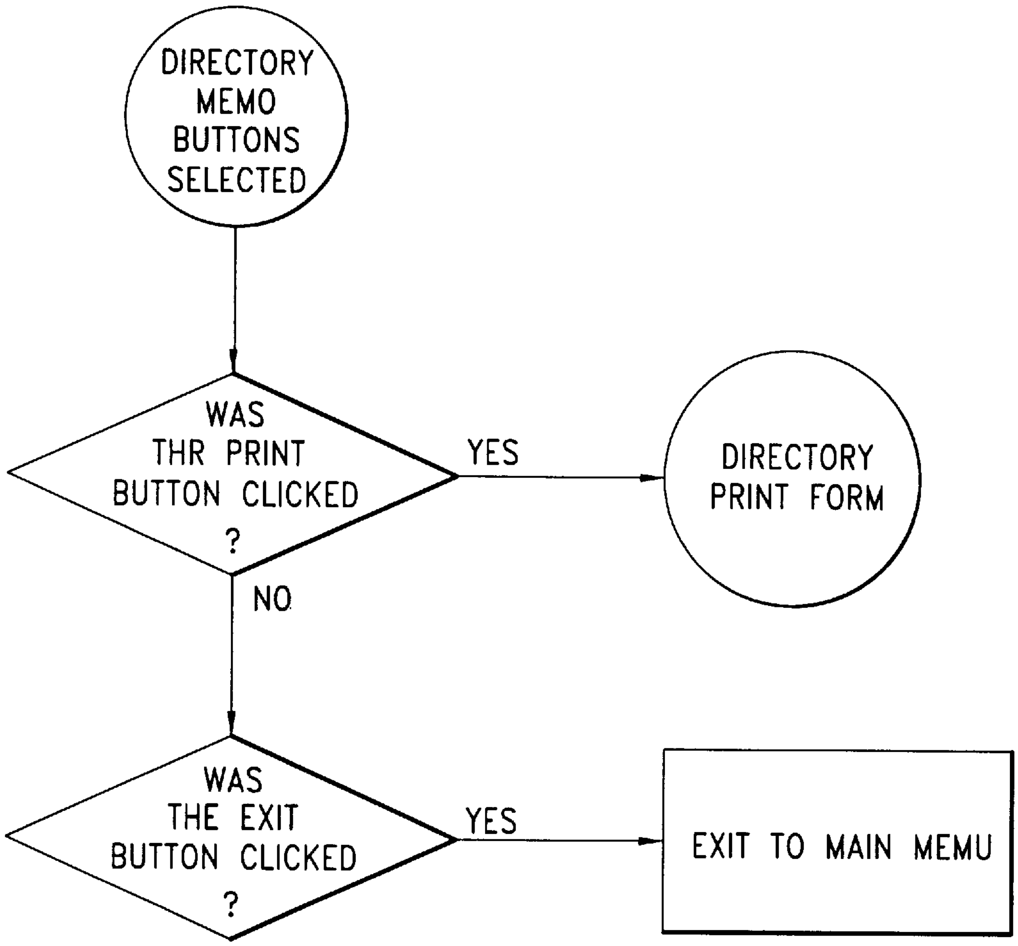
Figure 85:
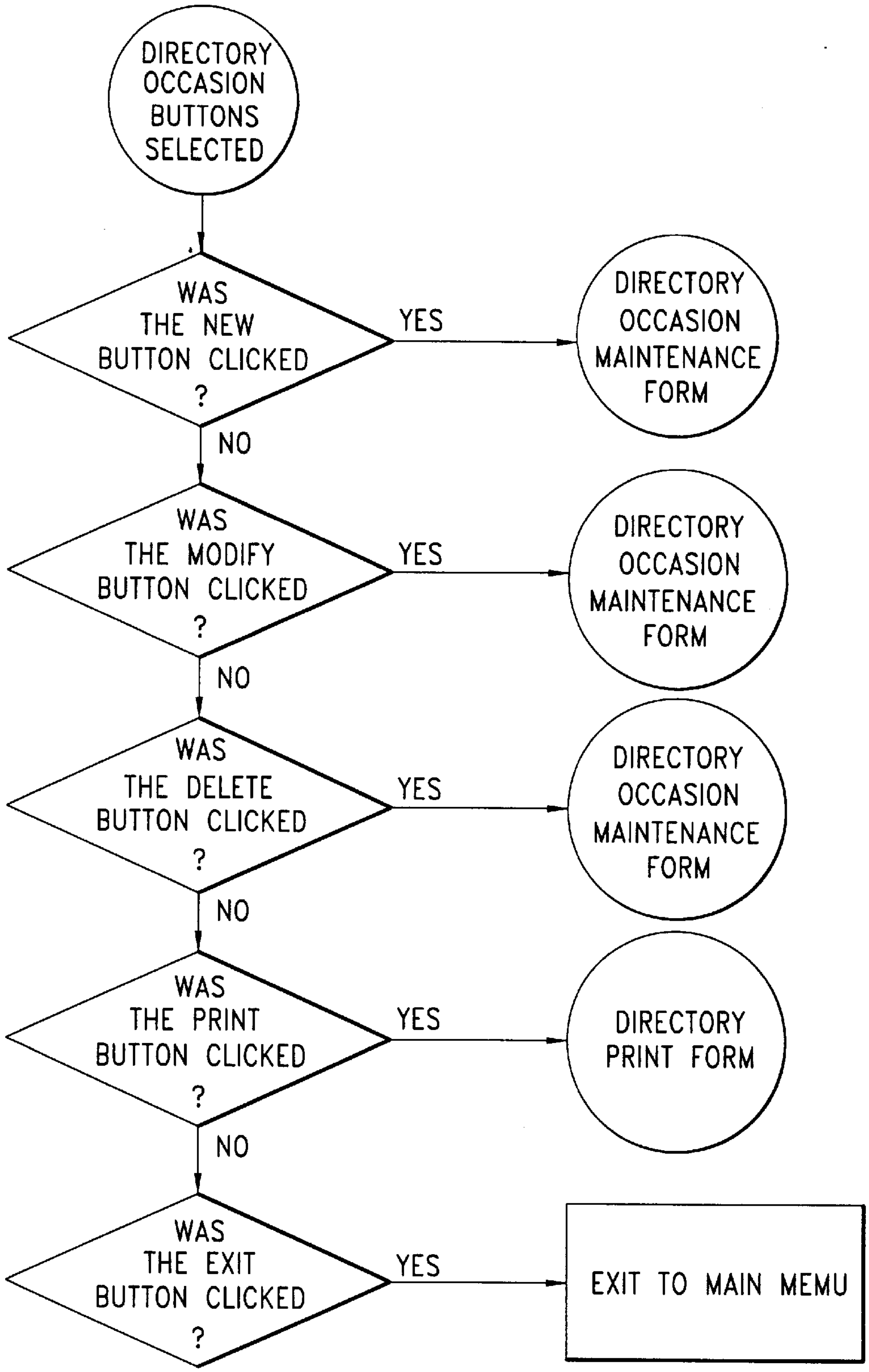
Figure 86:
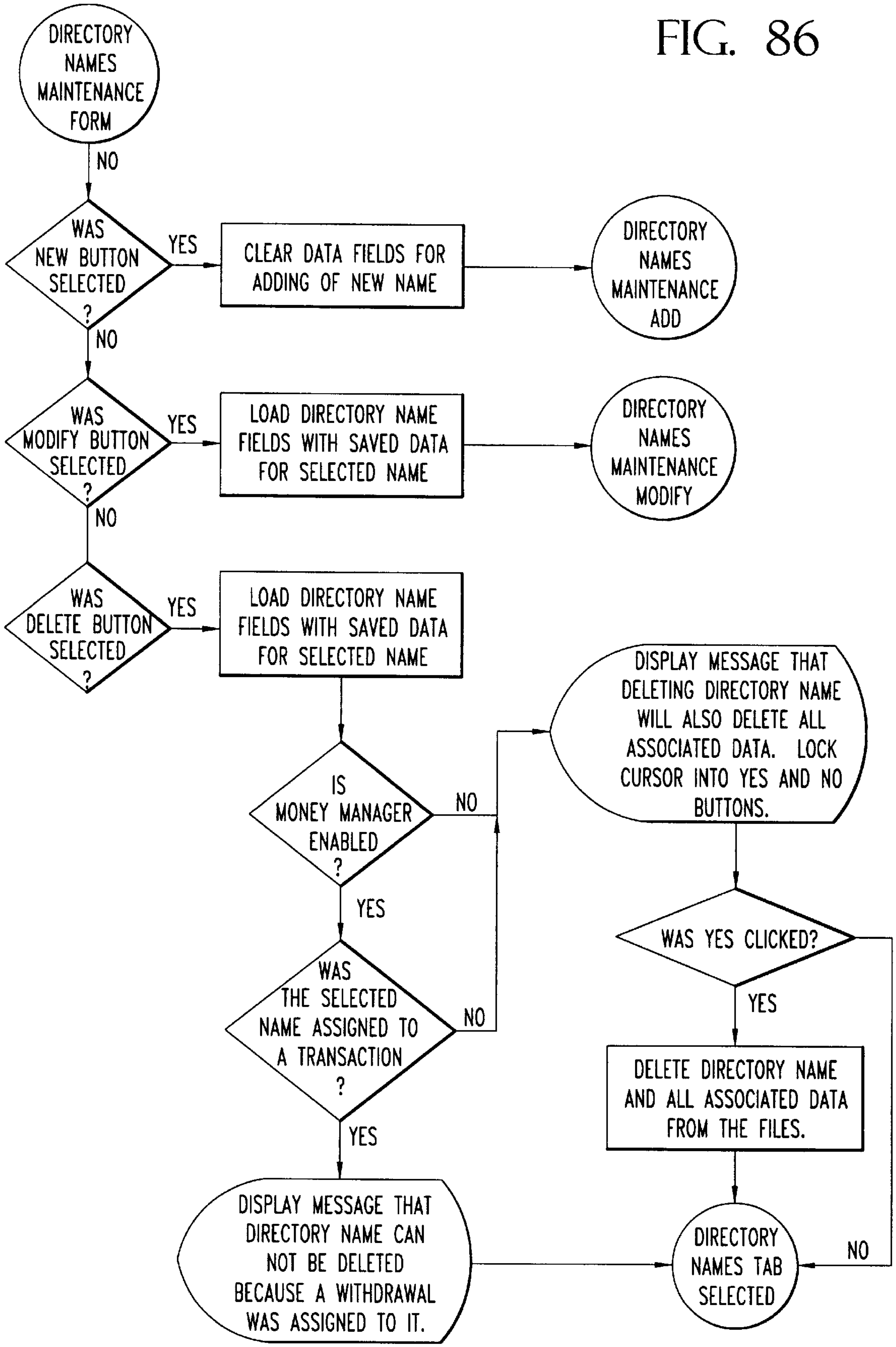
Figure 87:
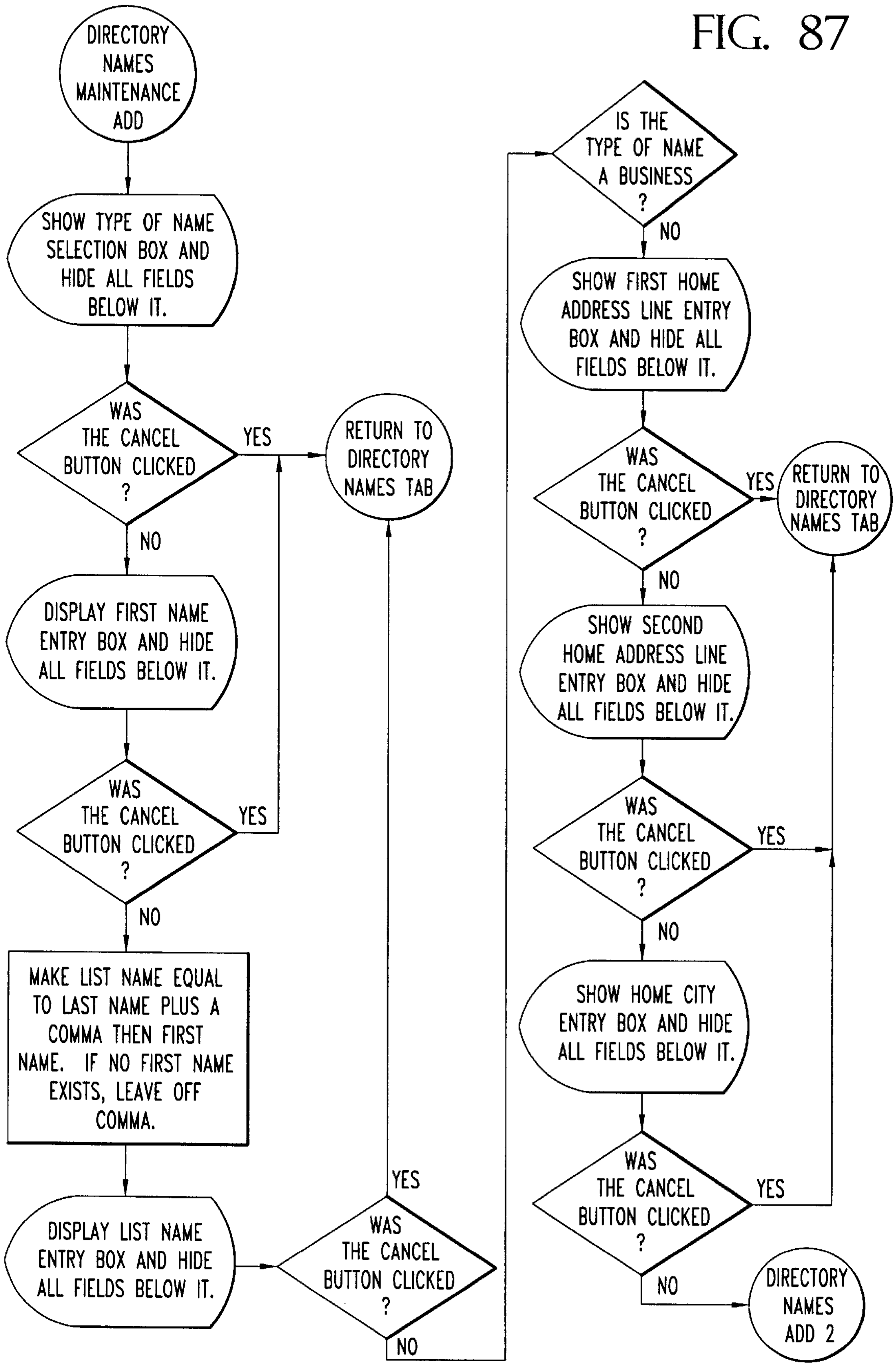
Figure 88:
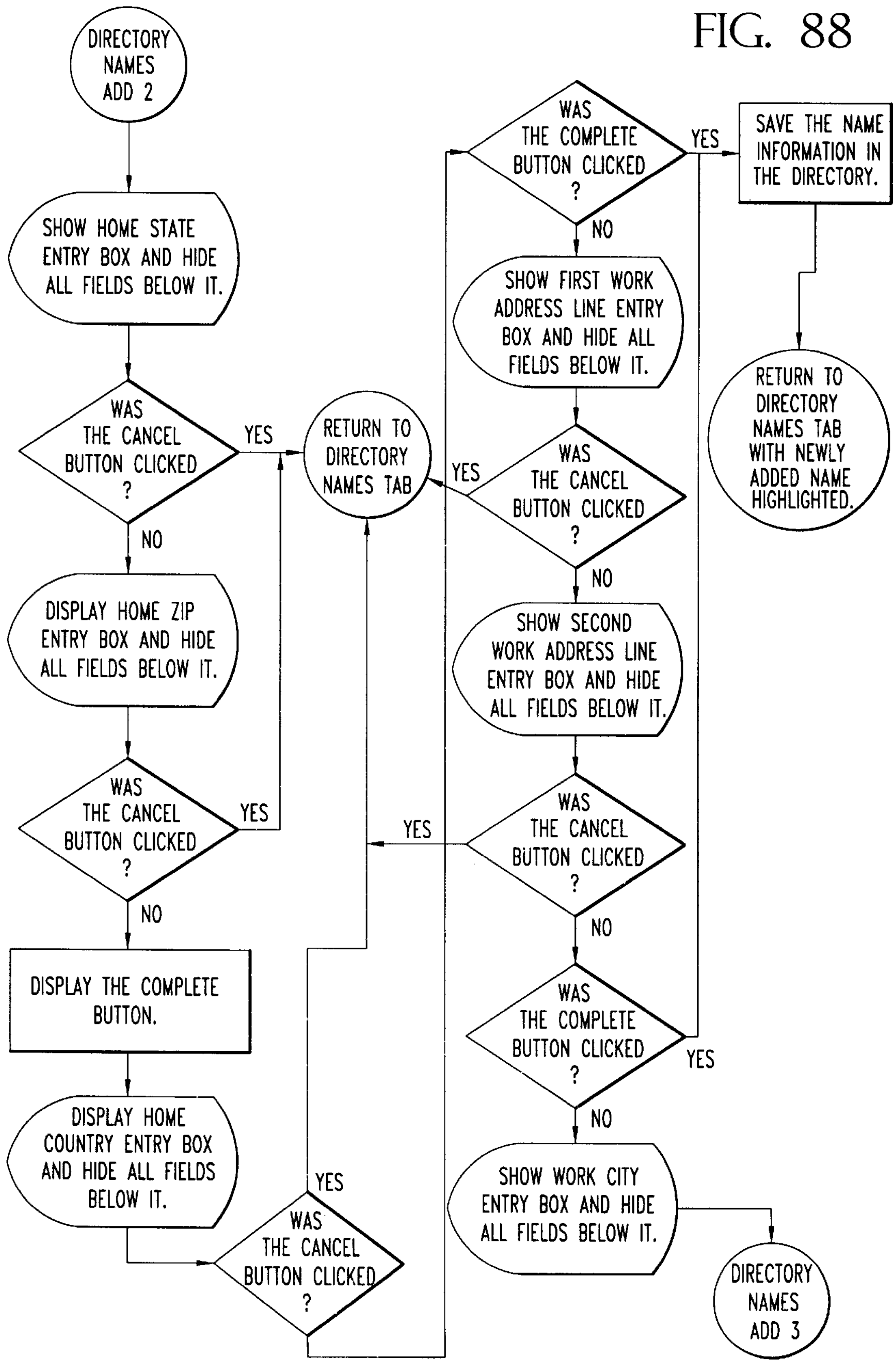
Figure 89:
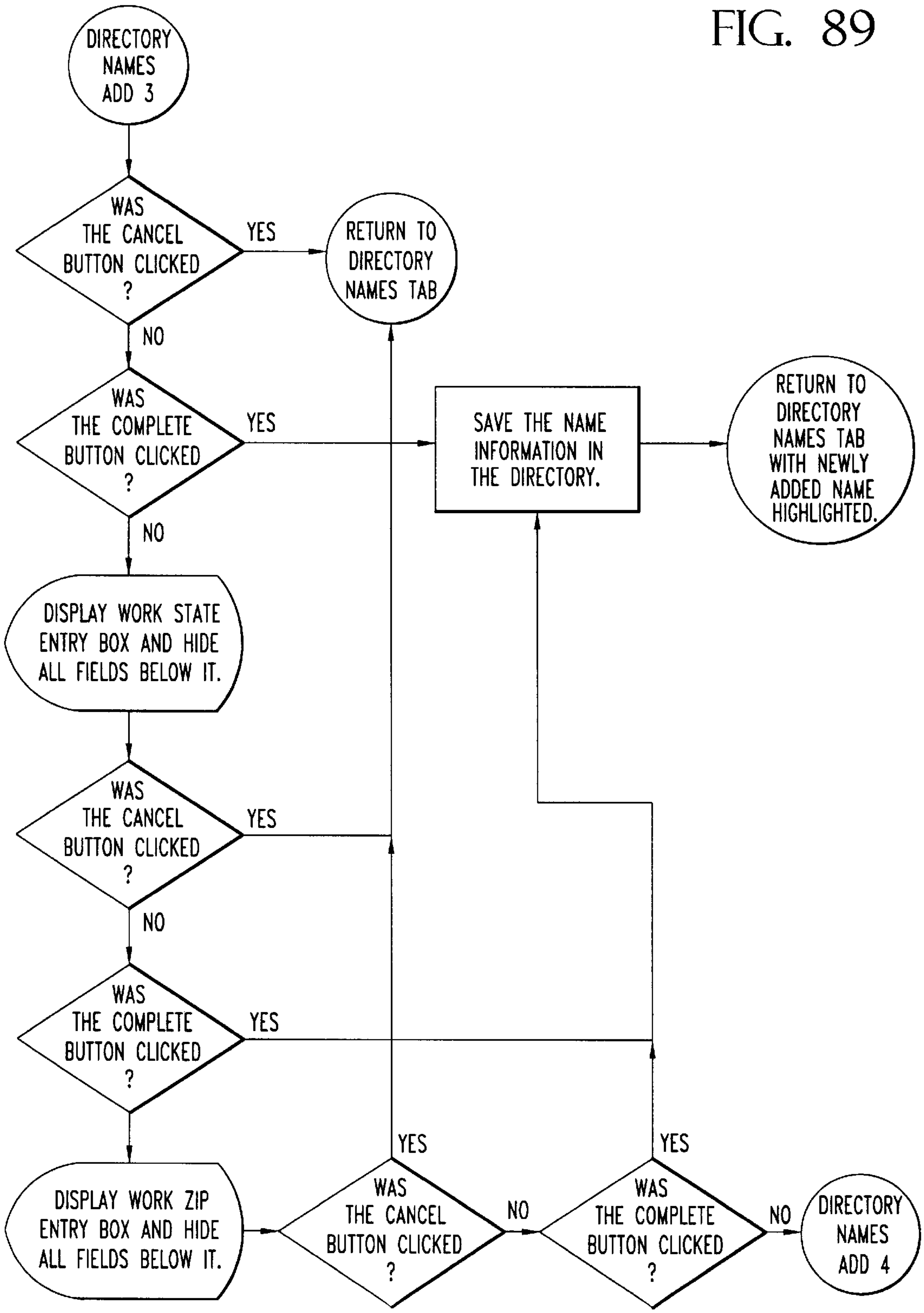
Figure 90:
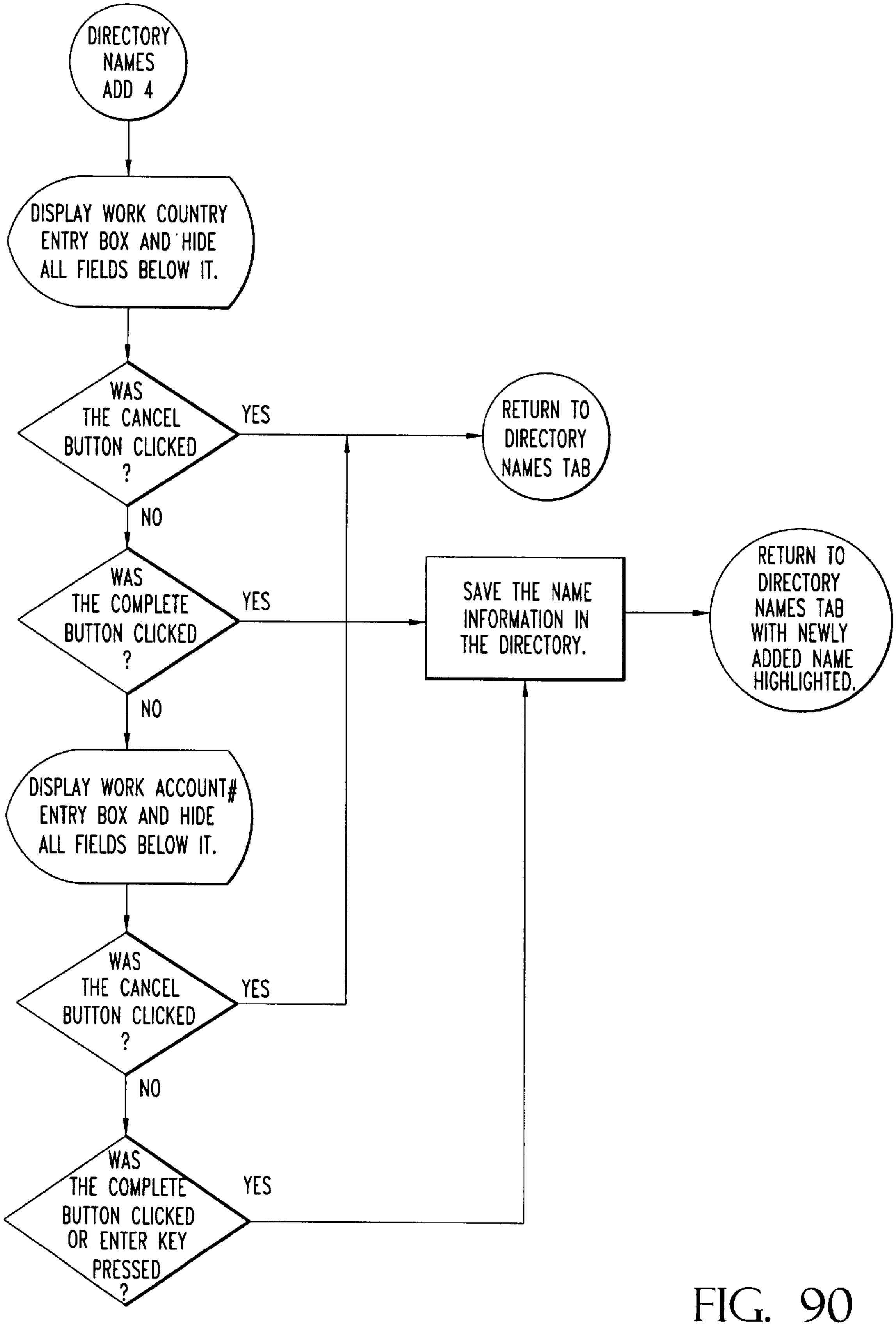
Figure 91:
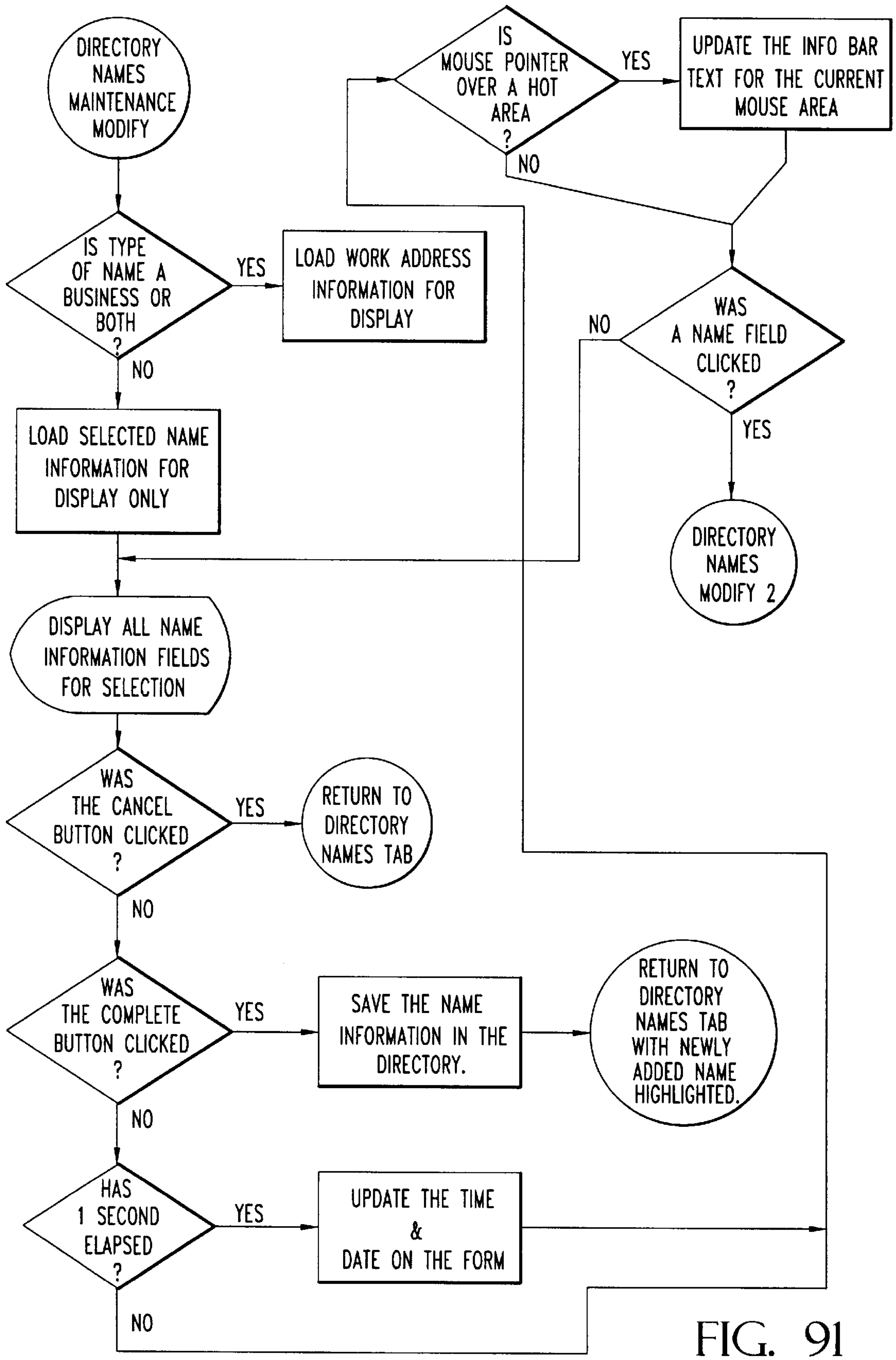
Figure 92:
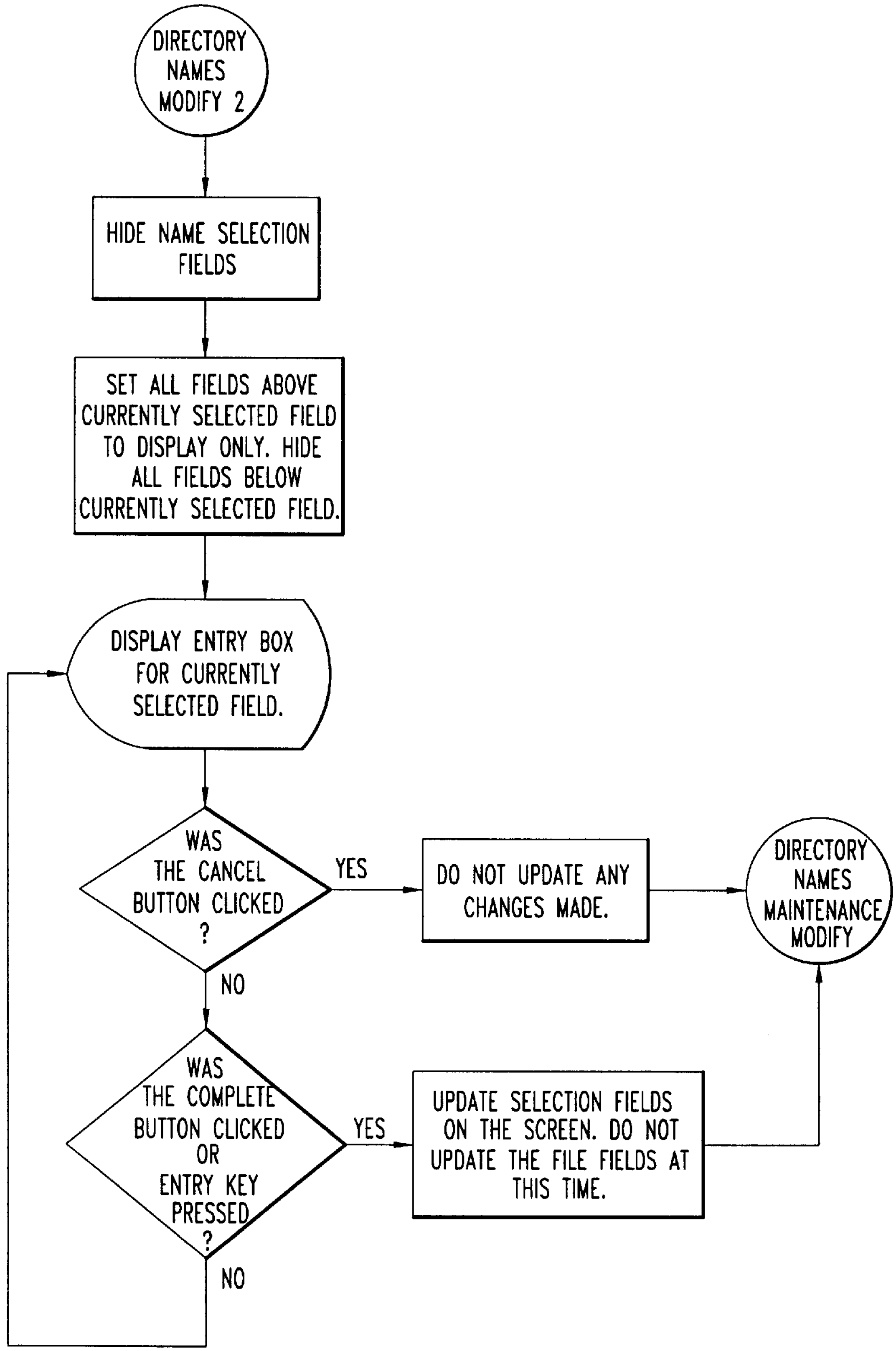
Figure 93:
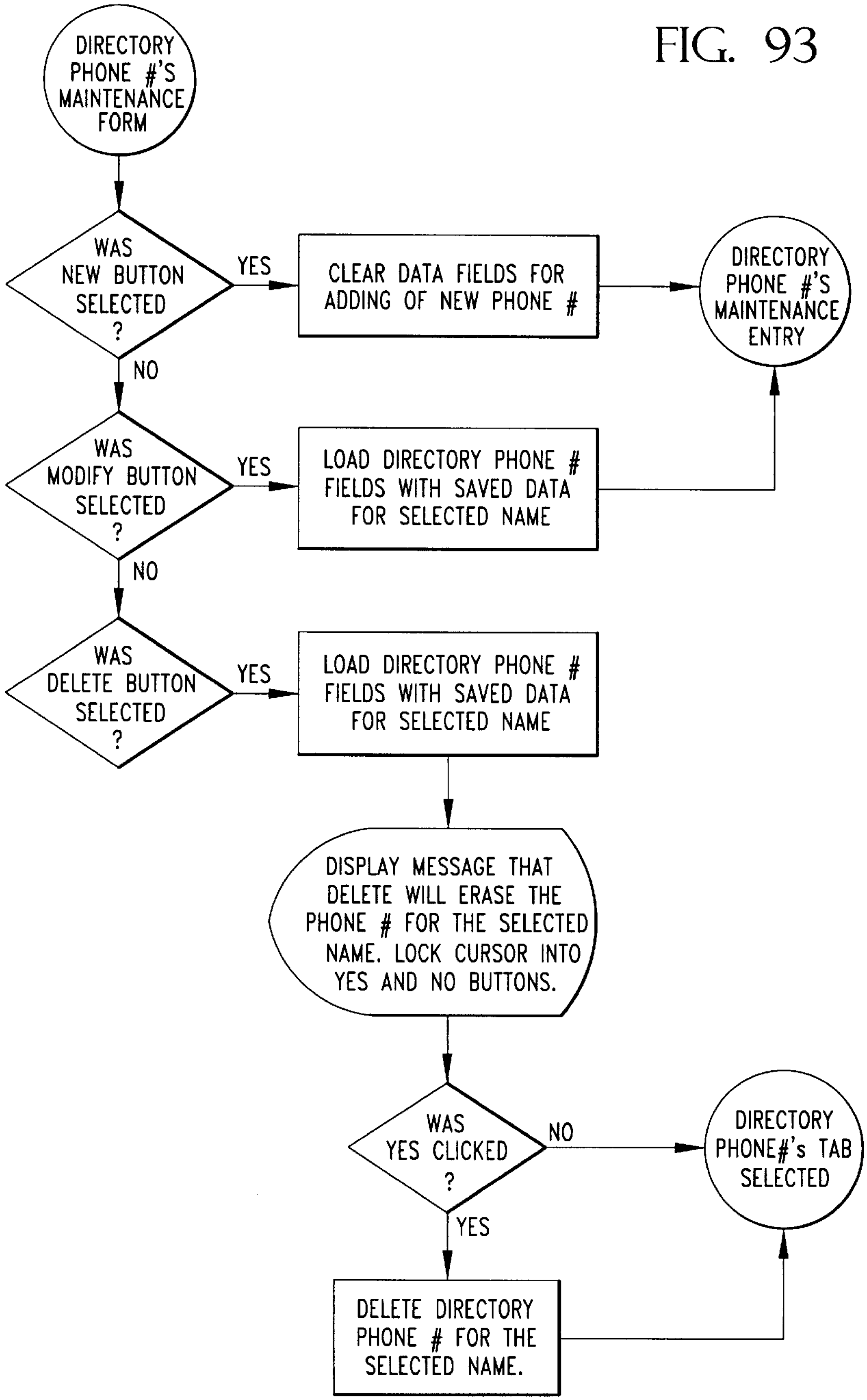
Figure 94:
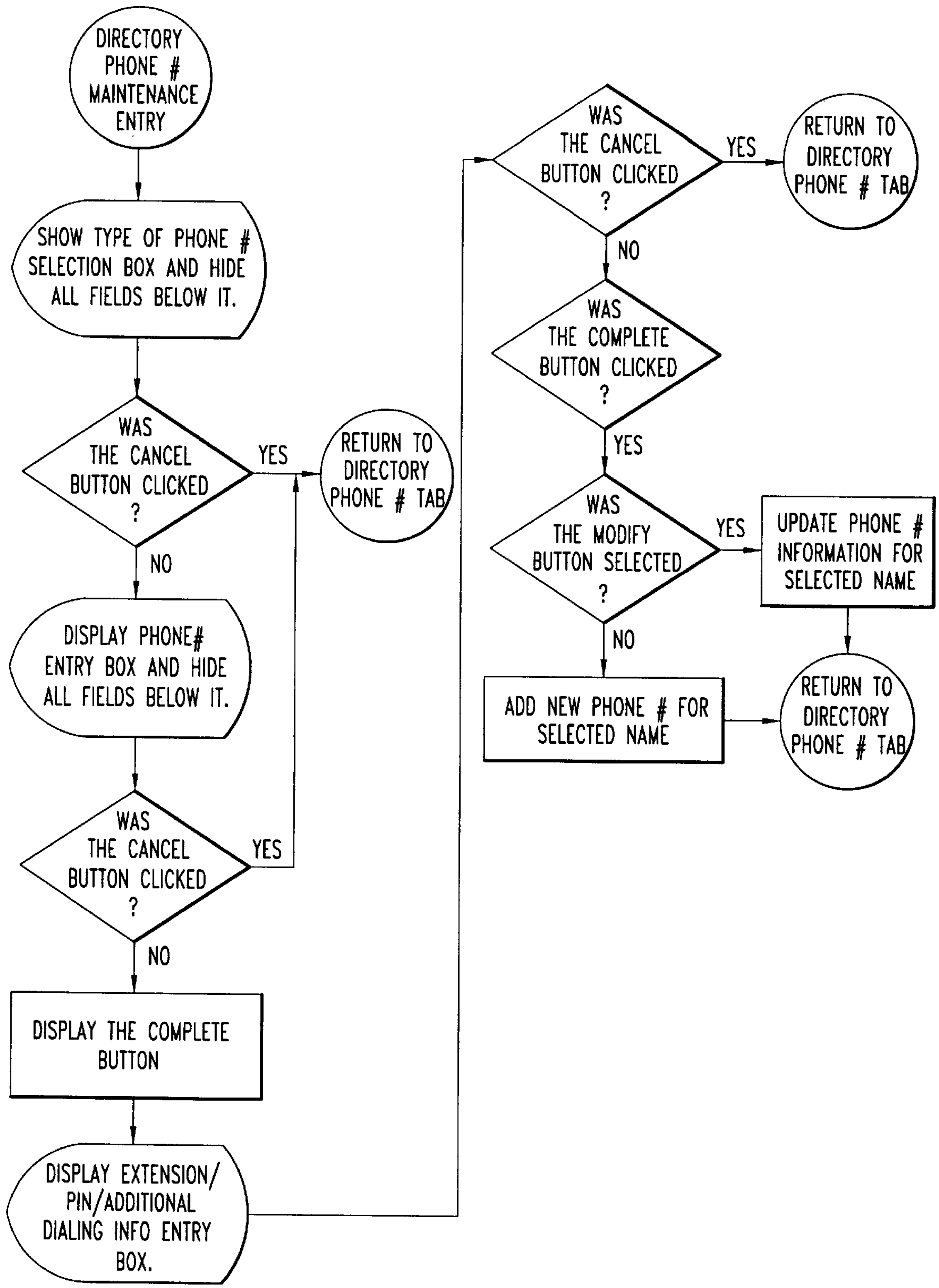
Figure 95:
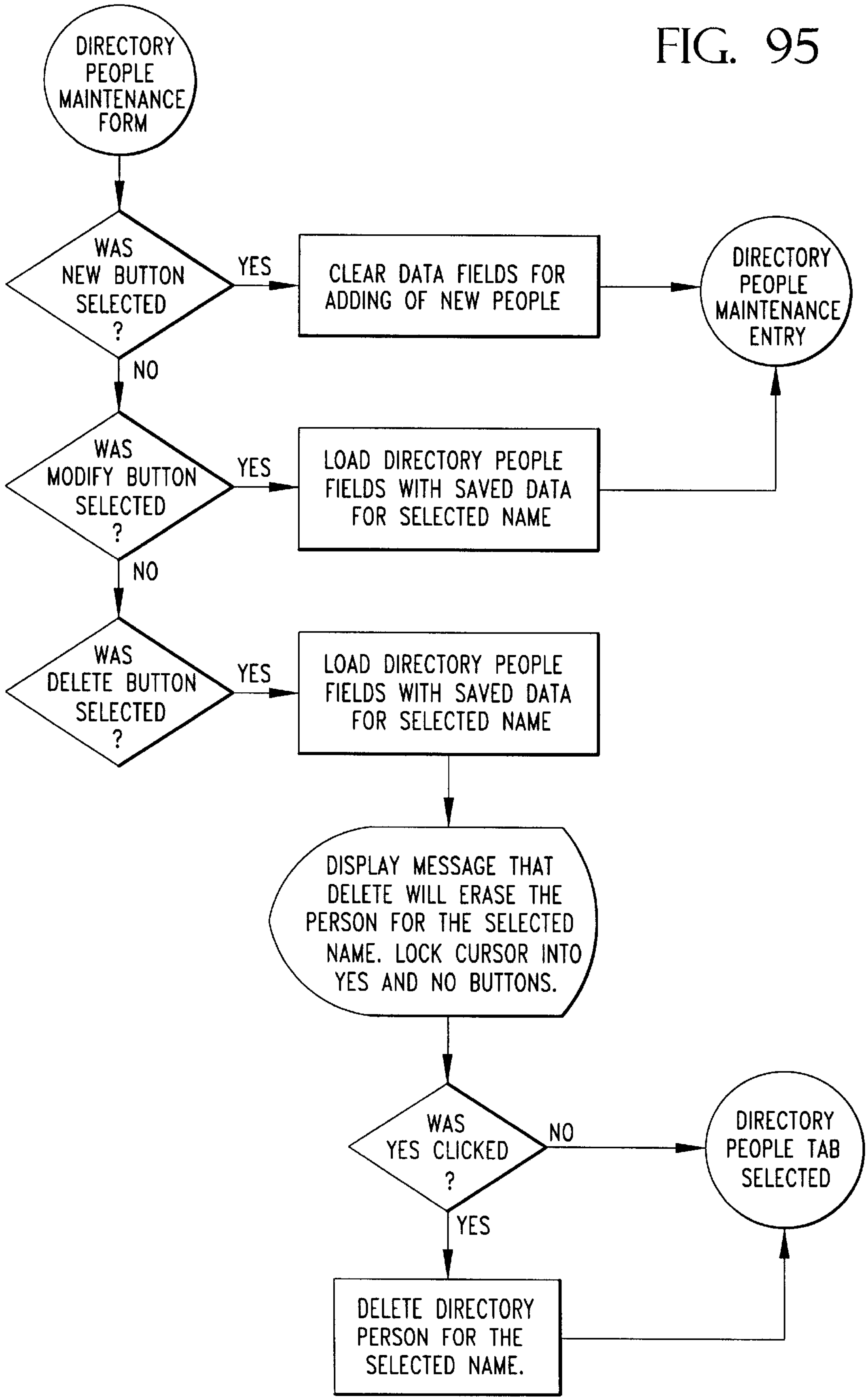
Figure 96:
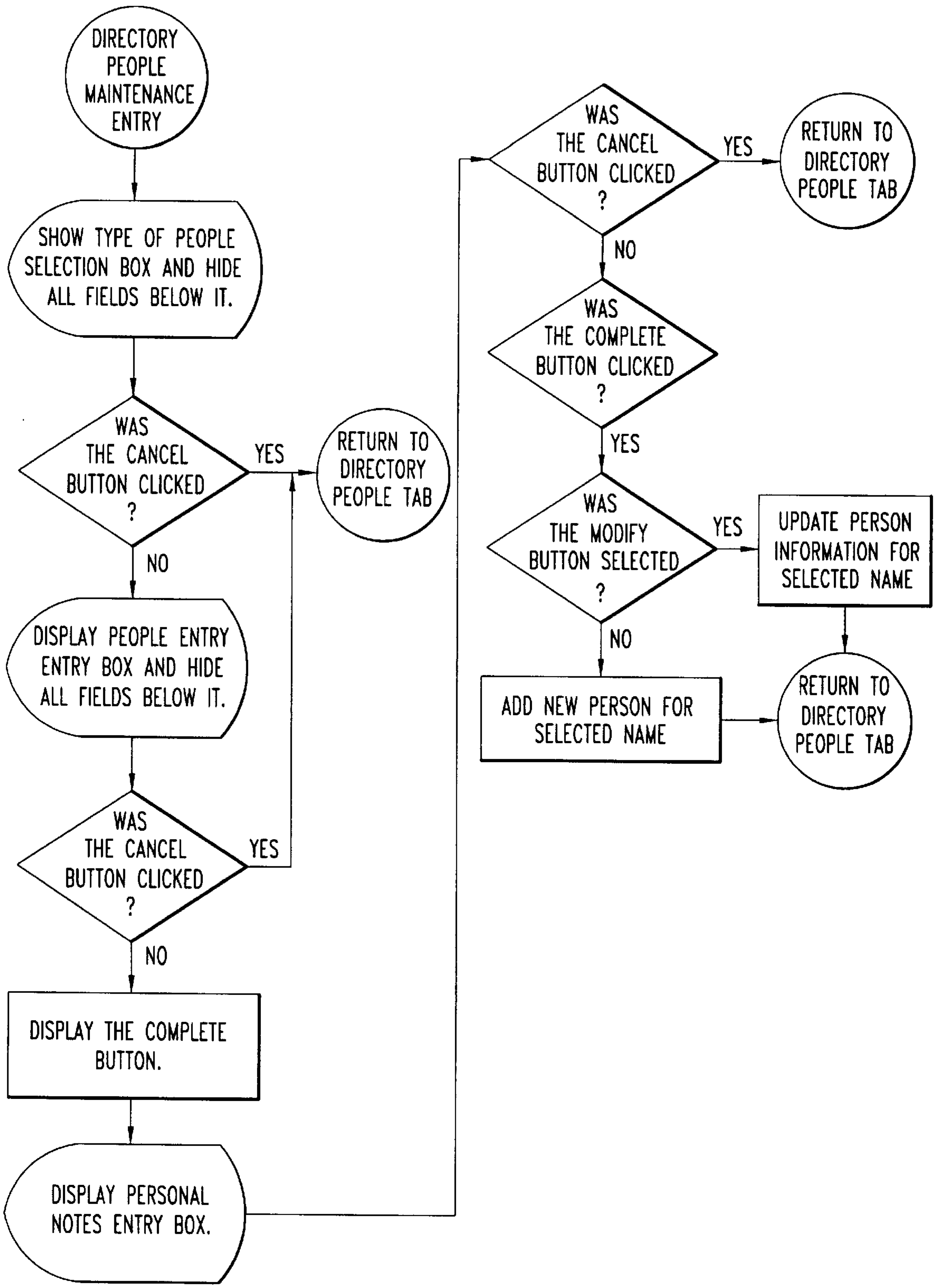
Figure 97:
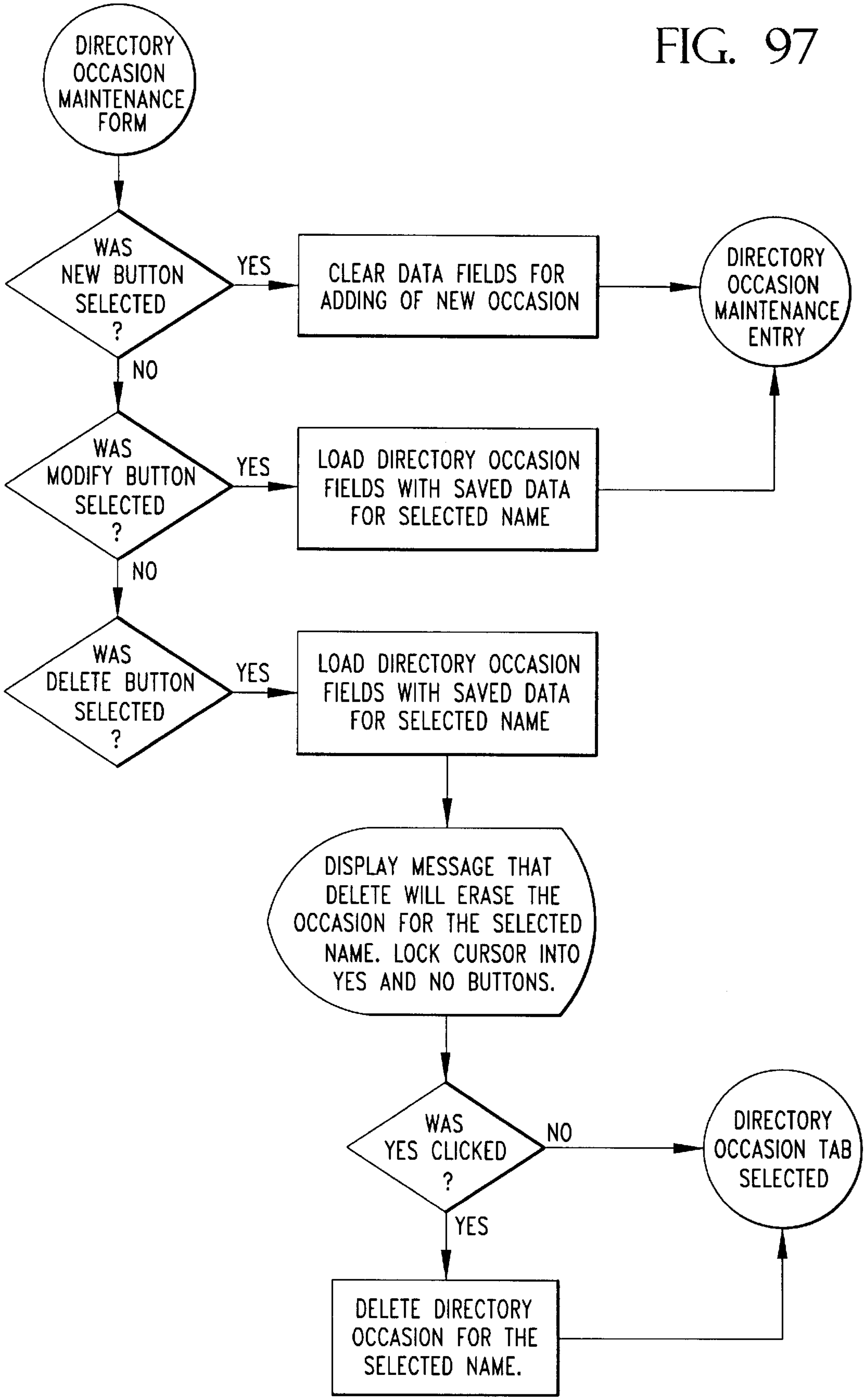
Figure 98:
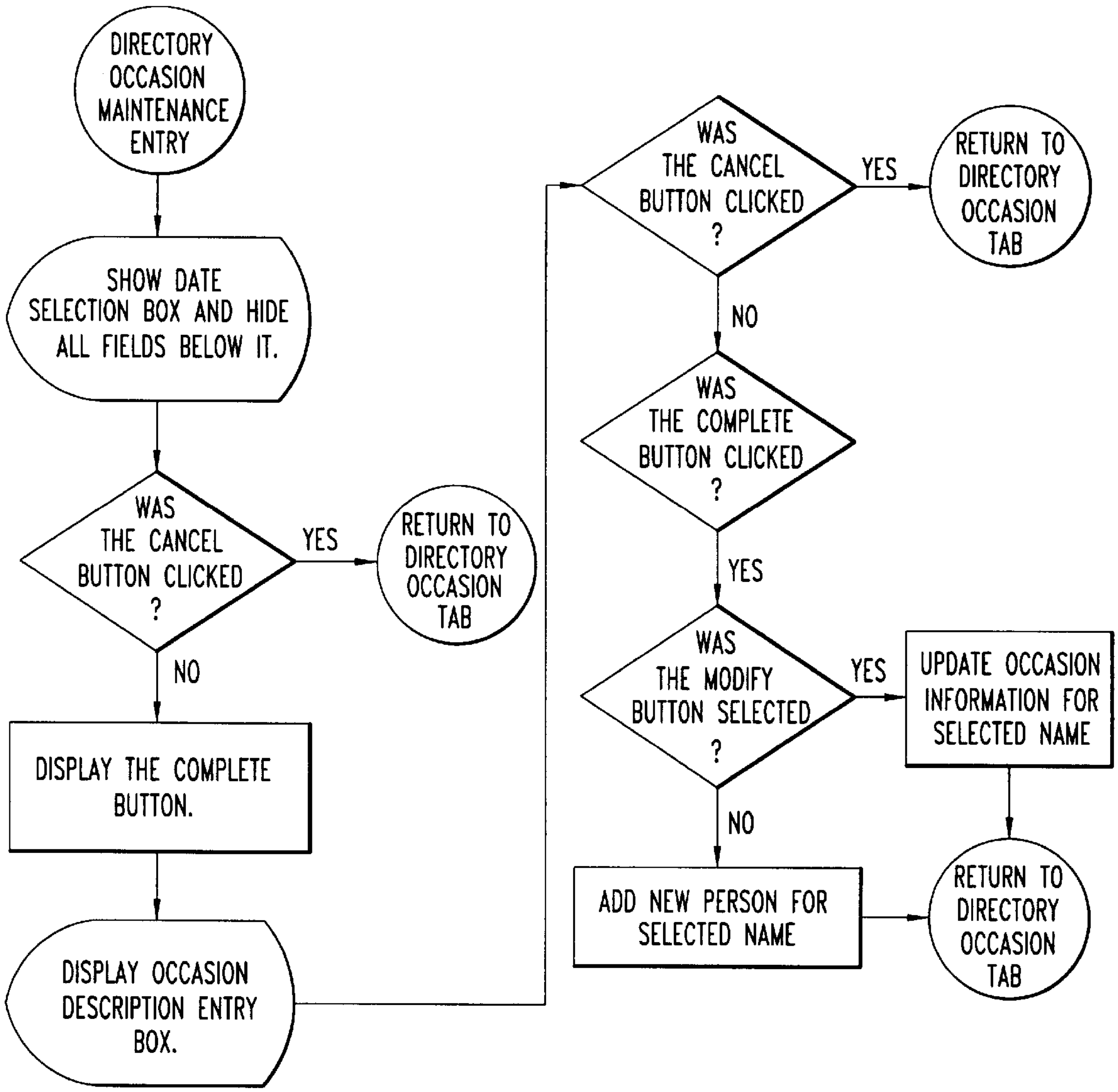
Figure 99:
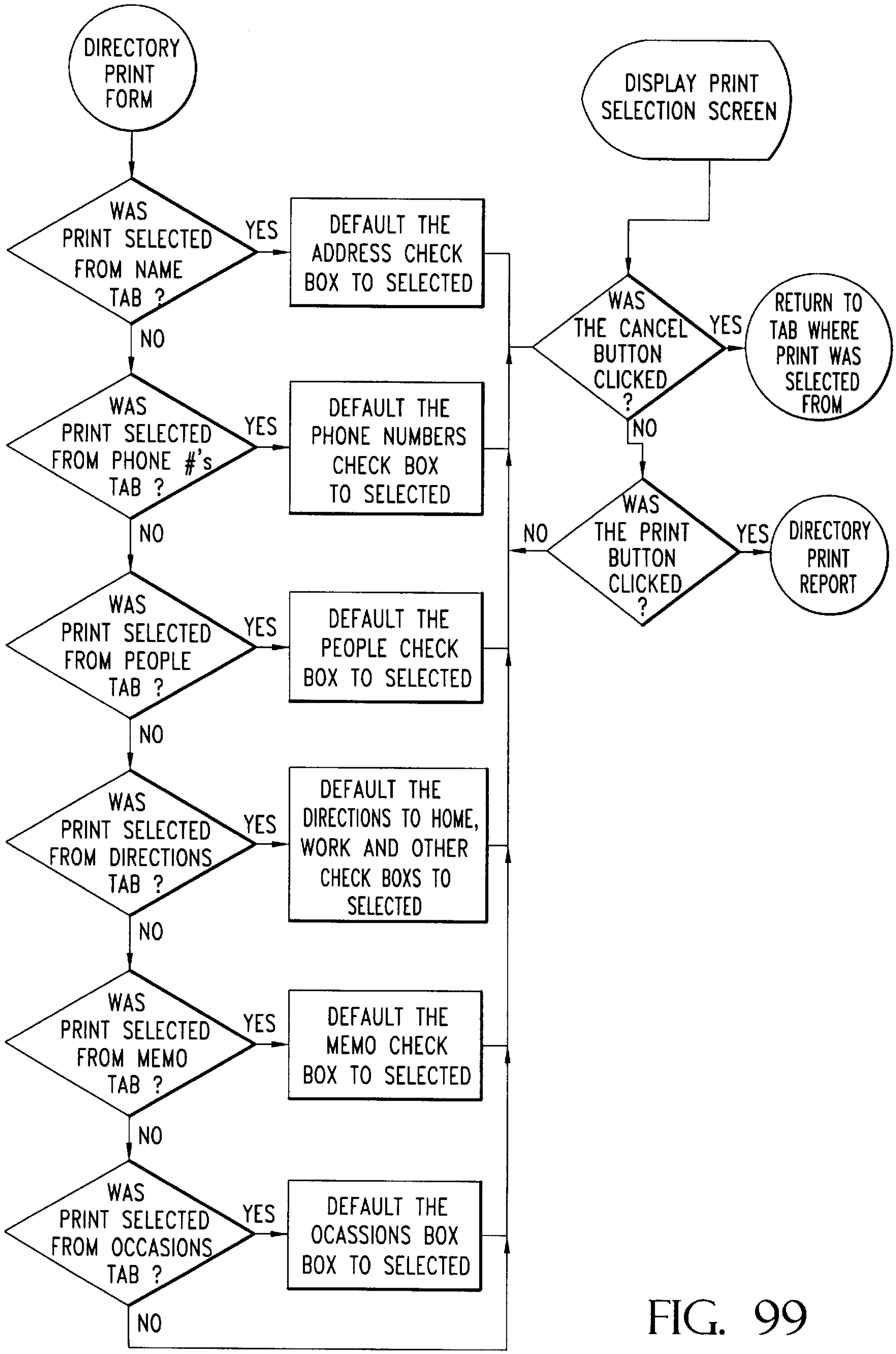
Figure 100:
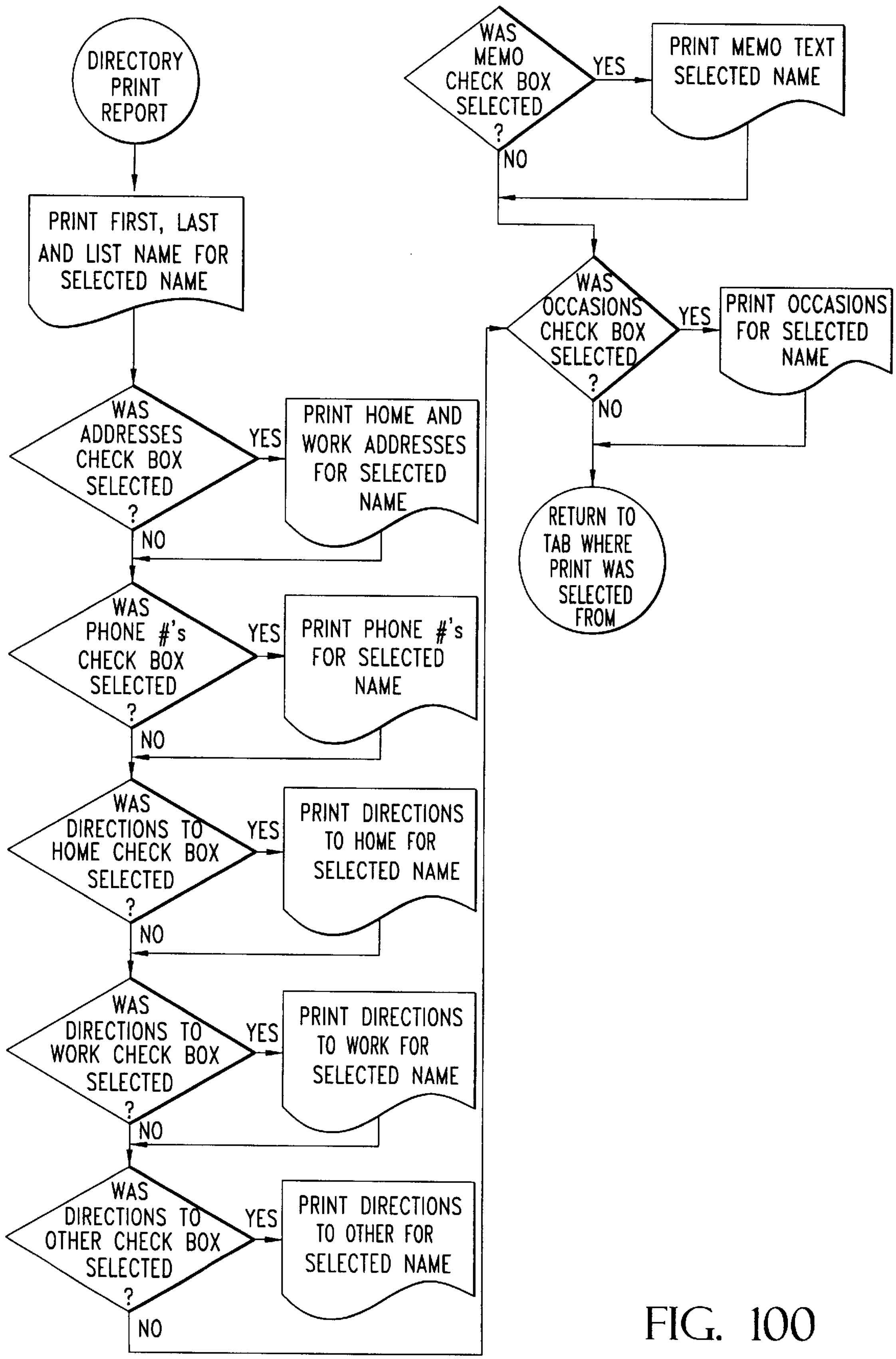
Figure 101:
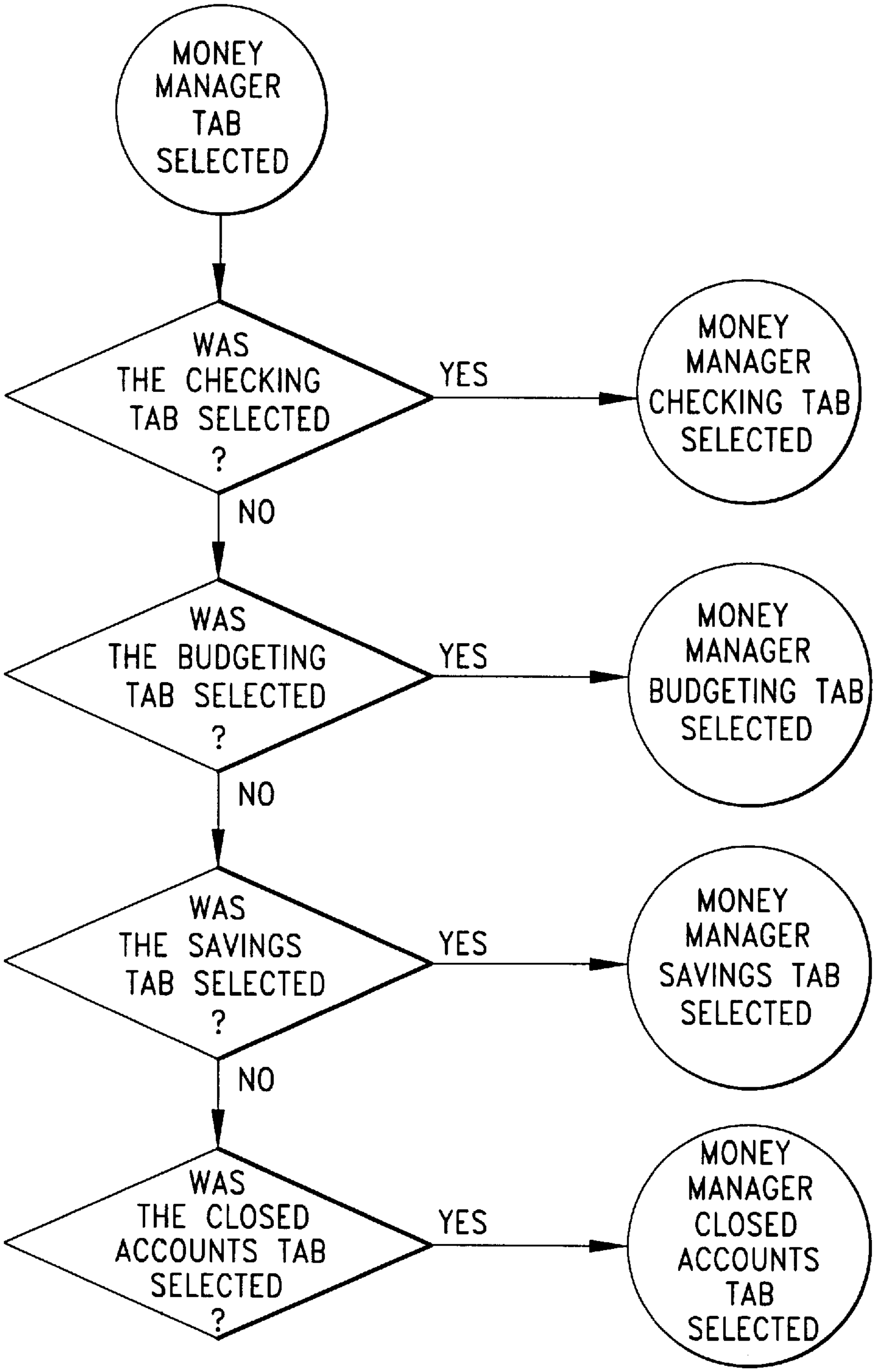
FIGS. 101–131 constitute the flow chart for the Money Manager module.
Figure 102:
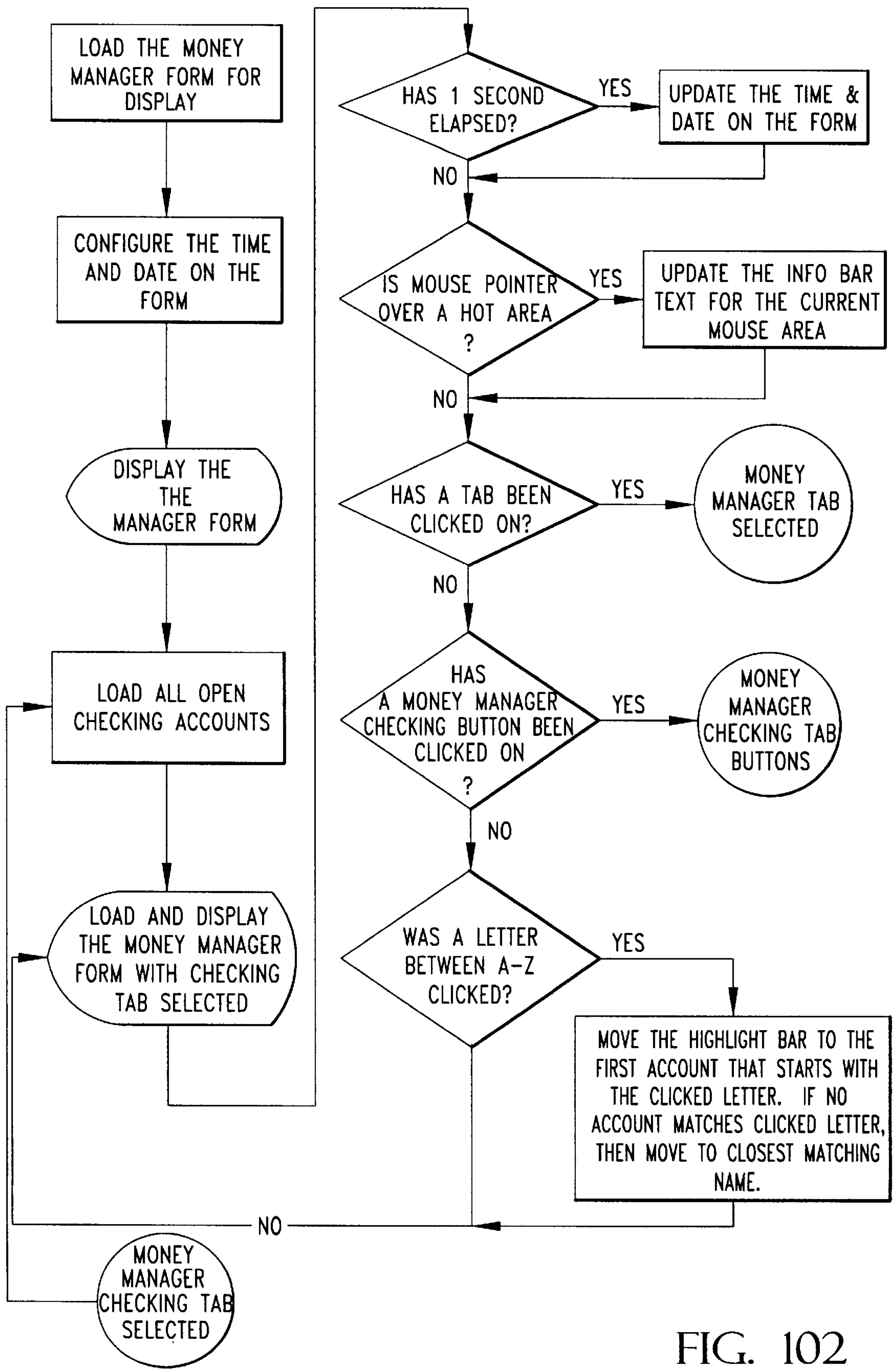
Figure 103:
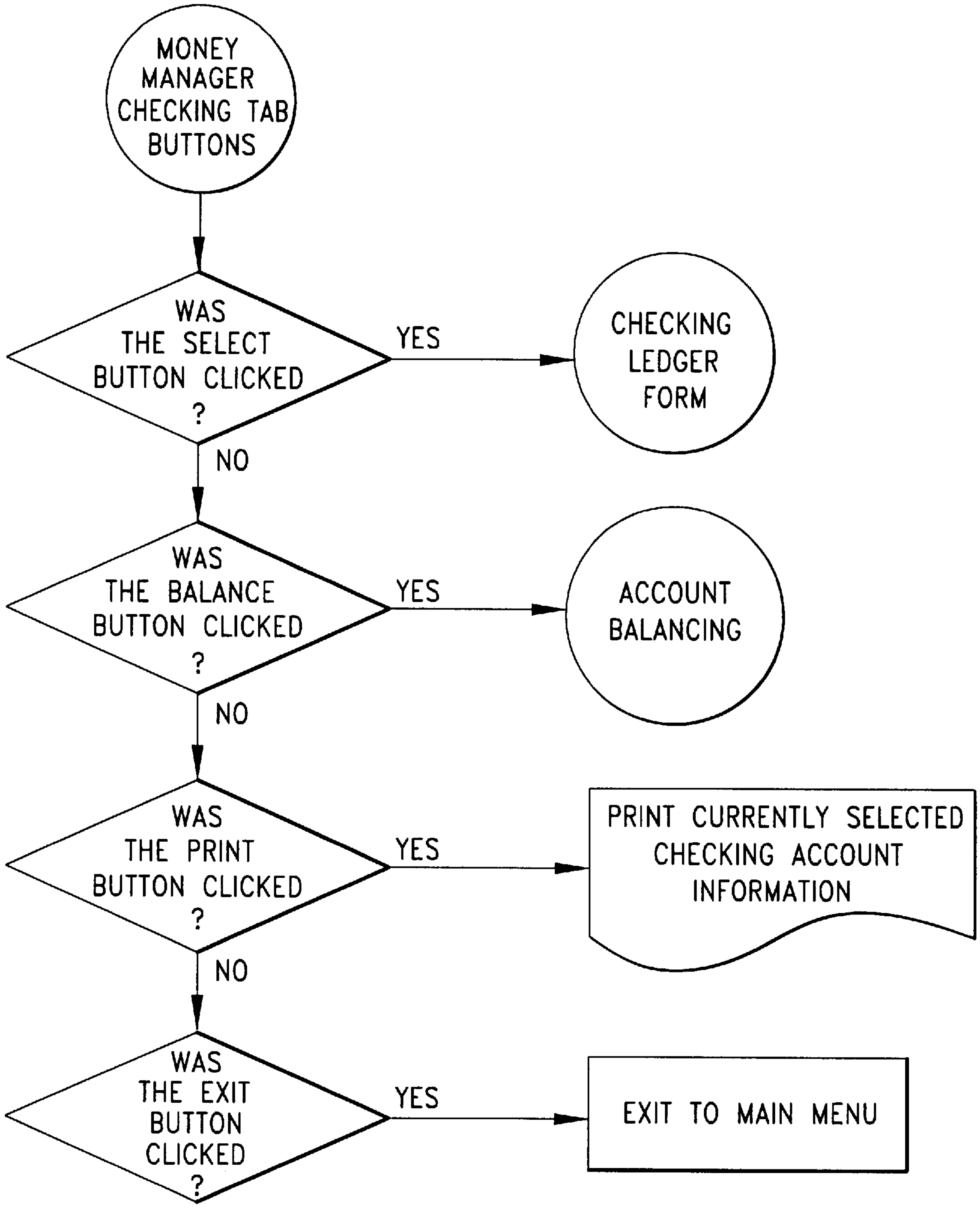
Figure 104:
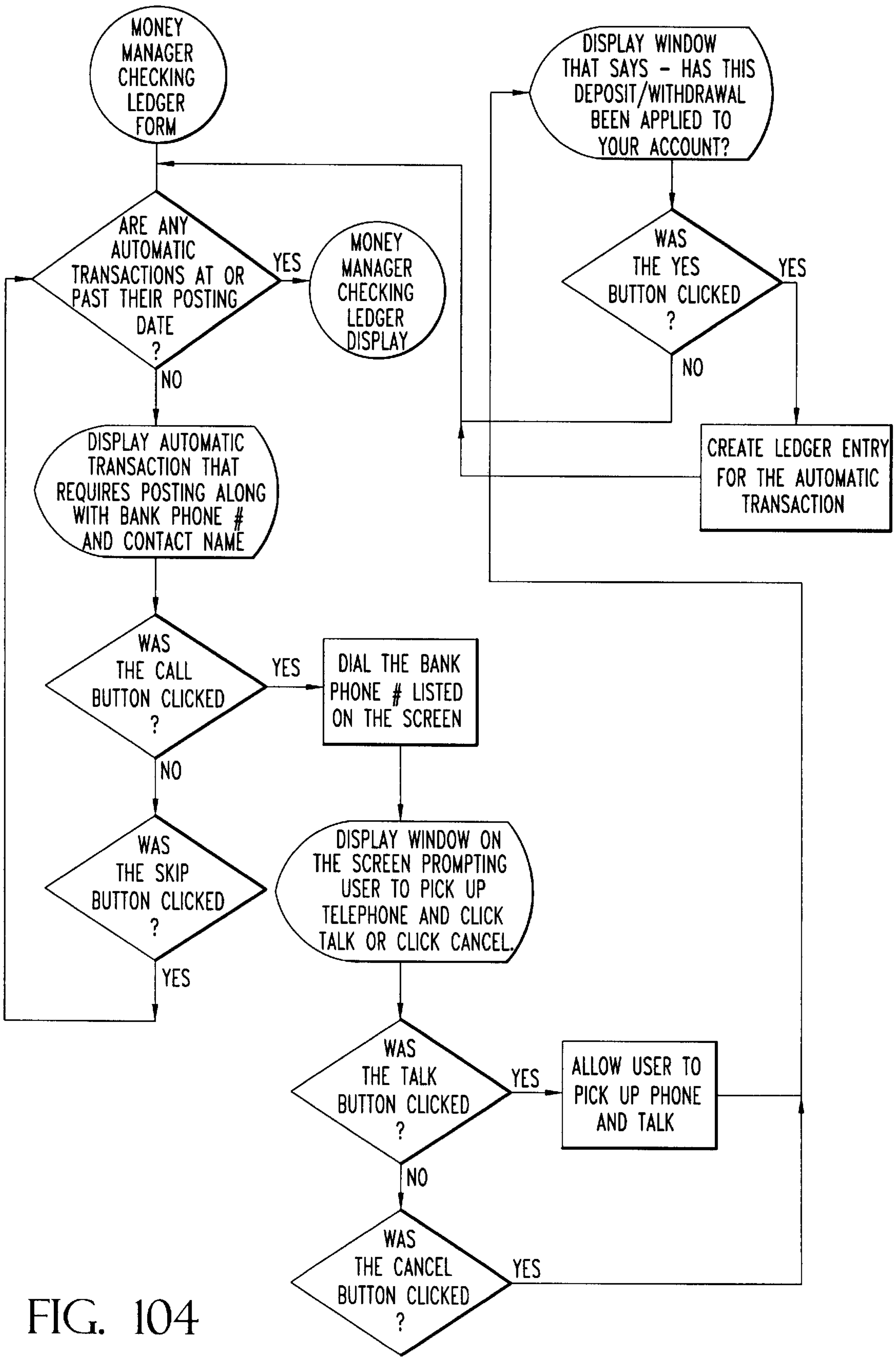
Figure 105:
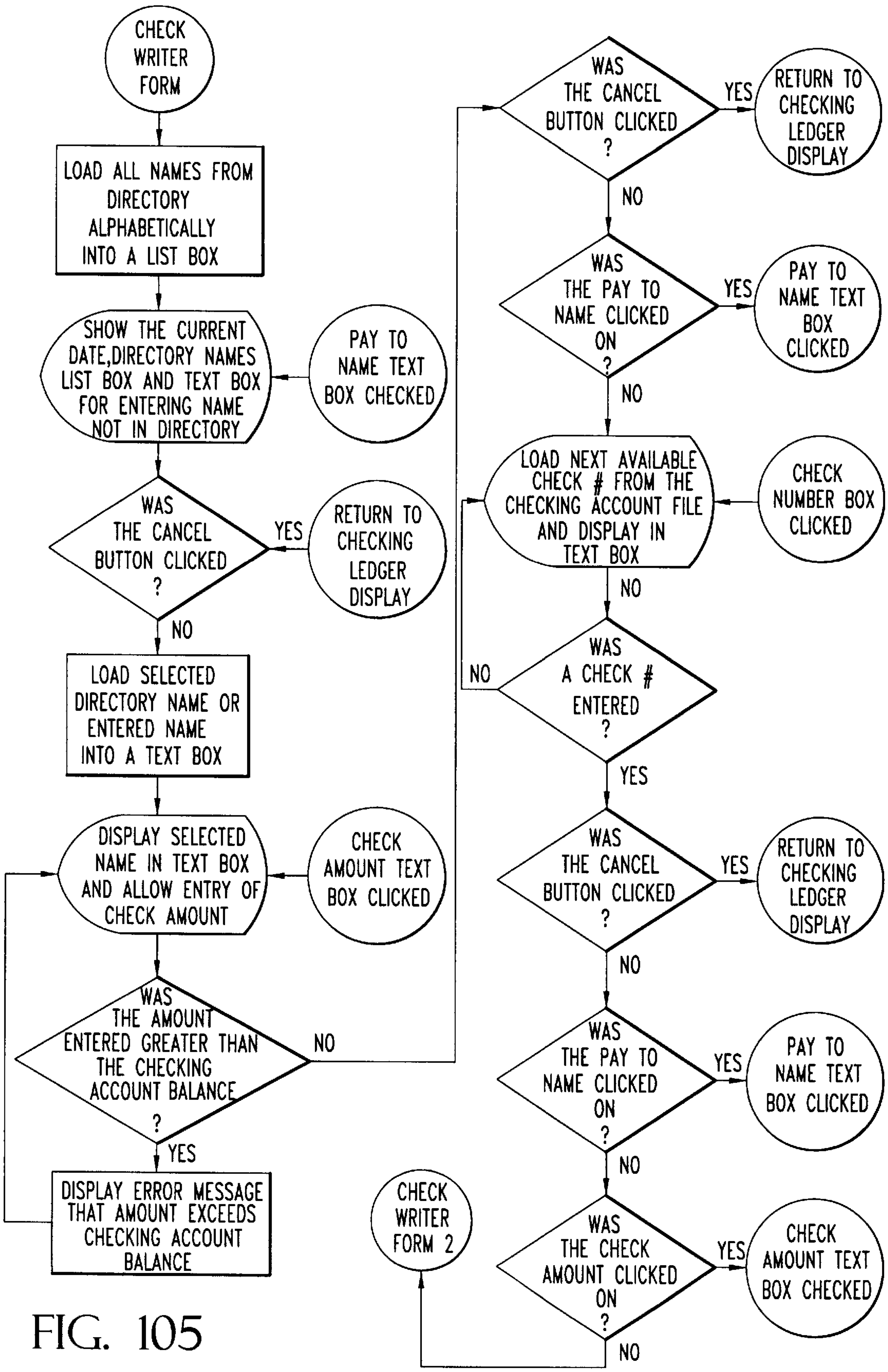
Figure 106:
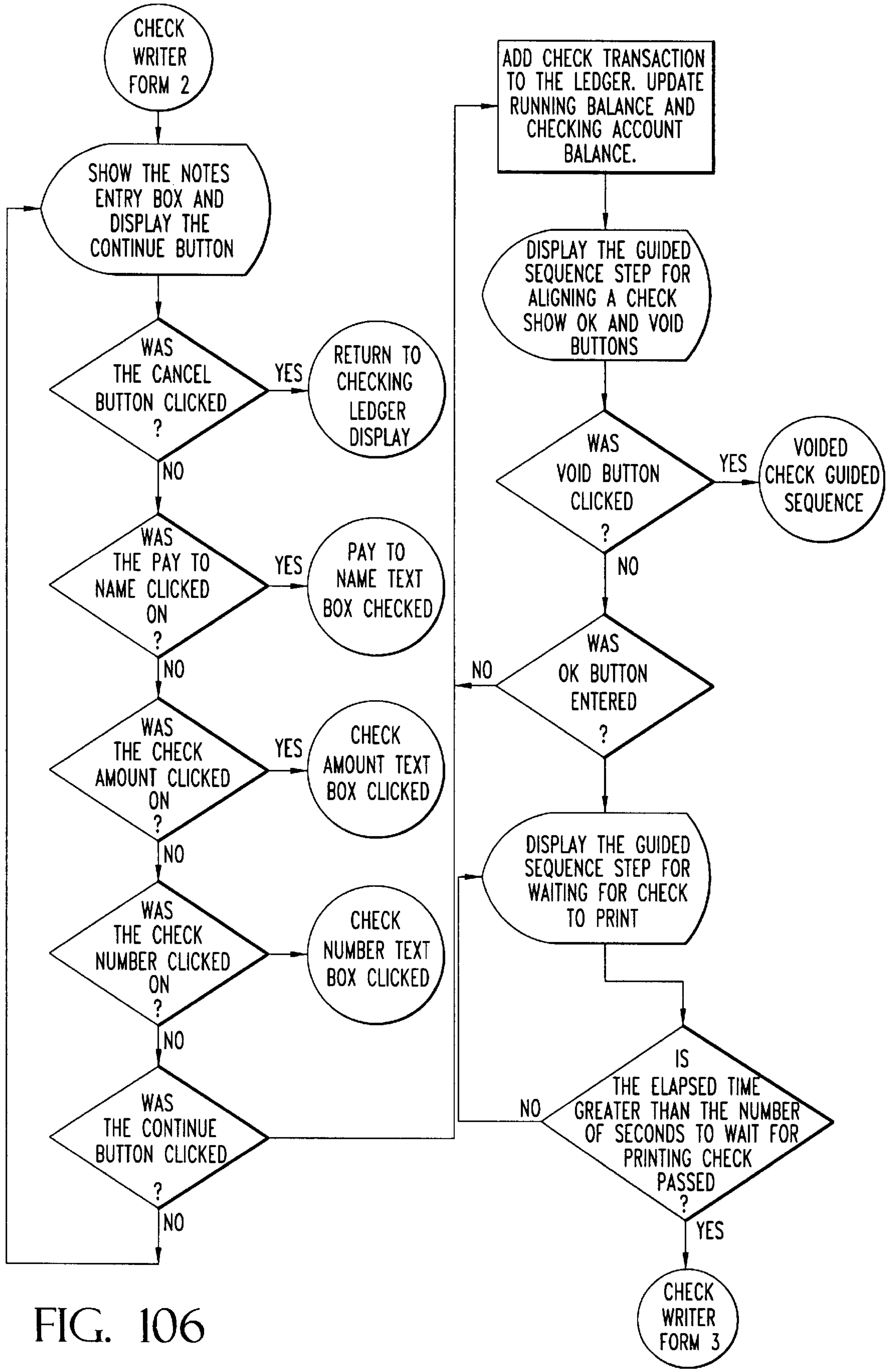
Figure 107:
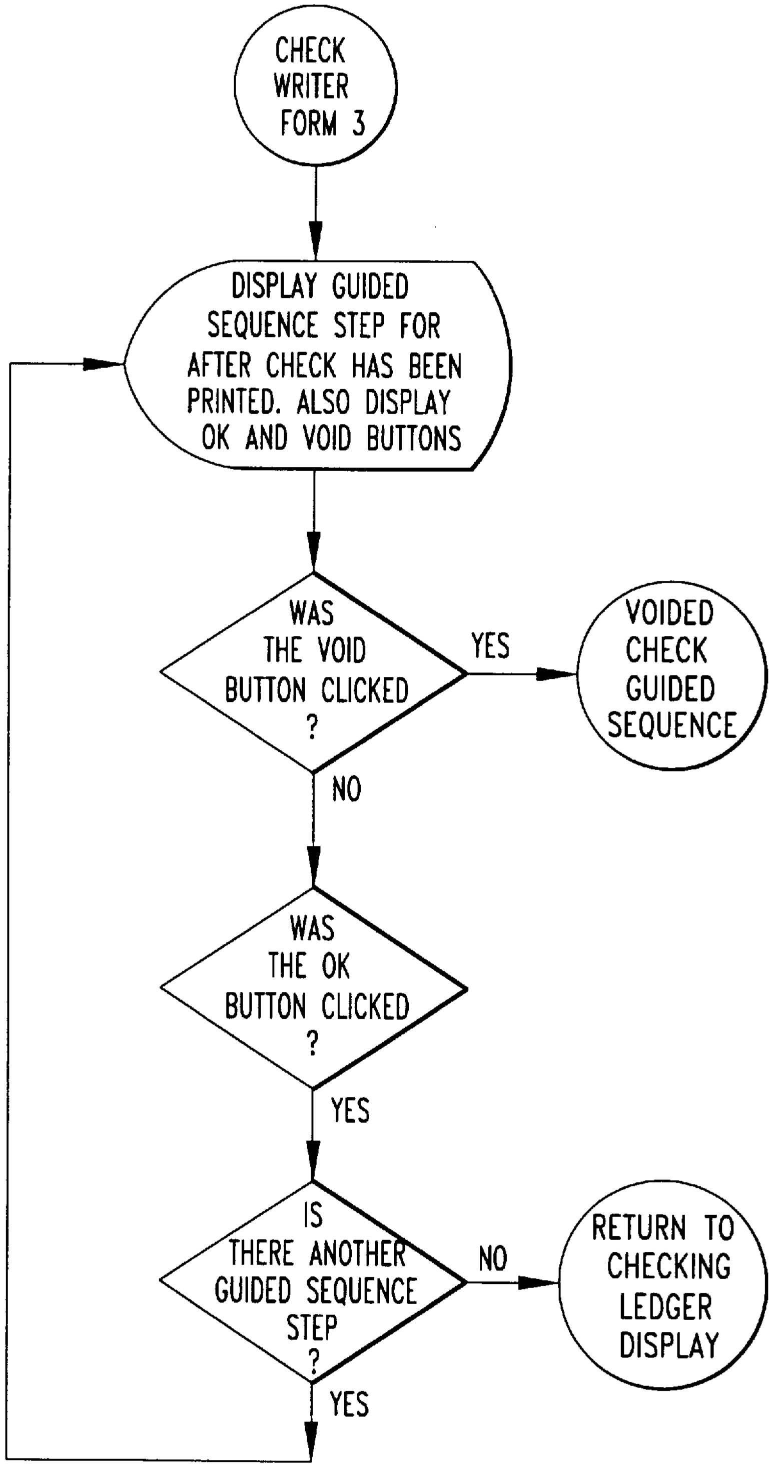
Figure 108:
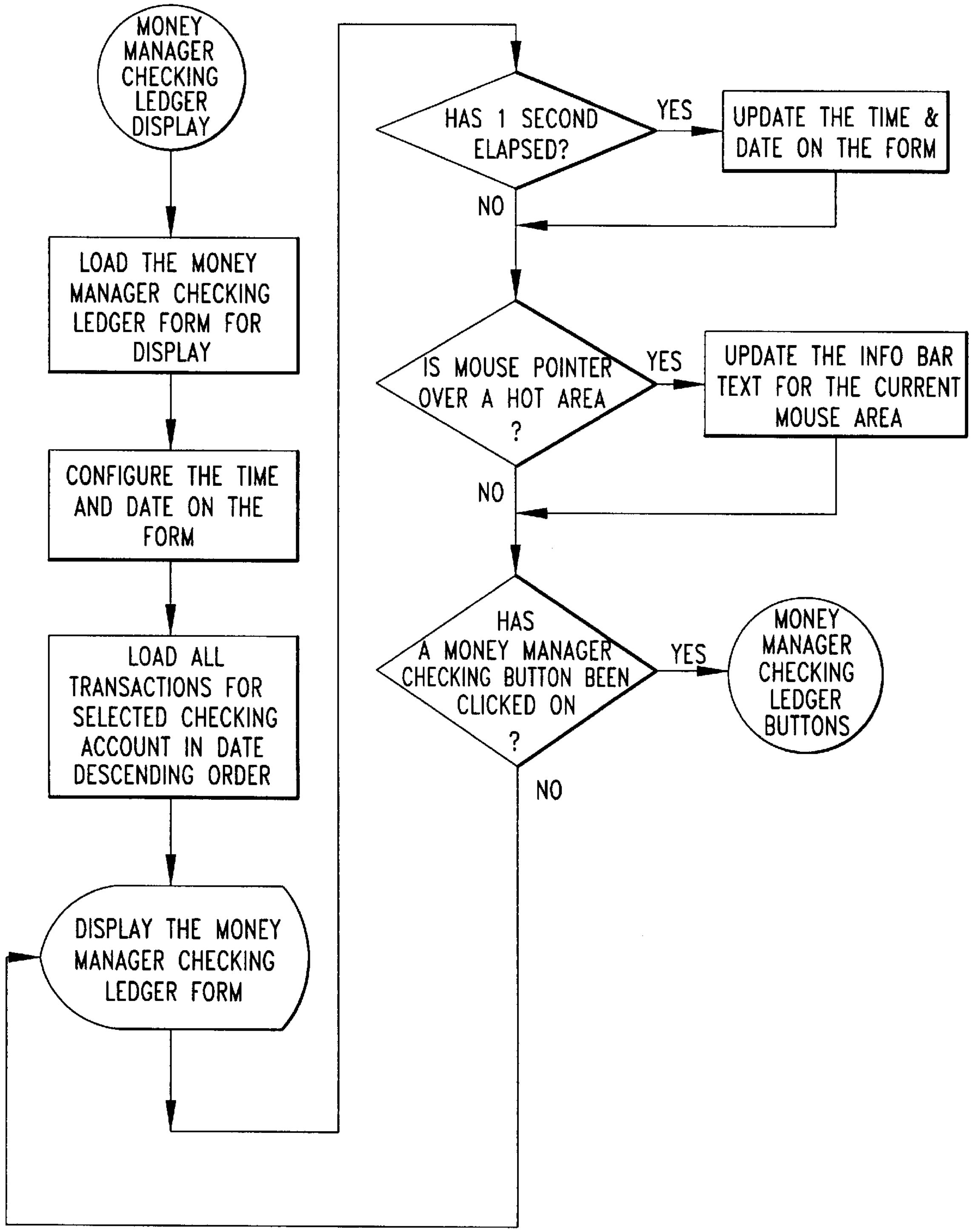
Figure 109:
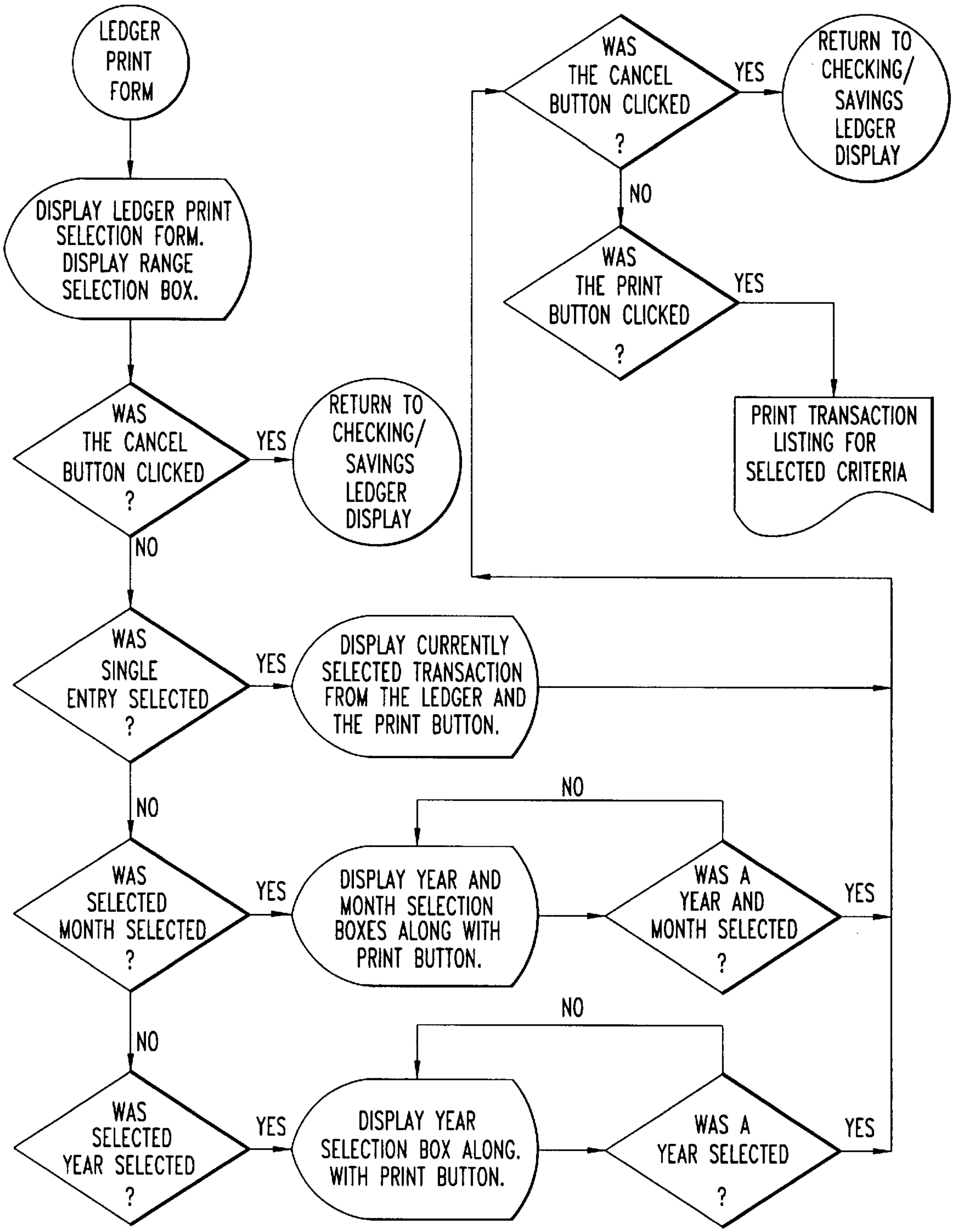
Figure 110:
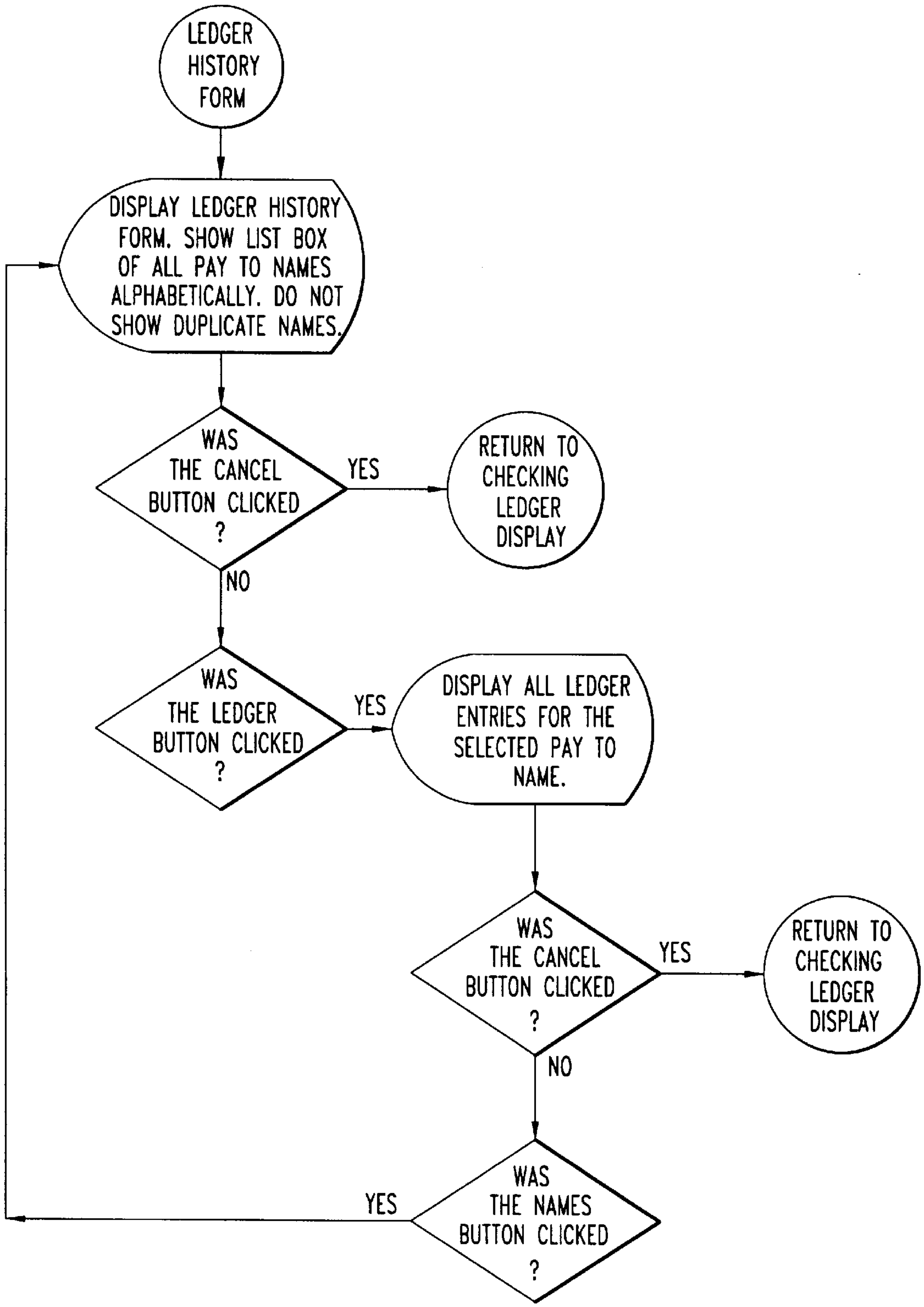
Figure 111:
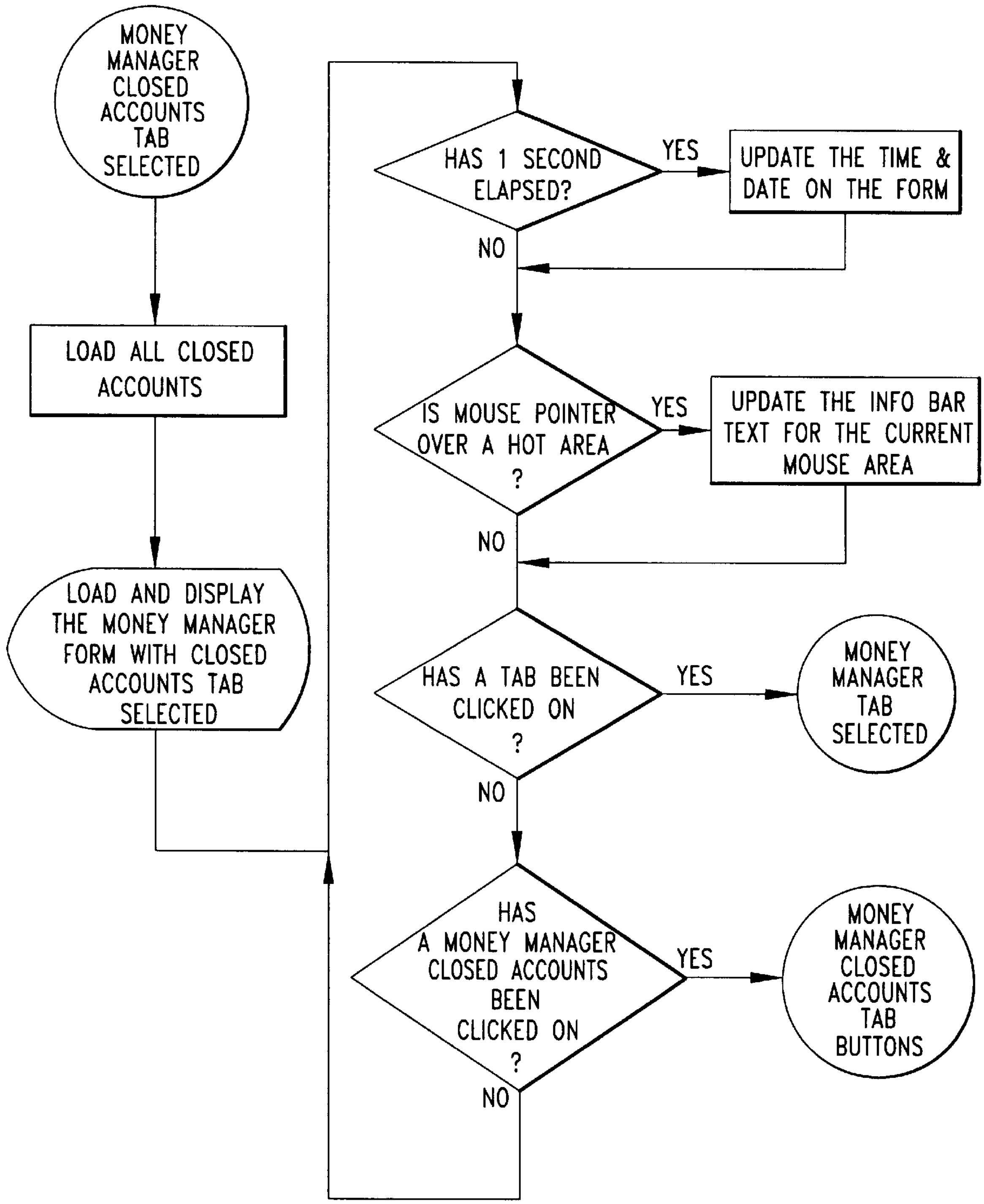
Figure 112:
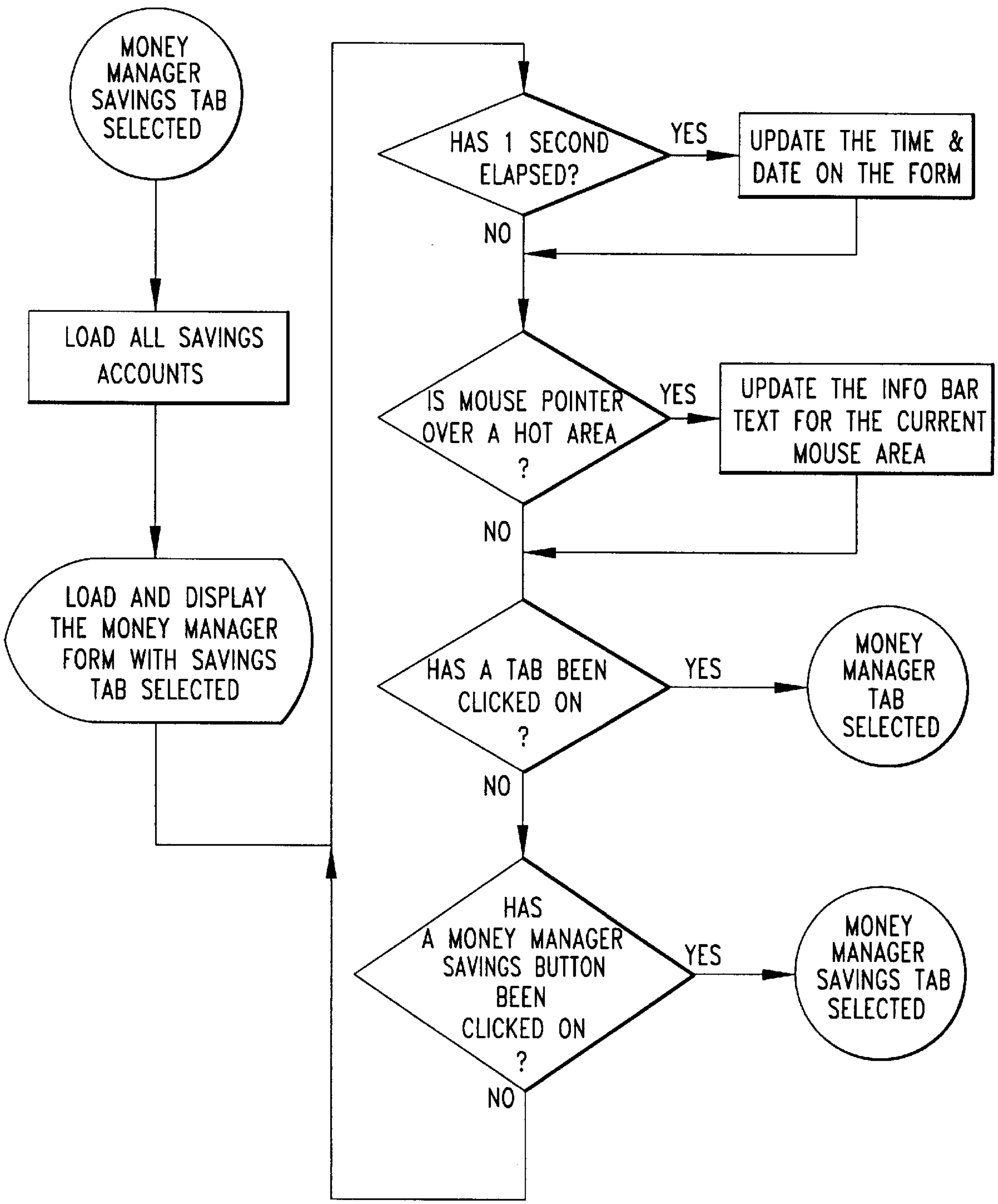
Figure 113:
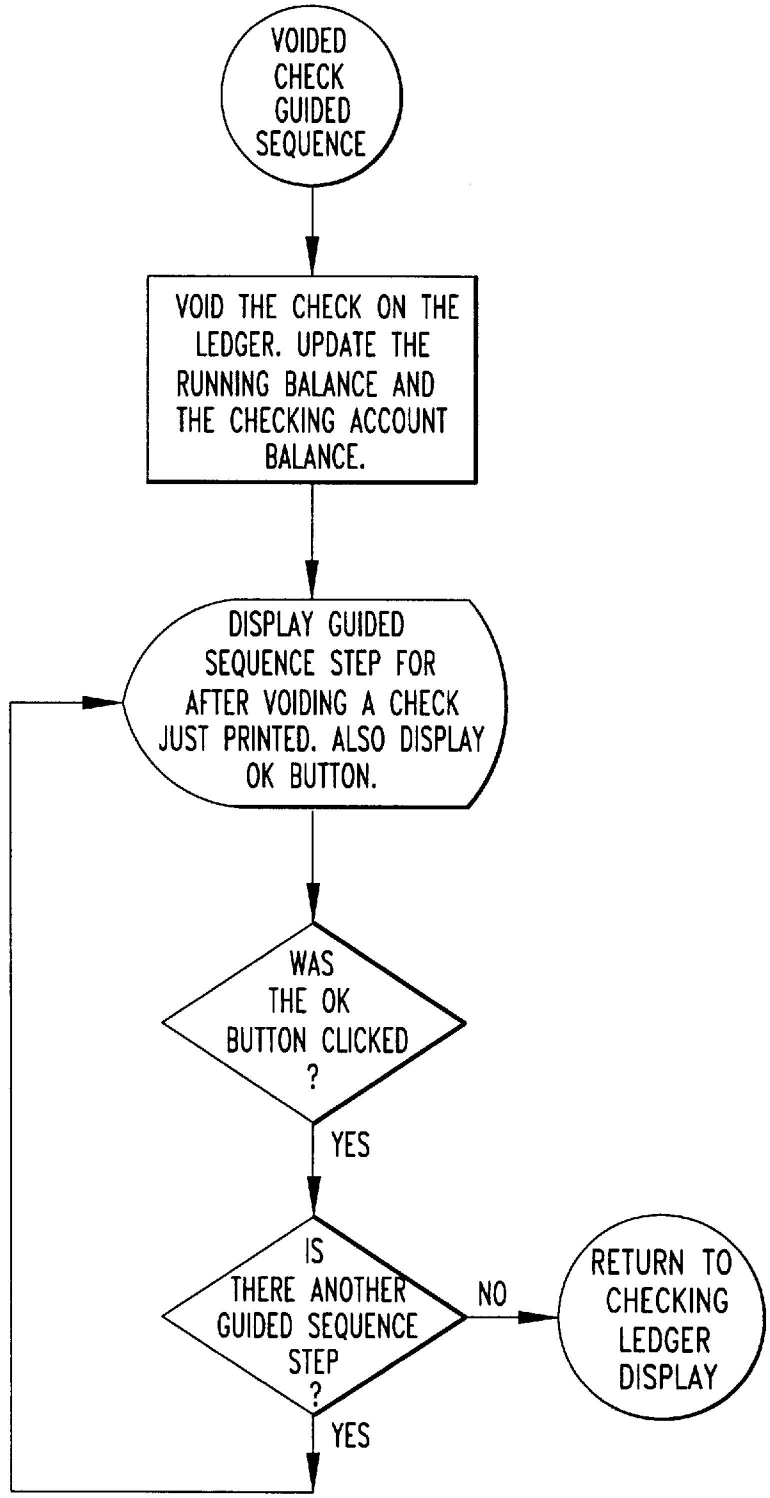
Figure 114:
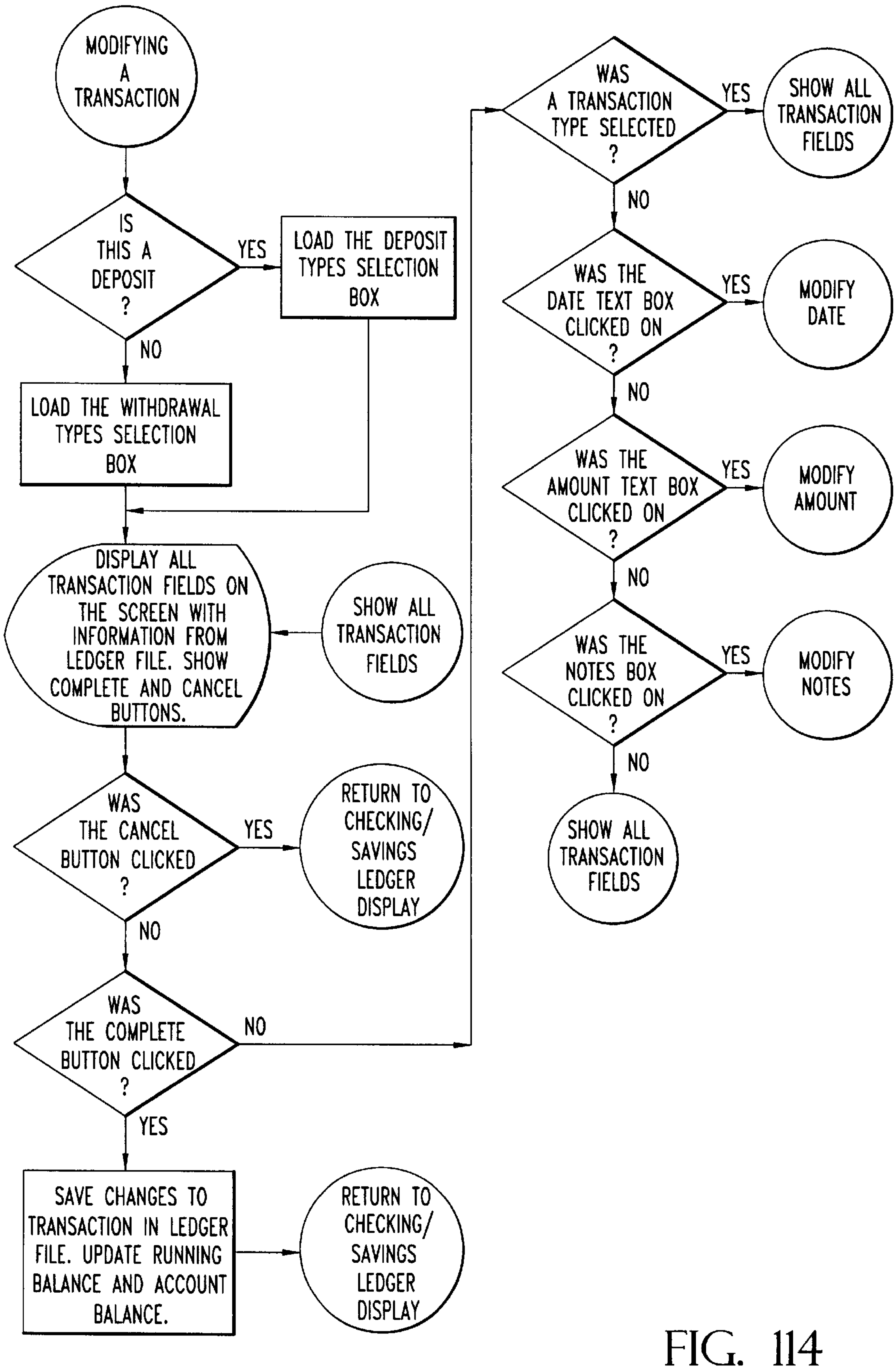
Figure 115:
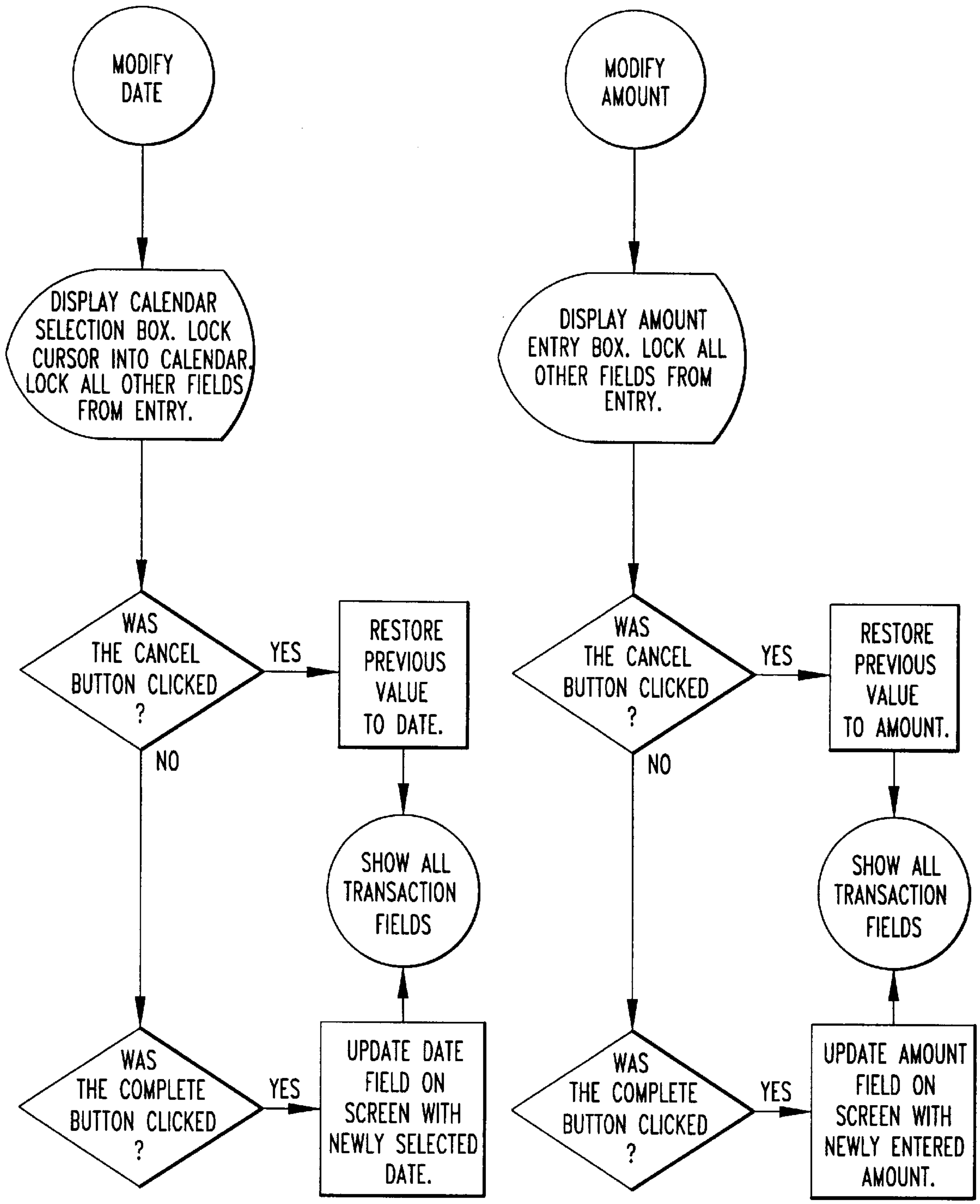
Figure 116:
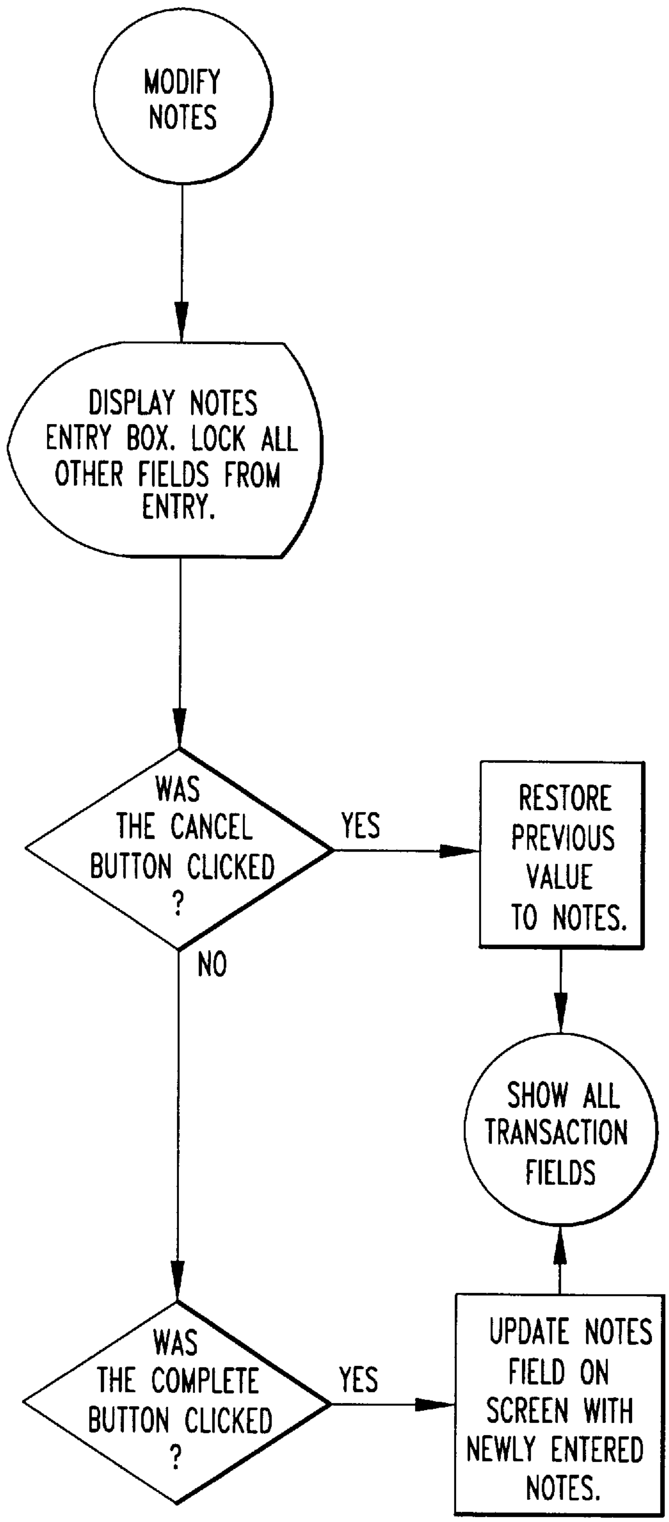
Figure 117:
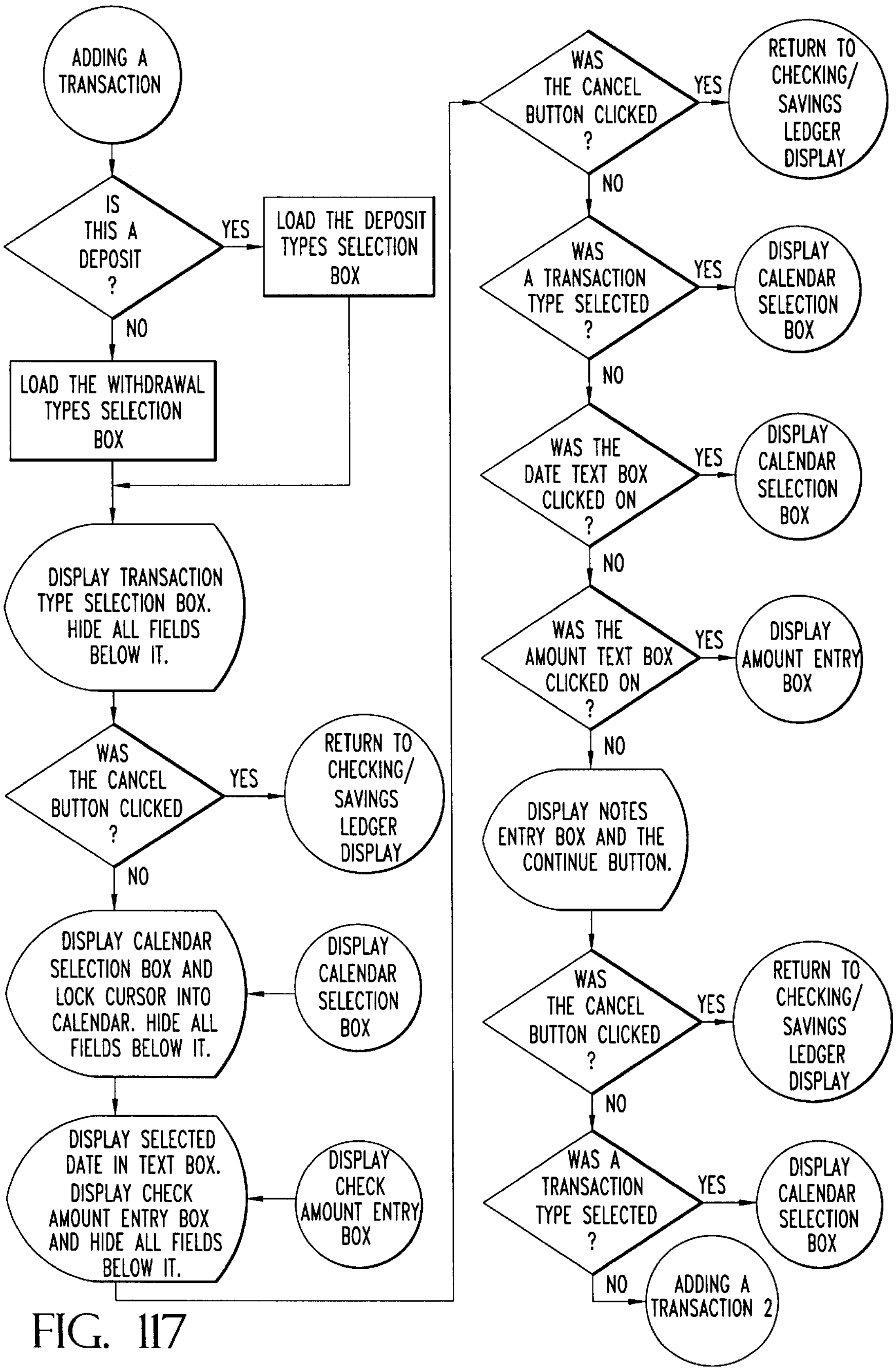
Figure 118:
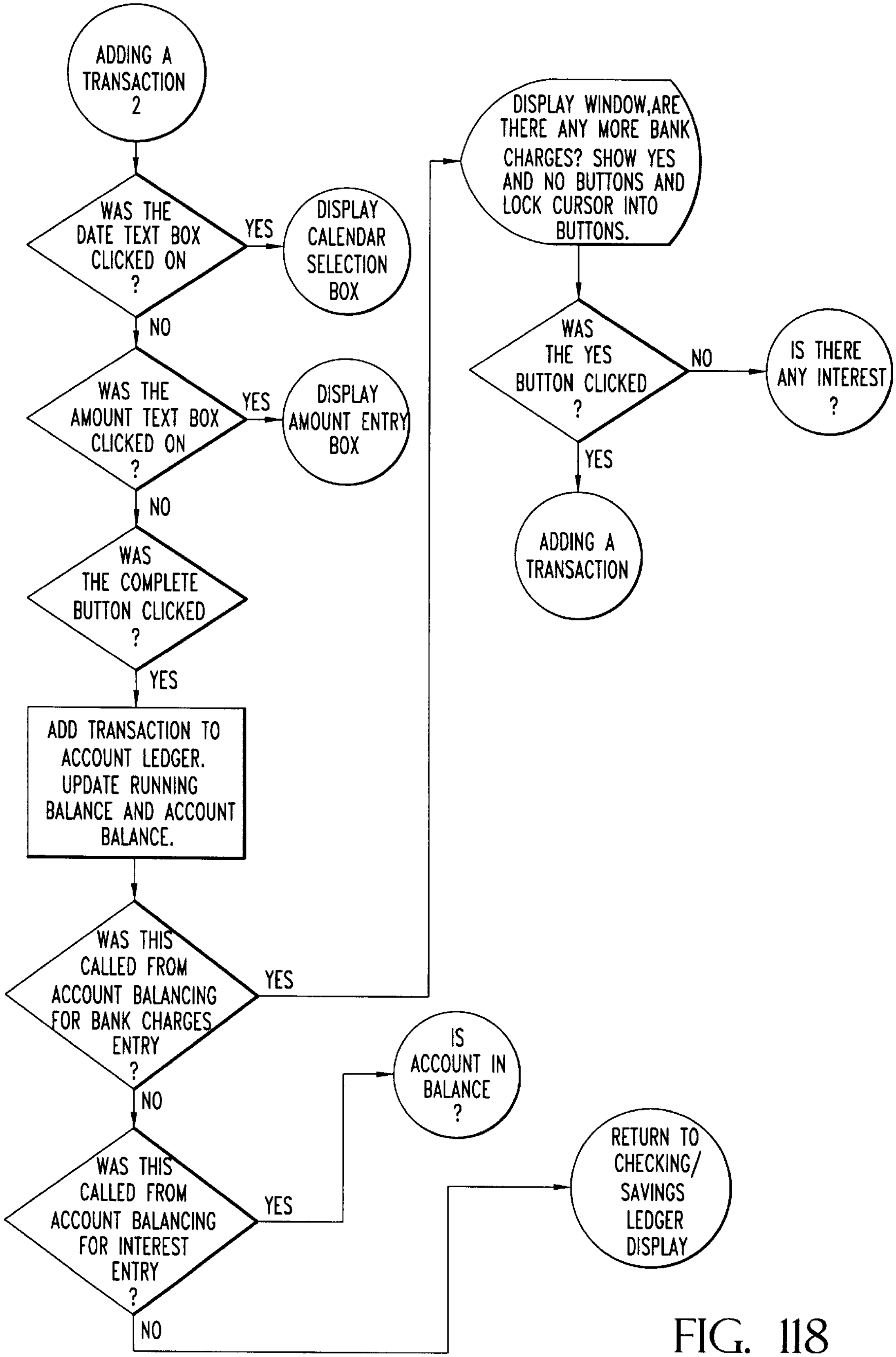
Figure 119:
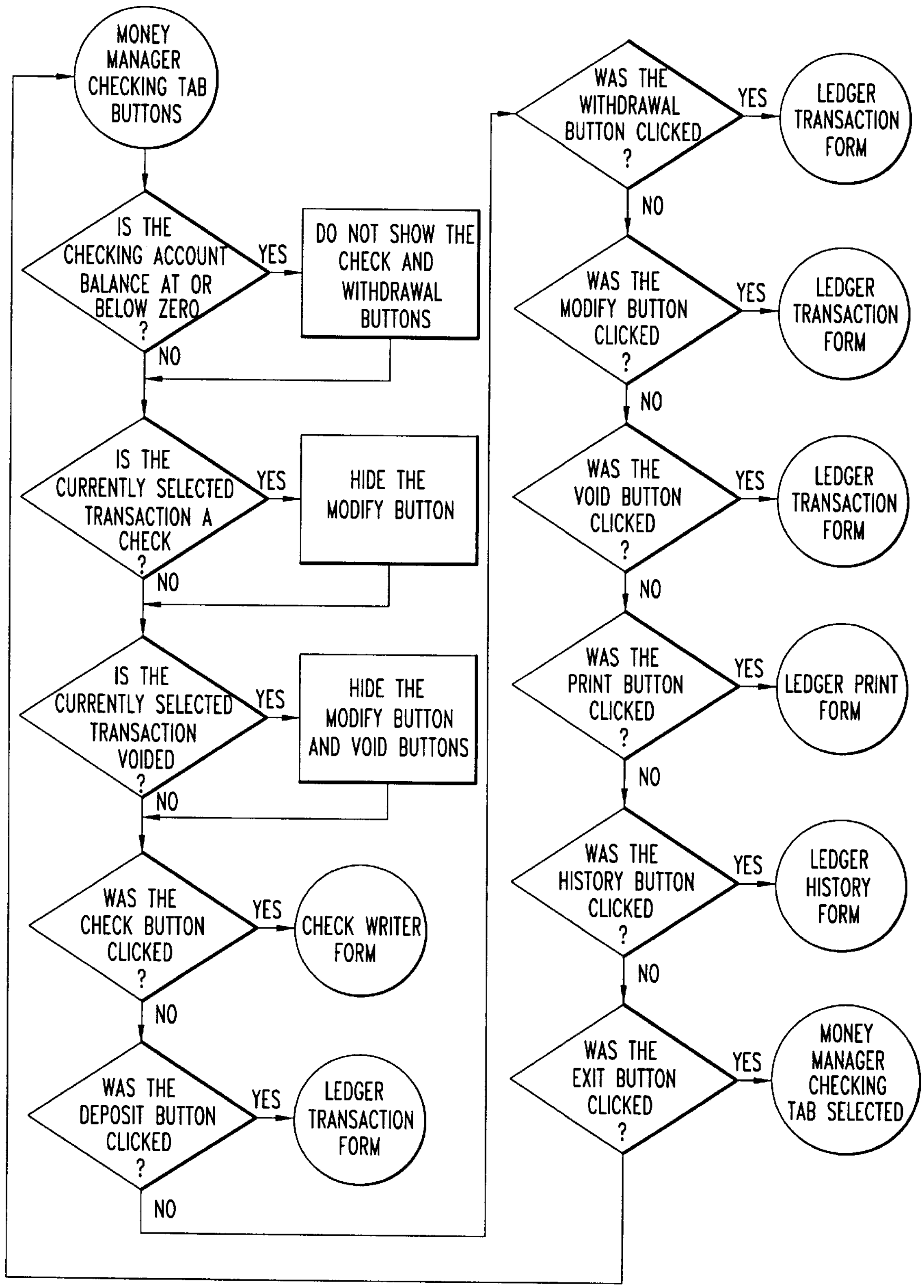
Figure 120:
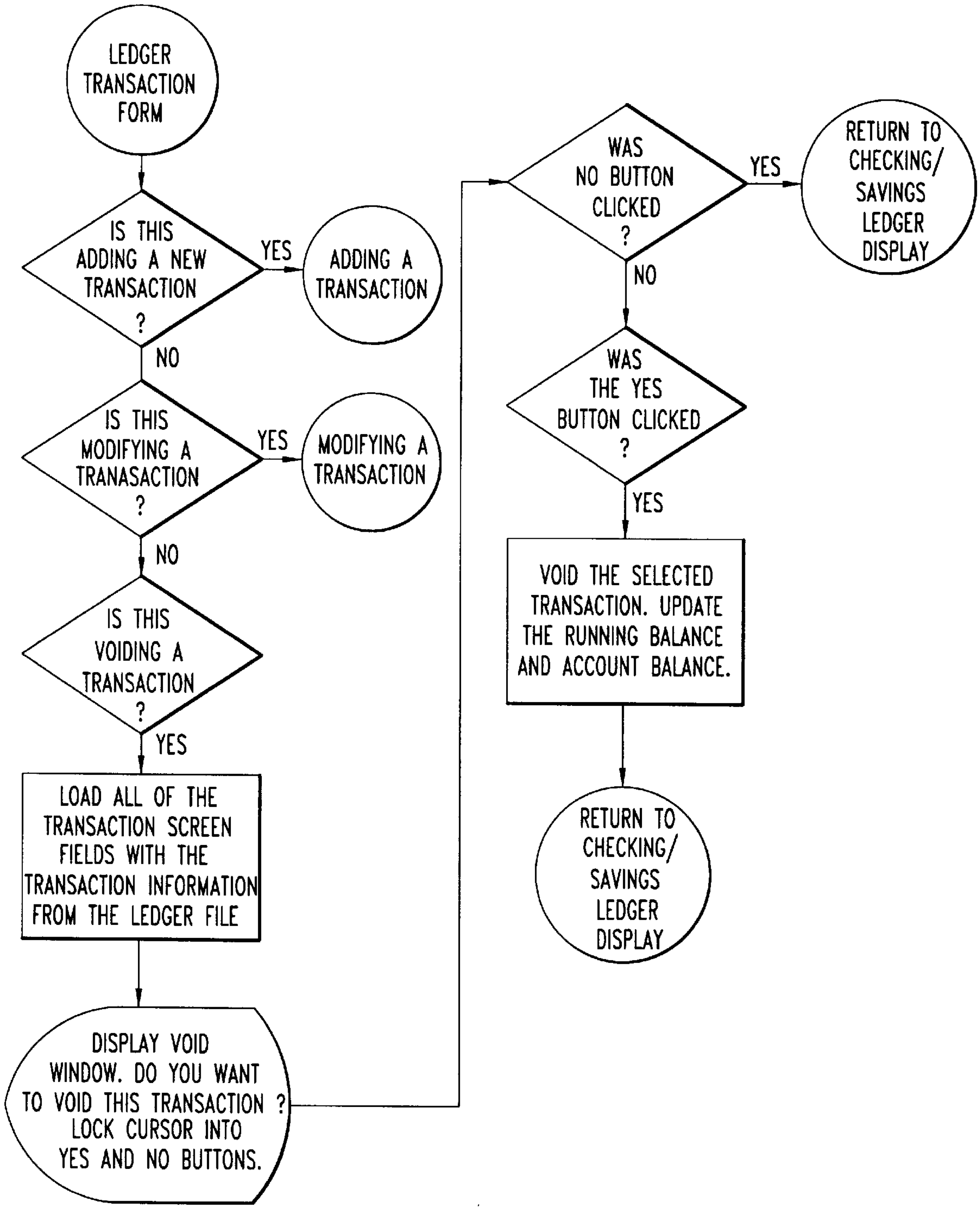
Figure 121:
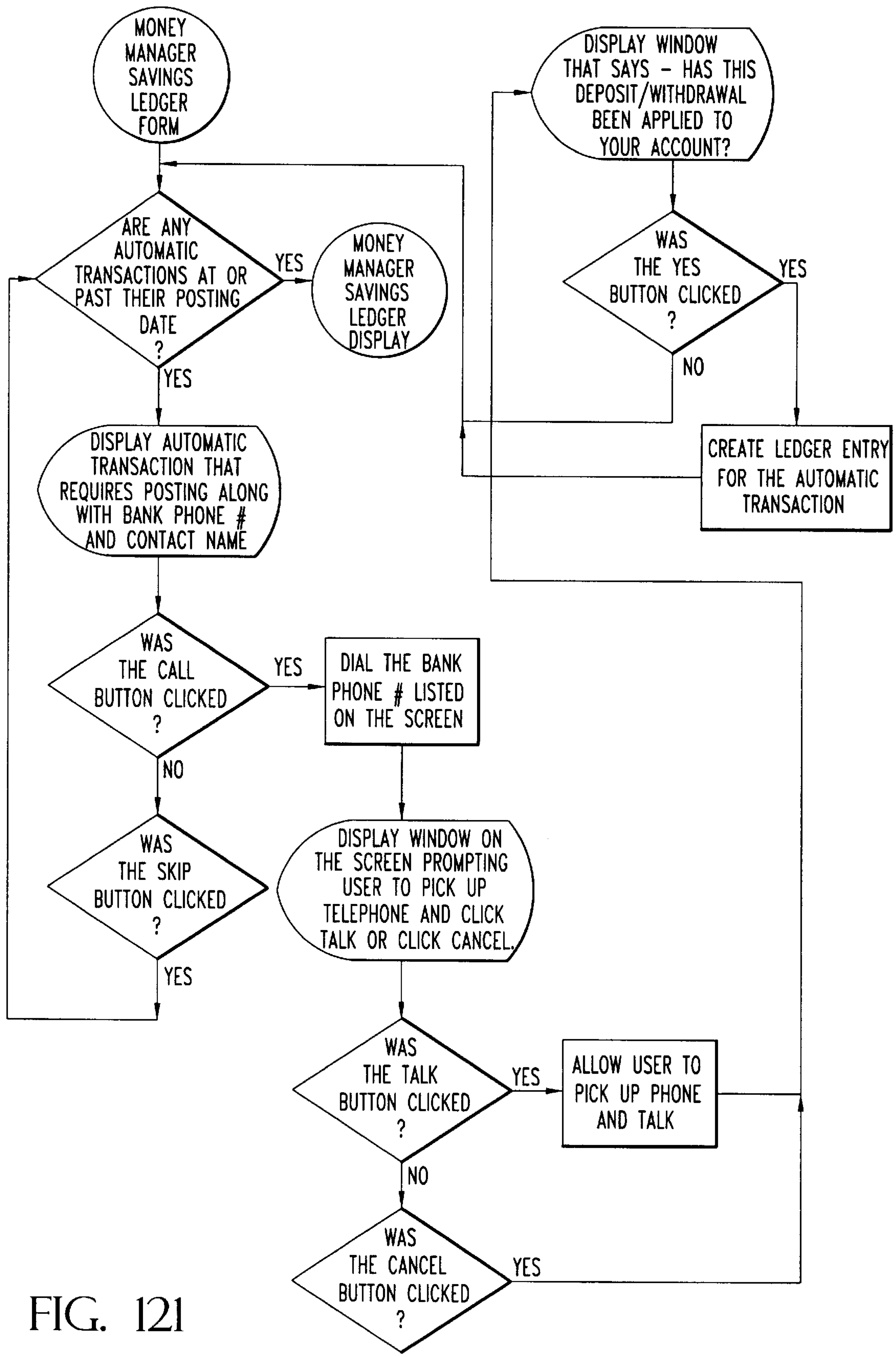
Figure 122:
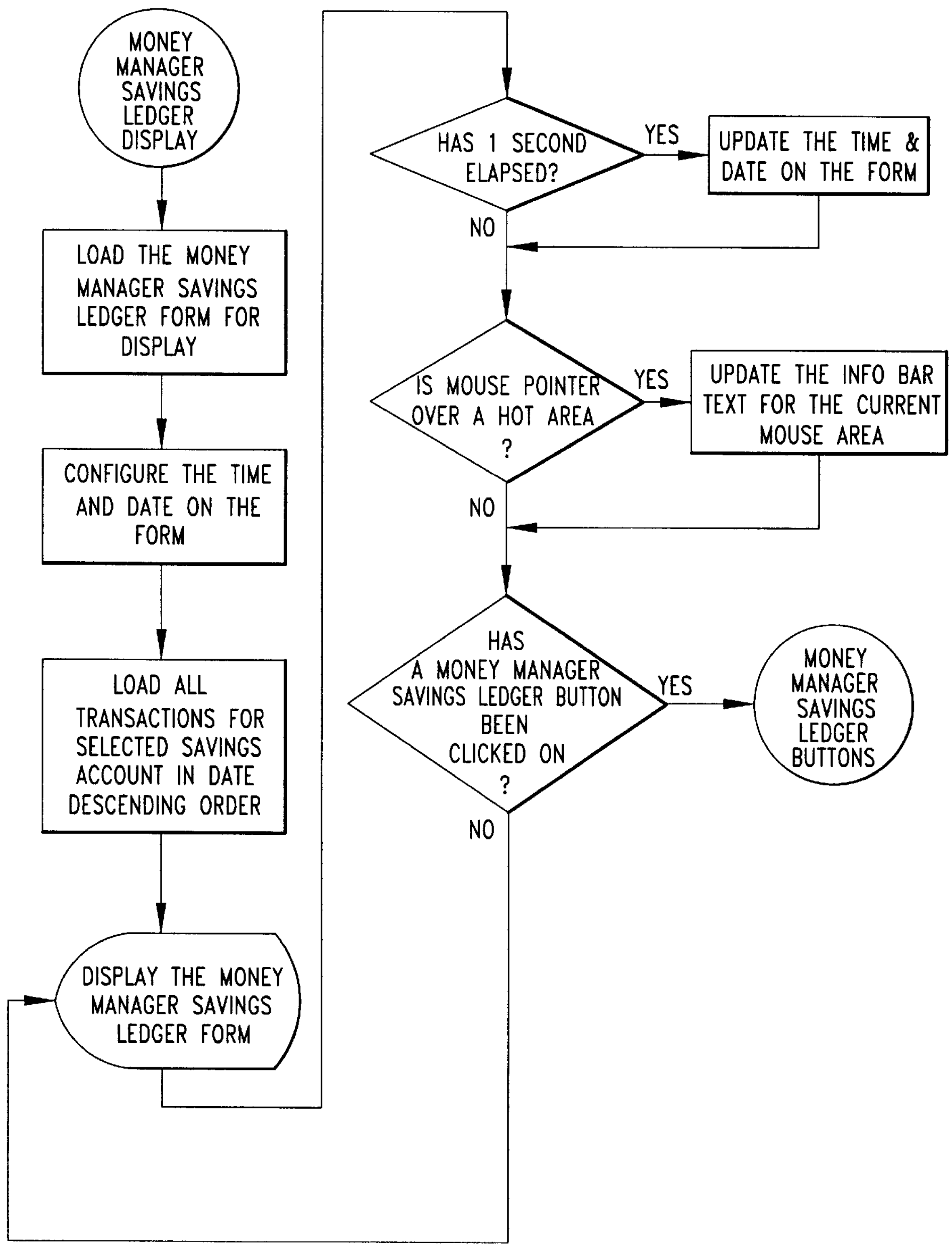
Figure 123:
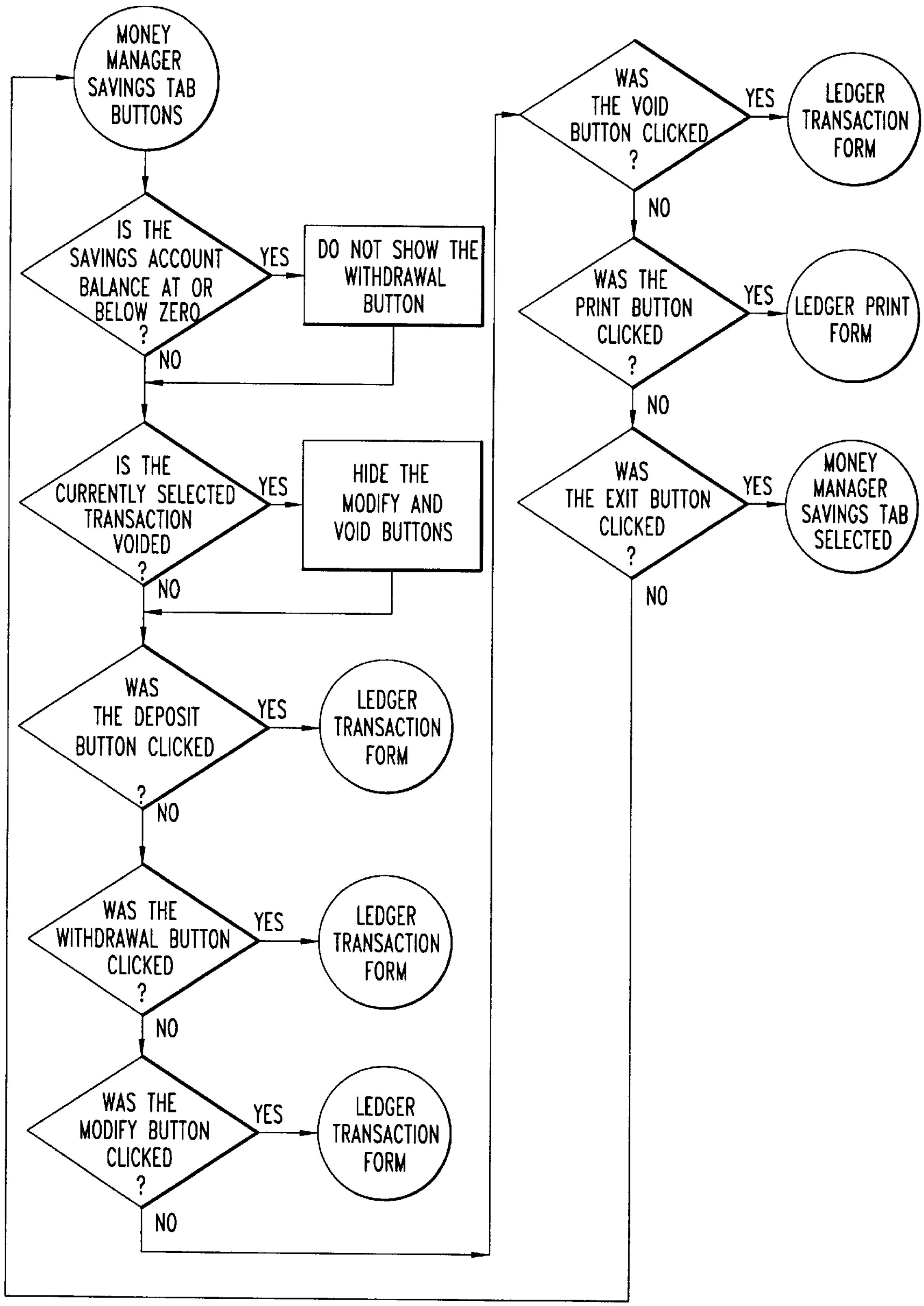
Figure 124:
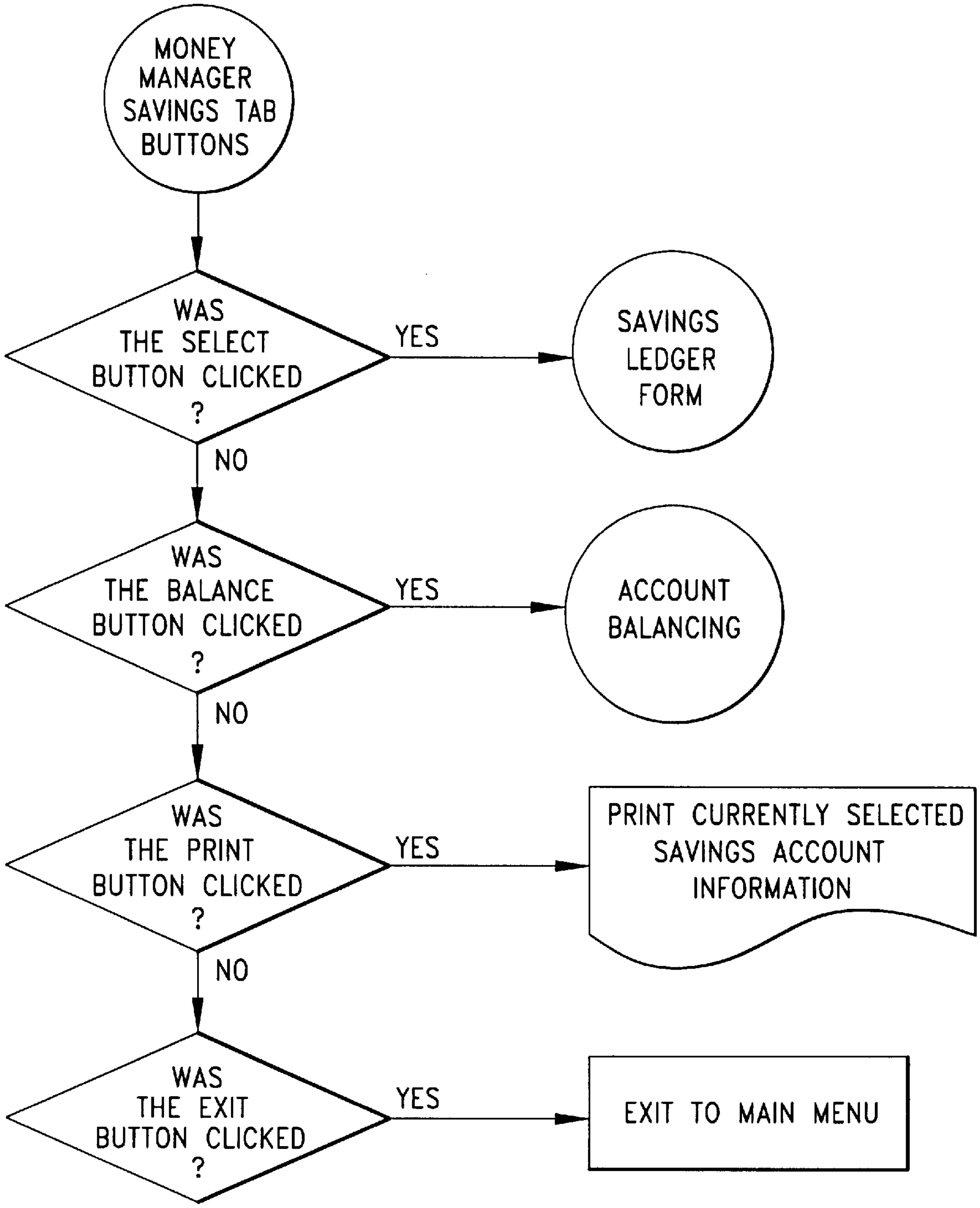
Figure 125:
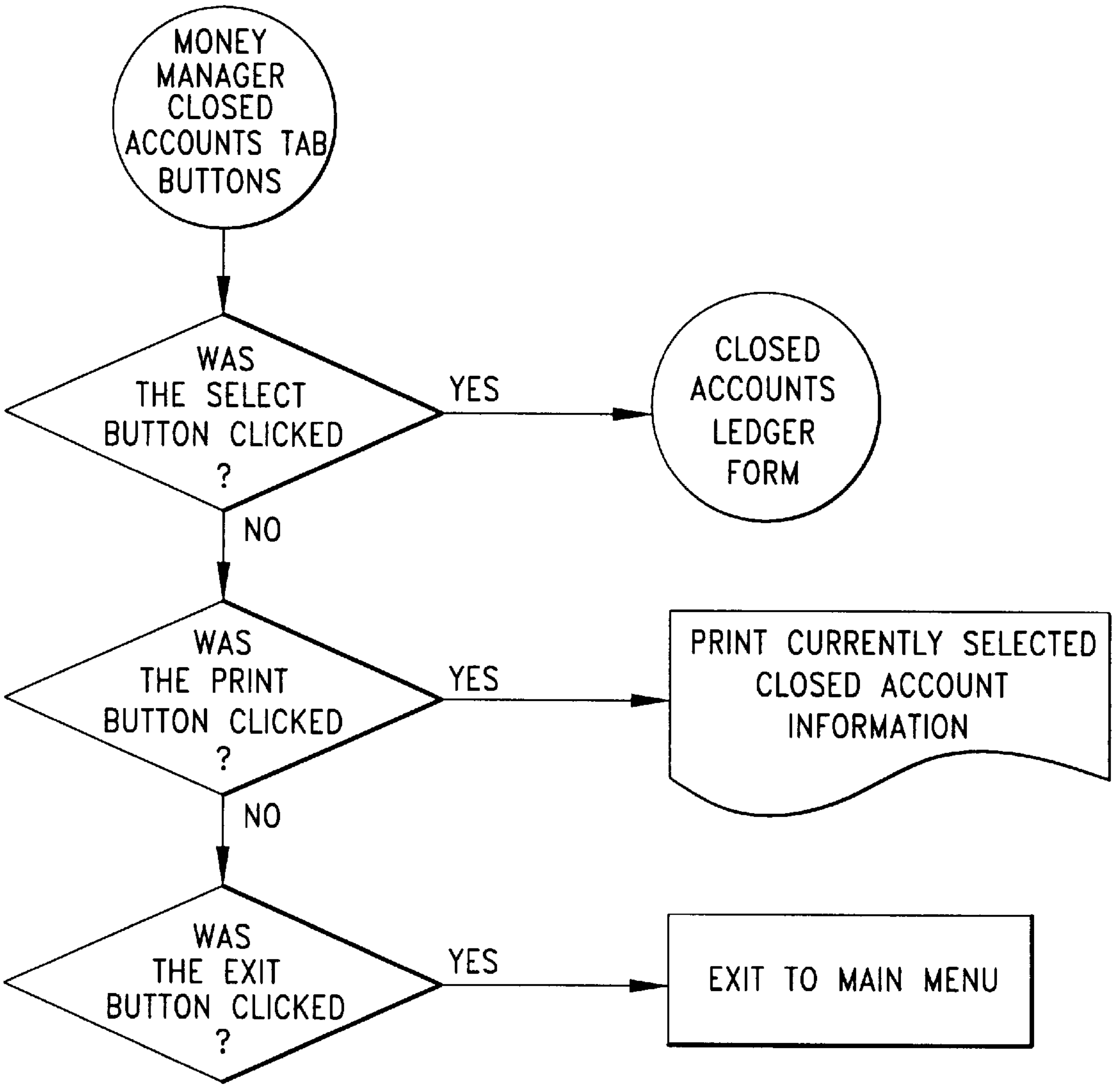
Figure 126:
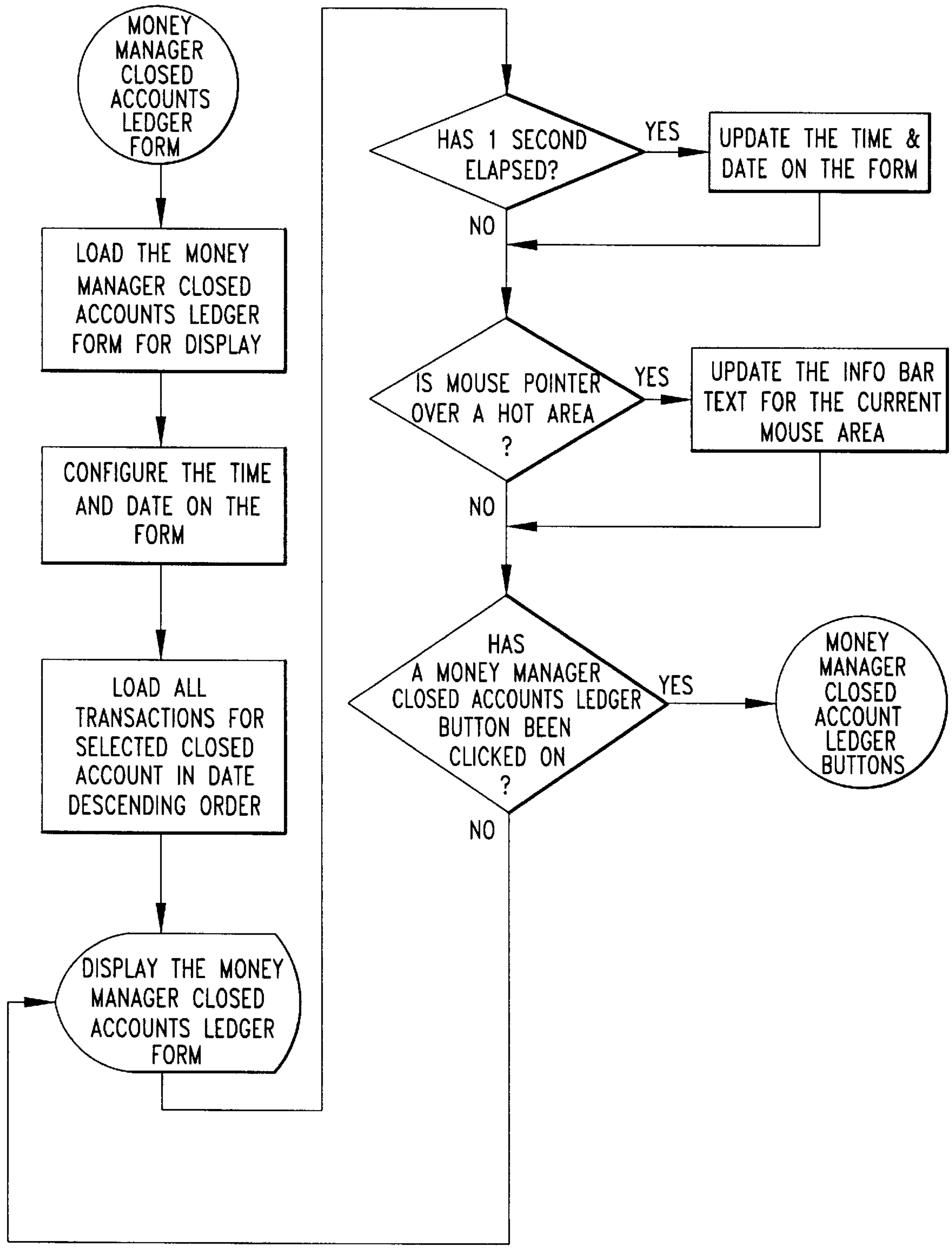
Figure 127:
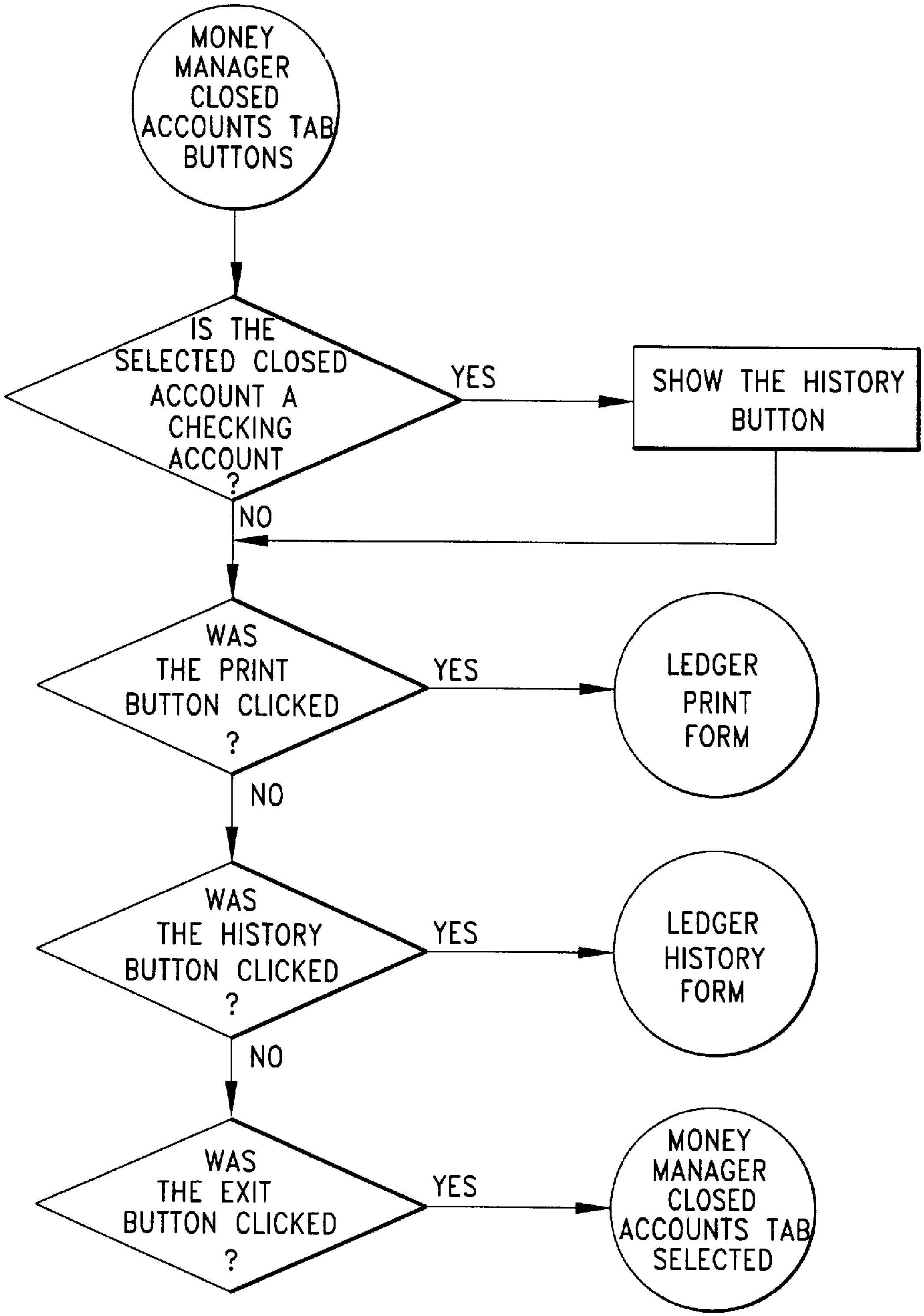
Figure 128:
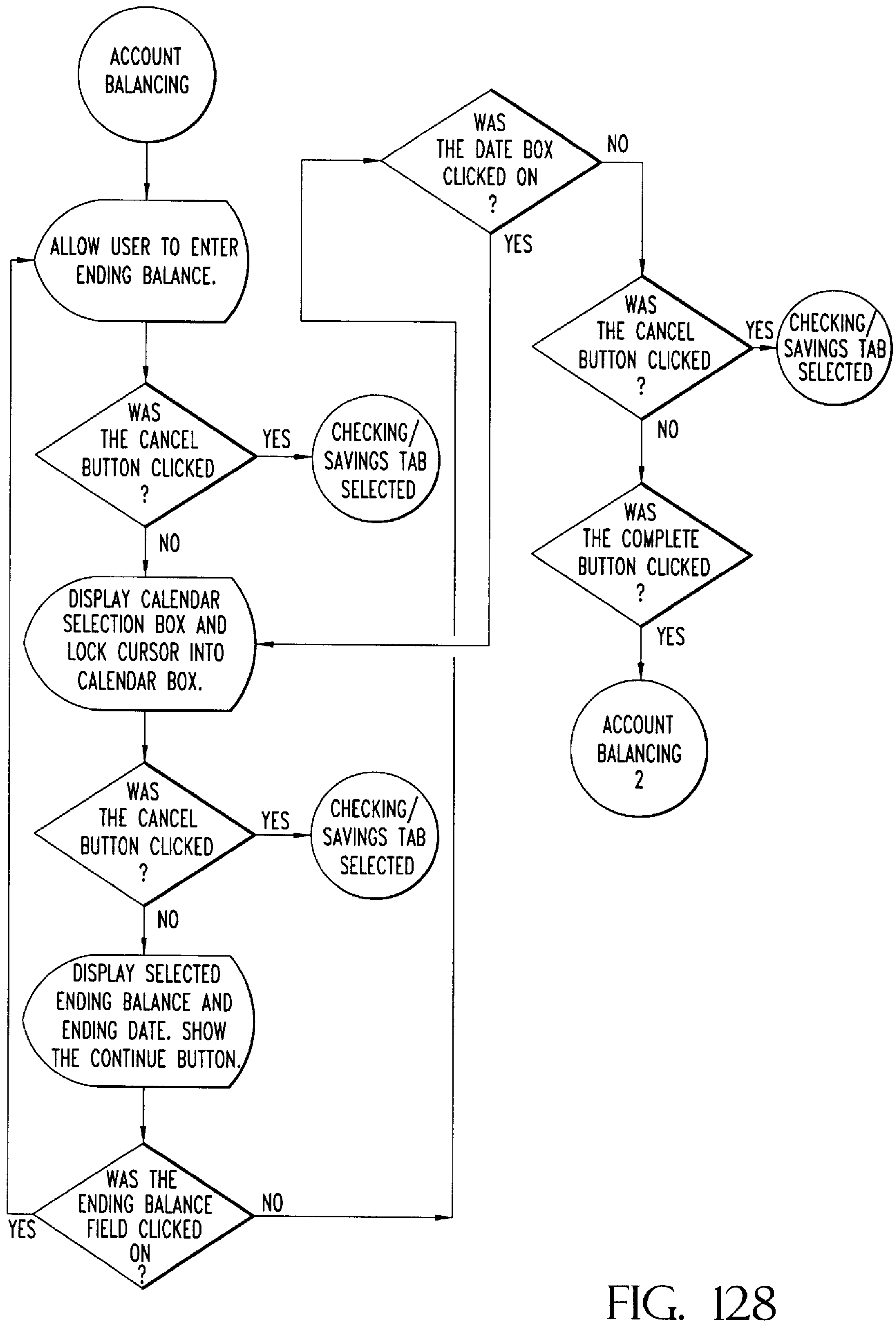
Figure 129:
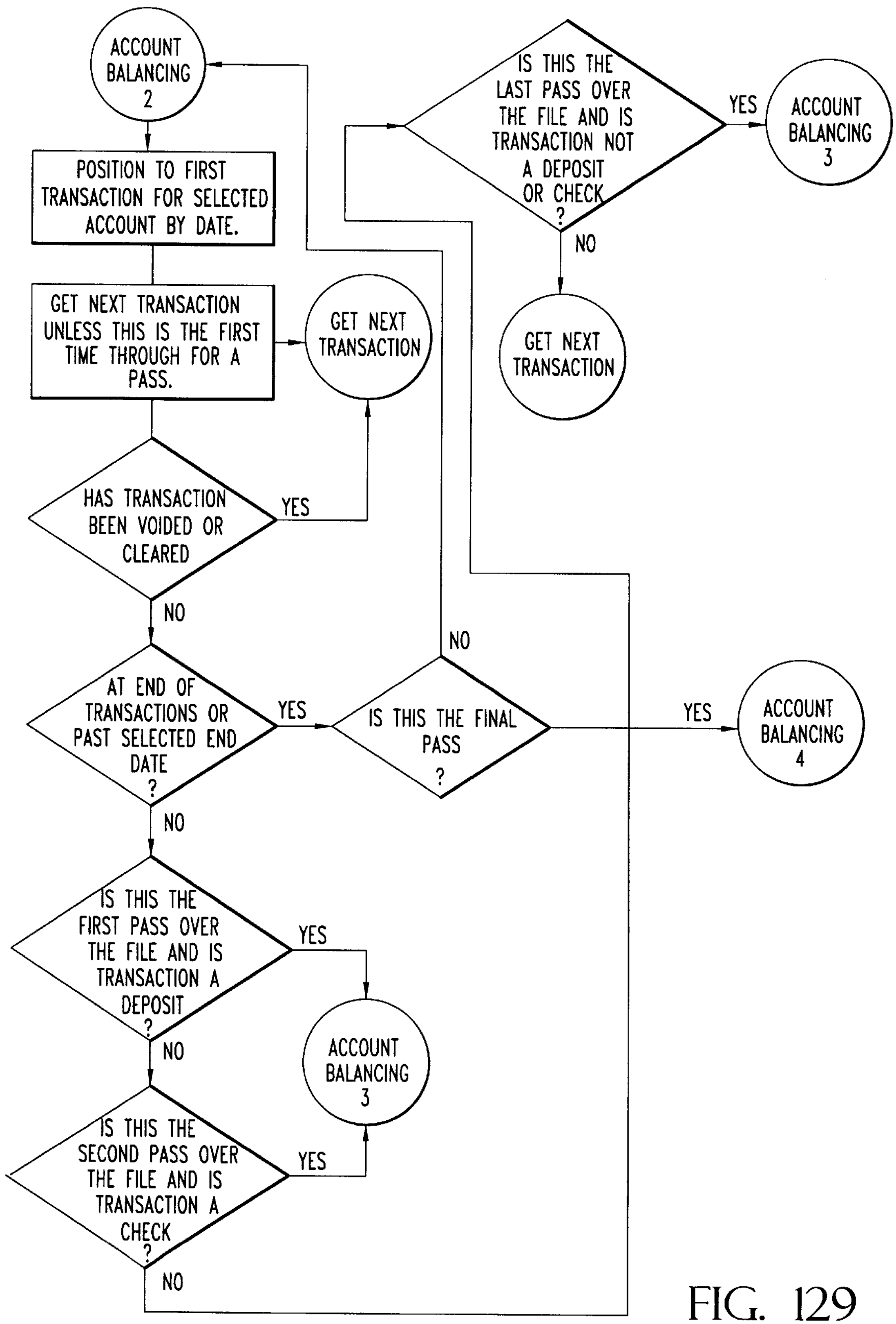
Figure 130:
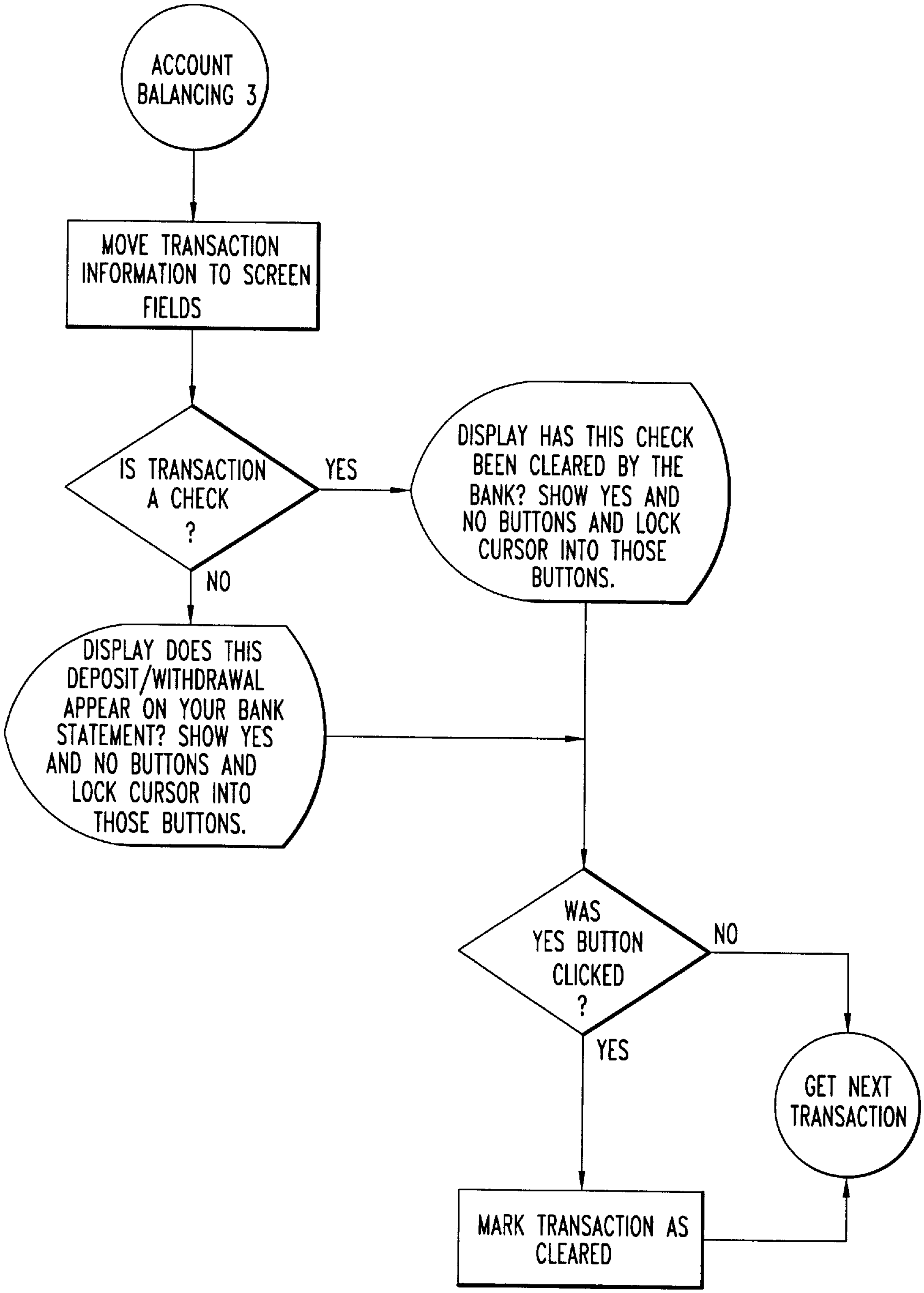
Figure 131:
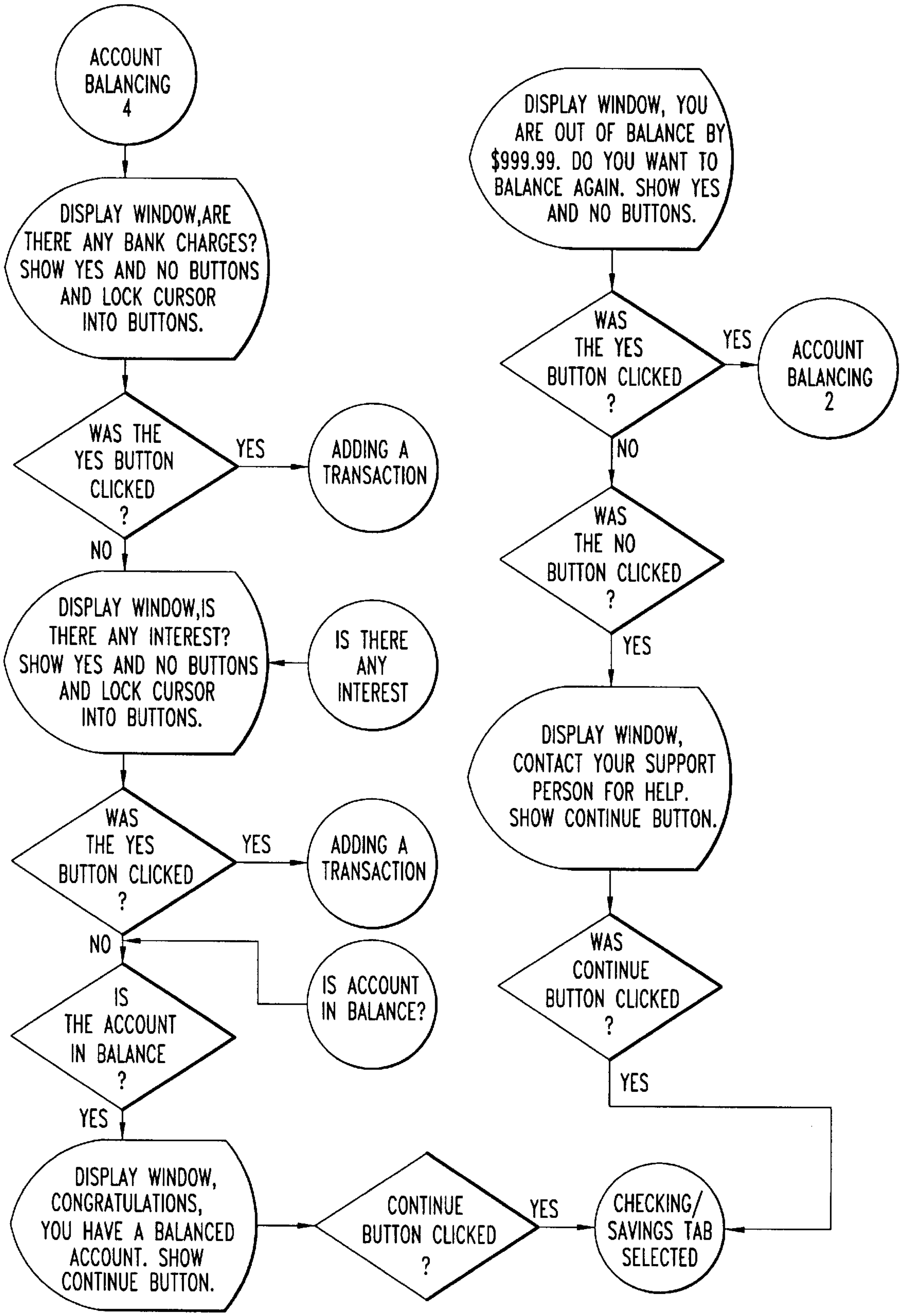
Figure 132:
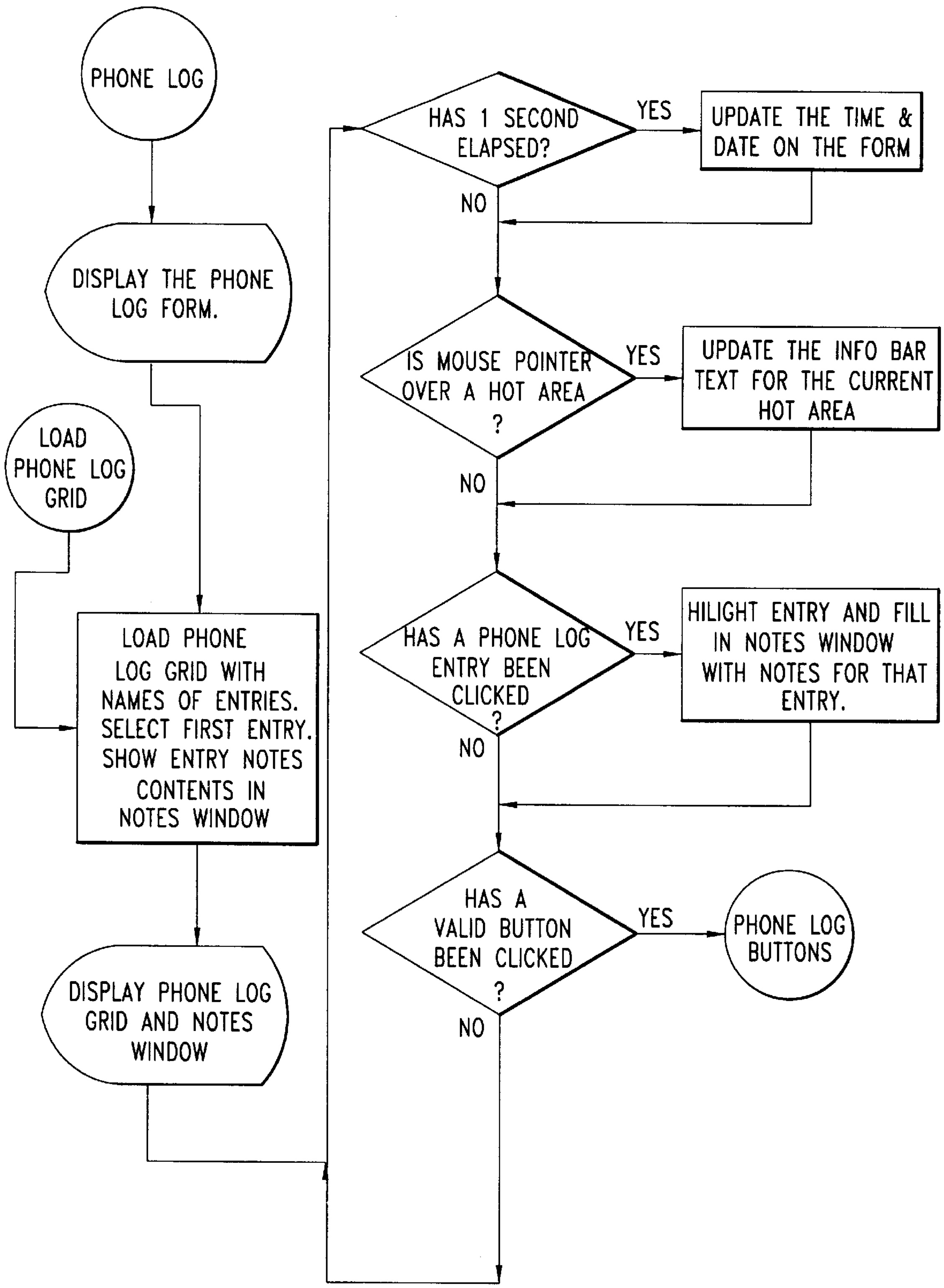
FIGS. 132–135 constitute the flow chart for the Phone Log module.
Figure 133:
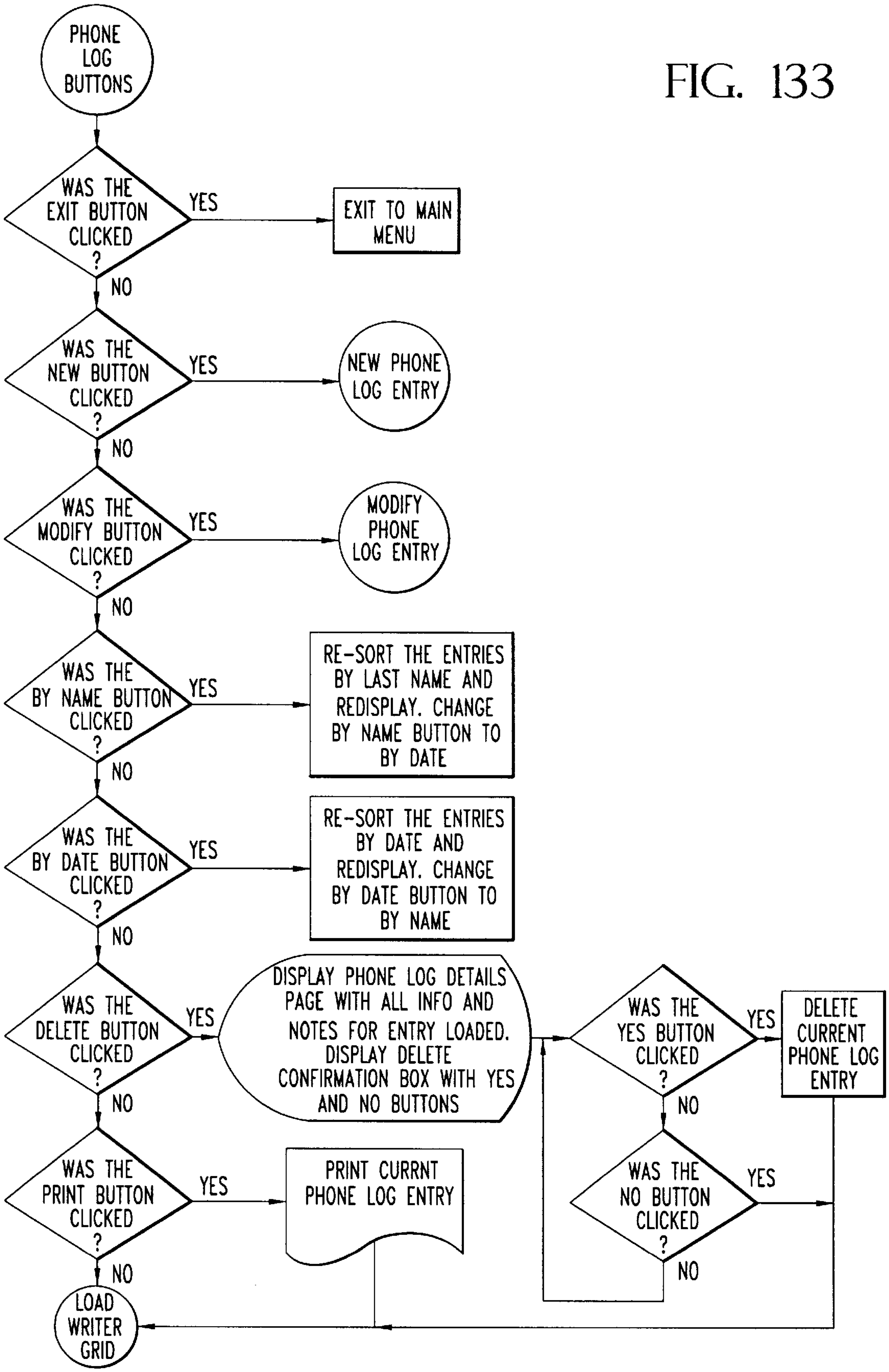
Figure 134:
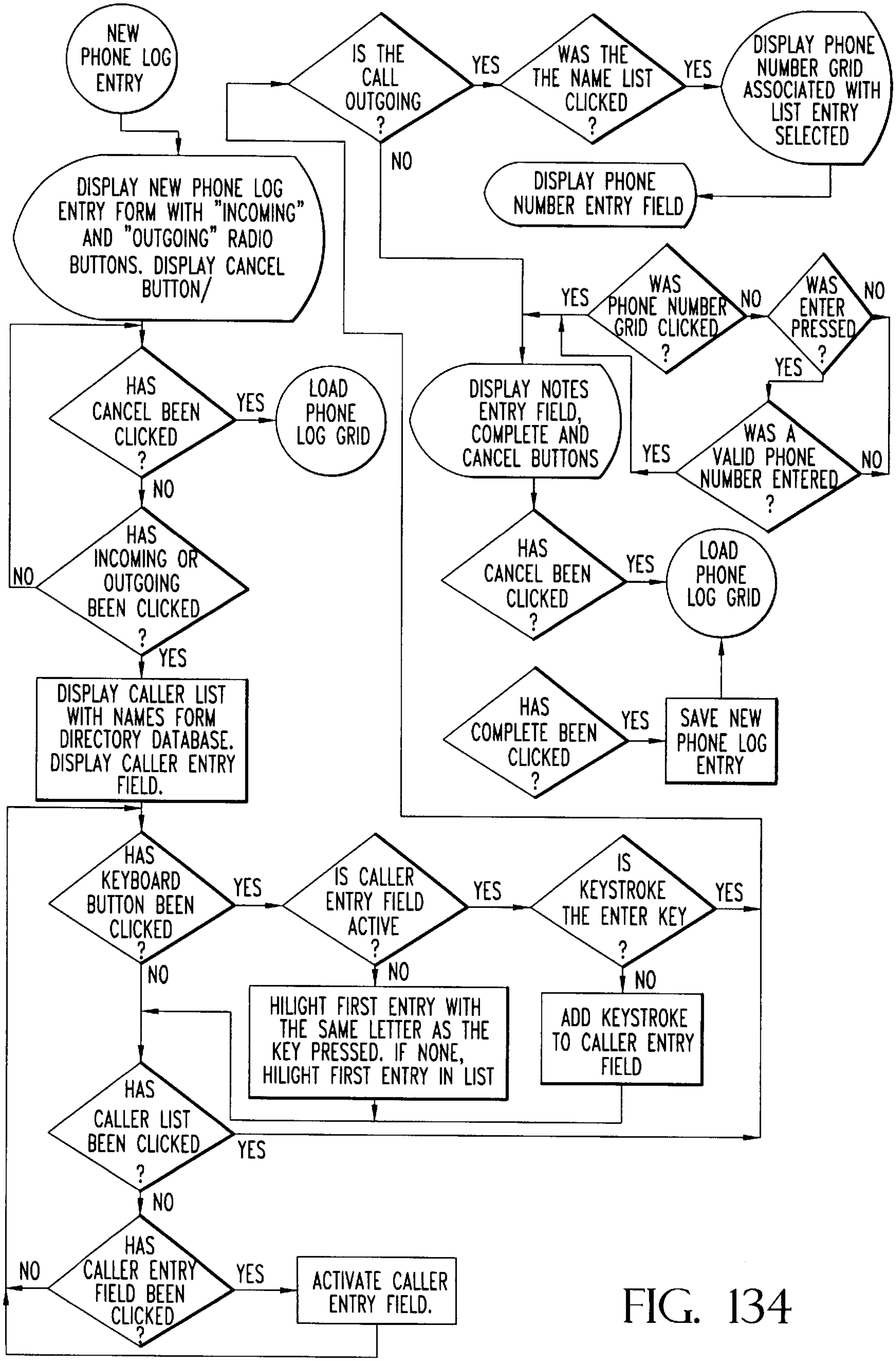
Figure 135:
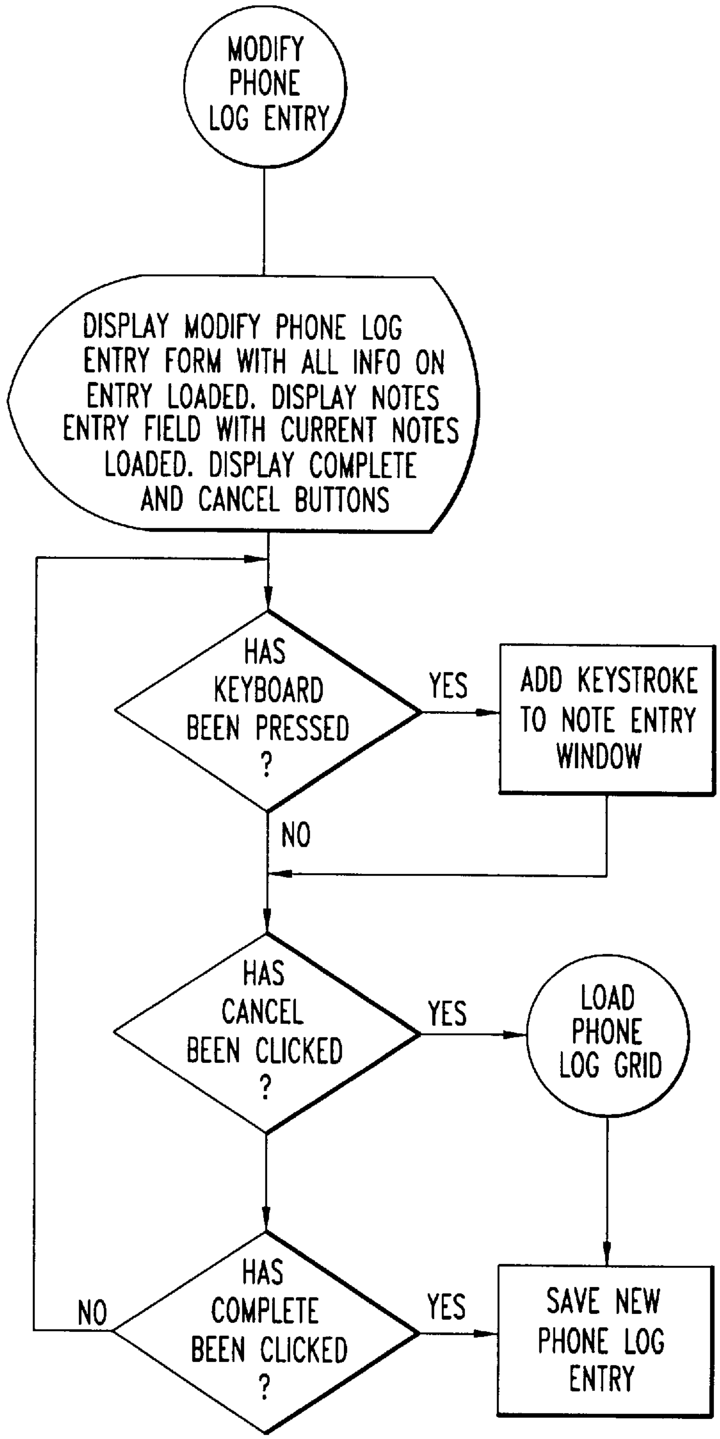
Figure 136:
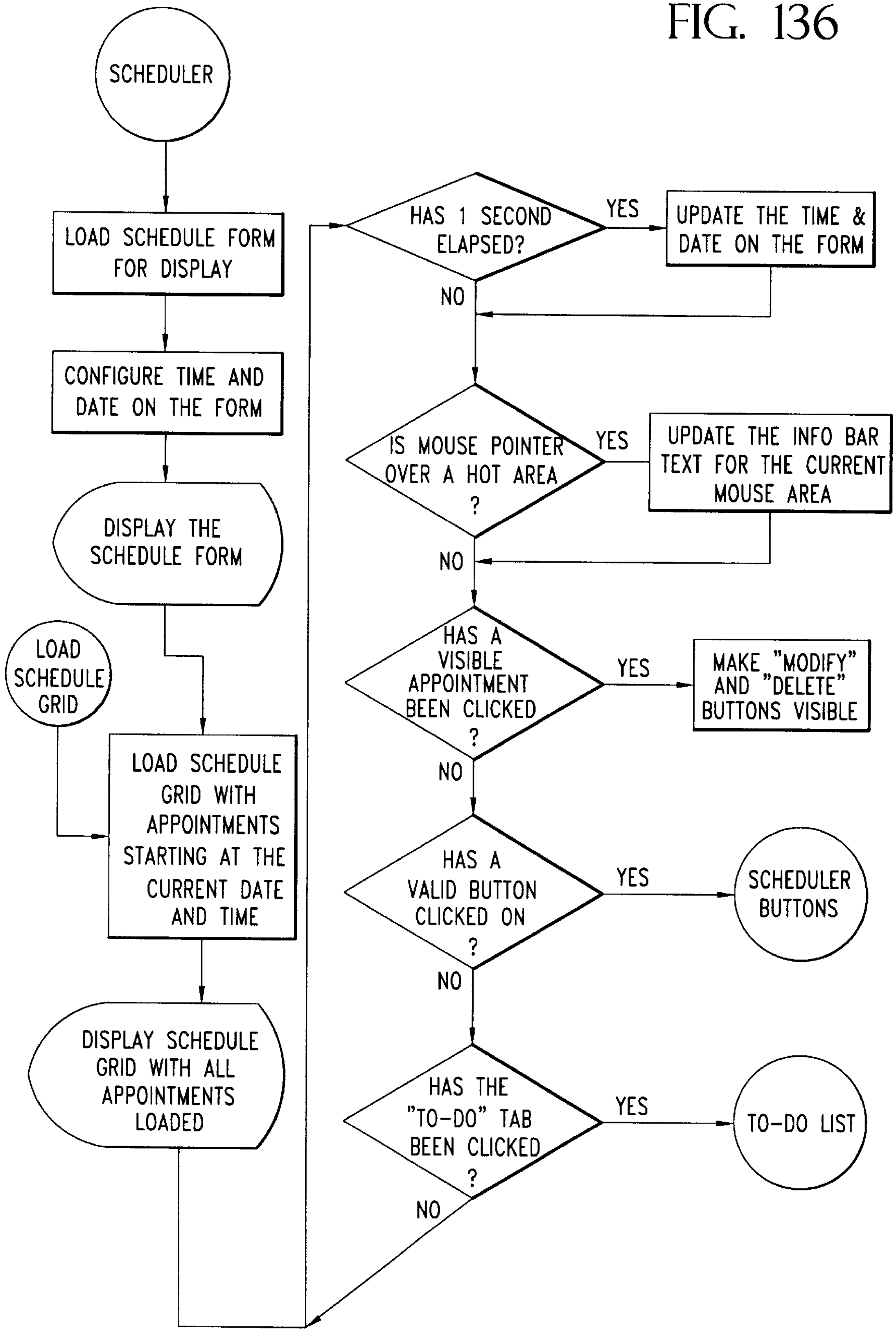
FIGS. 136–150 constitute the flow chart for the Scheduler module.
Figure 137:
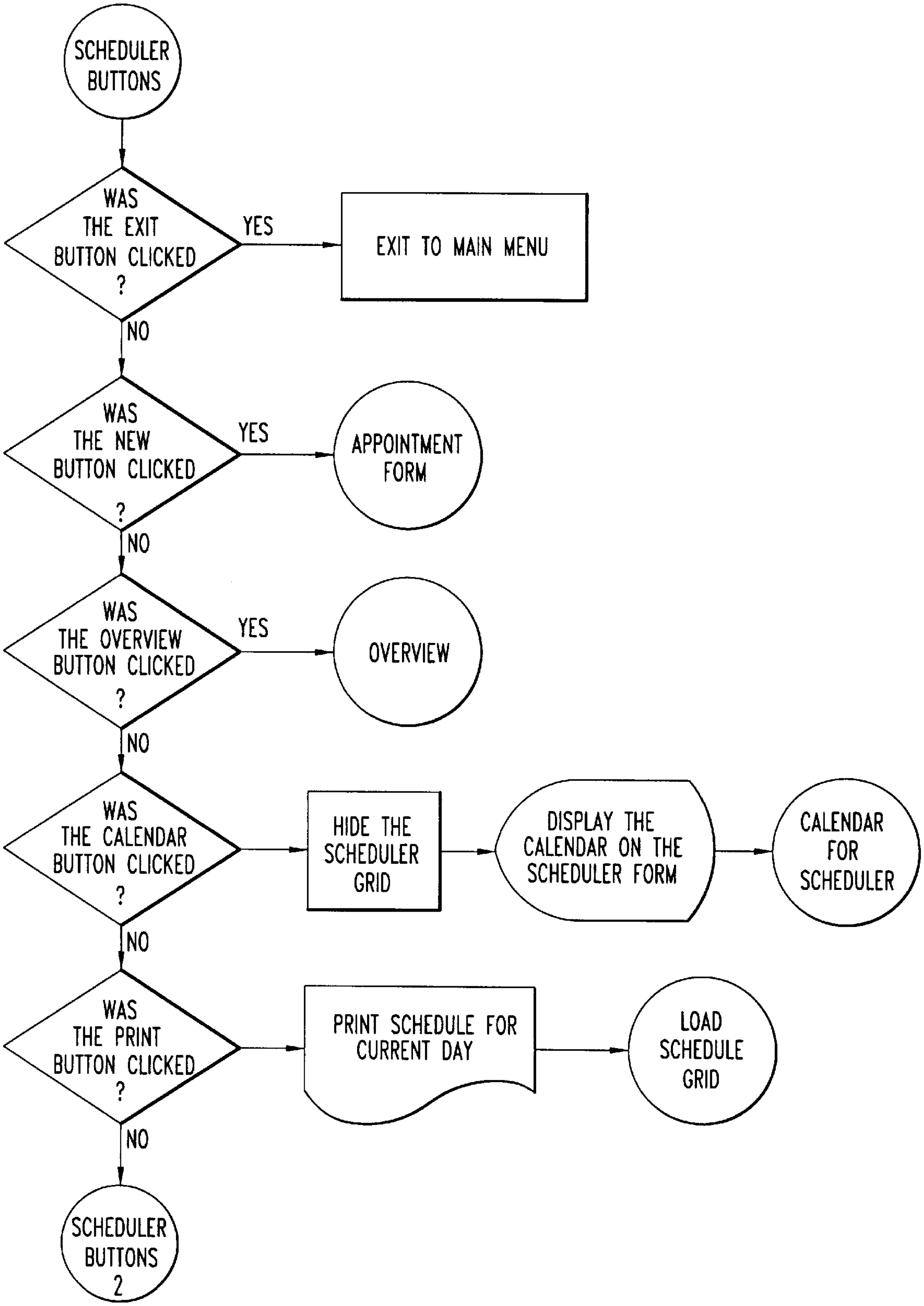
Figure 138:
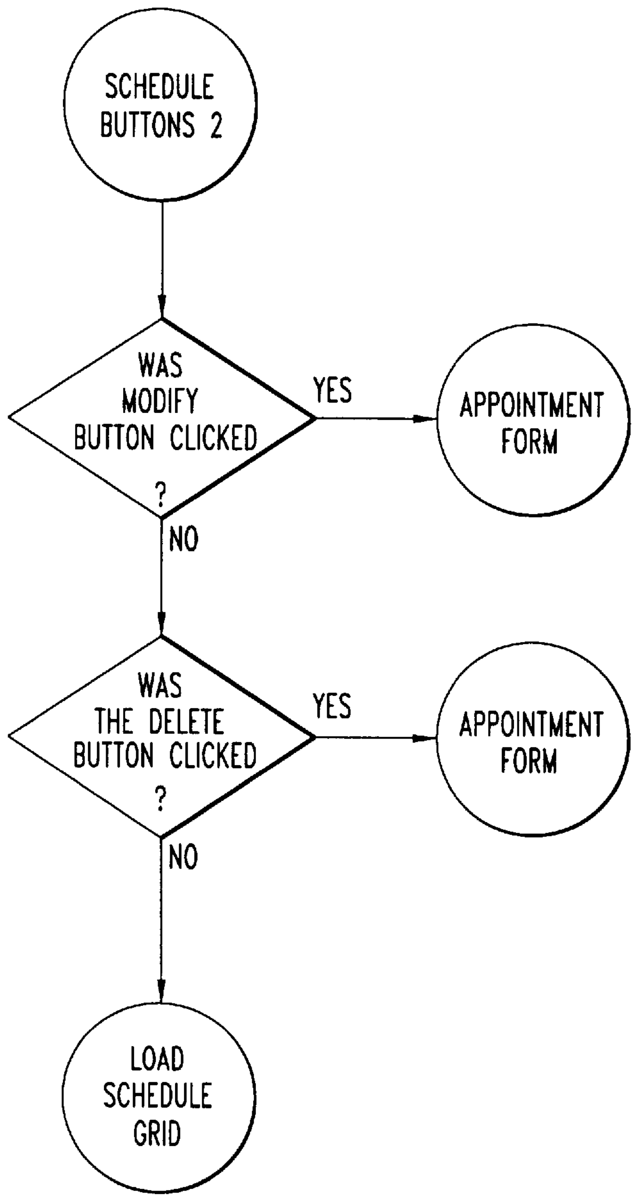
Figure 139:
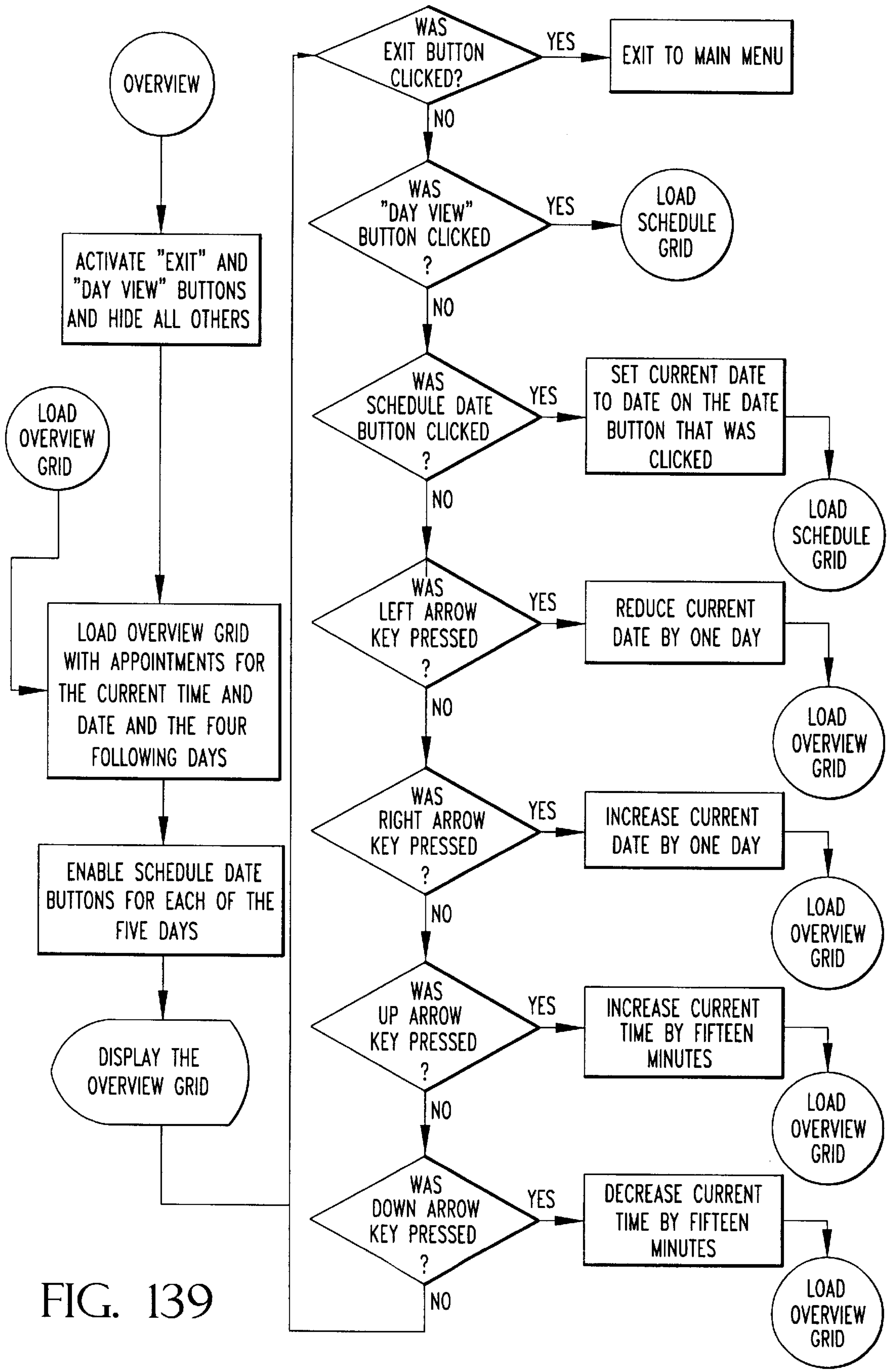
Figure 140:
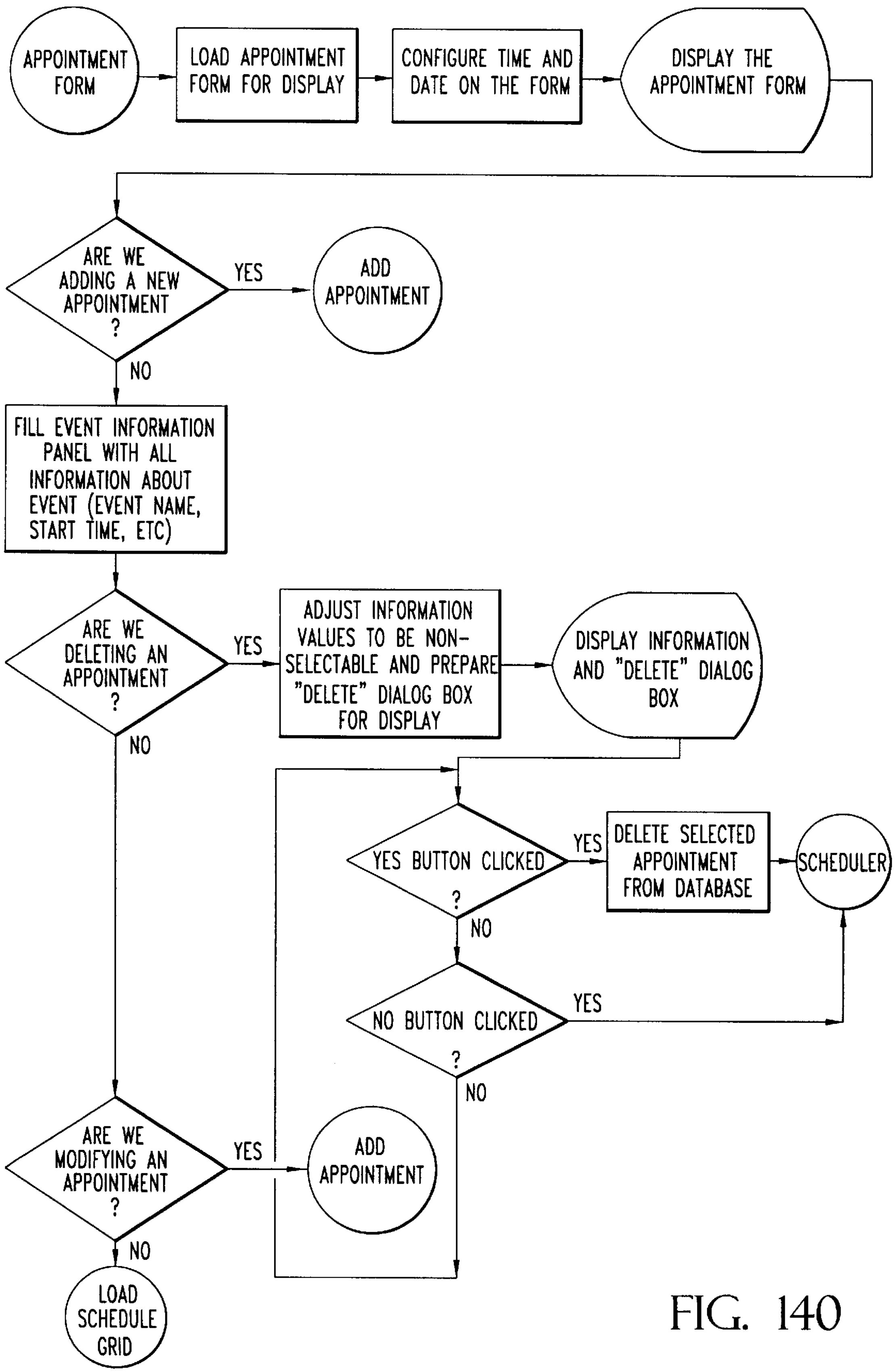
Figure 141:
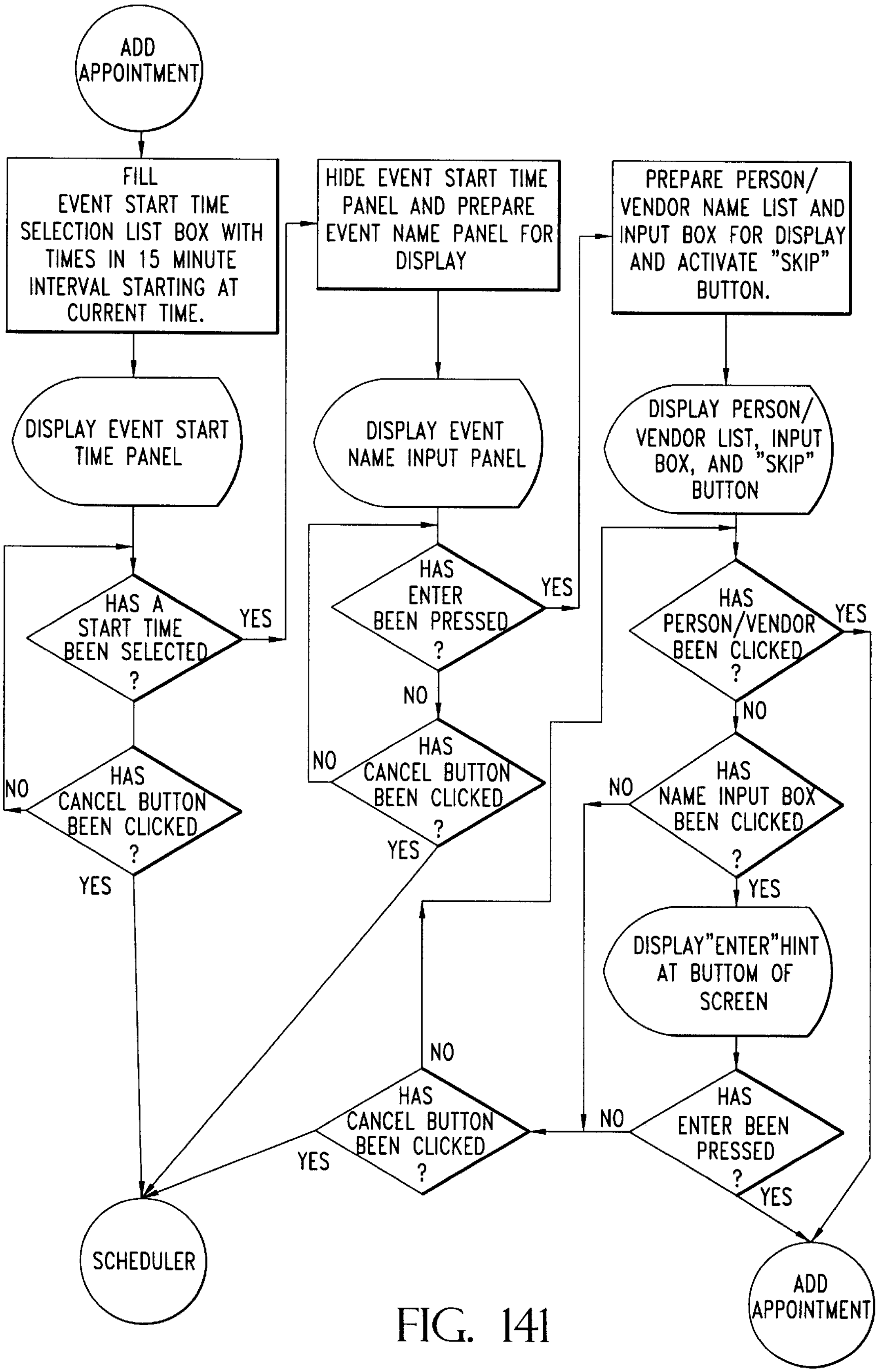
Figure 142:
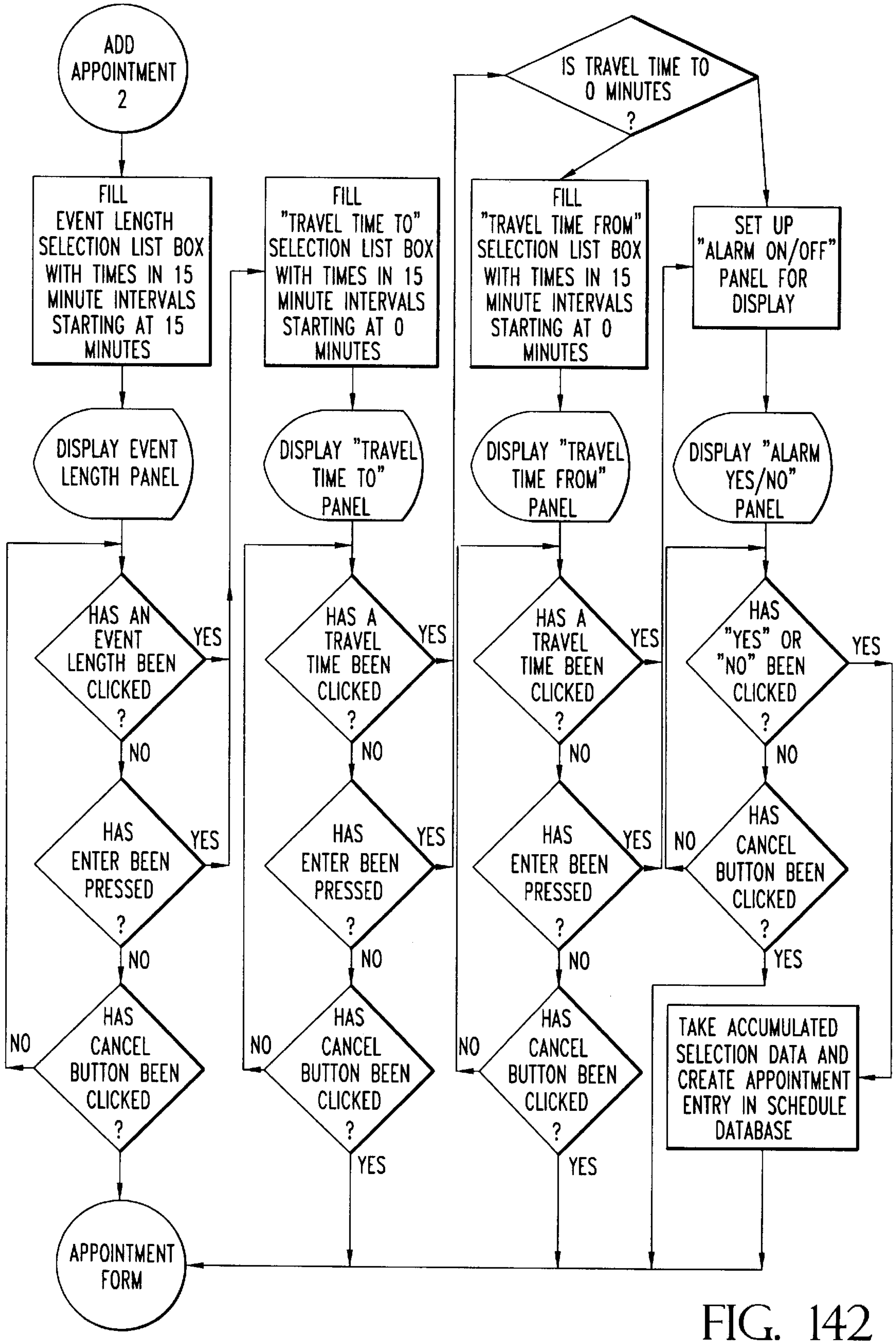
Figure 143:
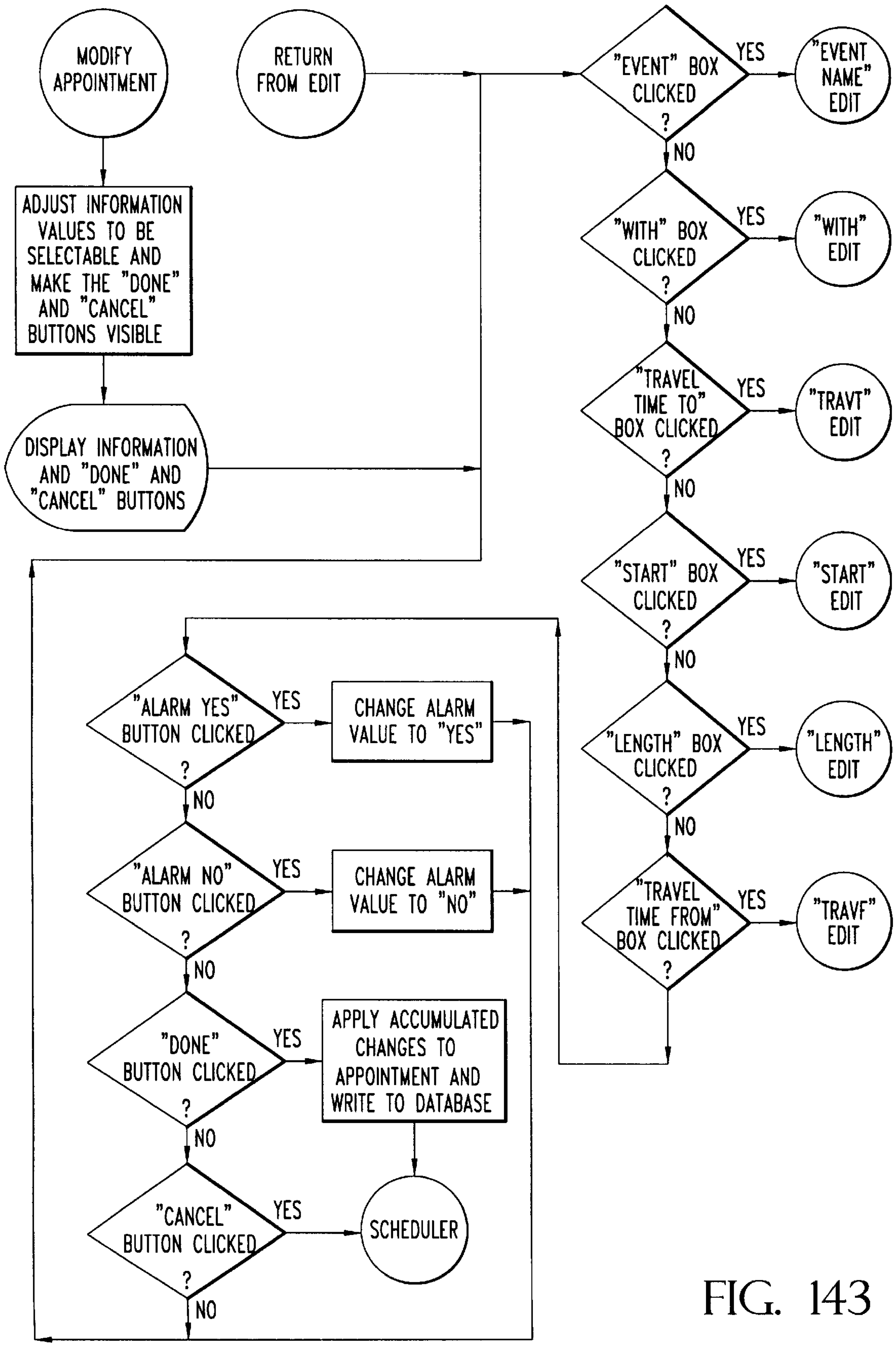
Figure 144:
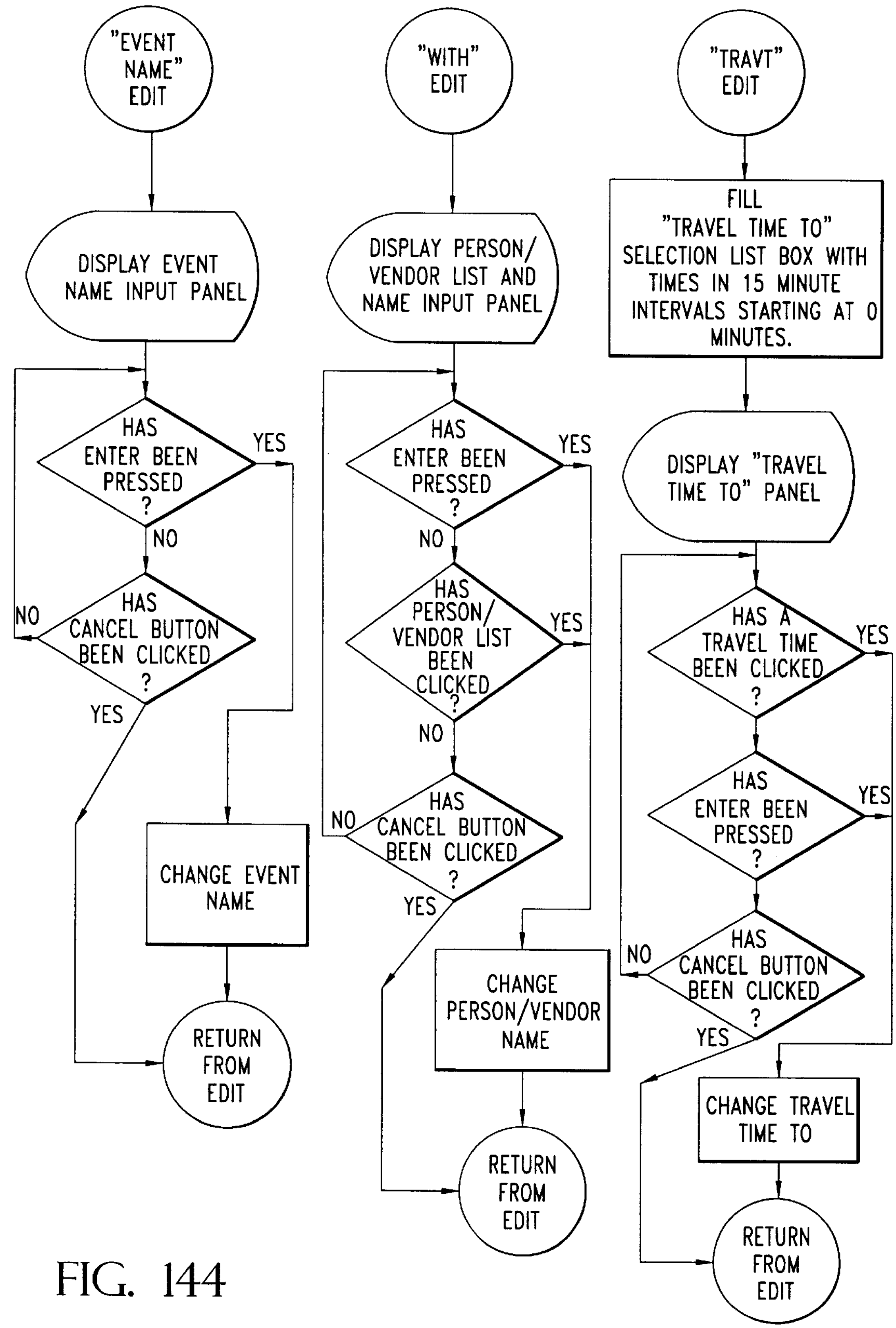
Figure 145:
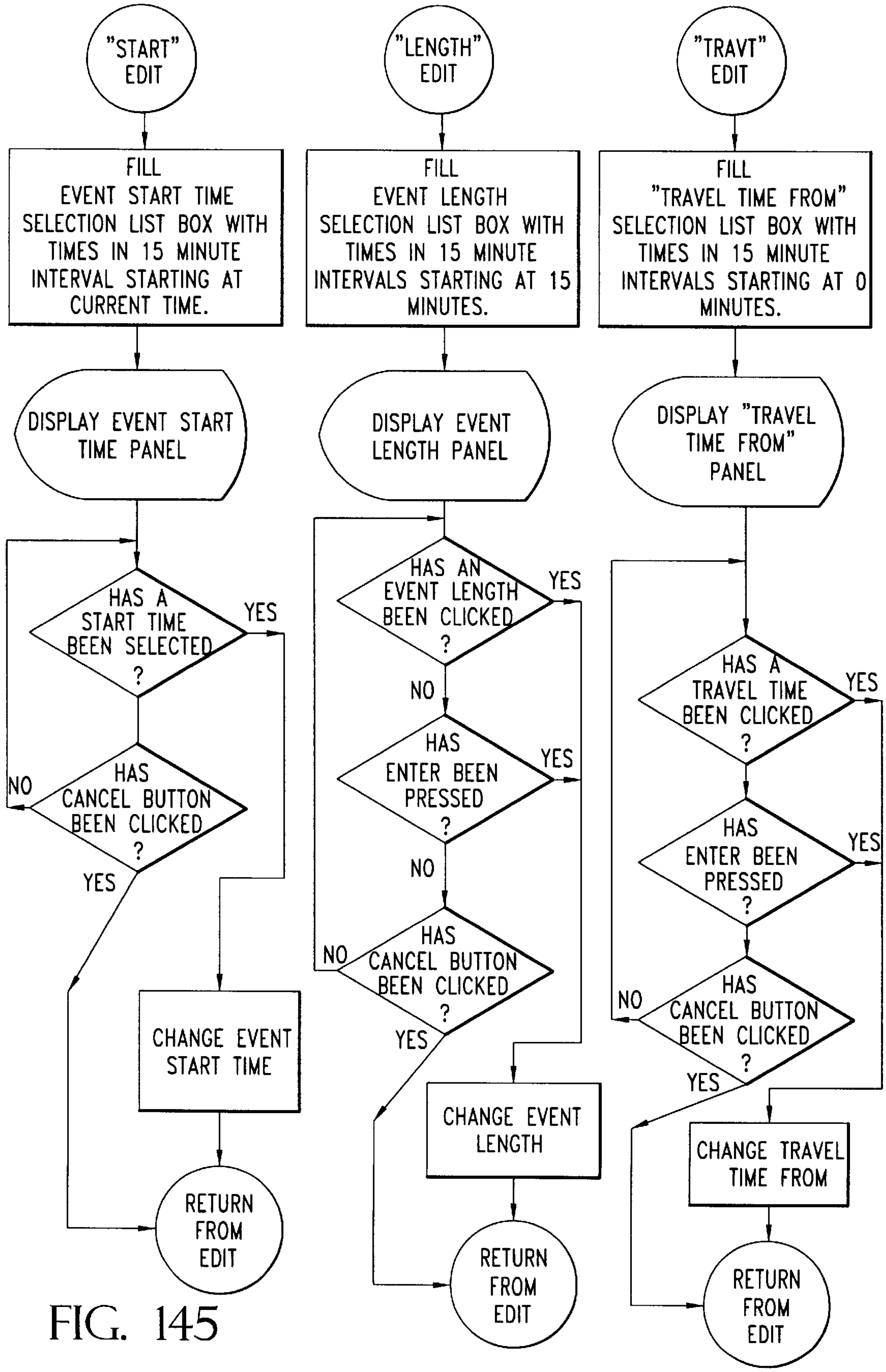
Figure 146:
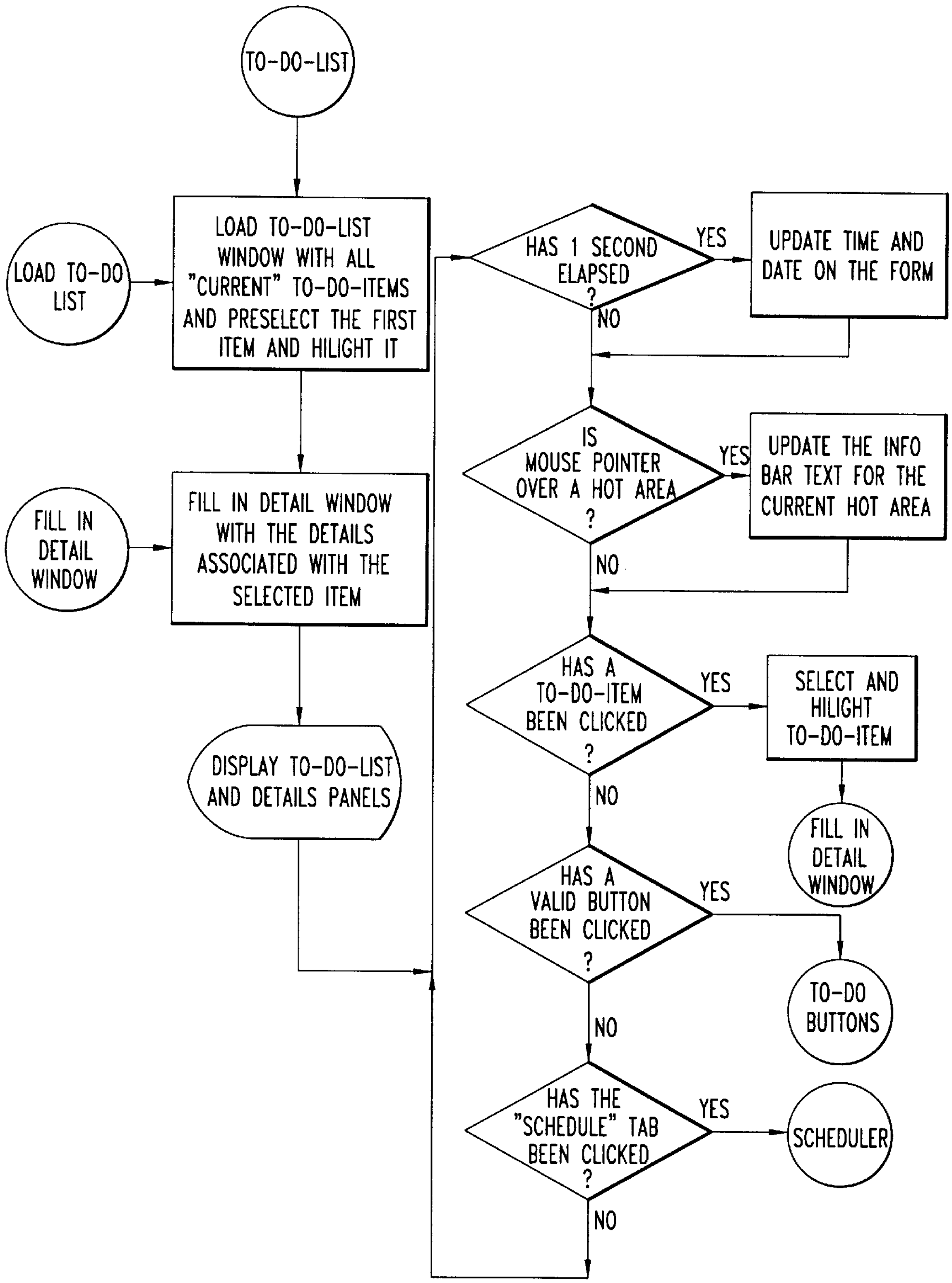
Figure 147:
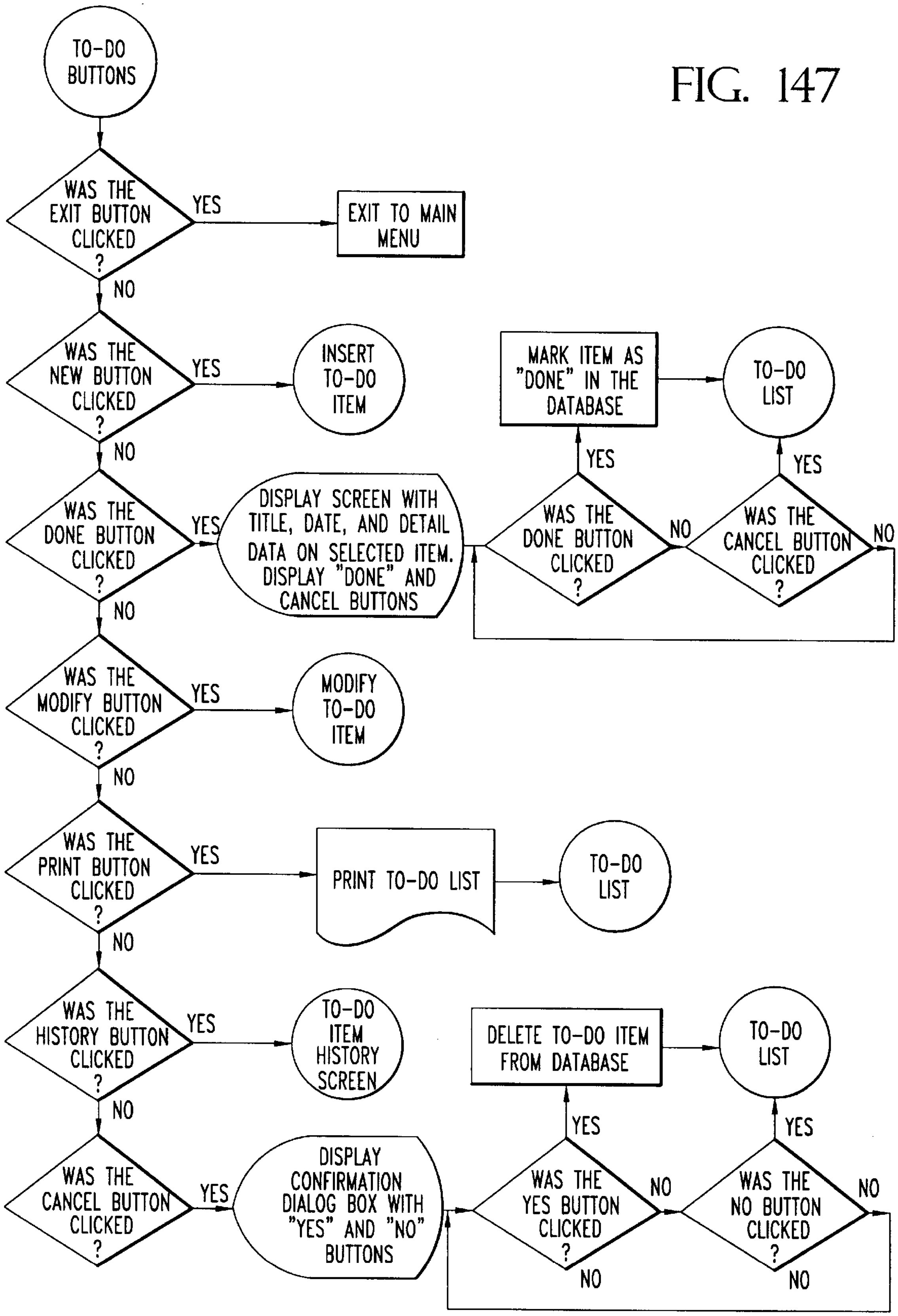
Figure 148:
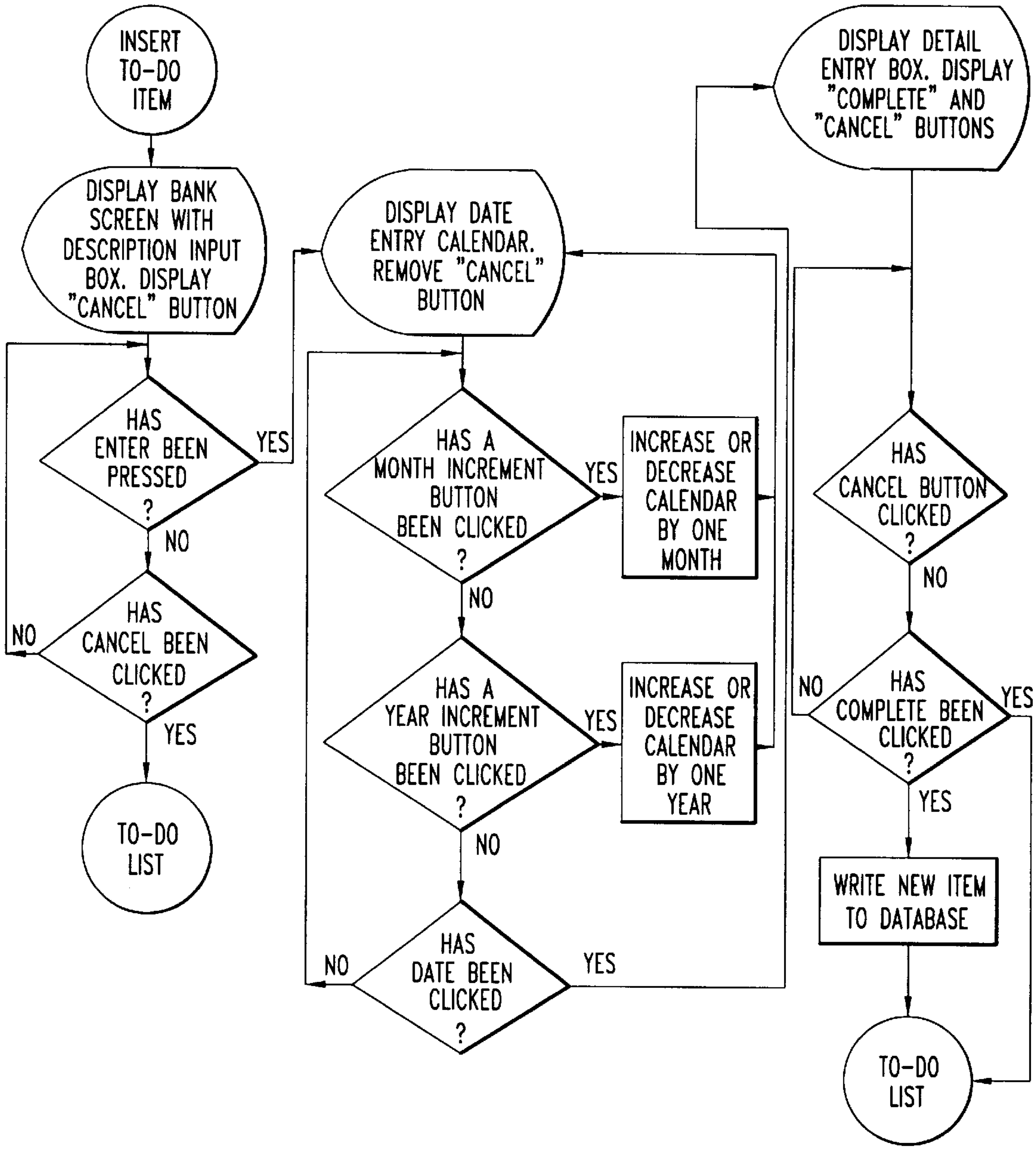
Figure 149:
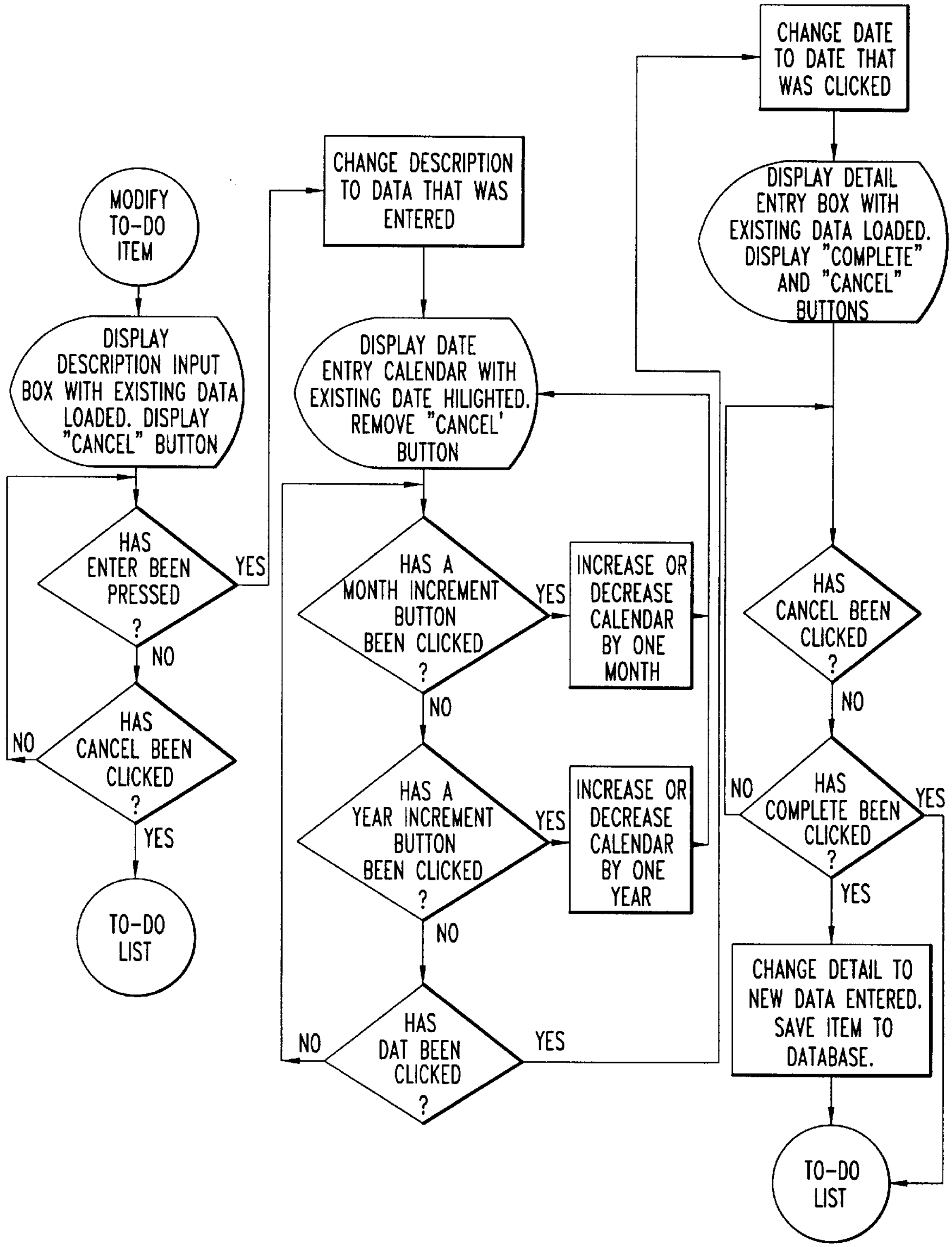
Figure 150:
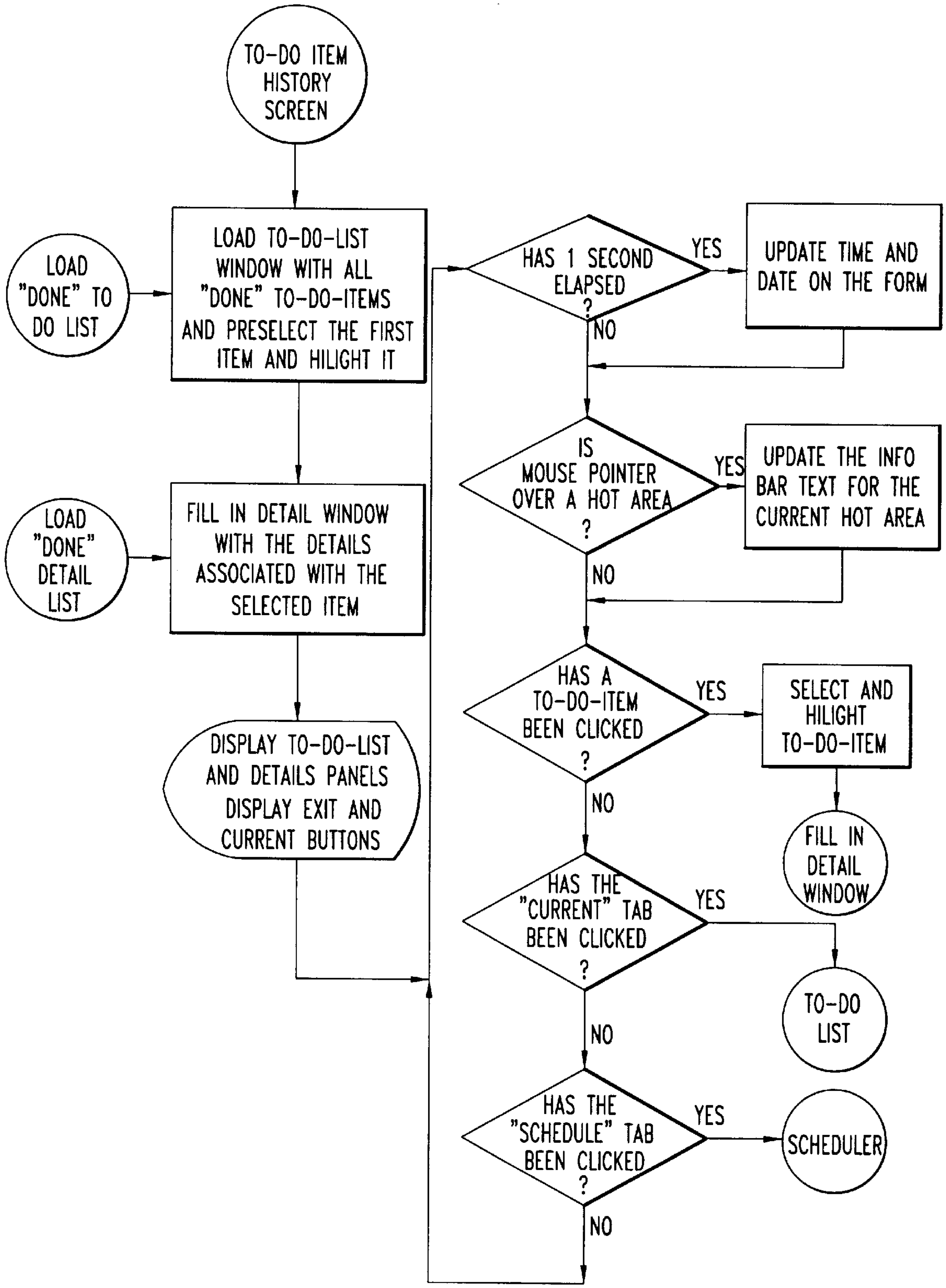
Figure 151:
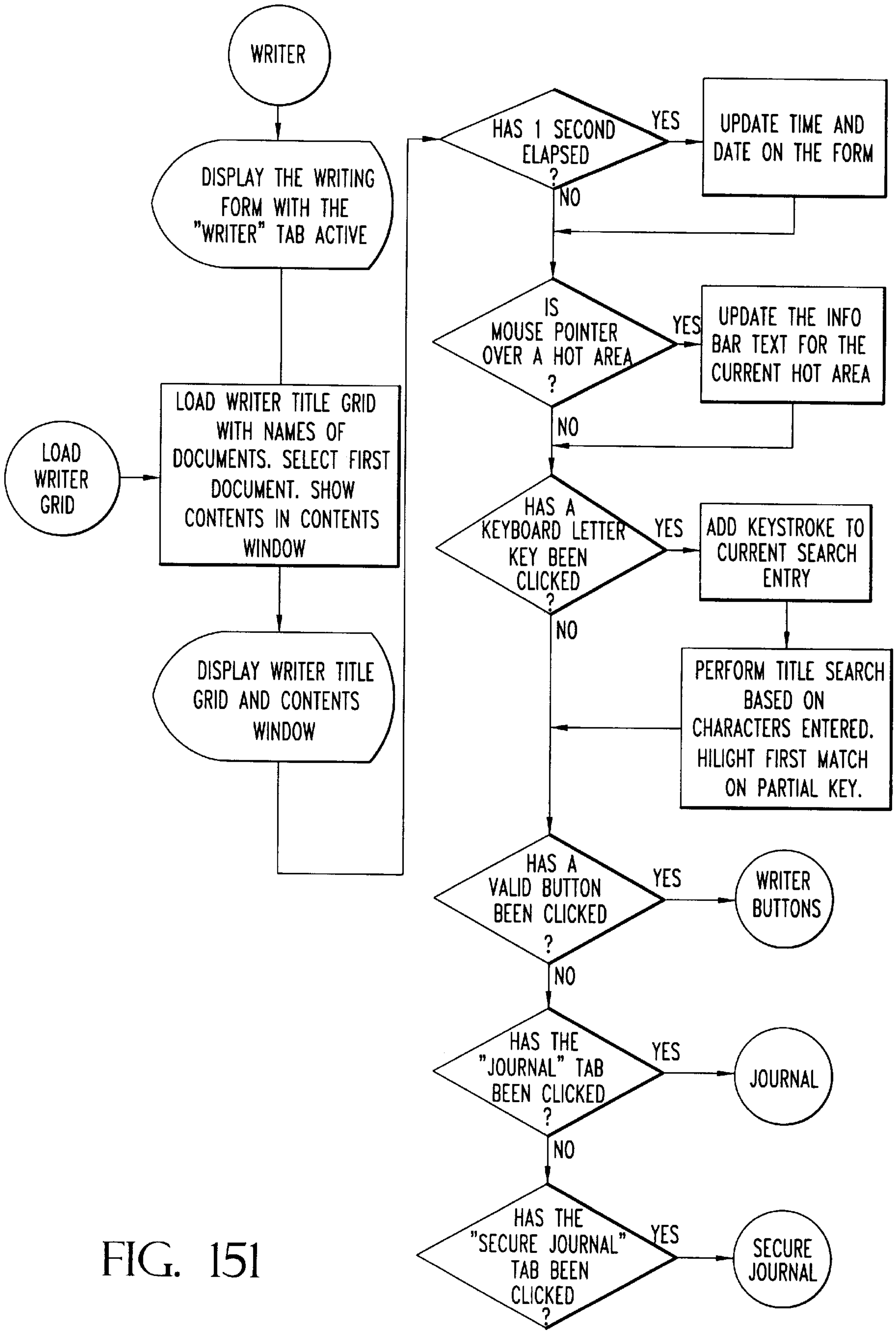
FIGS. 151–155 constitute the flow chart for the Writer function in the Writing module.
Figure 152:
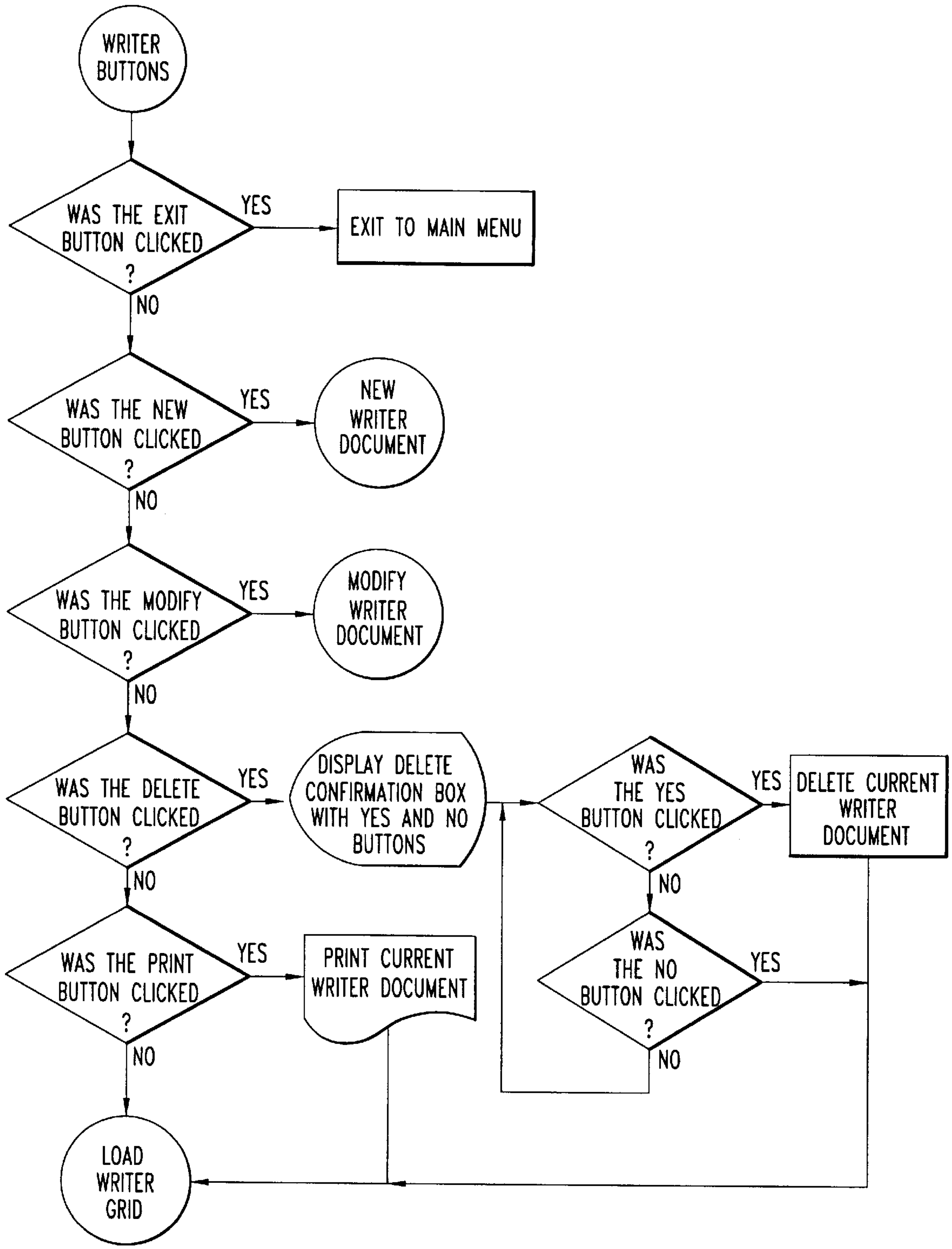
Figure 153:
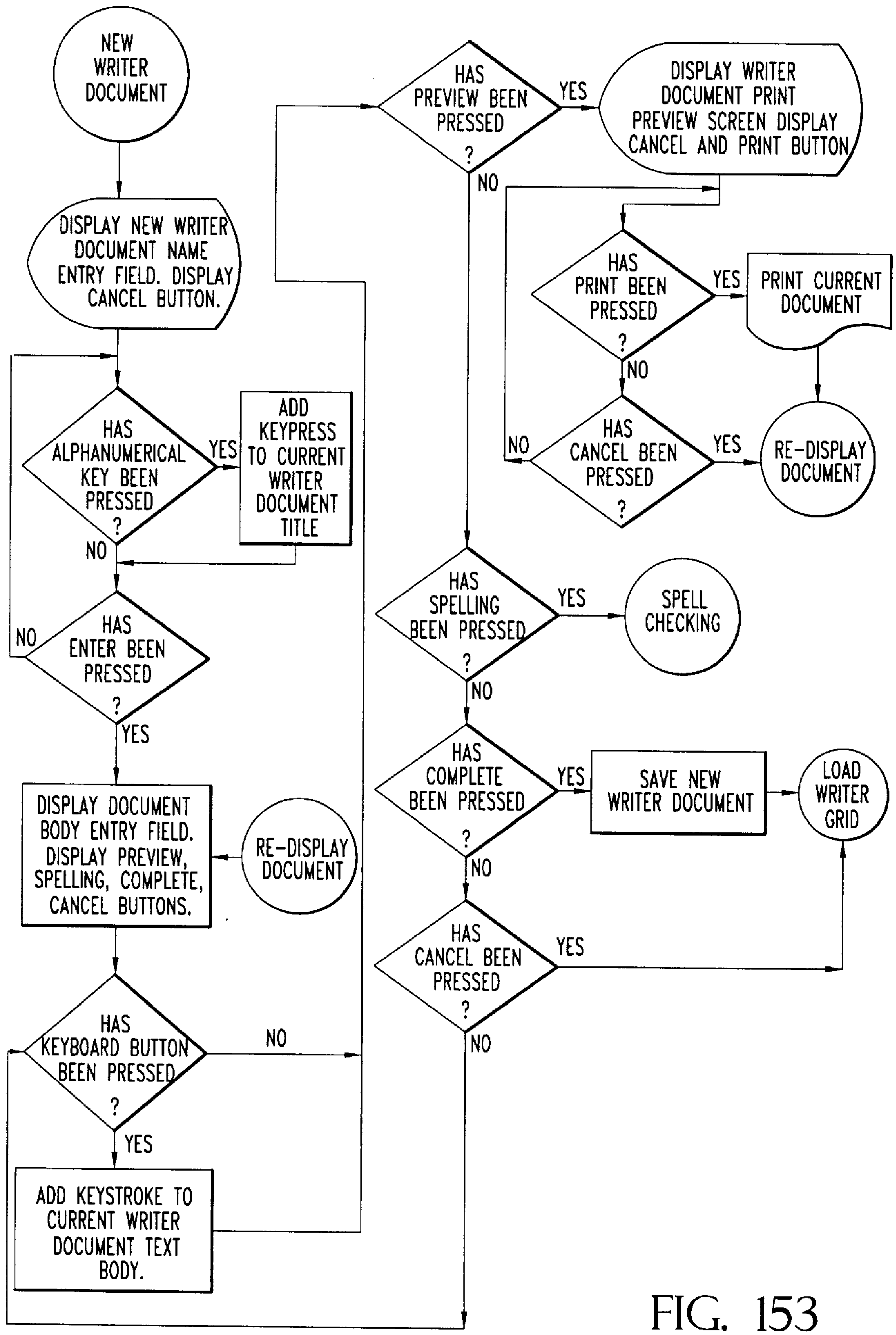
Figure 154:
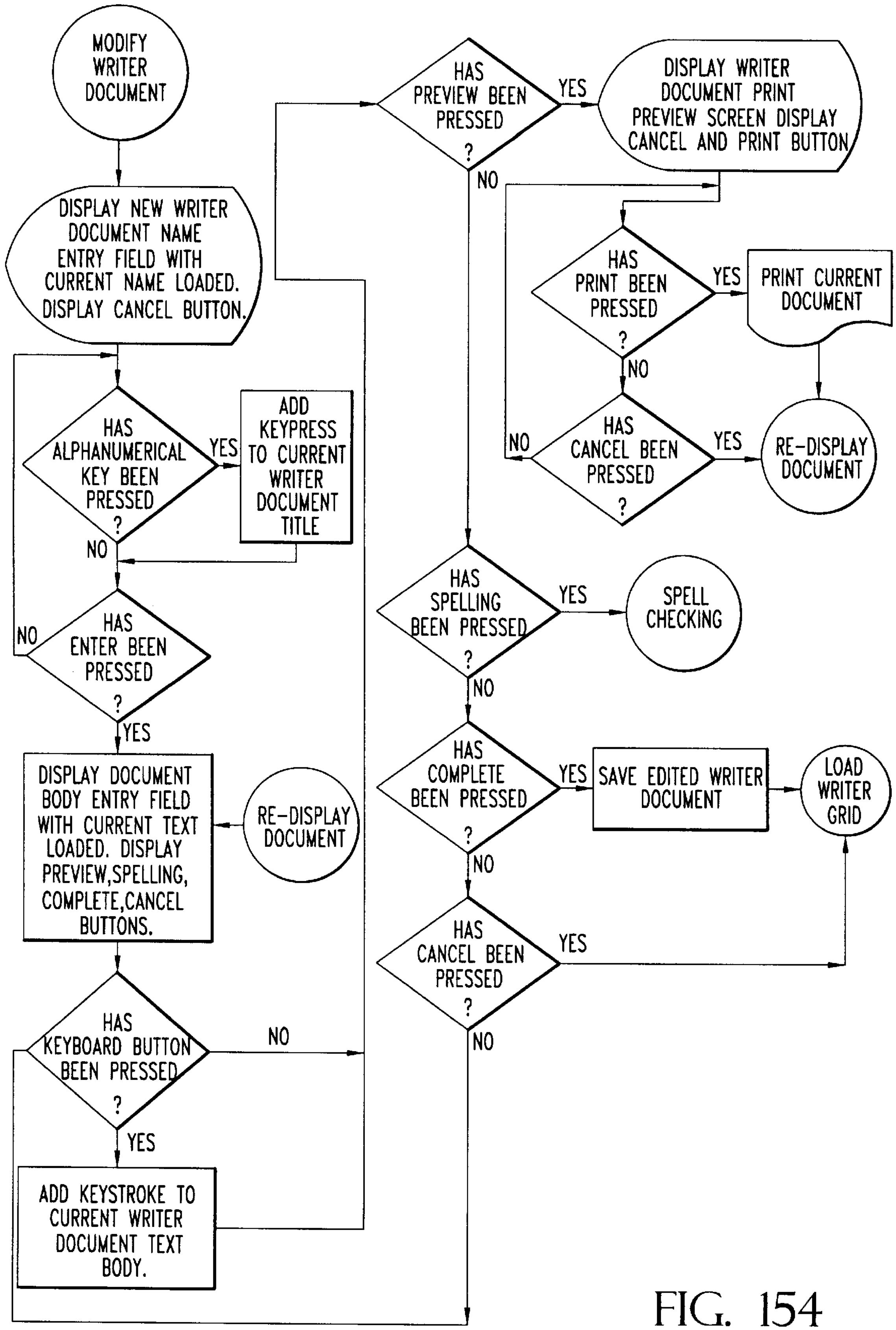
Figure 155:
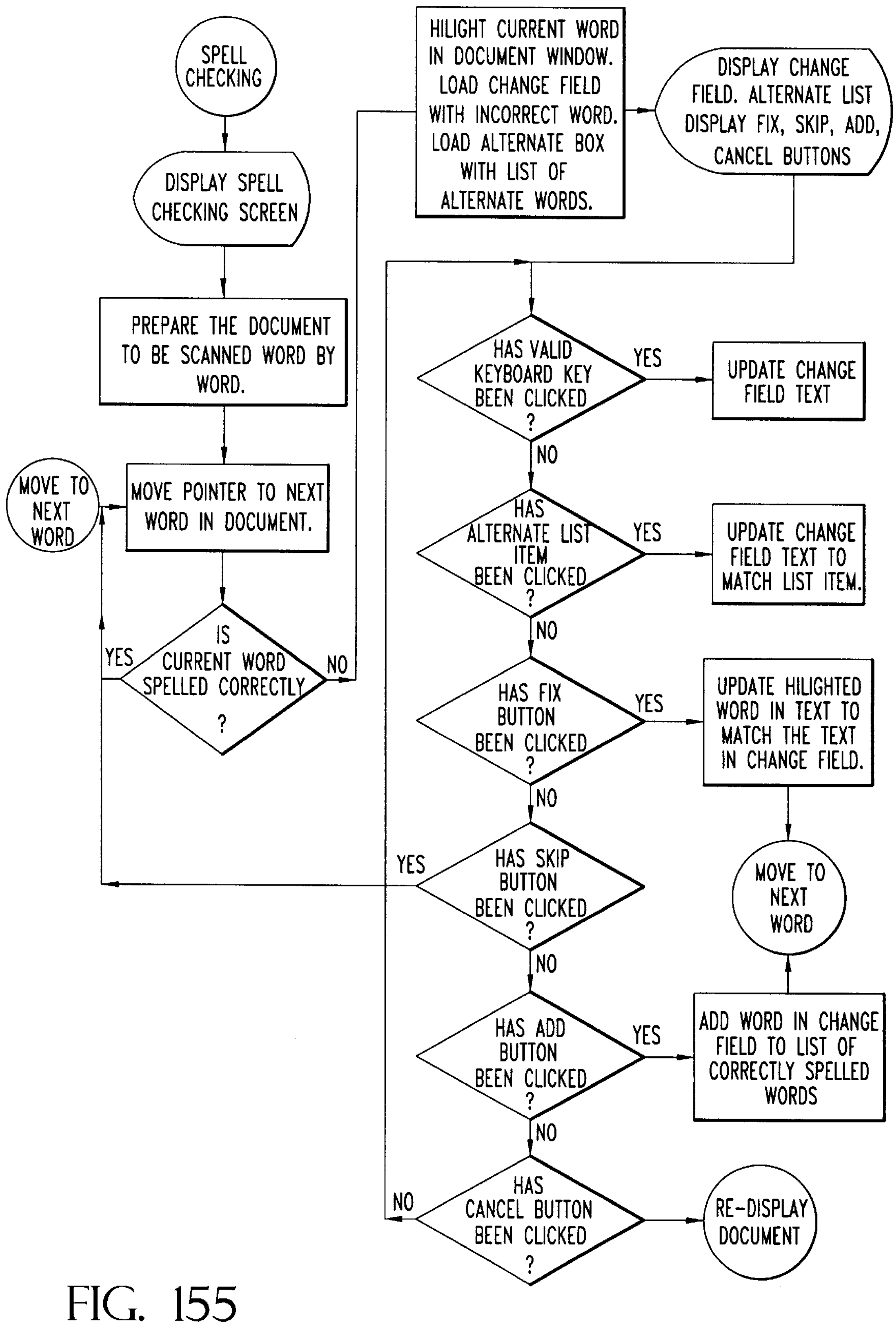
Figure 156:
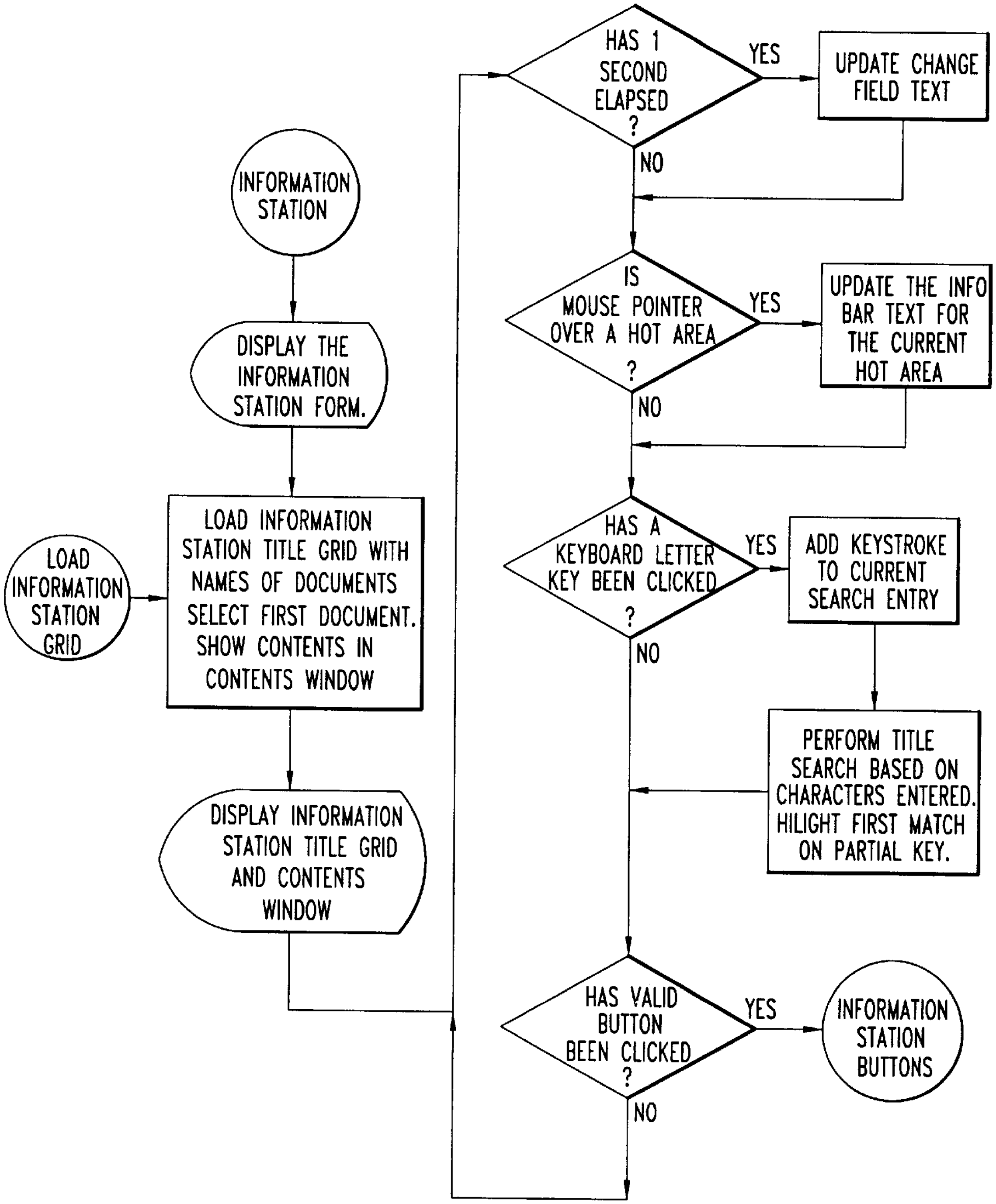
FIGS. 156–159 constitute the flow chart for the Information Station module.
Figure 157:
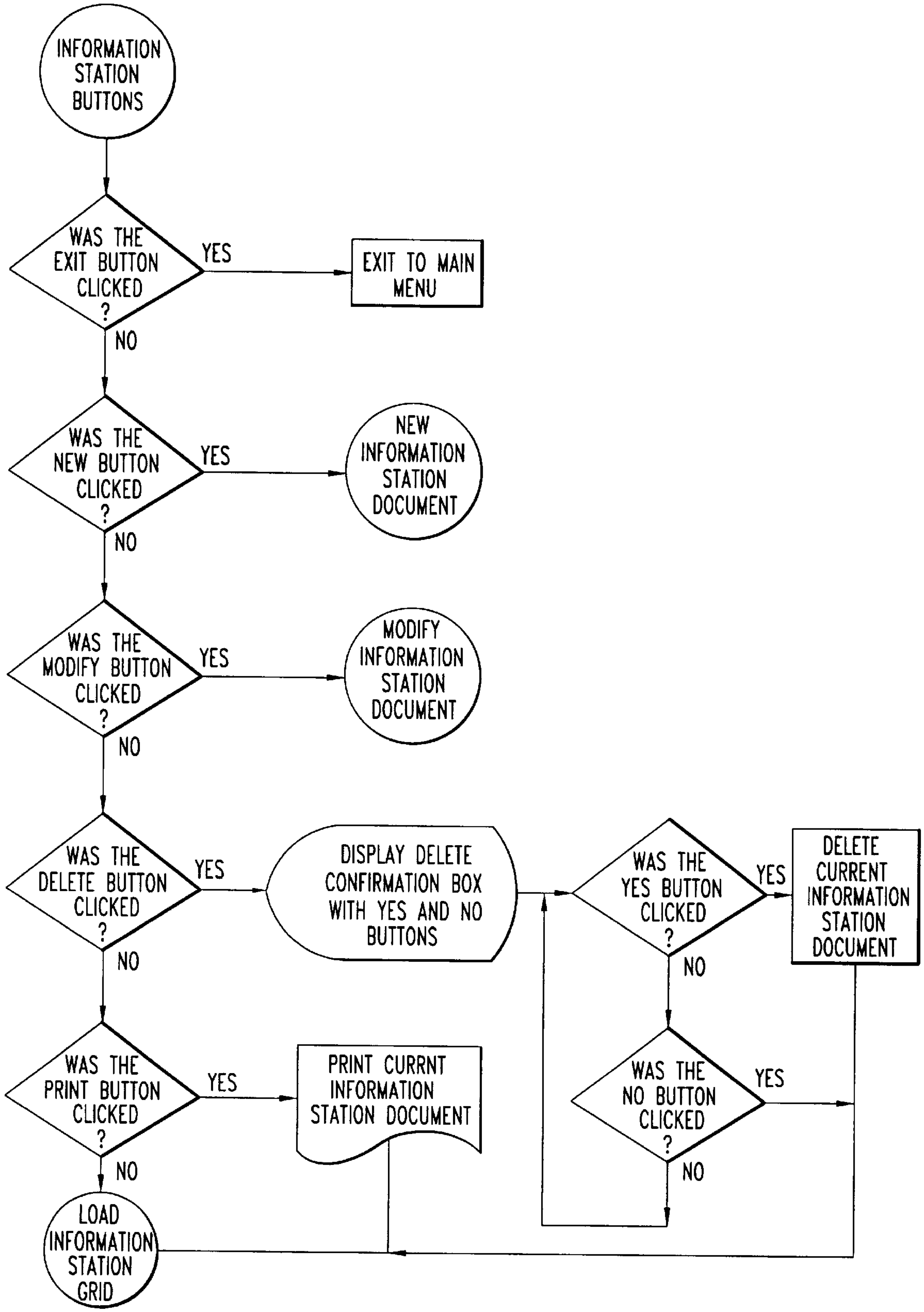
Figure 158:
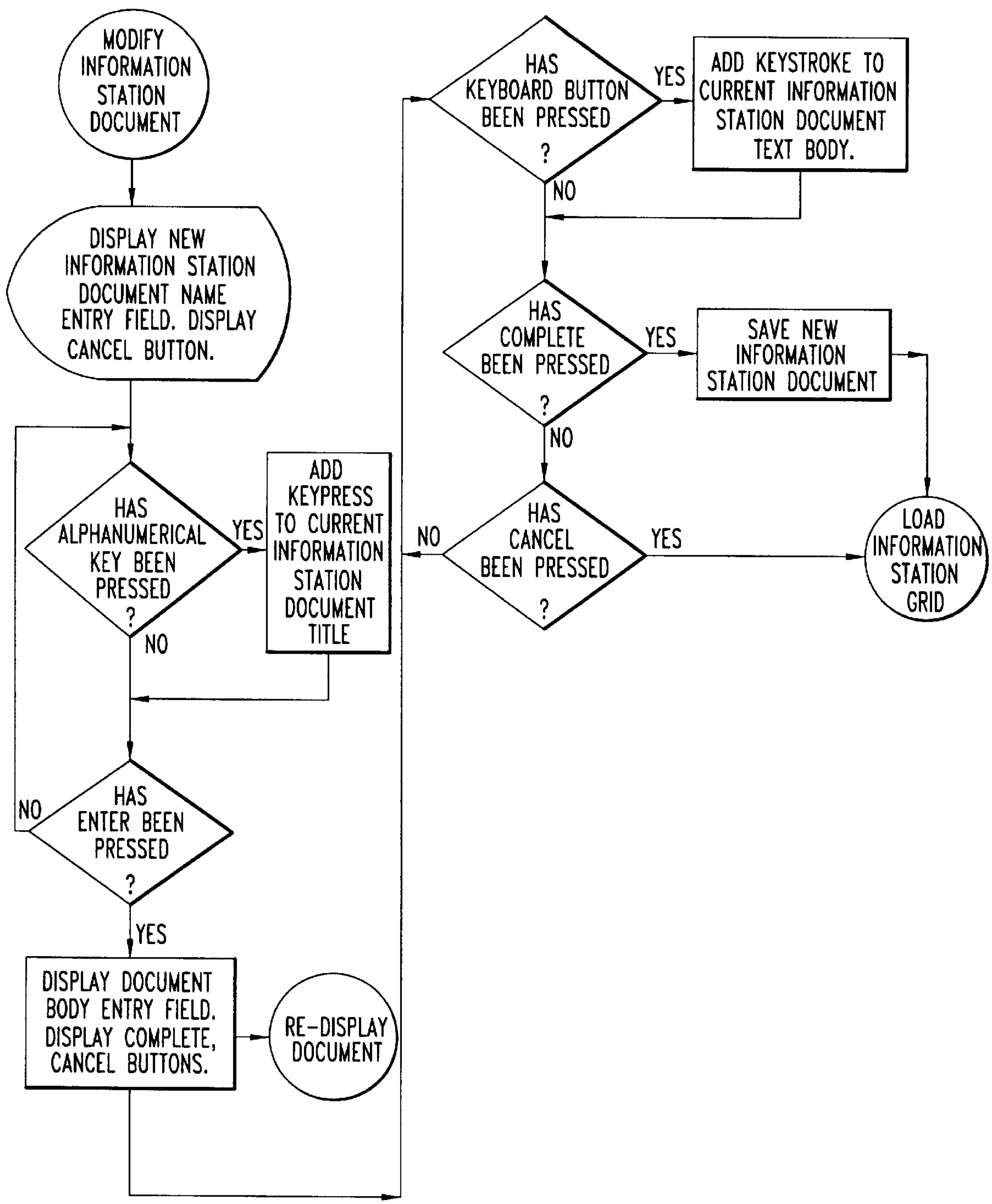
Figure 159:
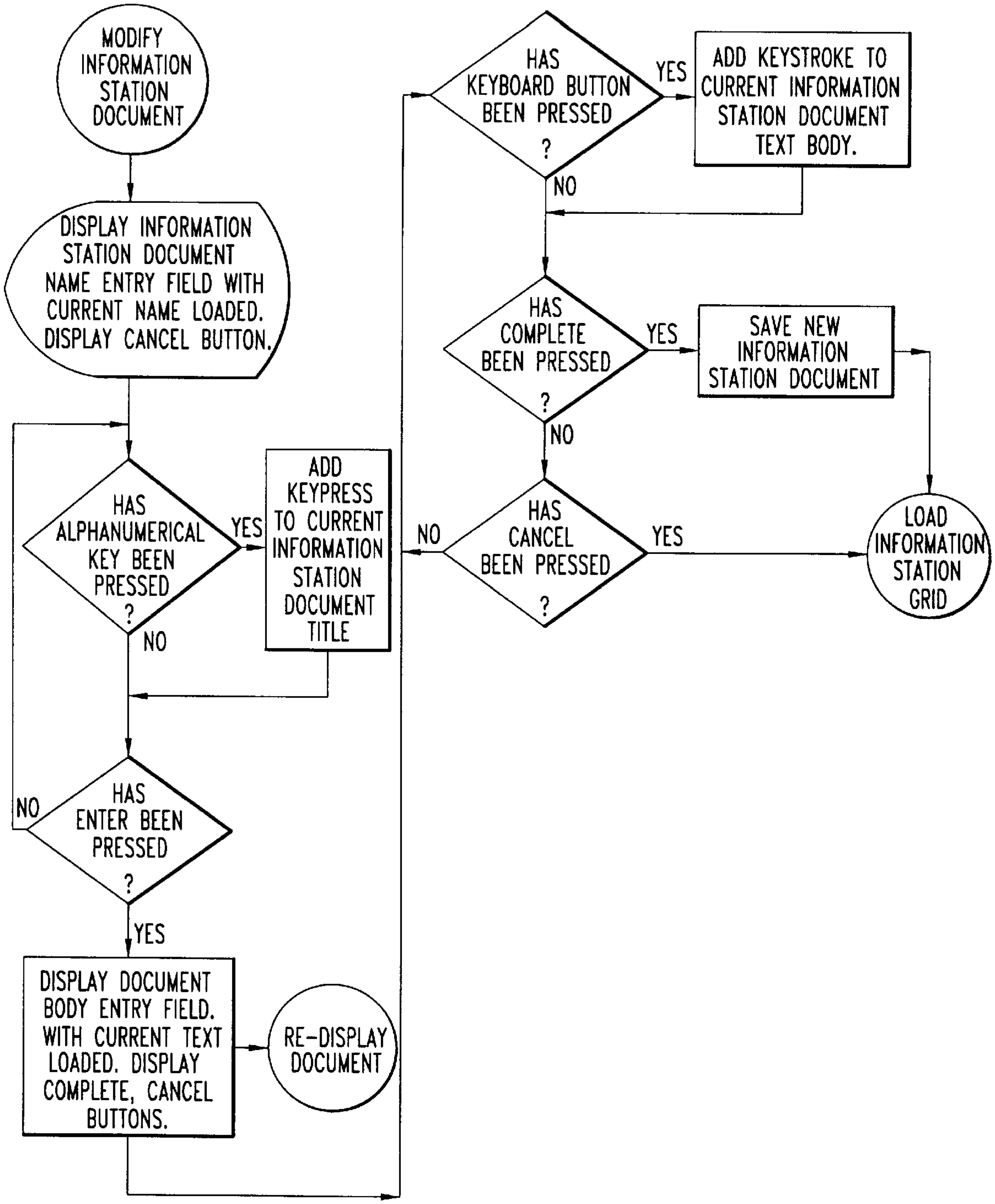
Figure 190A:
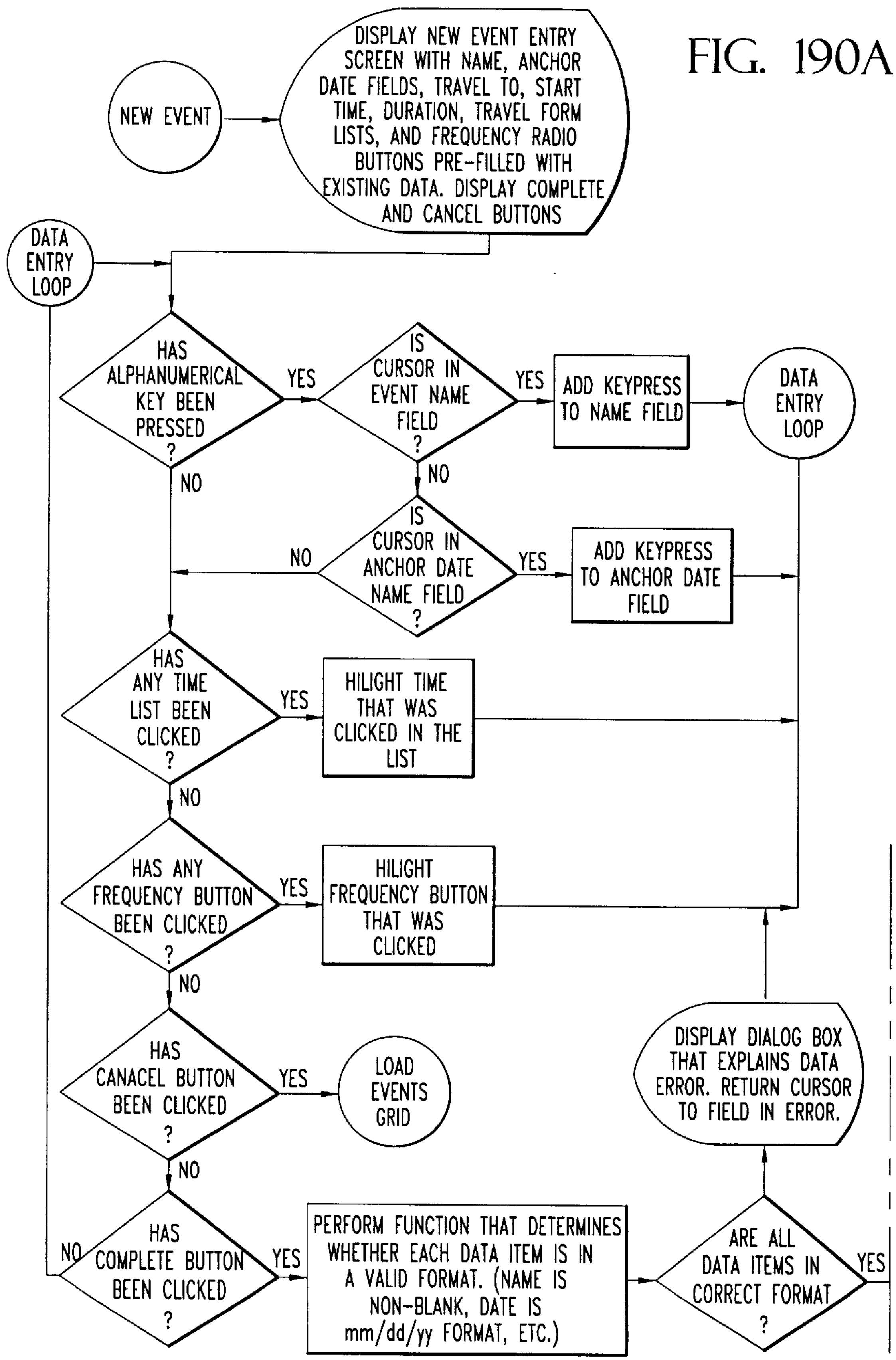
Figure 190B:
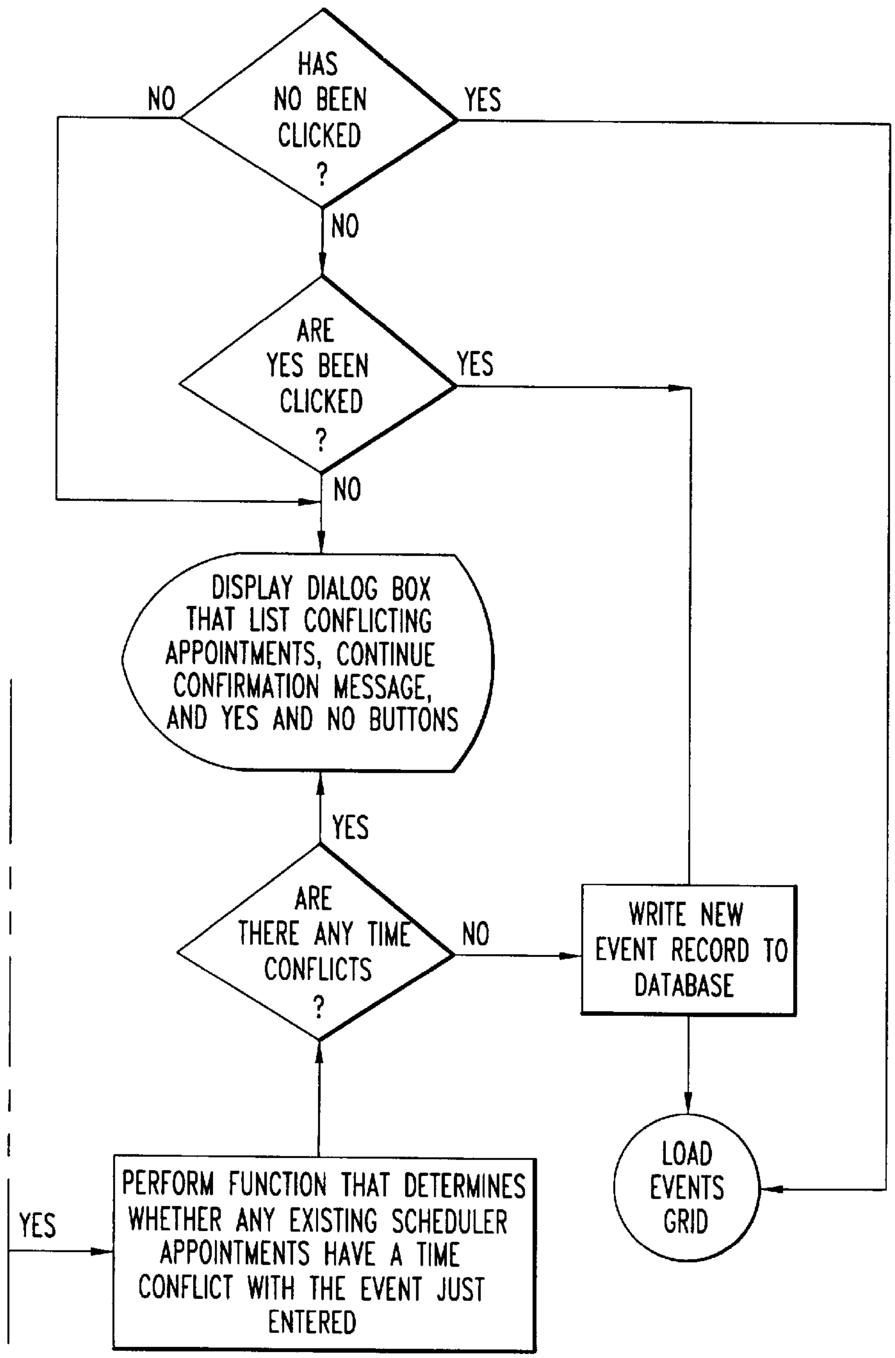

As with the Educational Organizer 20 of application Ser. No. 08/376,965, the Educational & Life Skills Organizer/Memory Aid 220 comprises software (FIGS. 74–190) that provides for controlling the monitor display (or screen) 12, thereby providing the disabled user with the effective yet easy-to-use visual cues and/or even audio cues. This software modifies the graphical user interface to permit the user to use only simple responses (e.g., a single click of the mouse 7) without confusing the user. Therefore, it within the broadest scope of the present invention to include all of the graphical user interface (GUI) modifications disclosed in application Ser. No. 08/376,965 (e.g., limited pointer 60 travel, screen 12 layout, color press buttons, the use of color in general, the prevention of opening a second window within an already-opened window, guidance icon 64, Information Help Text Box 68, etc.) which greatly assists the disabled user in using the Educational & Life Skills Organizer/Memory Aid 220. As such, the discussion of these GUI modifications are also not repeated here.

Figure 3:
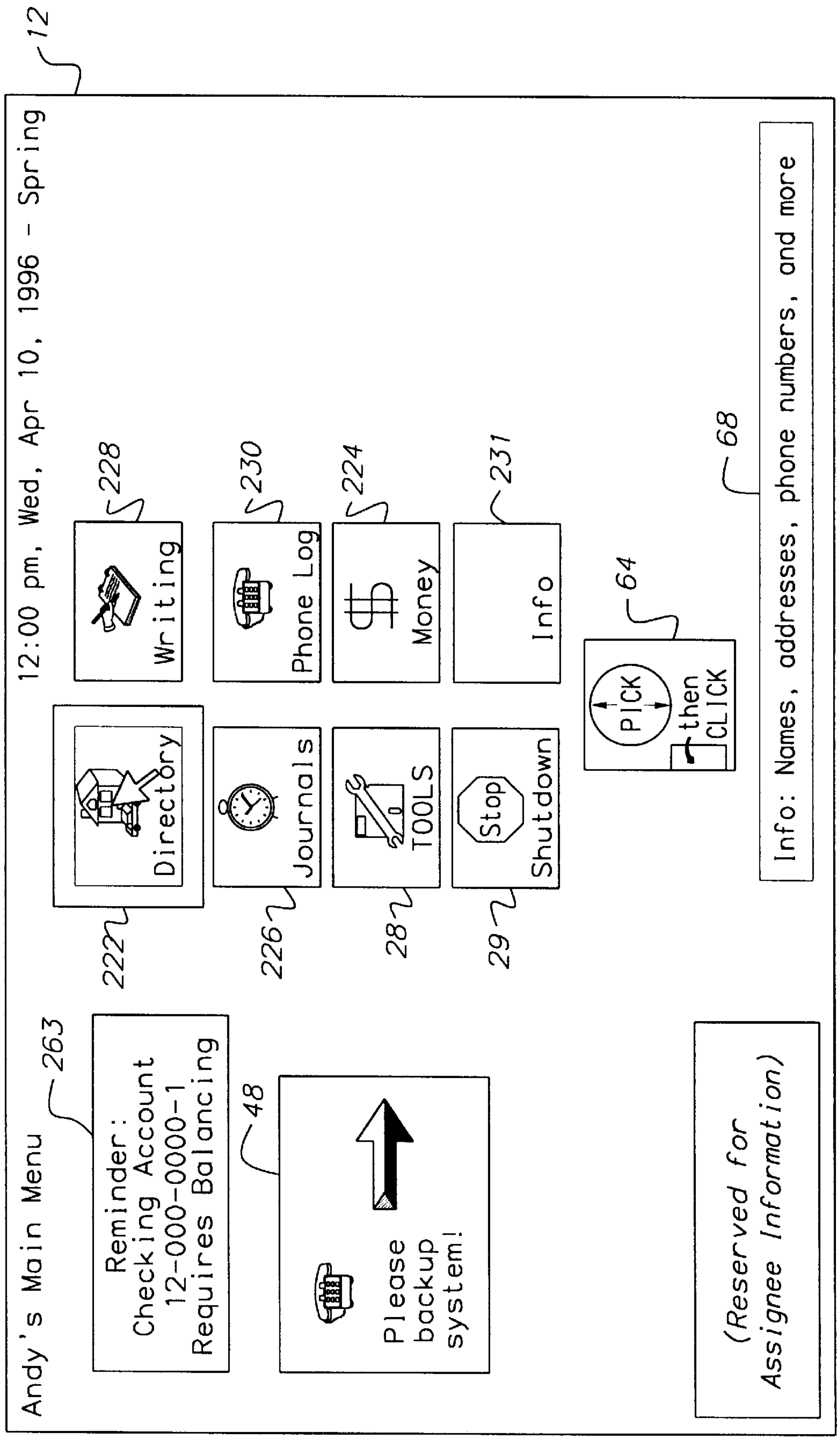
FIG. 3 is the Main Menu.

In particular, as shown in FIG. 3, the primary user has the choice of selecting options for School 24, Journals 26, Tools 28, Shut Down 29, Directory 222, Money Manager 224, Time (hereinafter known as the "Scheduler") 226, Writing 228 and Phone Log 230. Since the School option 24, Journals option 26, Tools option 28 and the Shut Down option 29 are the subject matter of application Ser. No. 08/376,965, their respective operations are not discussed herein. In addition, although the Tools option 28 is subject matter of application Ser. No. 08/376,965, the Tools option 28 of the present invention now includes a Time/Date subfunction 234 and a Repair subfunction 236 (FIG. 1A), to be discussed later.

The Directory Module 222, Money Module 224, Scheduler Module 226, Writing Module 228 and Phone Log Module 230 can be installed/uninstalled through the Maintenance Menu 232 (FIGS. 2A–2B), as described in application Ser. No. 08/376,965. The option settings that are available in the Directory Module 222, Money Module 224, Scheduler Module 226, Writing Module 228 and the Phone Log Module 230 are configured in the Maintenance Menu 232.

Figure 4:
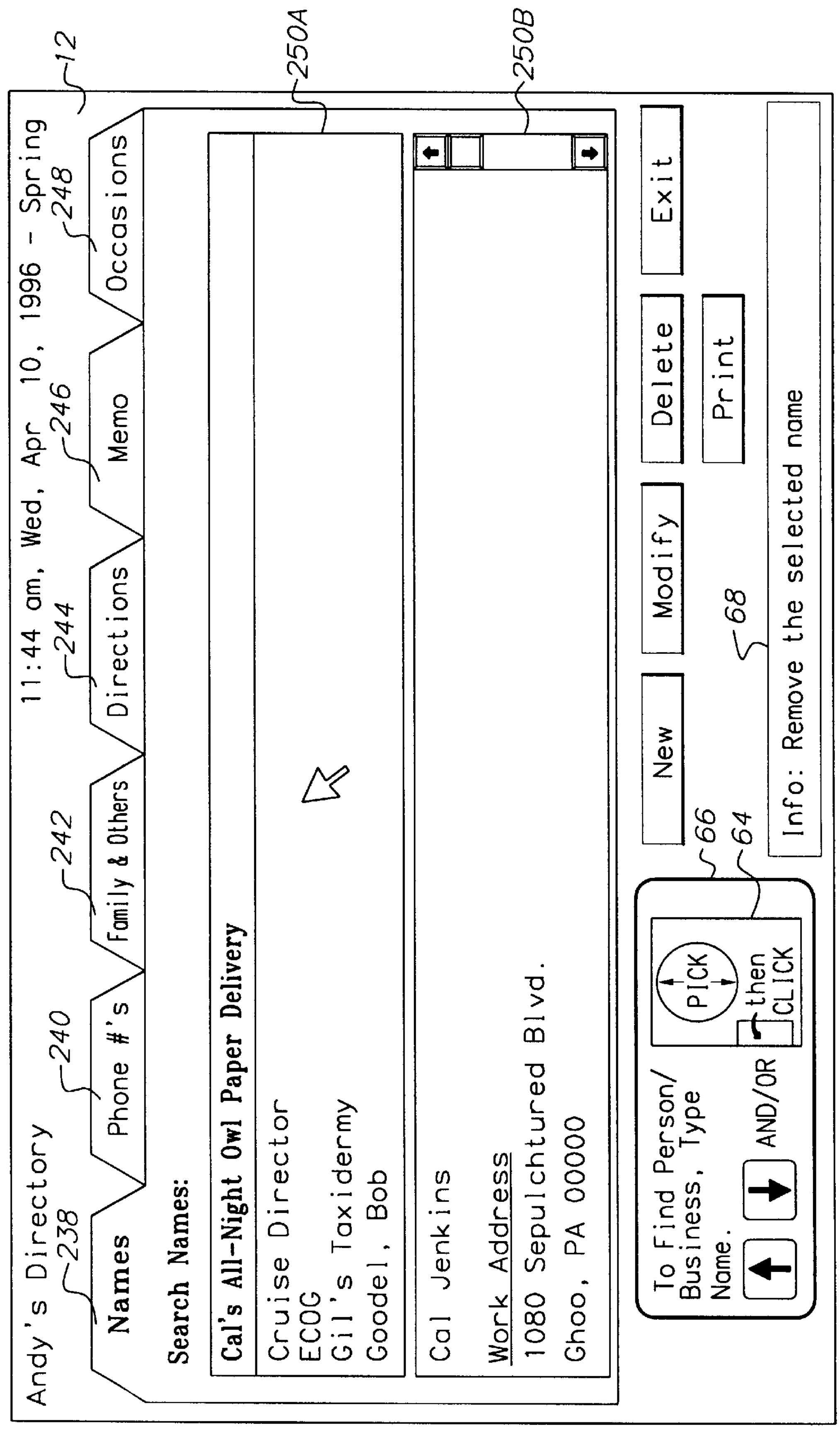
FIG. 4 is the Directory module.

Each of these modules comprises at least one function that is depicted in the screen display 12 to the user as a "file folder." Therefore, any subsequent reference to the phrase "file folder" or "folder" corresponds to the indicated function. Each function comprises at least one subfunction that is depicted to the user as a labeled colored button in the lower right of the screen display 12. The user can move directly to any one of the file folders when the tabs of those file folders are visible, as shown in FIG. 4. All subsequent references to the monitor display (or screen) 12 heretofore implies the usual display of the Educational Organizer 20 of application Ser. No. 08/376,965, e.g., the user's name and the name of the currently-selected module in the upper left, time/date information in the upper right, a guidance icon 64, instruction box 66 and information help text box 68 at the bottom of the screen, and subfunction selection buttons (of different colors) at the bottom, in addition to the new subject matter of the present application.

It should also be noted that many of the figures in the present application depict the display screen(s) 12 that appear when a certain function or subfunction is operative; these display screen(s) 12 are exemplary only and, therefore, the content of the display screens 12 depicted in the accompanying figures may vary from function to function or from subfunction to subfunction. As such, the time/date information in the upper right of every screen display 12 should be considered.

As shown in FIG. 4, the Directory Module 222 (FIGS. 74–100) is a stand-alone module comprising a Name function 238, Phone Number function 240, Family & Others function 242, Directions function 244, a Memo function 246 and an Occasions function 248. These functions permit the storage of particular information regarding persons' name/address (Name function 238), phone numbers (Phone Number function 240), relationship (Family & Others function 242), home/business directions (Directions 244), general information (Memo function 246) and special occasions (Occasions function 248). The Directory Module 222 also serves as a data base for a Phone Log Module 230, the Money Manager Module 224 and the Scheduler Module 226.

Upon entry into the Directory Module 222 (FIG. 4), the default display is the "Names" folder, which is split into an upper portion 250A and a lower portion 250B, with the tabs of the other file folders visible. In the upper portion 250A is a list of names and/or identifying information. Insofar as the impaired user has difficulty recalling names, the identifier in the list in the upper portion 250A can be a nick name (e.g., Slim), profession (e.g., My lawyer), or any personally meaningful descriptor (e.g., that dope who makes me laugh when I go to the dentist). In the lower portion 250B is the person's given name (e.g., Cal Jenkins) and, under the designator of Home Address or Work Address, the appropriate address. The functionality available from this screen 12, as displayed in the subfunctions at the bottom, is the ability to create new entries into the directory, to modify or delete existing entries, to print the information about the selected individual, and Exit to the Main Menu (FIG. 3).

Figure 5:
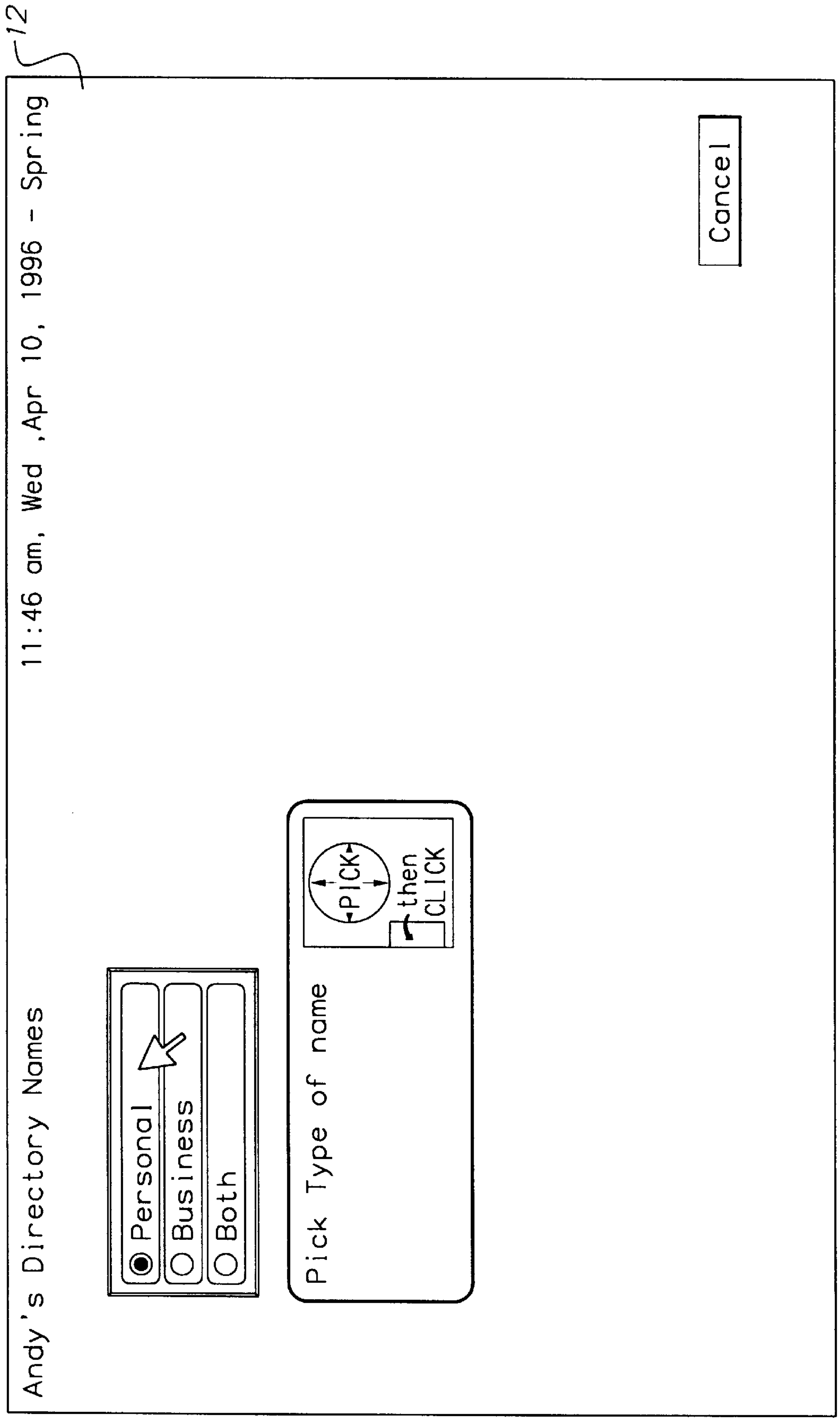
FIGS. 5–15 shown the New subfunction of the Names function.
Figure 6:
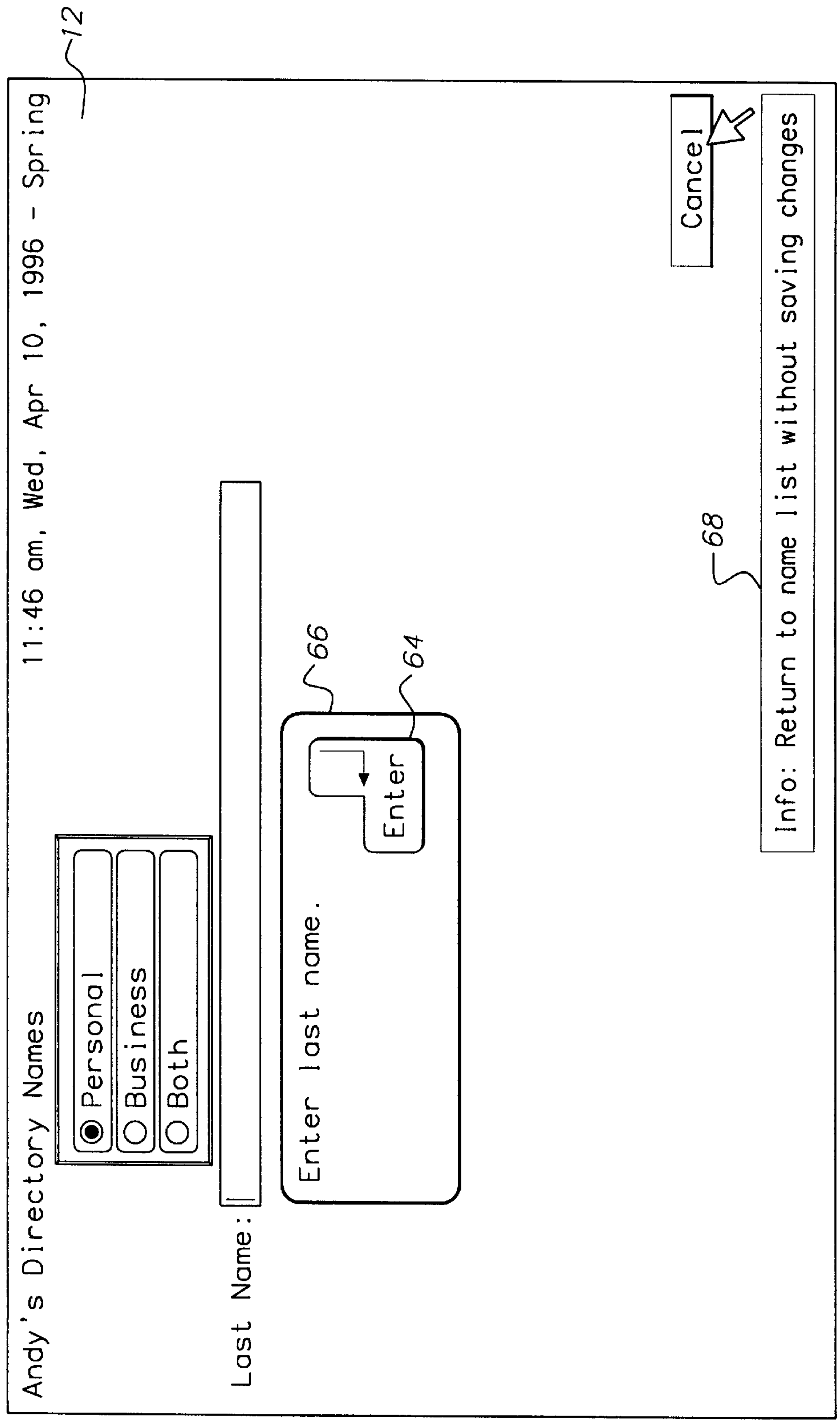
Figure 7:
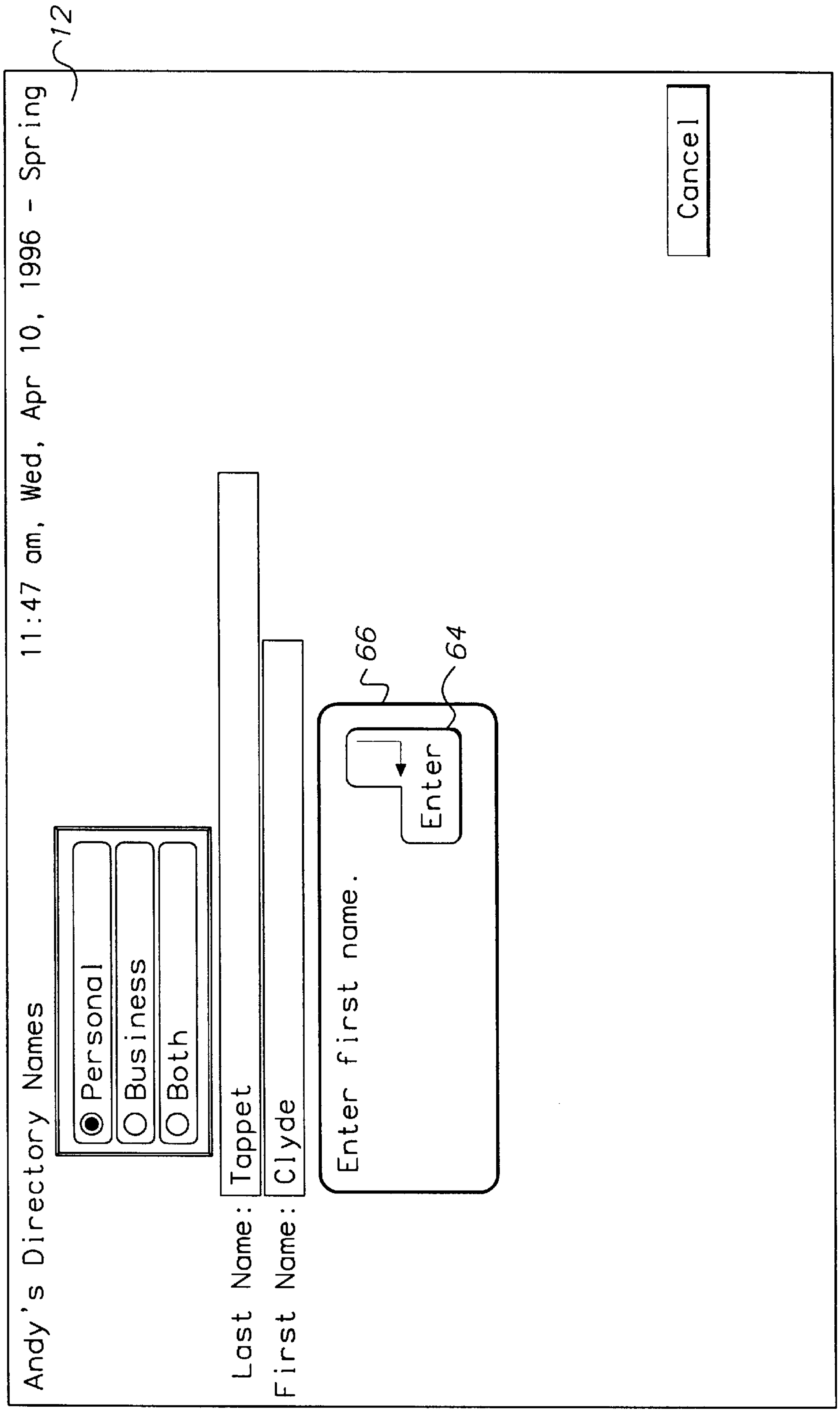
Figure 8:
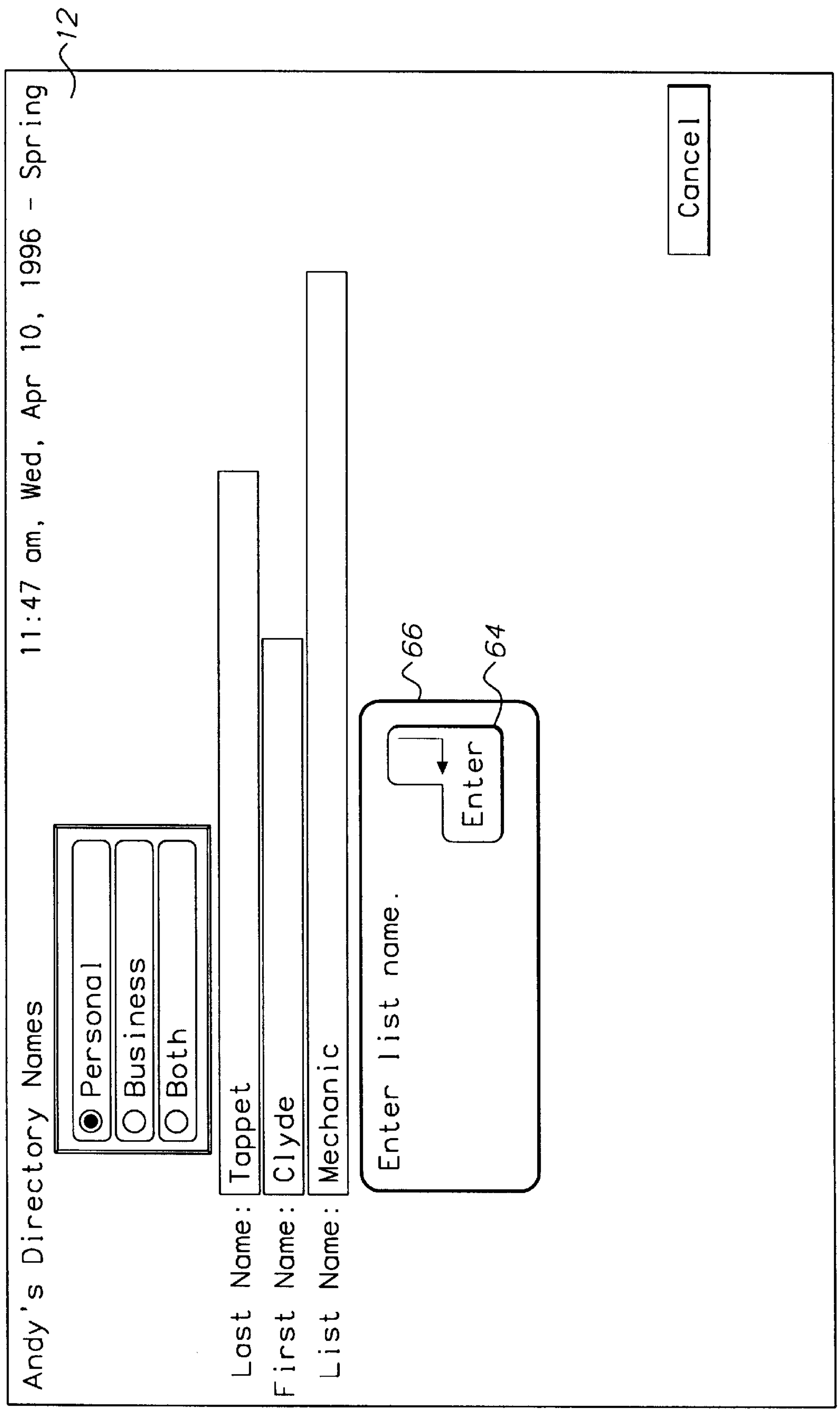
Figure 9:
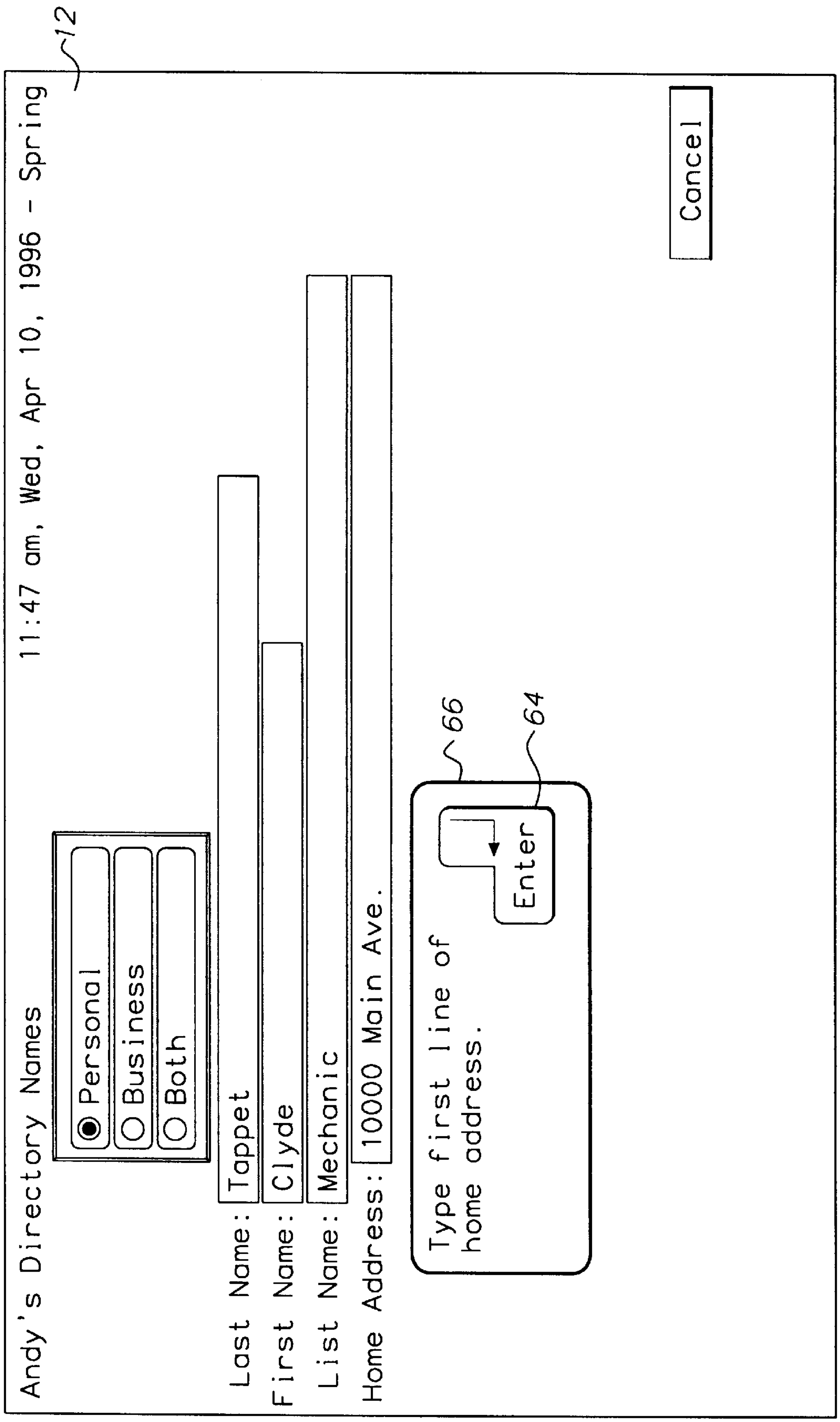
Figure 10:
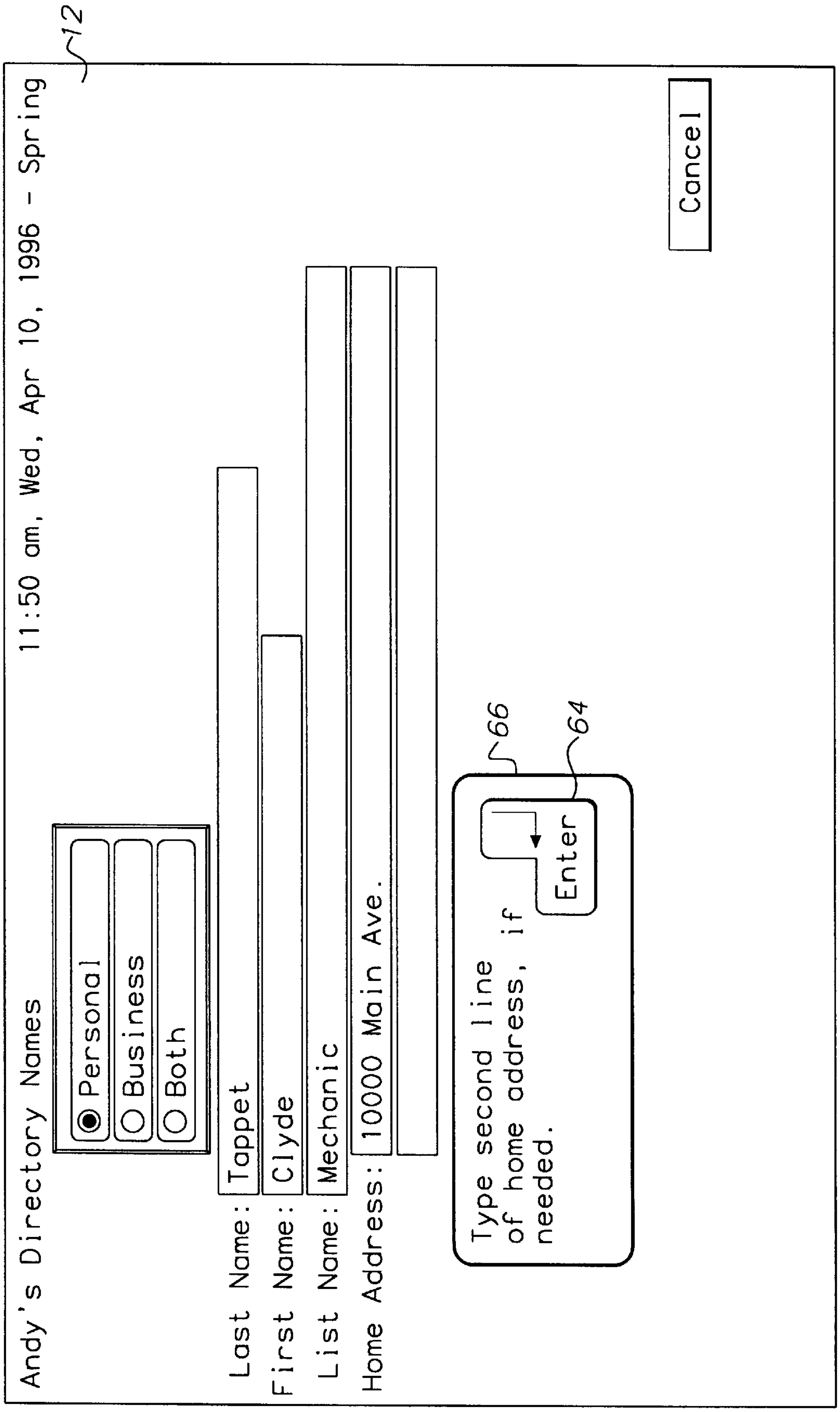
Figure 11:
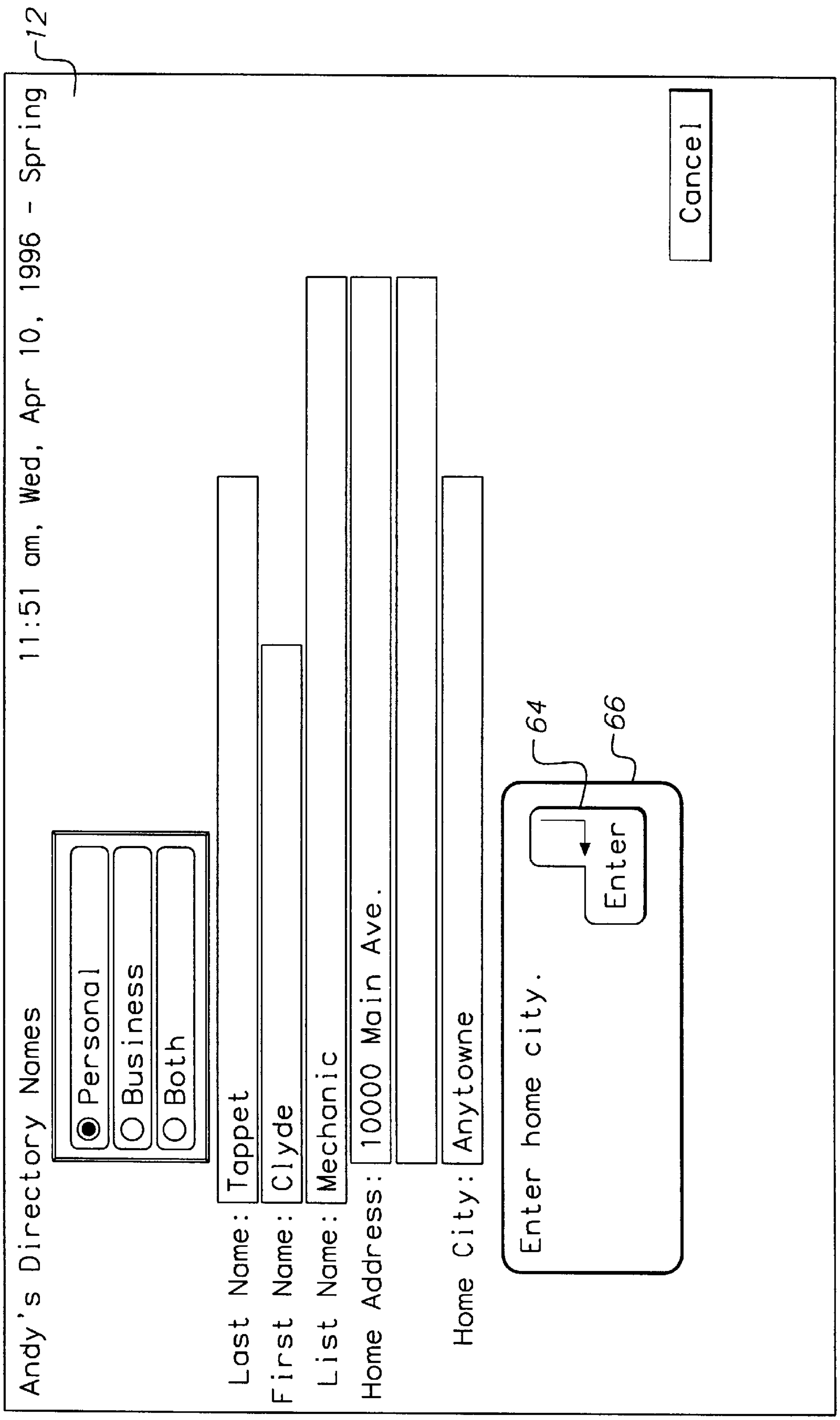
Figure 12:
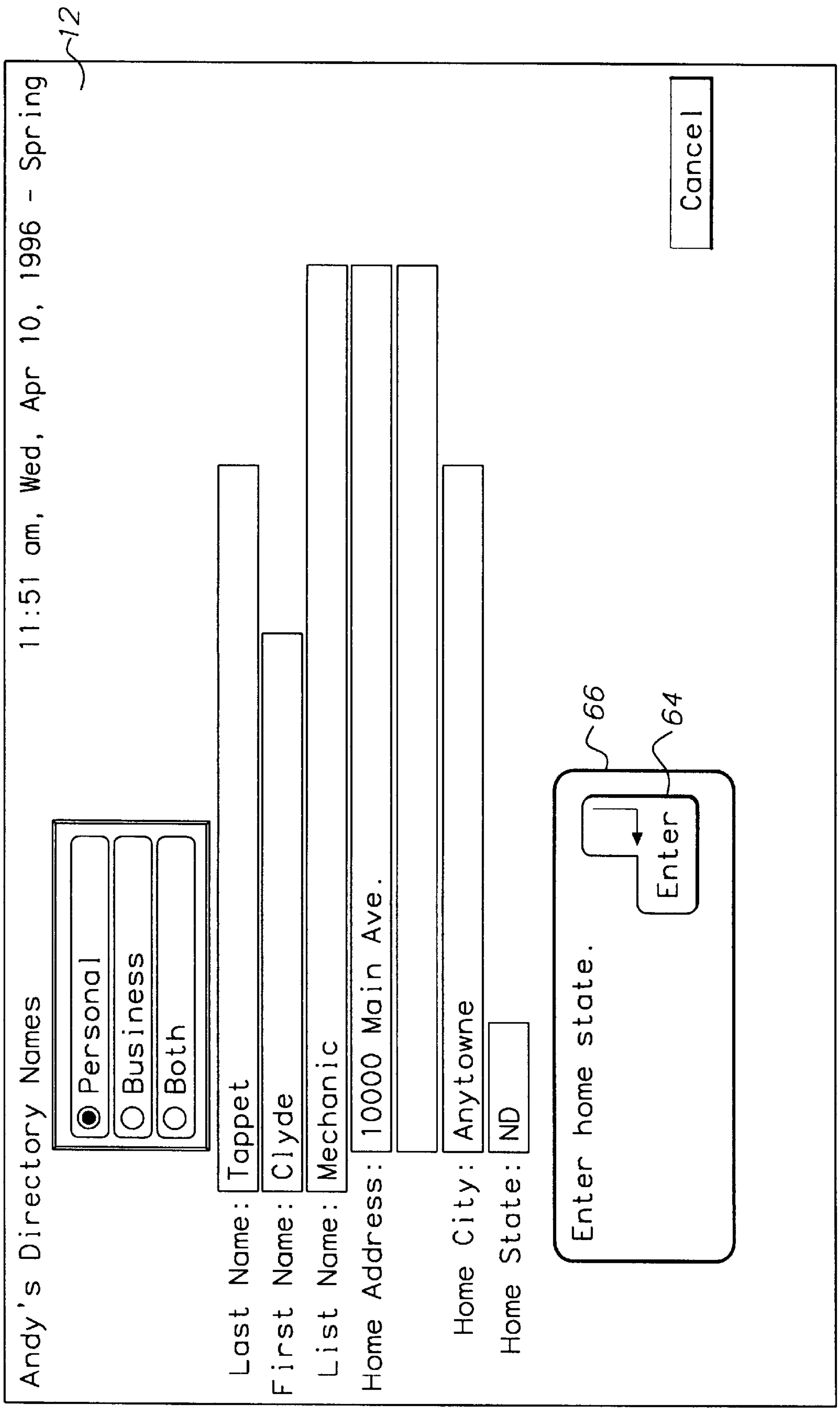
Figure 13:
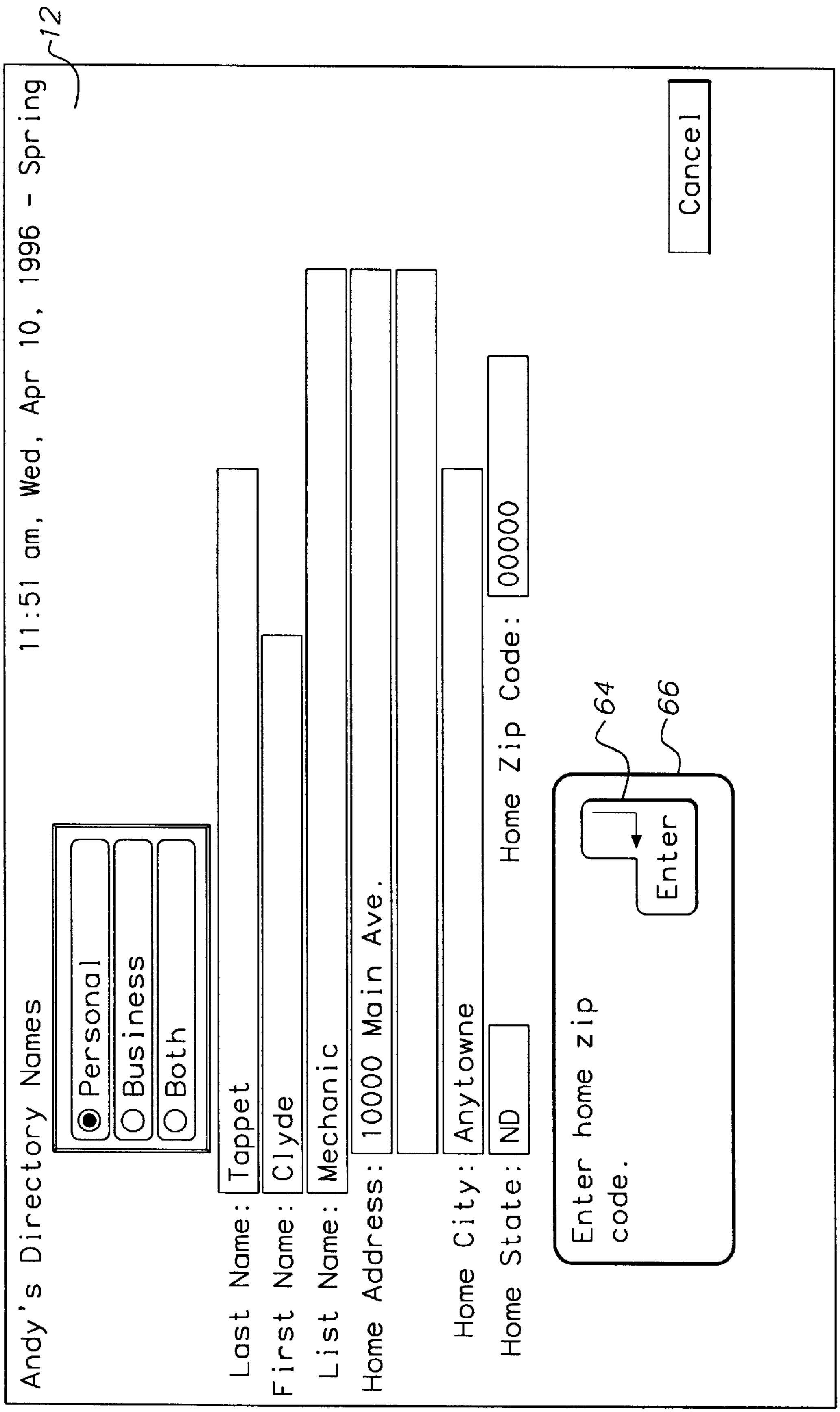
Figure 14:
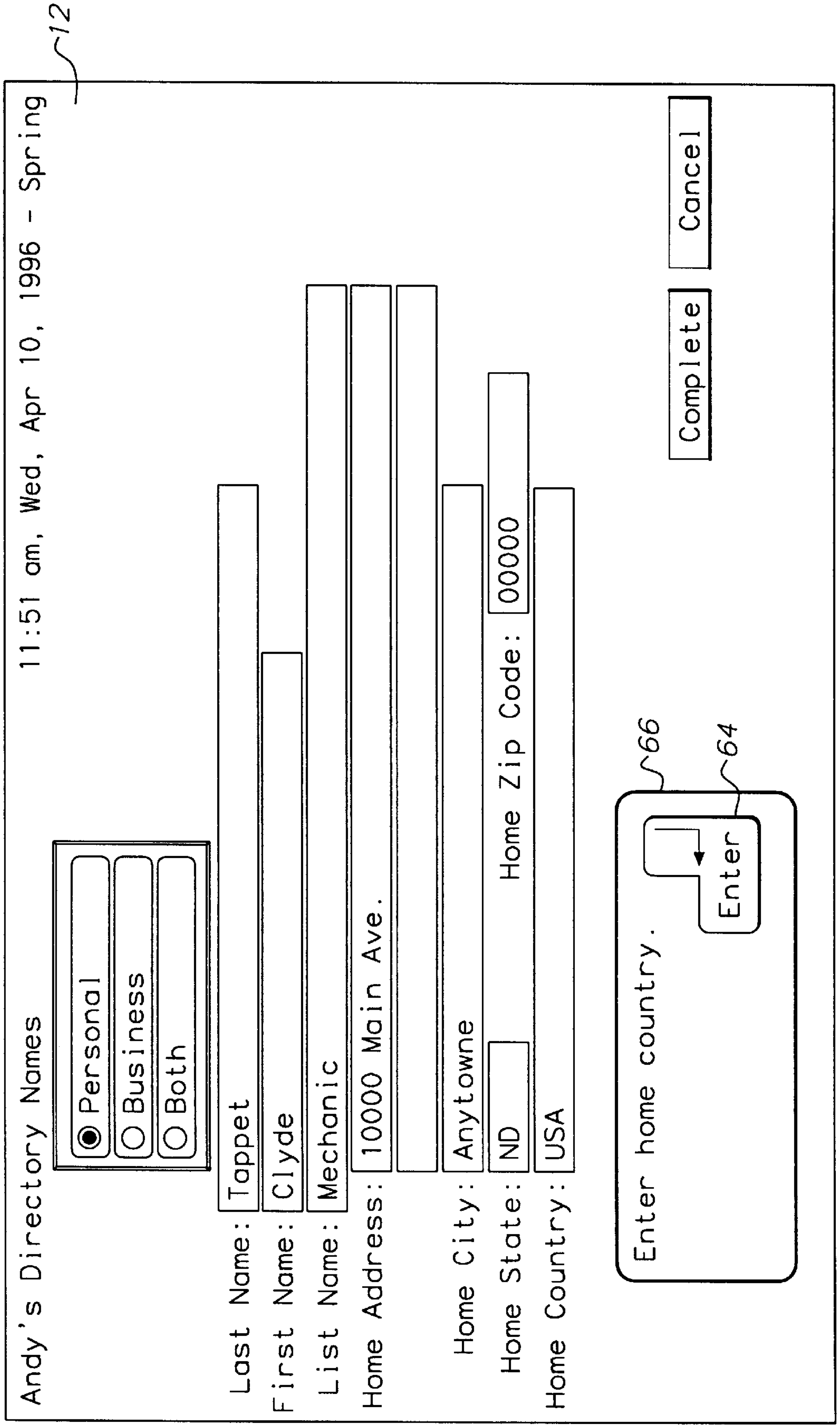
Figure 15:
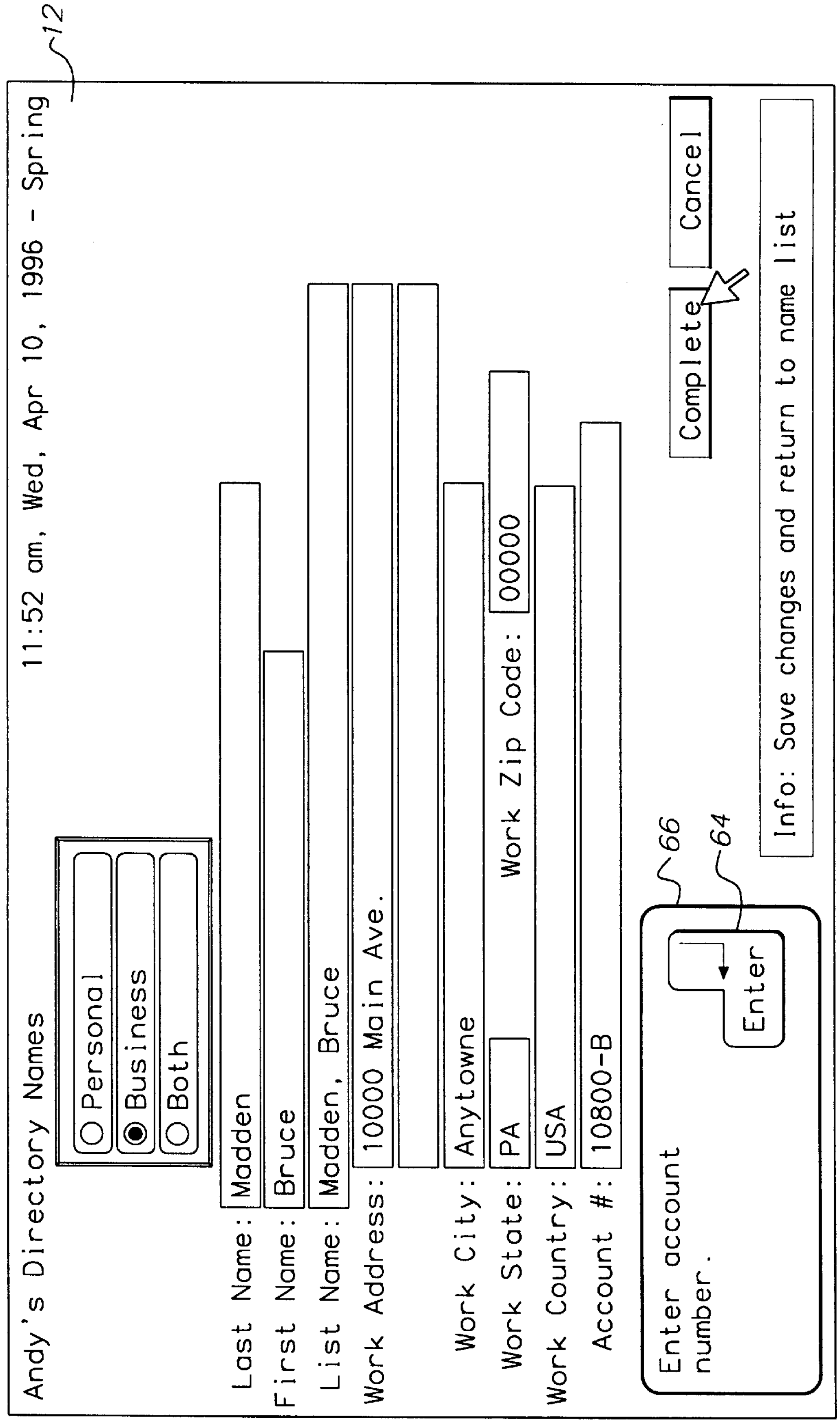

To create a new entry in the Directory, the user clicks on "New" subfunction button (FIG. 4) which brings the user to the screen 12 shown in FIG. 5. The user selects "Personal" "Business" or "Both" from a box with radio bullets, as instructed by the instruction box 66 to "Pick type of name", and then is stepped through the data entry process. As shown in FIG. 6, first, the user is prompted with "Enter last name" (e.g., Tappet) in a "Last Name" field with the "Enter" key icon 64/instruction box 66; if the user does not enter any text in the "Last Name" field, the user cannot progress to the next step. Next, as shown in FIG. 7, the user is prompted with "Enter first name" (e.g., Clyde) into a "First Name" field with the same structure. Then, as shown in FIG. 8, "Enter list name" for the nickname or other designation (e.g., mechanic); in this "List Name" field, the real name is displayed with a distinctive color background block (e.g., sky blue) so that if the user wishes, he/she can press the "Enter" key and use the real name on the list. With the first keystroke, however, the entire block disappears as the user types in the presumably more personally meaningful designator. Again, the ENTER key icon 64 guides the user to the next step of entering a home address into a "Home Address" field (or for further user clarity, that field may be labeled "Home Street" with directions of "Type first line of home address" and the "Enter" icon 64 (FIG. 9). As shown in FIG. 10, a second address line appears in the "Home Address" field, allowing for lengthier street addresses or suite/apartment numbers and accompanied with the "Enter" key in the guidance icon 64. Then the ensuing steps are to "Enter home city" into a "Home City" field (FIG. 11), "Enter home state" in a "Home State" field (FIG. 12, and in which the letters are automatically capitalized), "Enter home zip code" in a Home Zip Code field (FIG. 13), "Enter home country" in a "Home Country" field (FIG. 14, and which the home country of the user, as preset by the secondary user into the Maintenance Menu 232, is entered automatically as the default and which can be changed by the user entering a different country; there is no need for the user to erase the default entry). Furthermore, the secondary user can also associate a bank account with a particular person in the Directory; using the Maintenance Menu 232, the secondary user presets the bank account number so that the account number is automatically displayed in the "Account #" field as shown in FIG. 15. At this point the user can either press the "Enter" key or point/click on the "Complete" subfunction button at the bottom of the screen 12.

Once the user has entered data in the last data field (and has, therefore, completed data entry) in the "New" subfunction, the user selects the "Complete" subfunction button, (or in the alternative, hits the "Enter" key). This saves all of the entered data and returns the user to the Names folder 238 (FIG. 4). At any time during data entry, the user can return to the Names folder 238 (FIG. 4) by selecting the "Cancel" subfunction button and at the same time eliminate all the previous data entries made up to that point in time. However, it should be noted that the "Complete" subfunction button (FIG. 15) appears in the screen 12 only after the user has entered data in all of the data fields. After selecting the "Complete" subfunction button, the entry is then displayed in alphabetical order, according to the List Name (which may be different than the given name) in the Names folder 238 (FIG. 4). All entered data are preserved unaltered, except for the specific change and saving data is always automatic, as throughout the system 220.

Alternatively, if the user wishes to make a change in a completed entry (FIG. 4) he/she can select the desired entry from the list in the upper portion 250A (at which time it is highlighted as shown in FIG. 4), point/click on the "Modify" subfunction button at the bottom of the screen 12, and be presented with the entire listing (i.e., all of the previously entered data) for change. The user then follows the "Enter" guidance icon 64/instruction box 66 directions to complete a guided sequence similar to the one just described with regard to the "New" subfunction.

Figure 16:
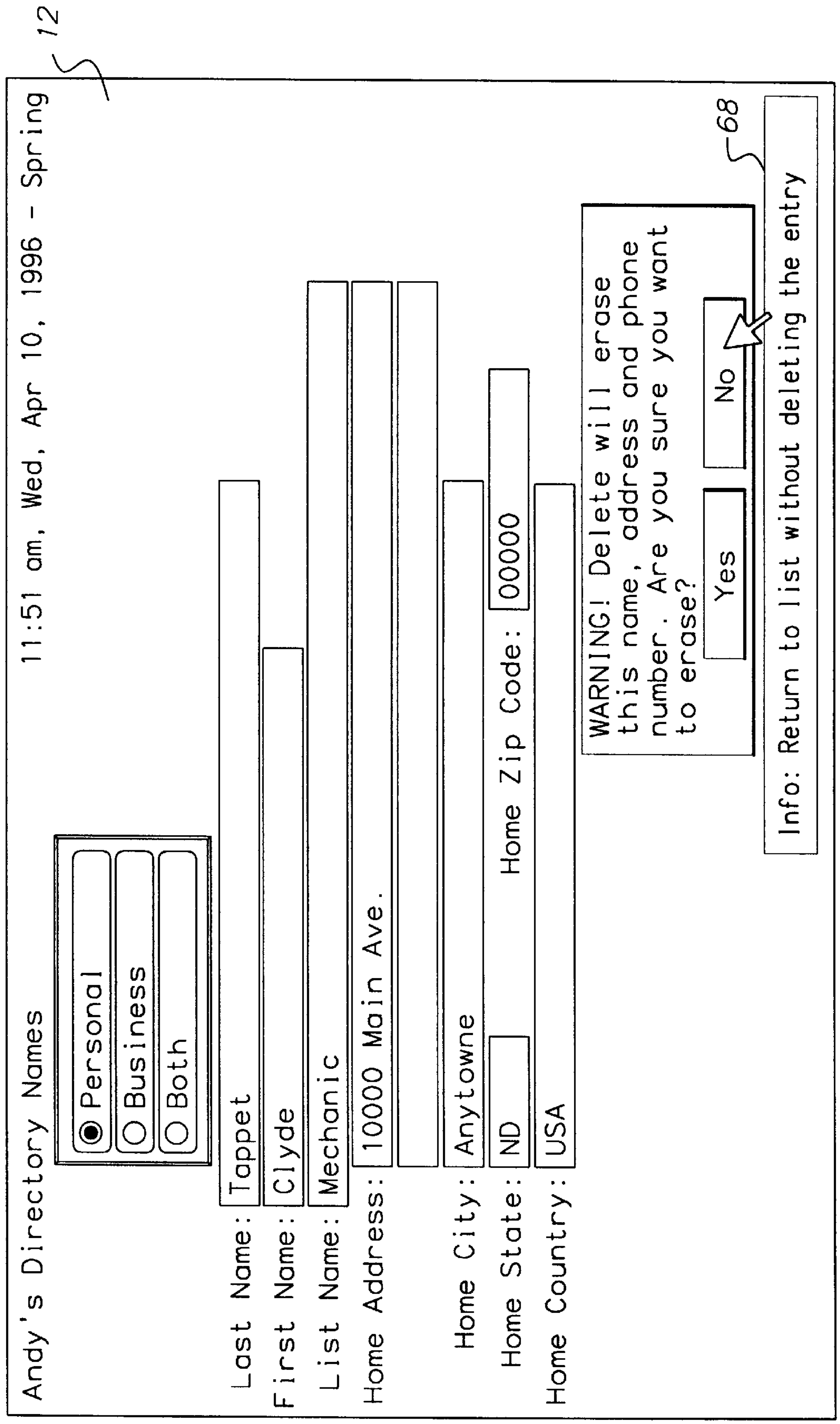
FIG. 16 is the Delete subfunction.

To remove an entry from the list as shown in FIG. 4, the user selects the entry from the list and then points/clicks on the "Delete" subfunction button. A full display of the directory entry (FIG. 16) is shown, with a red box at the bottom including a warning that Delete will erase everything and a question whether the user wants to erase. A "Yes" and "No" button appear inside the red box and the user is prevented from exiting that red box until one of the two buttons is selected. By default the pointer 60 is on the "No" button and must be intentionally shifted to the "Yes" button to complete deletion. If the "No" button is selected, the user is returned to the original screen 12 (FIG. 4) with the particular entry intact. If the "Yes" button is selected, the user is returned to the original screen 12 screen (FIG. 4) with the particular entry deleted from the list of names in the upper portion 250A.

It should be noted that everywhere throughout the Educational & Life Skills Organizer/Memory Aid 220, selection of the Delete subfunction button results in the red box display with a warning and the verification requirement of selecting a "Yes" or "No" button before any further action can be taken.

The "Print" subfunction button provides a printout of the selected name and address.

Figure 17:
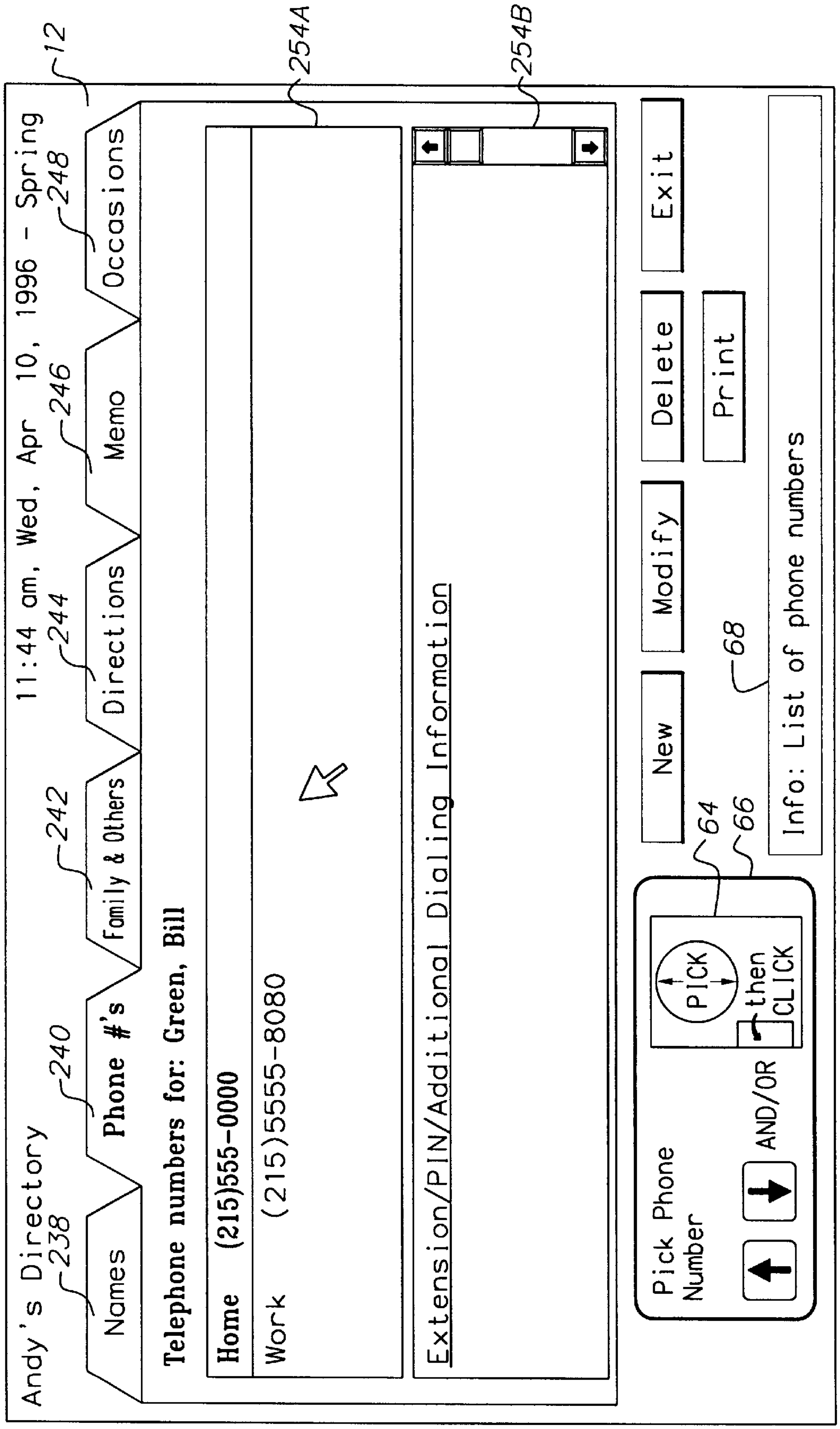
FIGS. 17–18 is the Phone #'s function.
Figure 18:
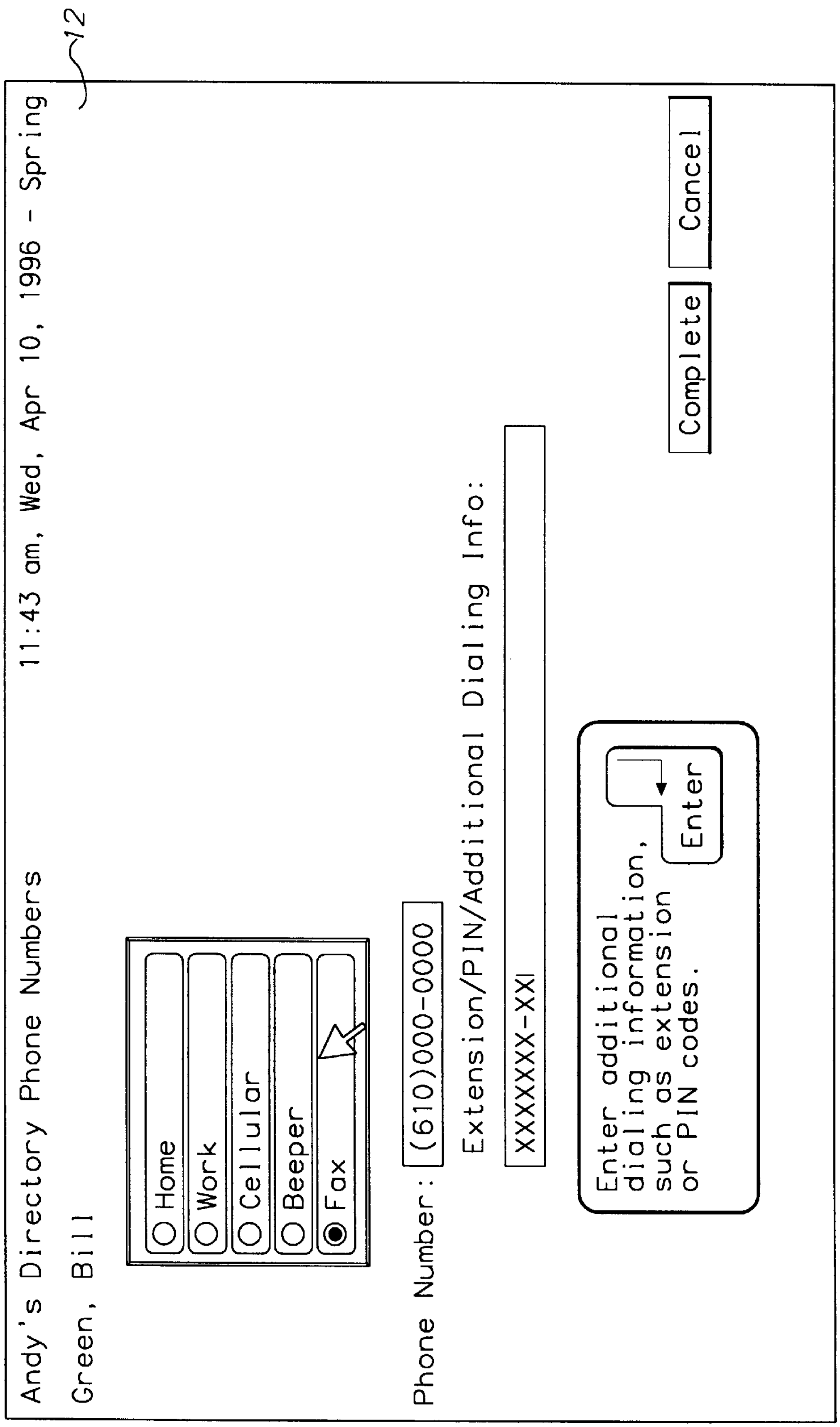

The second file folder (function), Phone #'s file folder 240 (FIG. 17), displays the telephone numbers corresponding to the person whose name was selected in the "Names" file folder 238 prior to selecting the "Phone #'s" folder 240. At the top of the folder 240, a heading is displayed (e.g., "Telephone numbers for: Green, Bill"). As in the Names folder 238, the Phone #'s folder 240 also includes subfunction buttons: "New", "Modify", "Delete," "Print" and "Exit". If the user selects the "New" subfunction button, the user is brought to the display screen 12 shown in FIG. 18 in which the user can select the type of phone number from the available radio bullets: Home, Work, Cellular, Beeper or Fax. After selection of the particular radio button the user is permitted to enter a phone number in a "Phone Number" field. By default (i.e., as preset by the secondary user in the "Home" information in the Maintenance Menu 232) the area code inside the "Phone Number" field is that of the user's home area code. After the user types in the phone number, the area code is highlighted; this block can be overwritten by simply typing the changed area code. When done, the user hits the "Enter" key and the user is presented with the an "Extension/PIN/Additional Dialing Info" field in order to "Enter additional dialing information, such as extension or PIN codes". At the end of data entry in the Phone #'s folder 240, the user is presented with either the "Complete" subfunction button or the "Cancel" subfunction button that operate as discussed earlier with respect to the Names folder 238. The user is returned to the Phone #'s folder 238 (FIG. 17), with list of phone number(s) in an upper portion 254A and the corresponding Extension/PIN/Additional Dialing Information in a lower portion 254B. The "Modify," "Delete," "Print," and "Exit" subfunction buttons operate in the same fashion as for the Names folder 238, described previously.

It should be noted that either the Names folder 238 or the Phone #'s folder 240 may include a field (not shown) for the user to record a person's E-mail address.

Figure 19:
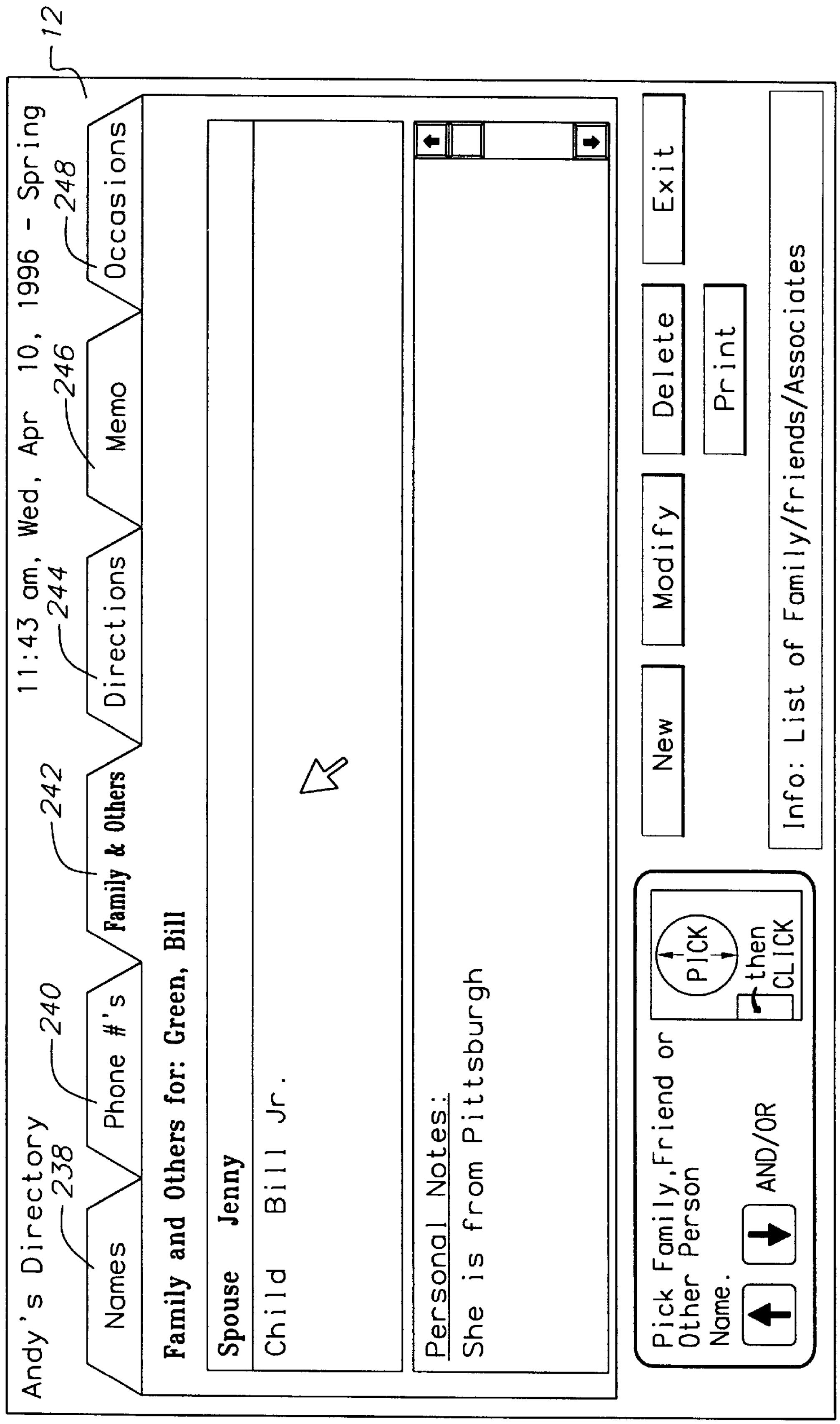
FIGS. 19–20 is the Family & Others function.
Figure 20:
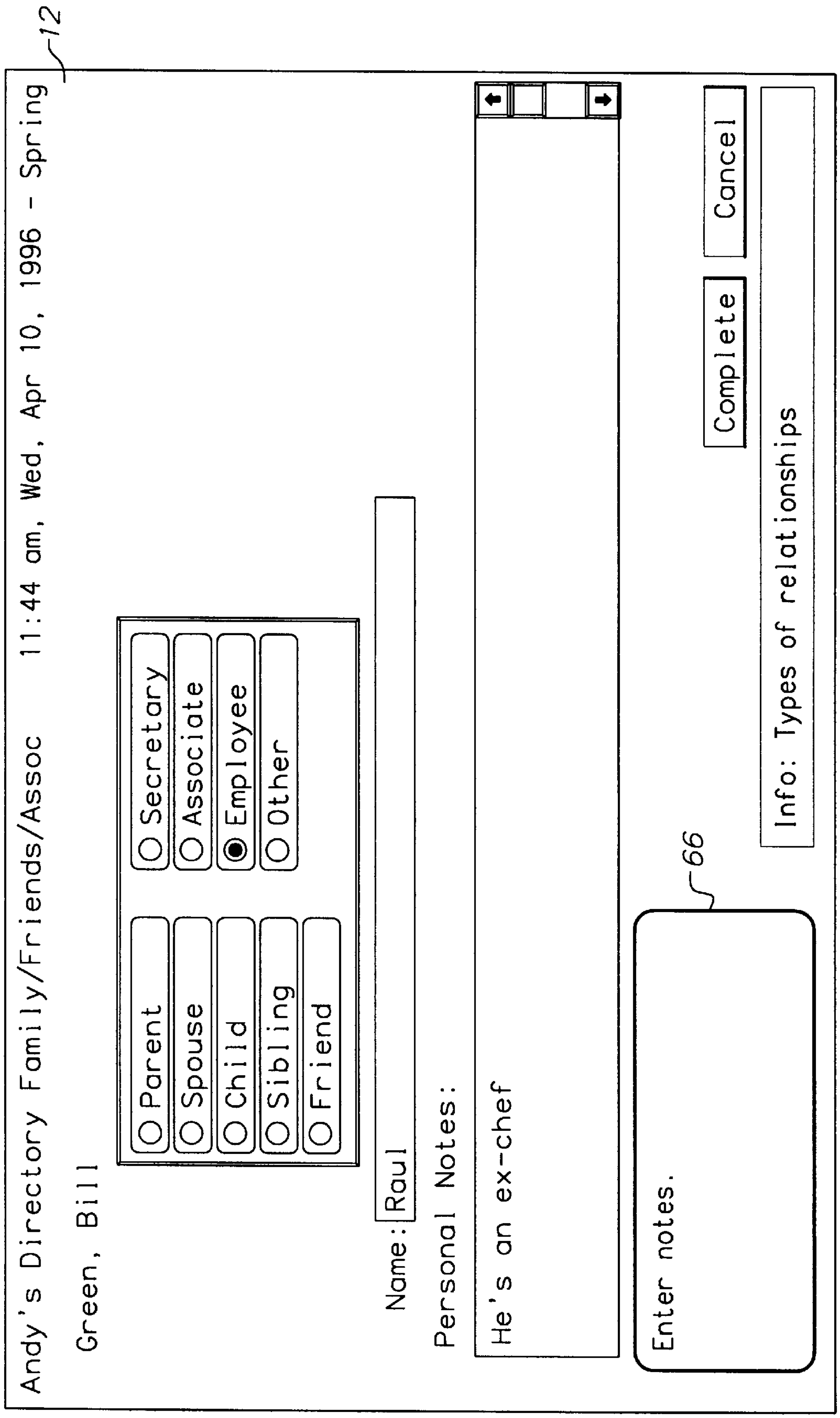

The third file folder, Family & Others folder 242, is shown in FIG. 19 comprising an upper portion 256A (for listing a name) and a lower portion 256B (for displaying personal notes). This folder 242 provides a database for the user regarding relationships of the user, such as: parent; spouse; child; sibling; friend; secretary; associate; employer; employee; other. The user can add a new entry to this folder 242 by selecting the New subfunction button in a similar manner as discussed with regard to the Names folder 238 under the guidance of the icon 64/instruction box 66. In particular, as shown in FIG. 20, the user selects one of the radio buttons in accordance with the particular relationship (although not shown in FIG. 20, a plurality of relationships may be included in addition to the ones shown in FIG. 20, e.g., "Employer"). The user is guided through entering the person's name in a "Name" field; if no name is entered in the "Name" field the sequence cannot progress. After entering a name, the user is then guided into entering any personal notes into a "Personal Notes" field reserved for that information. This is a scrolling field, so the user has plenty of space for entering unlimited desired data in this location. As previously discussed, the "Cancel" subfunction button is always available to the user, although the "Complete" subfunction button is only available to the user after all the data entries have been provided.

Figure 21:
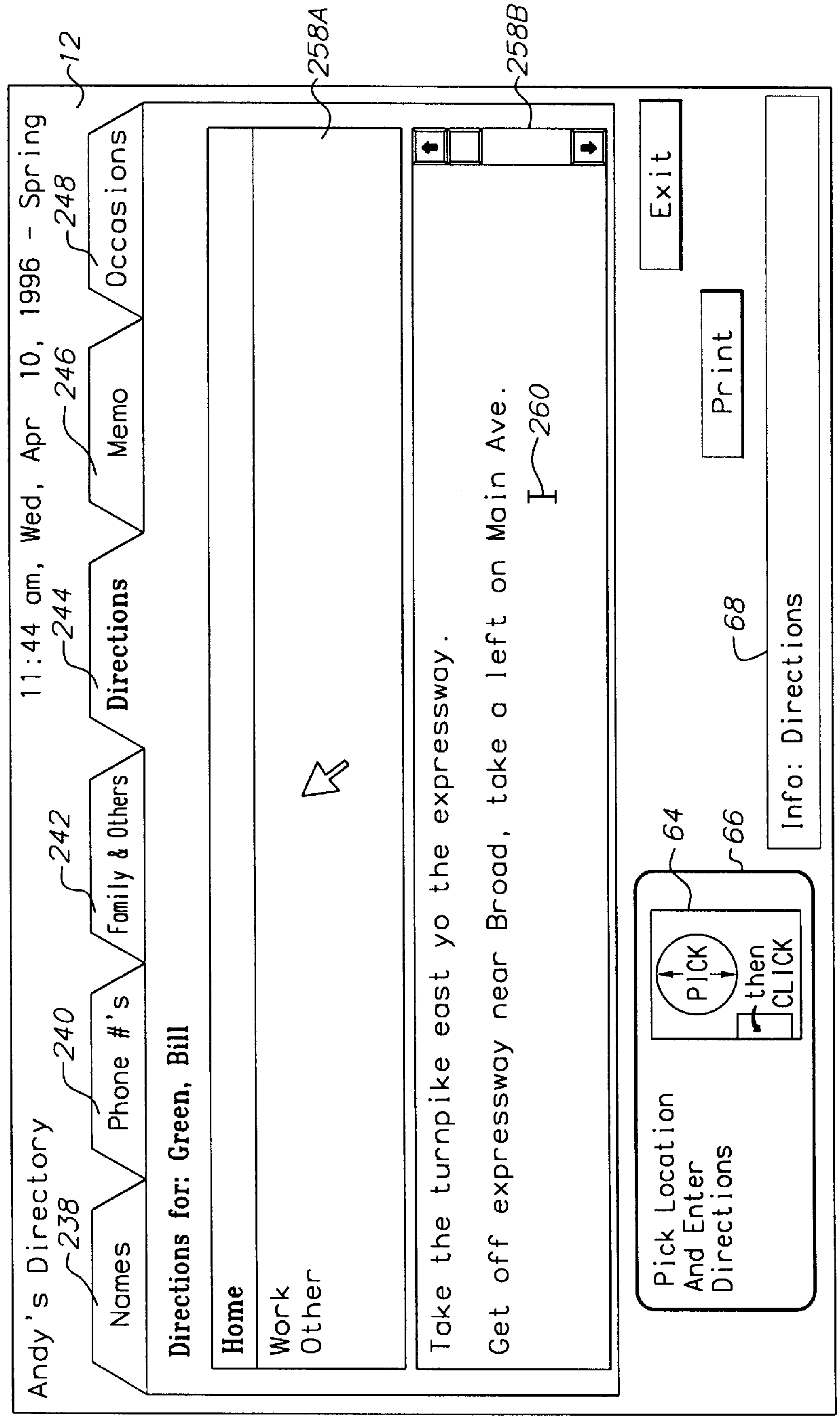
FIG. 21 is the Directions function.

The fourth file folder 244, Directions file folder, is shown in FIG. 21 which also comprises an upper portion 258A and a lower portion 258B. In the upper area 258A, the user selects "Home", "Work" or "Other" by pointing/clicking. Once selected, the text entry cursor 260 is automatically activated in the lower portion 258B, where the user can type the directions to a particular location. Thereafter, any time the user wants directions, he/she can select the desired location and find directions in the lower portion 258B. The "Print" subfunction button provides a printout of the selected directions.

Figure 22:
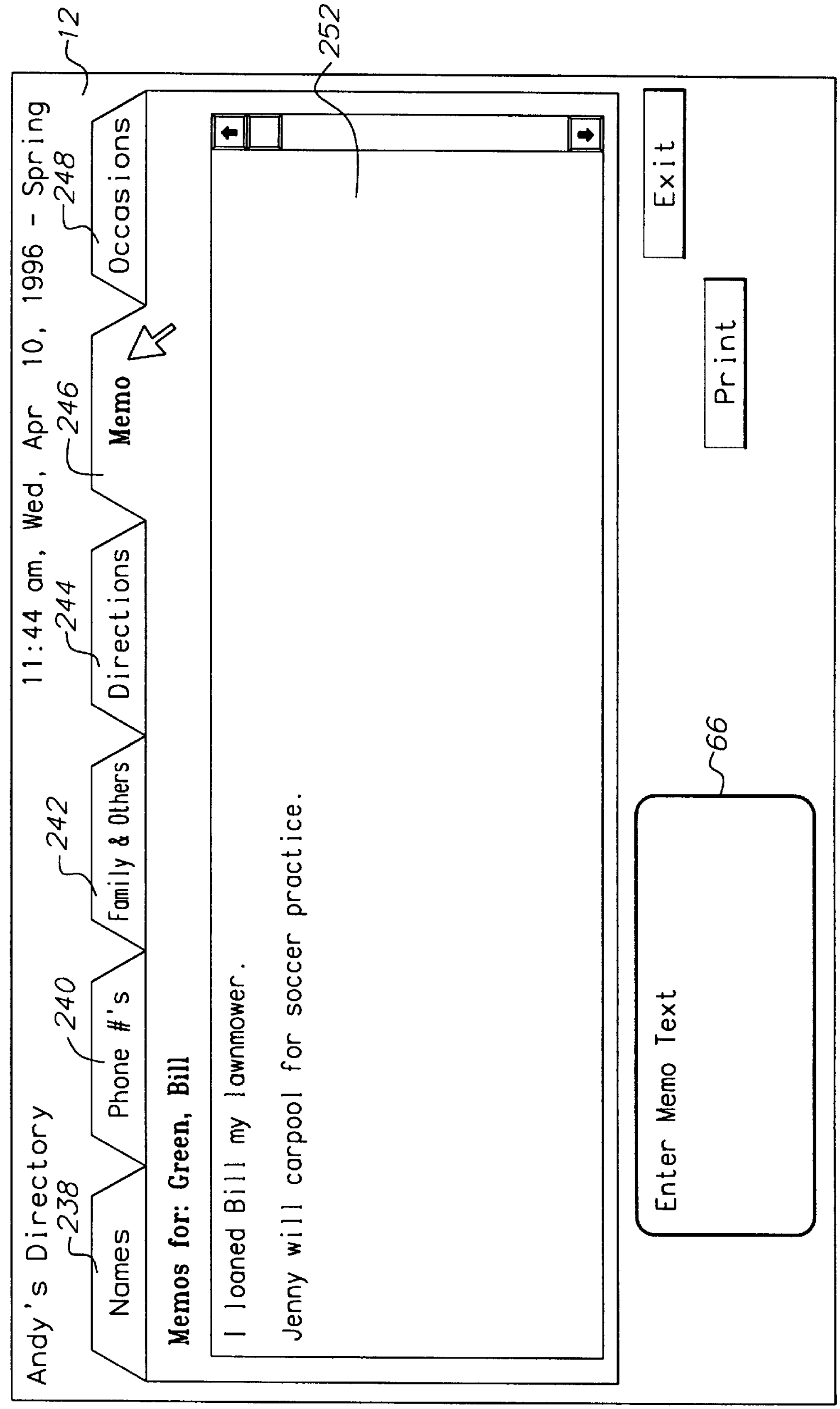
FIG. 22 is the Memo function.

The fifth file folder, Memo file folder 246, is shown in FIG. 22 and comprises a blank field 252 for the user to enter whatever data he/she wishes to associate with a person in the Names file folder 238. By selecting the "Print" subfunction button, the user can print a hardcopy of that data.

Figure 23:
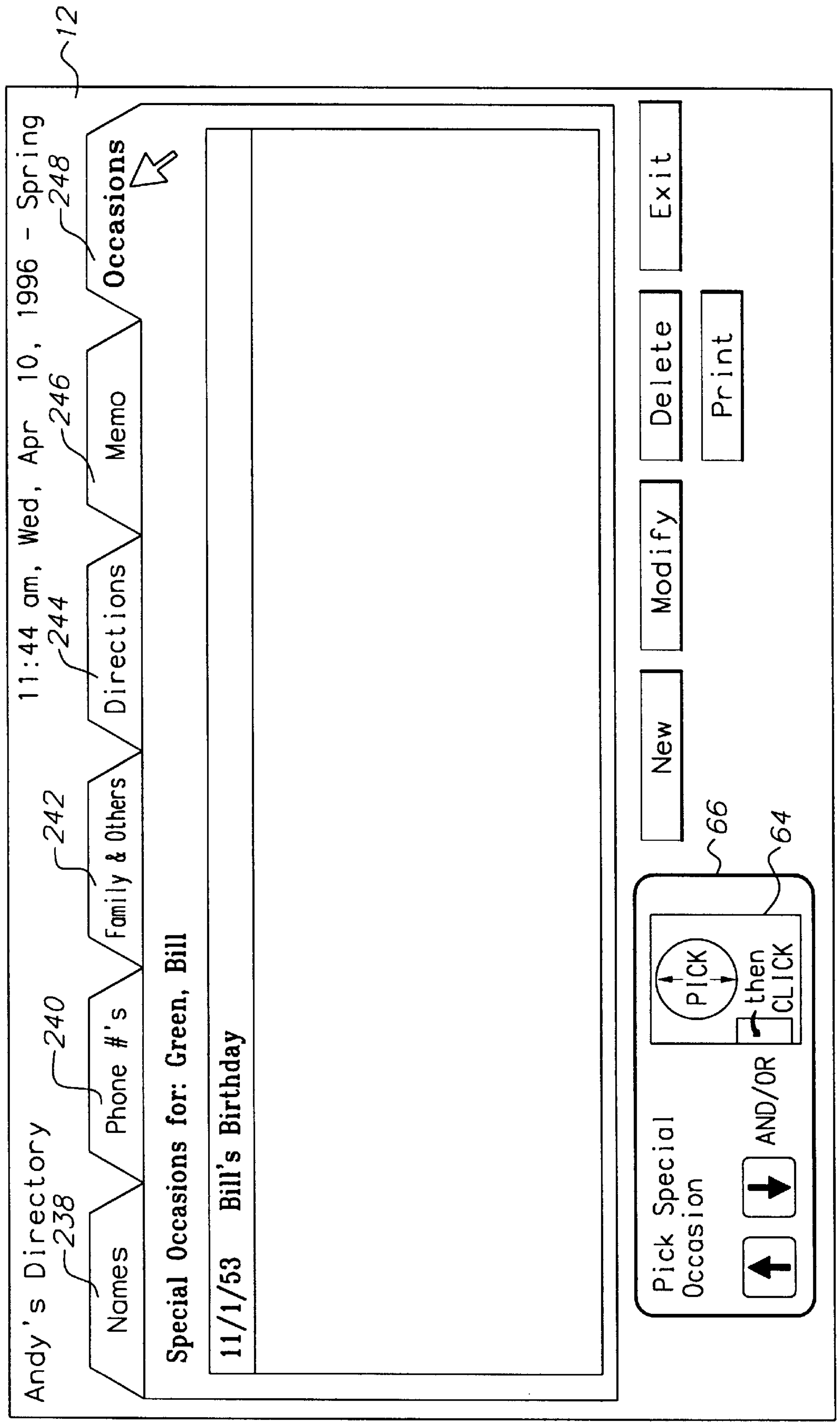
FIGS. 23–25 is the Occasions function.
Figure 24:
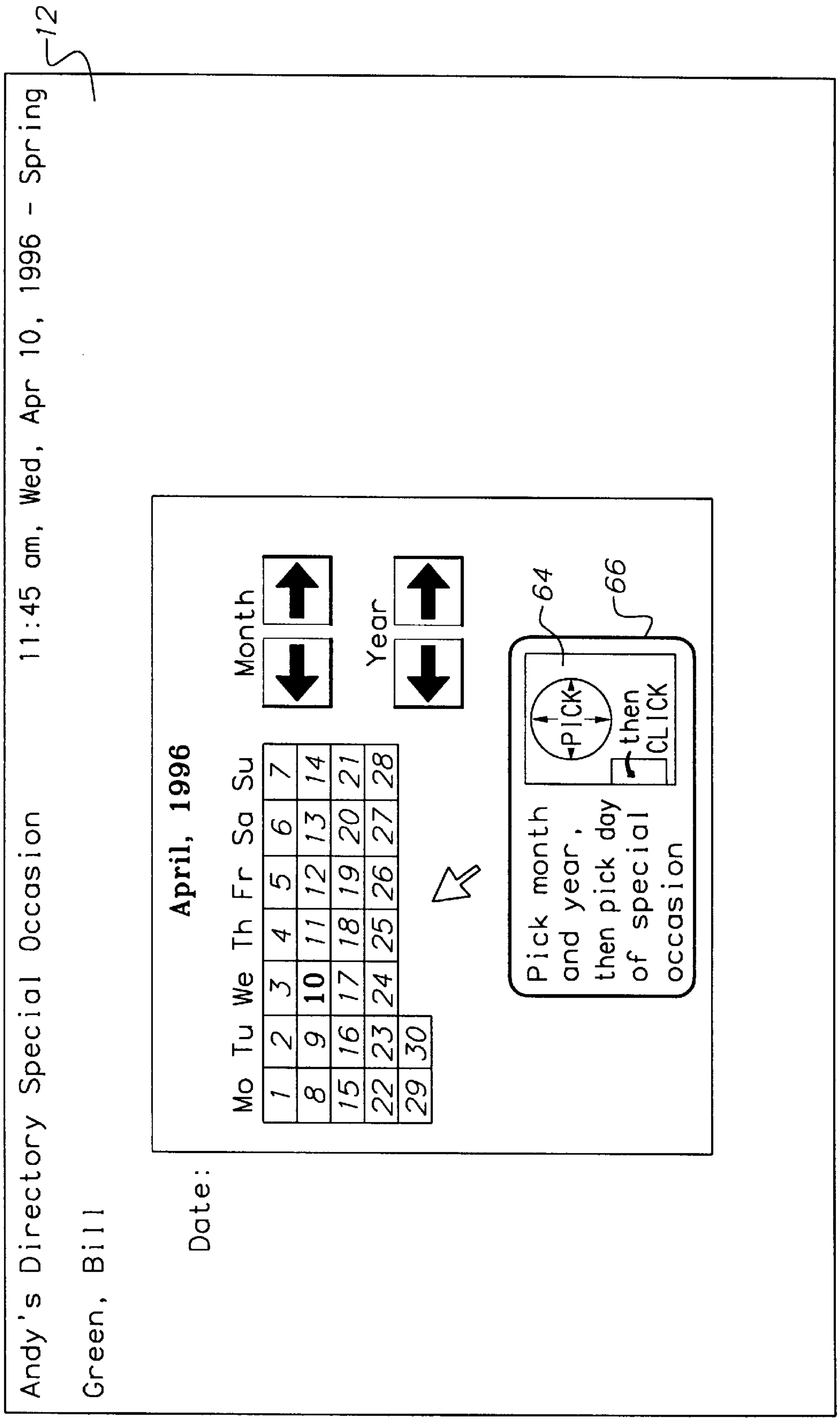
Figure 25:
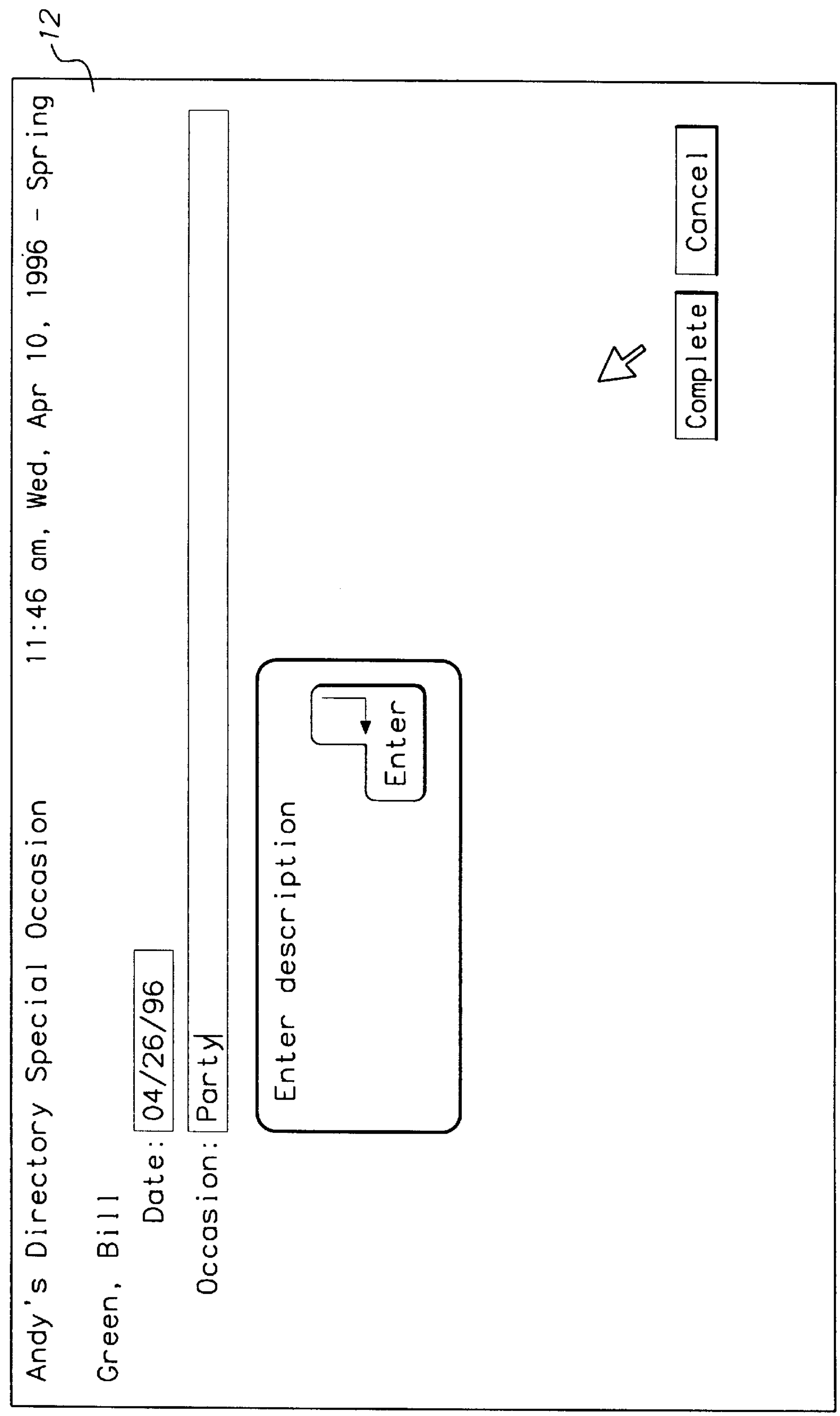

The sixth file folder, Occasions file folder 248, is shown in FIG. 23. The Occasions function follows a similar format as the earlier functions. In addition, in the Occasions function, when the user points/clicks the "New" subfunction button, a calendar screen, as shown in FIG. 24, is displayed. The user selects the month and year, and then the day of a special occasion. The next screen (FIG. 25) then displays the selected individual's name (from the Name file folder 238), the date selected from the calendar, and provides a one line "Occasion" field for the user to describe the occasion. As with the previous functions, the Occasion file folder 248 comprises New, Modify, Delete, Print and Exit subfunctions buttons.

Figure 26:
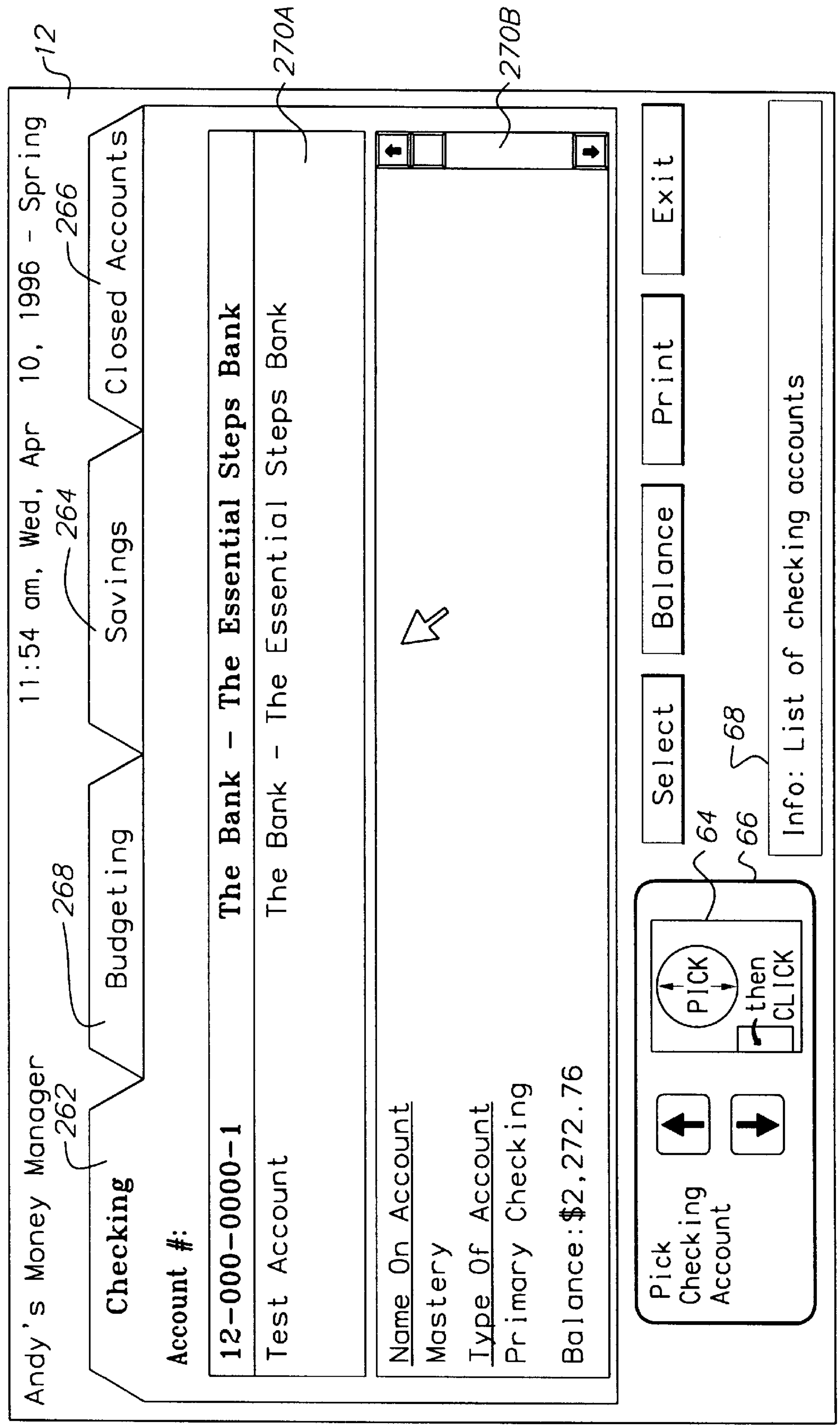
FIG. 26 is the Money Manager module.

The Money Manager module 224 (FIGS. 101–131) provides the user with the ability to record funds entered and withdrawn from savings and checking accounts. The Money Manager module 224 (FIG. 26) comprises a Checking function 262, Savings function 264, Budgeting function 266 and Closed Accounts function 268. When the user selects the Money Manager option 224 (FIG. 3) from the Main Menu the default function is the Checking file folder 262 (FIG. 26) with the tabs of other file folders: Savings file folder 264, Budgeting file folder 266 and Closed Accounts file folder 268 visible.

Before a discussion of either the Checking function 262 or the Savings function 264, it should be noted that upon the user's selection of either of these two functions, the Checking function 262 and the Savings function 264 determine whether any automatic deposits or withdrawals are active in their respective accounts. As will be discussed below, automatic transactions are those transactions that are prearranged and are entered through the Maintenance Menu 232. If either of these functions 262 or 264 finds any automatic transactions active, the next screen (not shown) displays the transaction information (e.g., amount and description) for the automatic deposit or withdrawal, name of bank and bank contact, and two subfunction buttons, "Call" and "Skip". If the "Skip" subfunction button is selected, the user by-passes the confirmation step and enters into the respective account as if no reminder had been given. If, on the other hand, the user selects the "Call" subfunction button, the bank is automatically dialed so that the user can confirm the transaction. The user is then prompted, "Has this deposit (or withdrawal) been applied to your account?" The user is then presented with "Yes" and "No" subfunction buttons. If the user selects the "Yes" subfunction button, the amount is entered into (or debited from) the account; if the "No" subfunction button is selected, the Checking function 262 and the Savings function 264 consider that selection as if the "Skip" subfunction button were selected previously.

The Checking file folder 262 (FIG. 26) comprises an upper portion 270A and a lower portion 270B. The upper portion 270A comprises a list of bank(s) where checking accounts exist for the user; the bank data are entered via the Maintenance Menu 232 by the secondary user. The lower portion 270B comprises a list of the name(s) on the account, the type of account (e.g., Primary Checking) and the available balance. All of these particulars are entered by the secondary user through the Maintenance Menu 232, except for the balance which is provided by the Checking function software for the running account. The subfunction buttons available in the Checking file folder are: "Select", "Balance", "Print" and "Exit". Selecting the "Print" subfunction prints out the particulars about the selected account.

To perform any checking transaction, the user points/clicks on the bank account in the upper portion 270A (as instructed by the message in the instruction box 66), and then points/clicks on the "Select" subfunction button. Activation of the "Select" subfunction causes a Checking Ledger (FIG. 27) screen to be displayed. The Checking Ledger screen also comprises an upper portion 271A and a lower portion 271B. The upper portion 271A displays the account number, running balance, and a chart of transactions organized chronologically, with the most recent being at the top. Information in the first column concerns the type of transaction that occurred, whether it was a deposit, withdrawal (e.g., service charge) or withdraw by check (indicated by a check number). The second column displays the transaction date while the third column displays the amount involved in the transaction. The account balance is displayed in the fourth column. The lower portion 271B in the Checking Ledger display (FIG. 27) contains information about the type of transaction, e.g., Withdraw or Deposit, and a memo written by the user regarding the transaction. For example, if a deposit was previously made, the lower portion 271B displays information that a deposit was made by MAC, Mail, Teller, Interest or Other and also includes a memo regarding that deposit. If a withdraw was previously made, the lower portion 270B displays that a withdraw was made by MAC, Cash, Service Charge or Other. When a check number, as it appears in the upper portion 271A, is selected by the user, the lower portion 271B indicates that the Withdraw type was by check and also includes the payee of that check number (FIG. 27).

The Checking Ledger display (FIG. 27) includes the following subfunctions at the bottom of the screen: "Check", "Deposit", "Withdrawal", "Exit", "Modify", "Void" and "Print". It should be noted that selection of the Exit subfunction button in the Checking Ledger screen returns the user to the Checking file folder 262.

Figure 28:
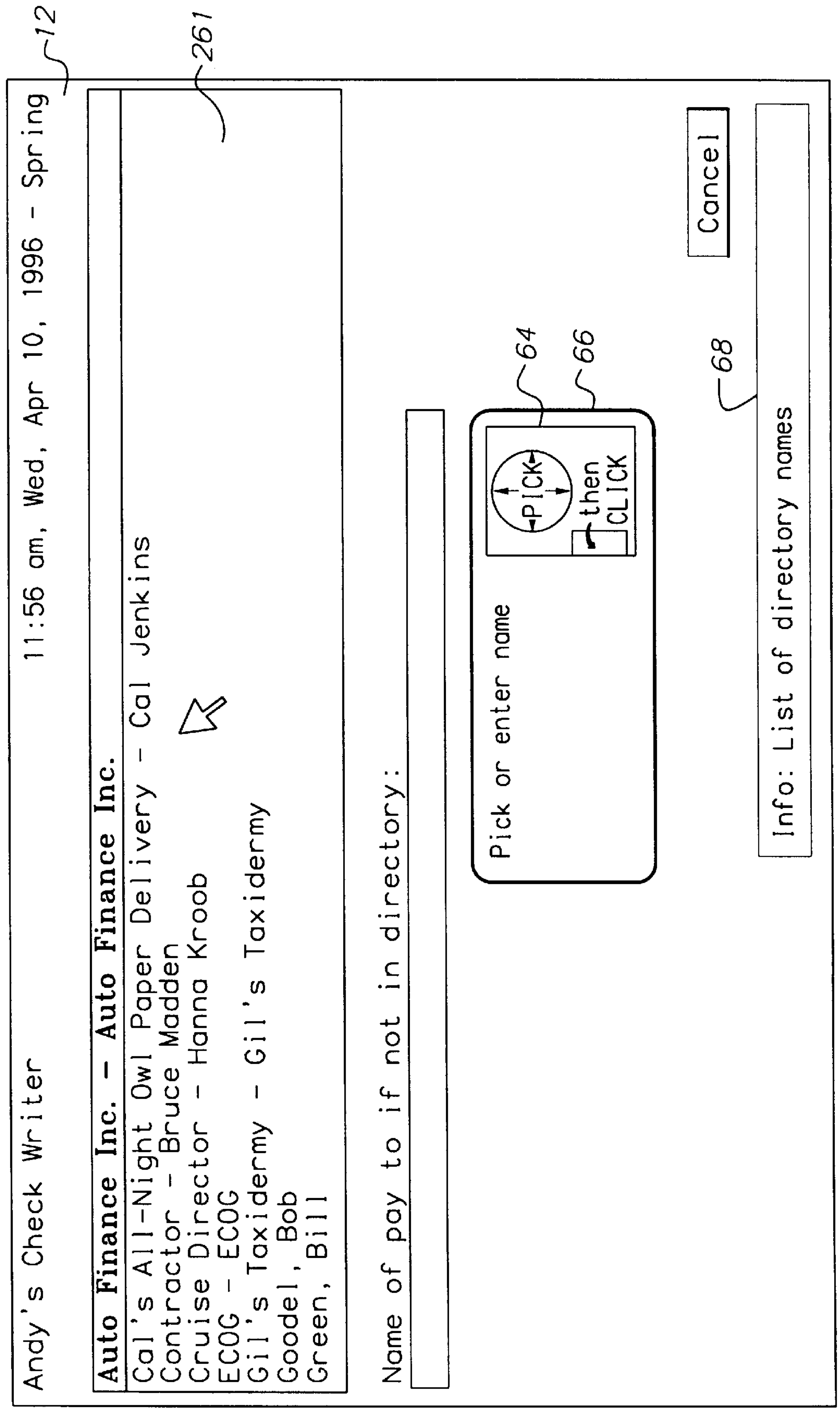
FIGS. 28–36 is the guided sequence for check writing.
Figure 29:
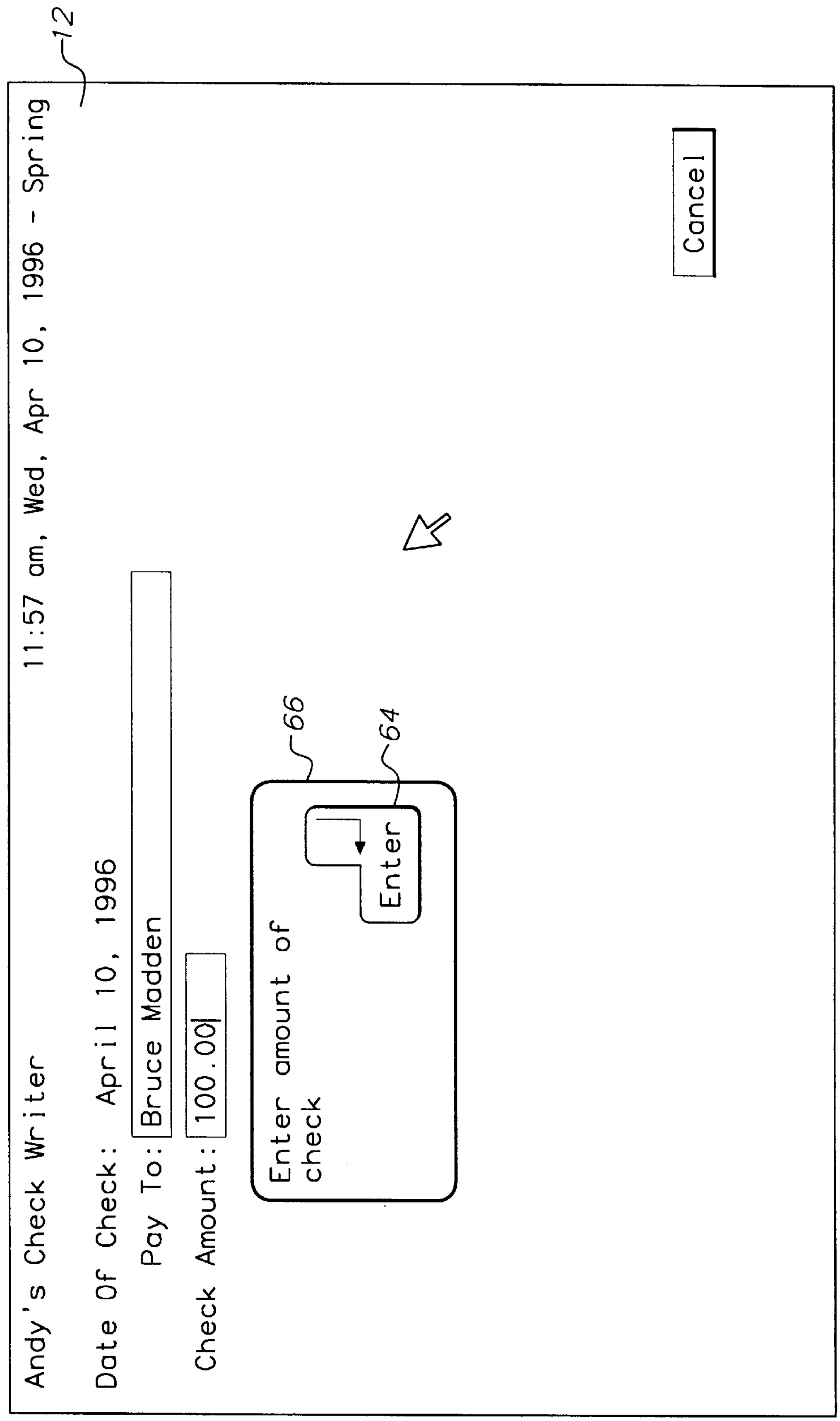
Figure 30:
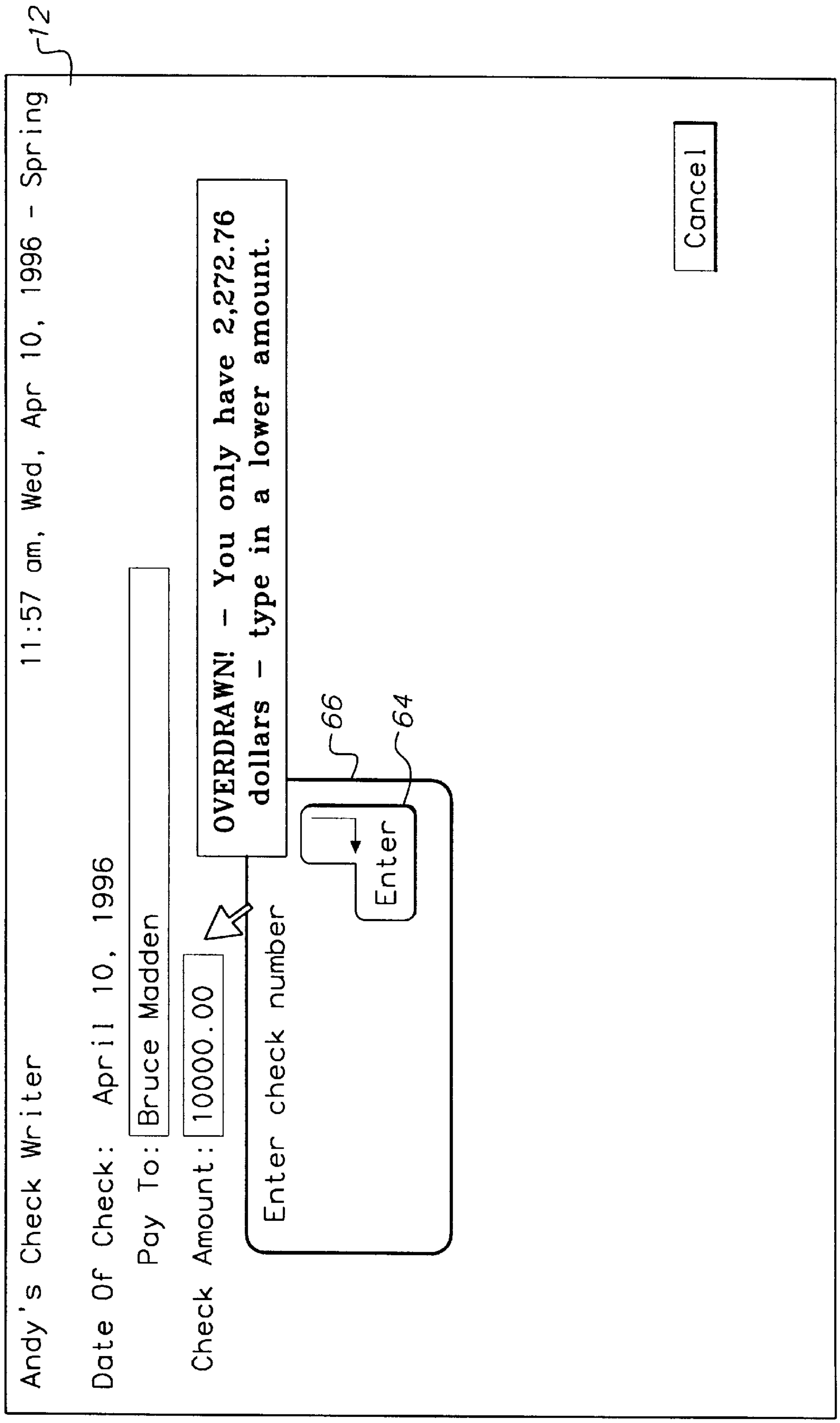
Figure 31:
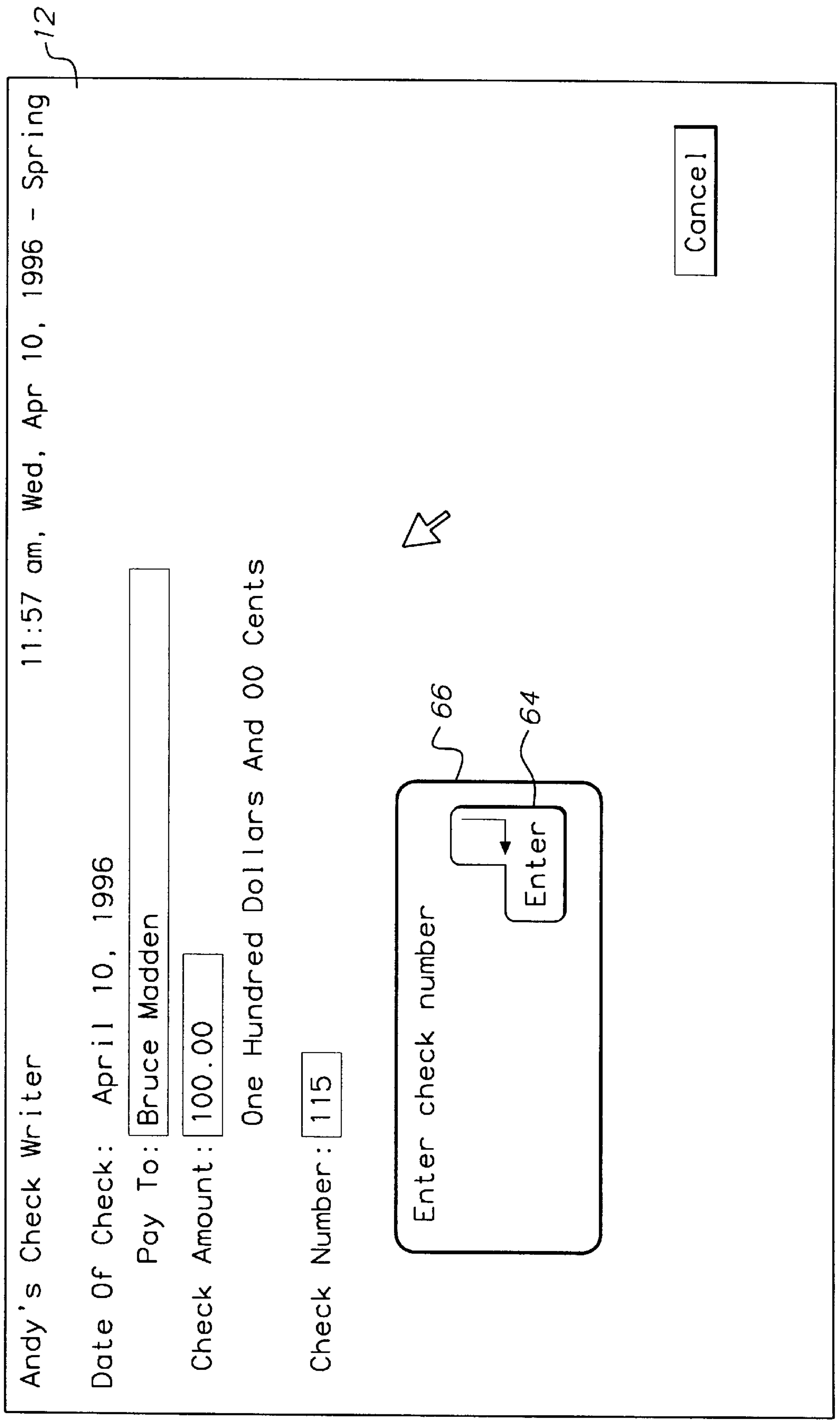
Figure 32:
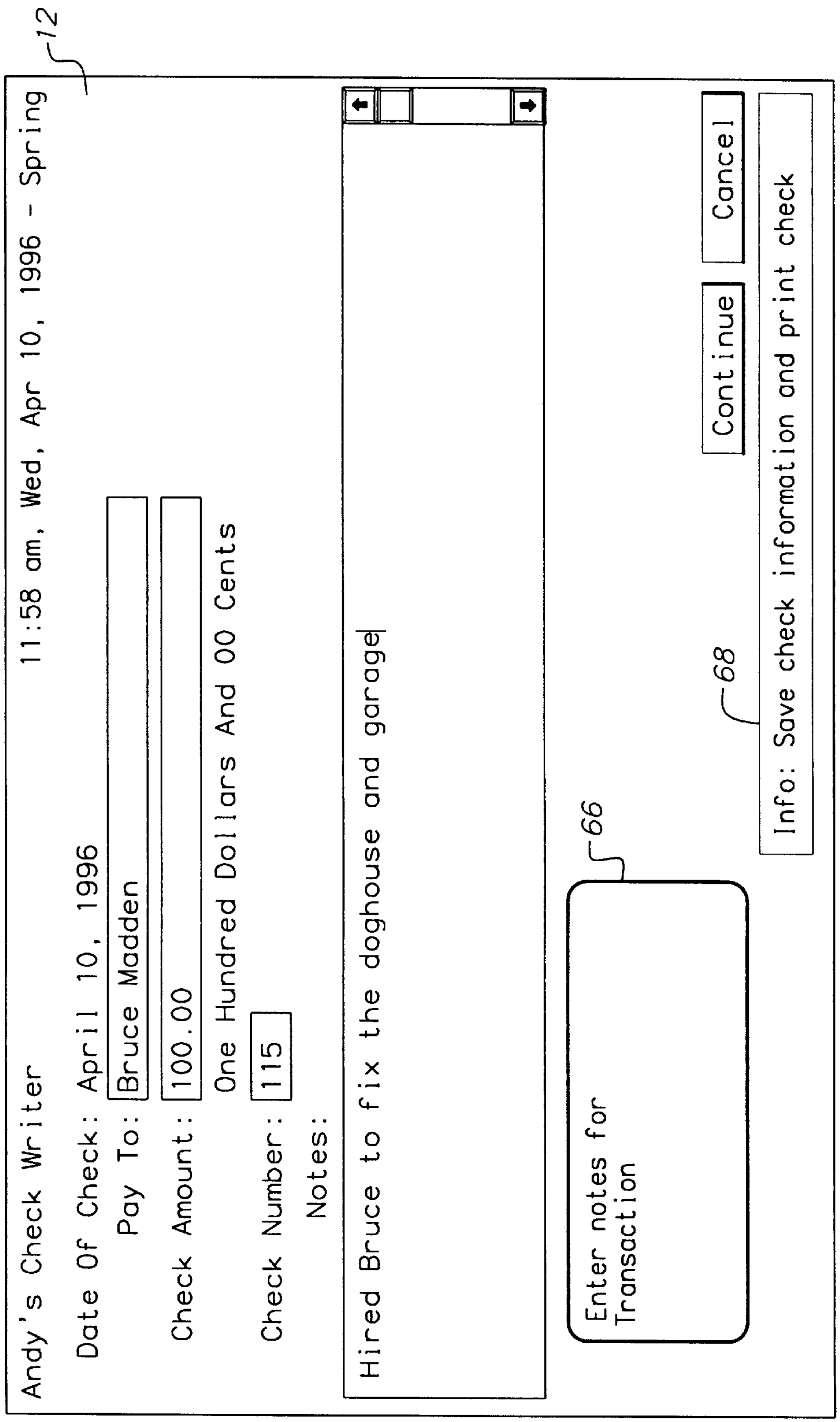
Figure 33:
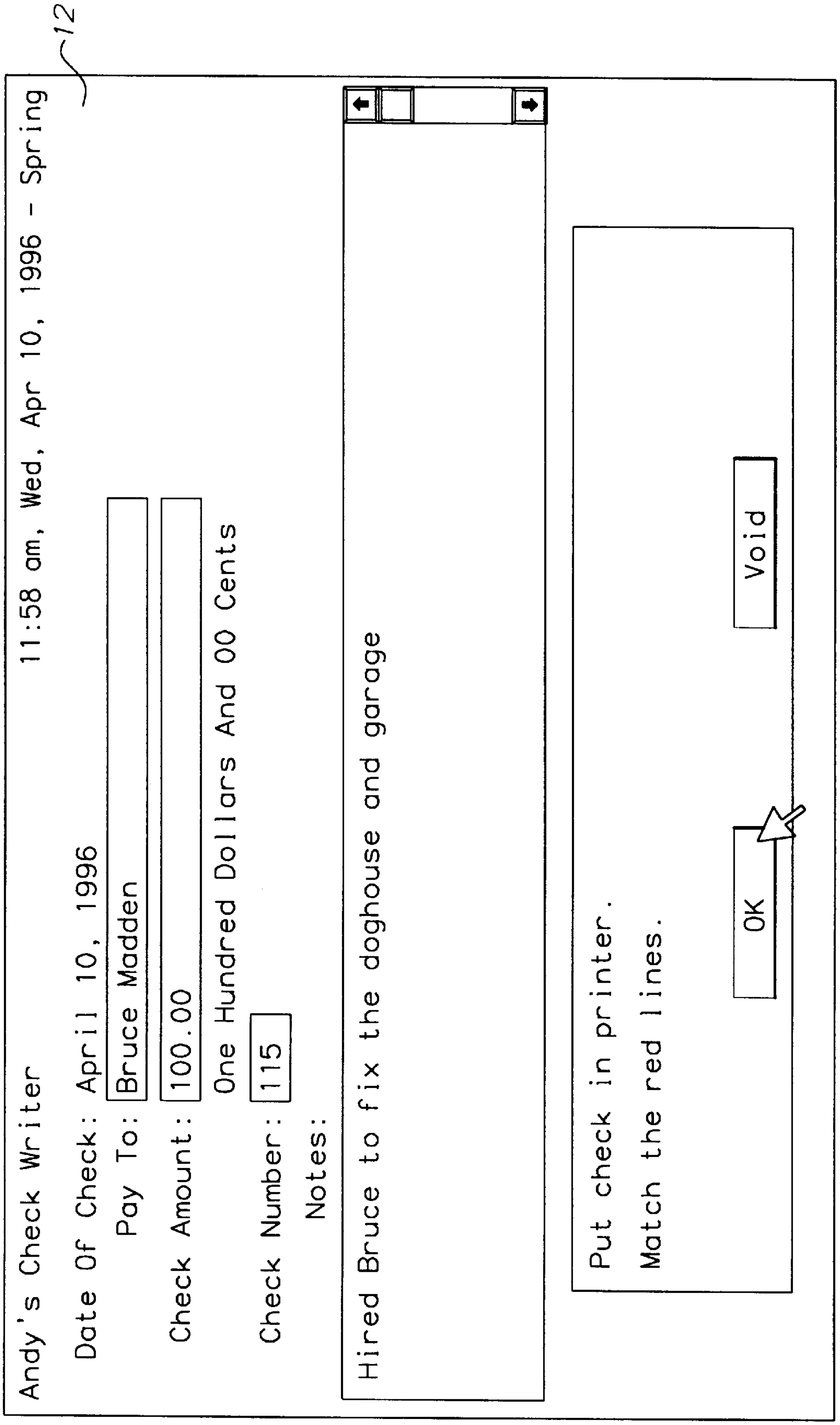
Figure 72:
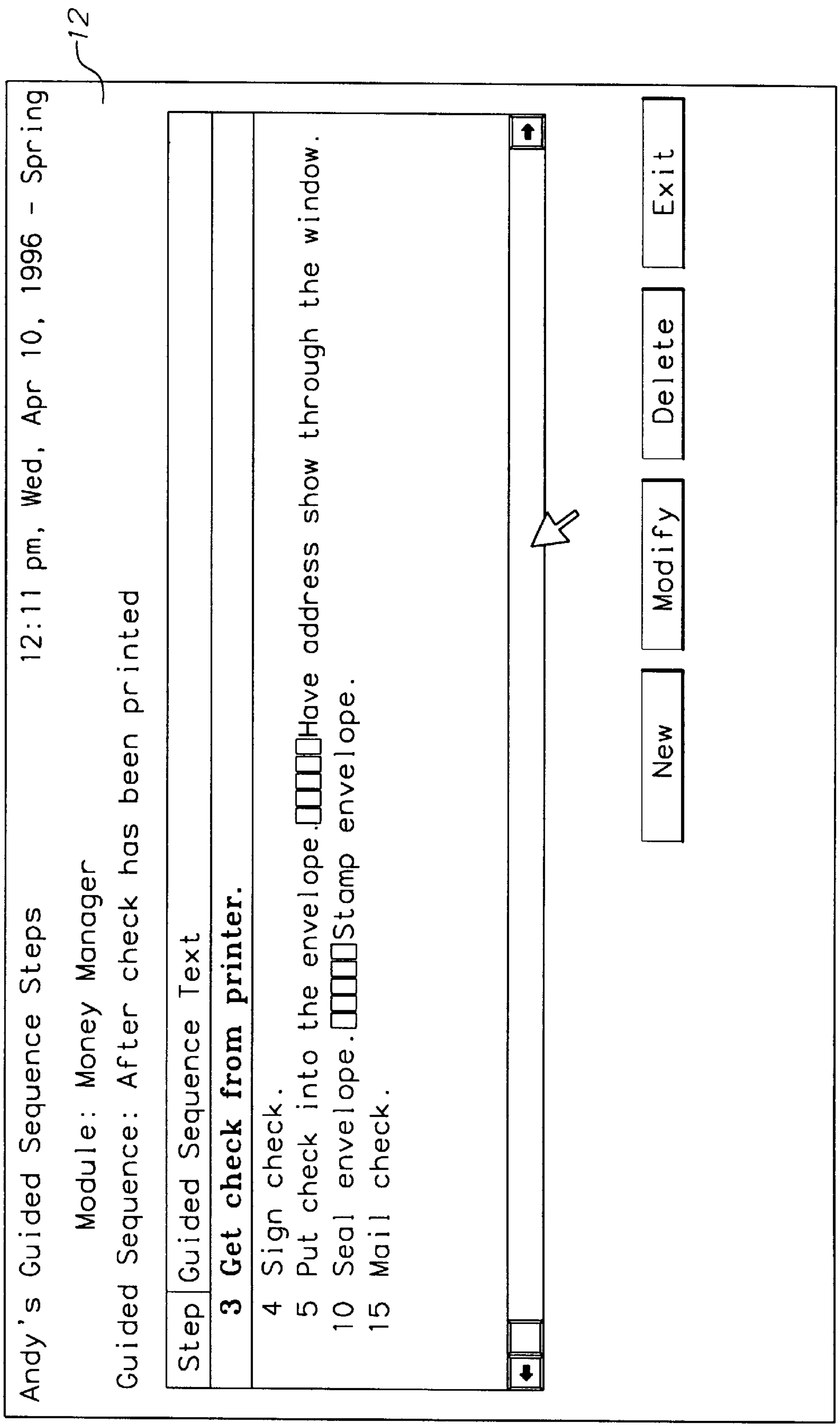

To write a check (FIGS. 28–36), the user points/clicks on the "Check" subfunction. The next screen (FIG. 28) has "Date of Check" (current date) at the top, a name listing field 261 displaying all names from the Names file folder 238, and a single line "Name of pay to if not in directory" field beneath the name listing field 261 to permit the user to enter any name which is not in the Names file folder 238, as would occur when the user has to make a one-time payment rather than a planned recurring payment, (e.g., a monthly water bill). After the payee's name is entered, the next screen (FIG. 29) displays the "Date of the Check" (which it should be noted is automatically controlled by the Checking file folder 262 so that no back-dating can be done), a "Pay To," field and a "Check Amount" field. The user is then instructed by the instruction box 66 of the guidance icon 64 to "Enter the amount of the check." If the person hits "Enter" key before entering the amount, a message appears on the screen, accompanied by an audible warning, e.g., a bell, alerting the user that the check amount must be greater than zero. The user can still enter an amount and, following the instruction of the Enter icon 64, progress to the next screen. It should also be noted that if the user attempts to write a check for more than is in his/her account, a prompt is displayed, as shown in FIG. 30, which warns the user that such an entered amount will overdraw on the account and requires that the user enter a lower monetary value. The next screen (FIG. 31) is the same as the last with the check number, in the "Check Number" field, having a blocked appearance (i.e., white numbers in a black rectangle within the "Check Number" field); if the check number is correct, the user presses the "Enter" key; if the check number needs to be corrected, the user can enter the correction. After hitting the "Enter" key, the next screen (FIG. 32) is a display of all that came before, plus a "Notes" field (FIG. 32) for writing a memo of information about this check (this information is printed on the face of the check). Once the memo is done, the user points/clicks on the "Complete" subfunction button at the bottom of the screen and the user is brought to the next screen; if the user selects the "Cancel" button the user is returned to the Checking Ledger screen (FIG. 27). As the user points/clicks on the "Continue" button the system 220 records the check information and moves the user into the guided sequences for check writing (FIGS. 33–36). These guided sequences are set and modified by the secondary user (therapist) through the Maintenance Menu 232 (FIG. 72). The guided sequence screens have a bold instructional field (e.g., a yellow color on a maroon-colored background) and any number of customized steps can be programmed by the secondary user to assist the primary user in actually preparing the check until that check is dropped into a mailbox. For example, Step 1 of a guided sequence is "Put check in printer. Match the red lines." (FIG. 33). It should be noted that the checks for use with this system 220 are customized to cue the user so that they go into the printer properly, are printed right side up, and can be reliably inserted into an envelope with the address showing.

Figure 27:
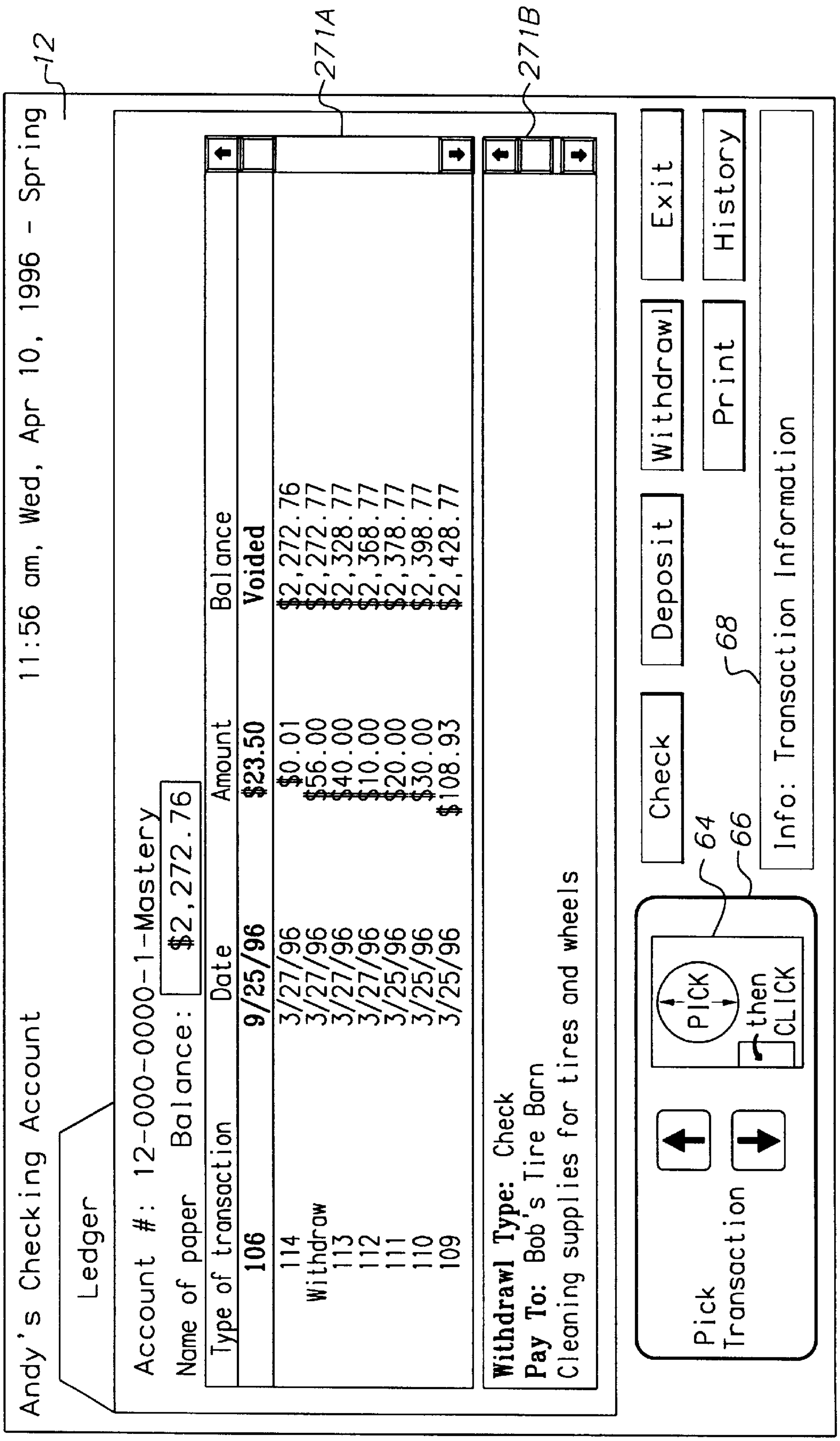
FIG. 27 is the Checking Ledger.
Figure 34:
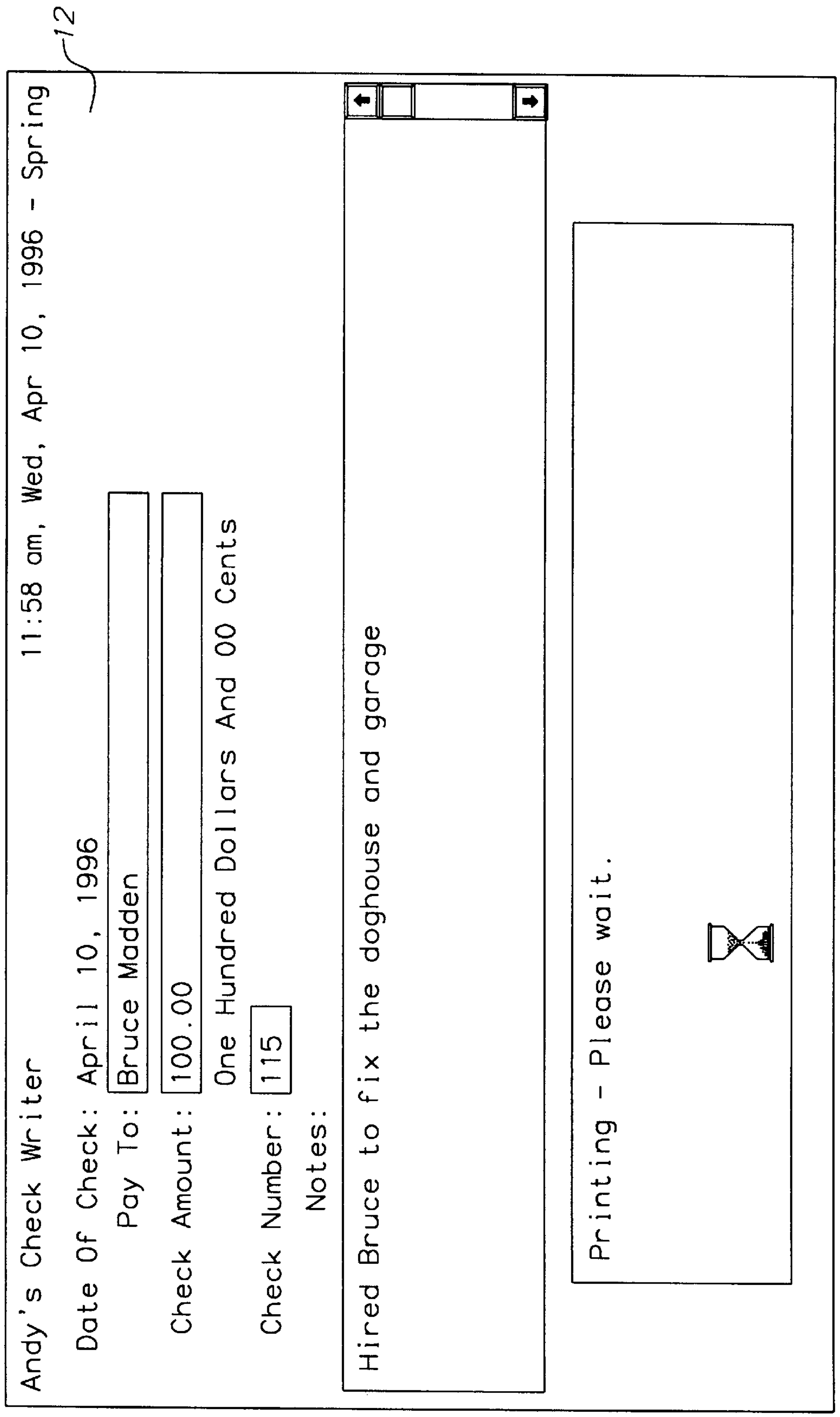
Figure 35:
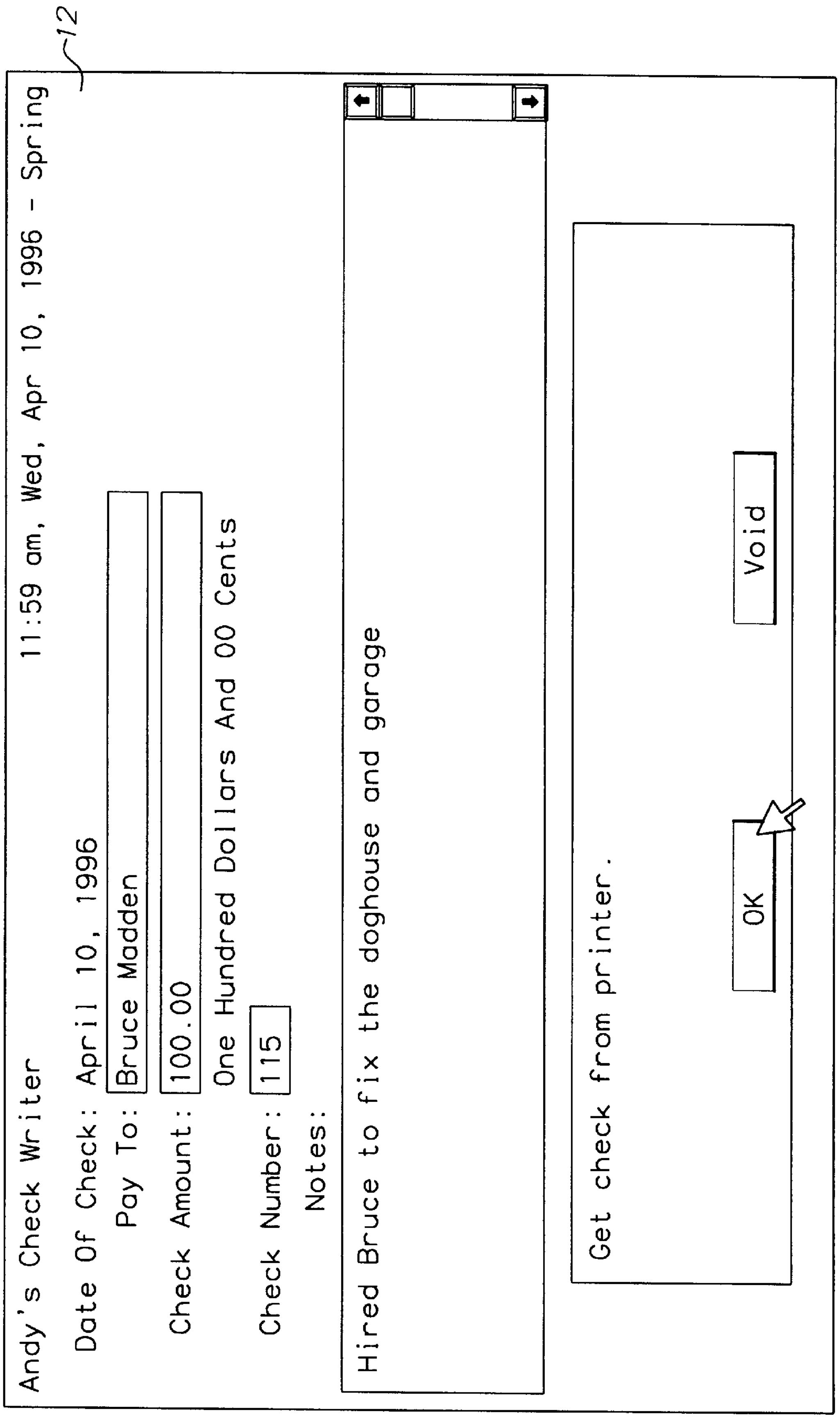
Figure 36:
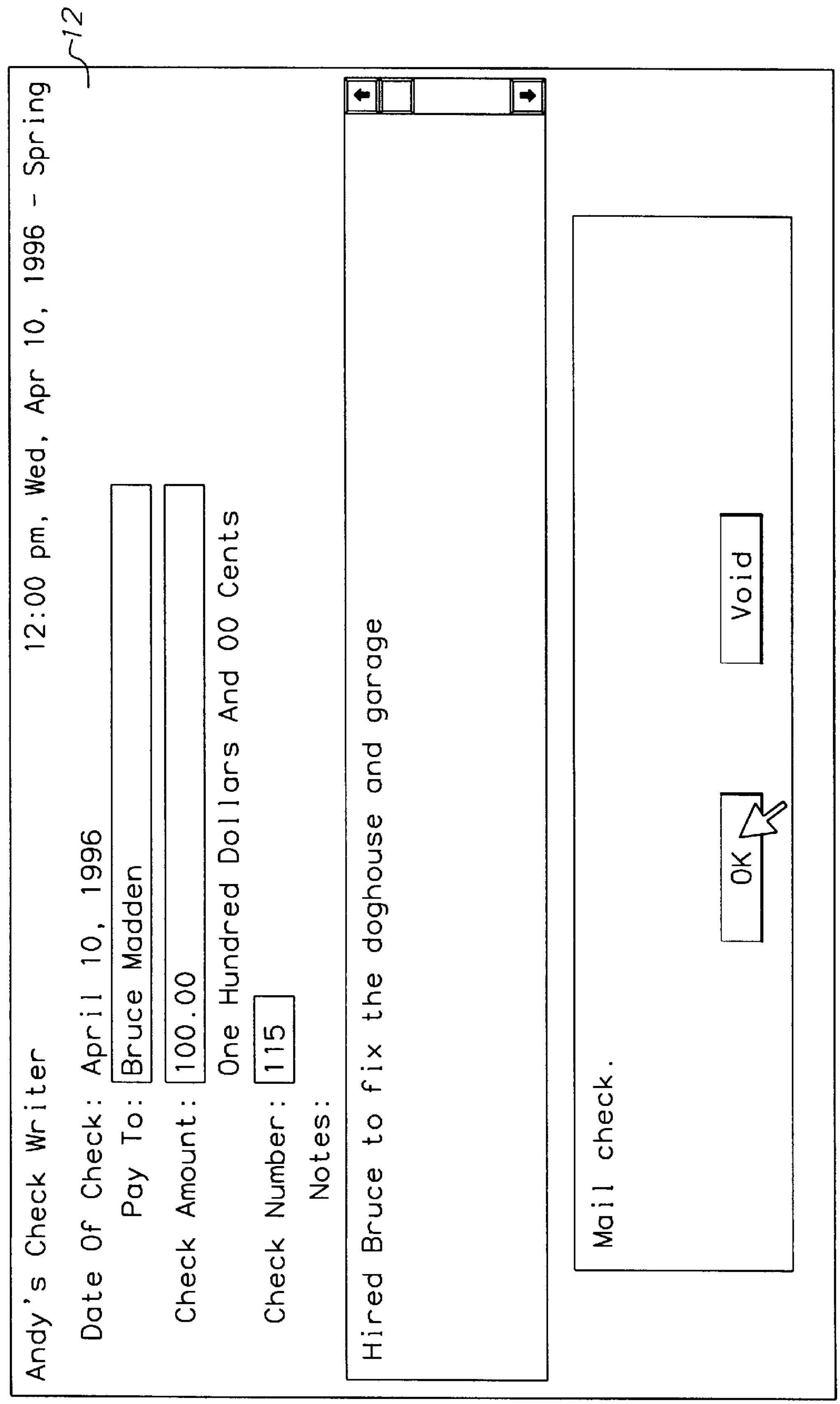

During use of the guided steps, the user must point/click on the subfunction buttons "OK" or "Void"; selection of the OK button moves the user to the next screen; selection of the Void button converts any already-entered data listed in the Checking Ledger into a voided entry, which is in italics (see FIG. 27, the entry for check no. 106) and light grey (a distinctly different appearance) in the Checking Ledger display (FIG. 27). If the Void subfunction button is selected by the user at this point in the sequence (i.e., the check is already printed), the user is instructed to take the check from the printer and tear it up. If the OK subfunction button is selected, the message given is "Printing—Please wait" (FIG. 34). The next screen (FIG. 35) is similar to the previous screen but the guided sequence message is "Get check from printer." Again, the Void button is available and follows the sequence described above. The selection of the OK button moves the user through the various steps, which (as mentioned above) can be modified through the Maintenance Menu 232 (FIG. 72) by the therapist who may change the wording, add steps or eliminate steps. A typical guided sequence might direct the user through signing the check (with OK/Void subfunction buttons available throughout); "Tear off receipt"; "File bill and receipt"; "Put check into the envelope," and instructing the user to select the OK button when the check is placed into envelope; or alternatively, assuring that when an envelope insert is to be used that it is placed properly in the envelope so that the addressee' address is clearly visible through a window in the envelope); "Seal envelope"; "Stamp envelope"; "Mail check" (FIG. 36). At any point in the guided sequence, the user can void the transaction. When the user completes the guided sequence of preparing a check, the user is returned to the Checking Ledger display (FIG. 27).

The Checking Ledger display (FIG. 27) also permits through subfunction selection buttons the ability to "Deposit", "Withdraw", "Print", "History" and "Exit". In addition, it should be noted that two other subfunction buttons are available, namely, "Modify" and "Void" (not shown). However, their respective availability to the user depends on the transaction. Since, in FIG. 27, an already-voided check (indicated by the italicized form of the check no. 106 and its dull color) has been highlighted by the user, both the "Modify" and the "Void" subfunction buttons are not available to the user (since voided transactions can be neither modified nor voided) and, as such, do not appear in the Checking Ledger display of FIG. 27. If, on the other hand, check no. 114 (i.e., a non-italicized, active check entered into the Checking Ledger) were selected (i.e., highlighted) by the user, a "Void" subfunction button would appear in FIG. 27 in addition to the "Check", "Deposit", "Withdrawal", "Exit", "Print" and "History" subfunction buttons; this permits the user to void an active check, but he/she cannot modify (e.g., change the amount, change the payee, etc.) that check since there is no "Modify" subfunction button. With respect to any other active (i.e., not previously voided and displayed in a non-italicized font) transaction, both the "Modify" and "Void" subfunction buttons are available to the user in the Checking Ledger.

Figure 37:
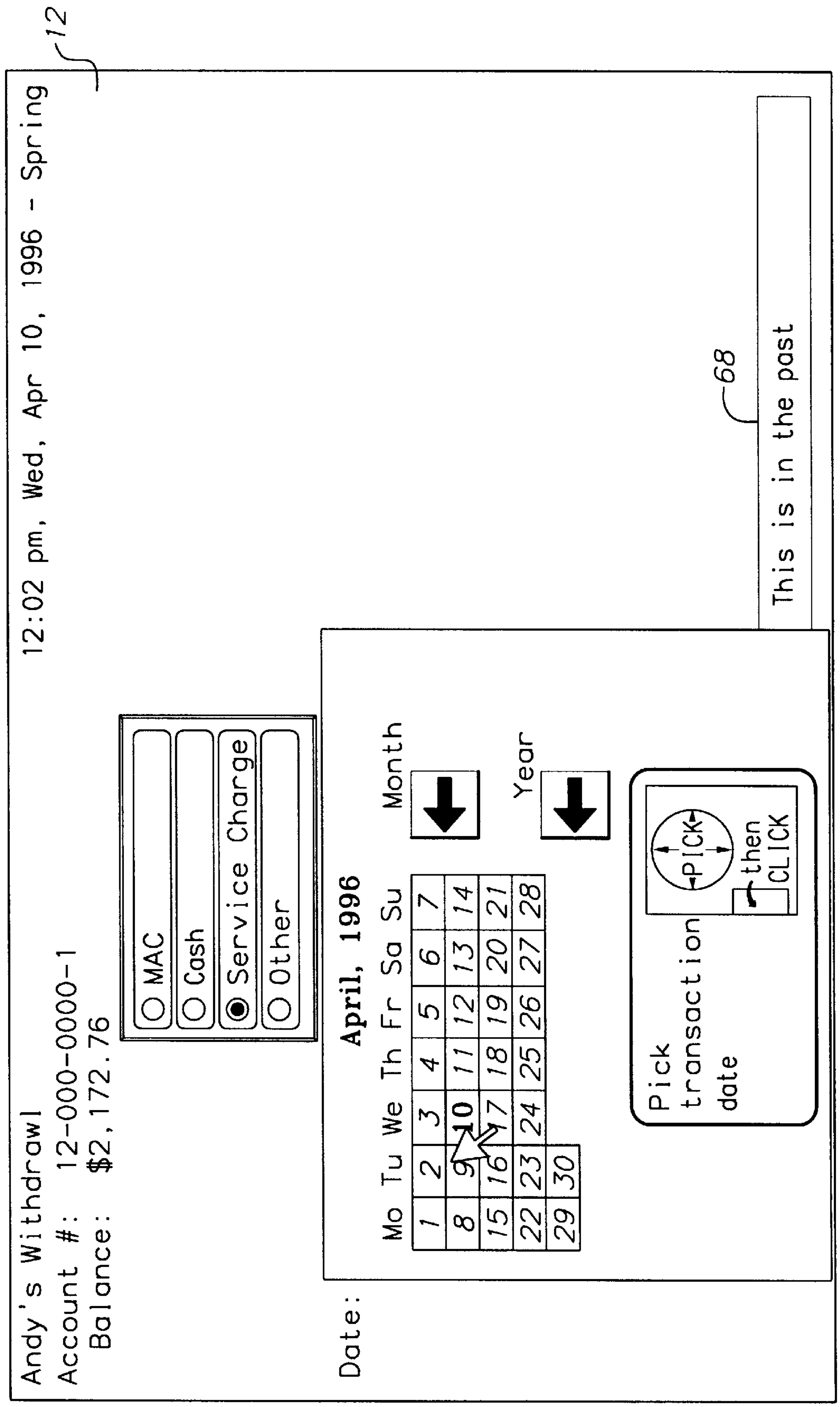
FIGS. 37–39 is the Withdrawal subfunction of the Checking Ledger.
Figure 38:
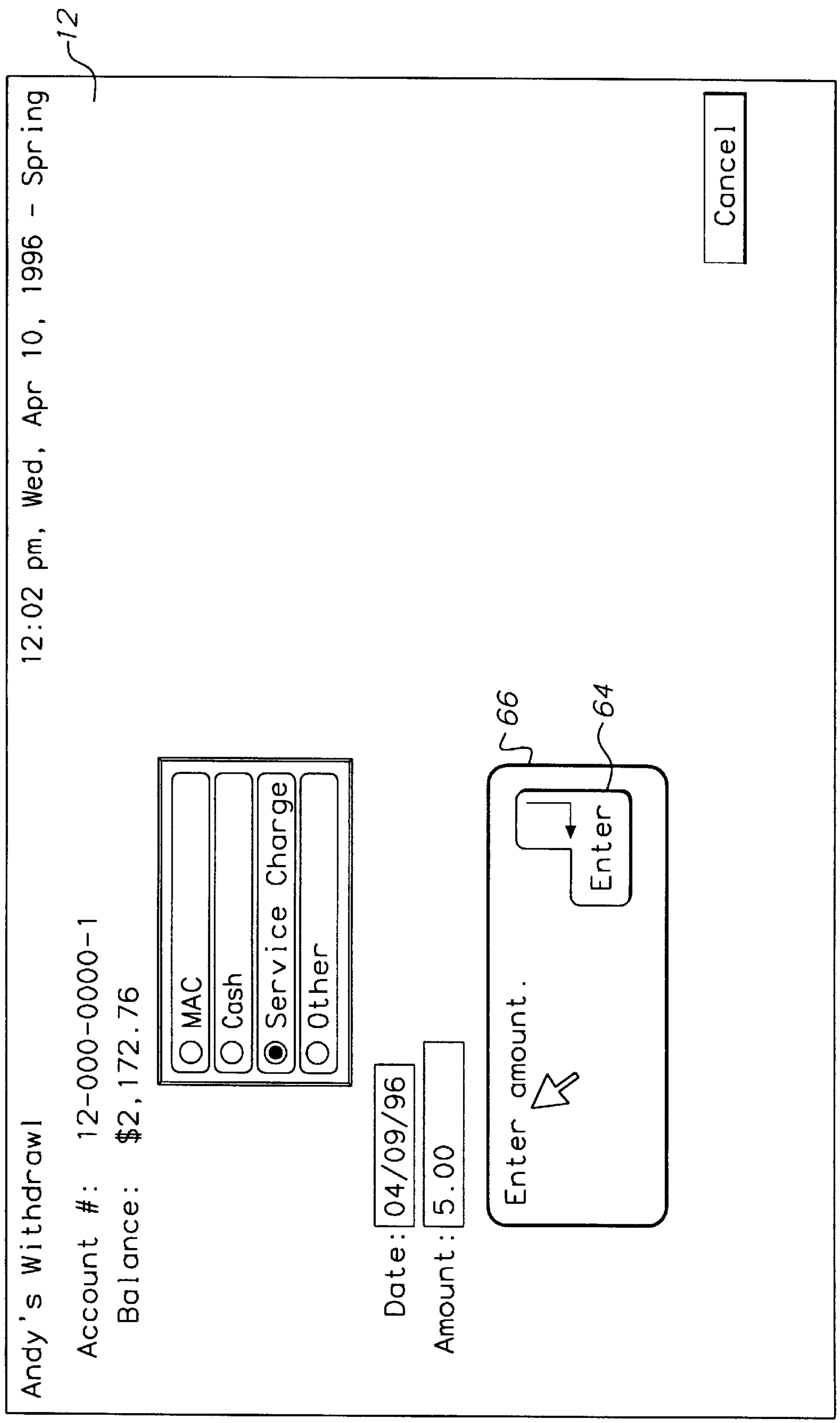
Figure 39:
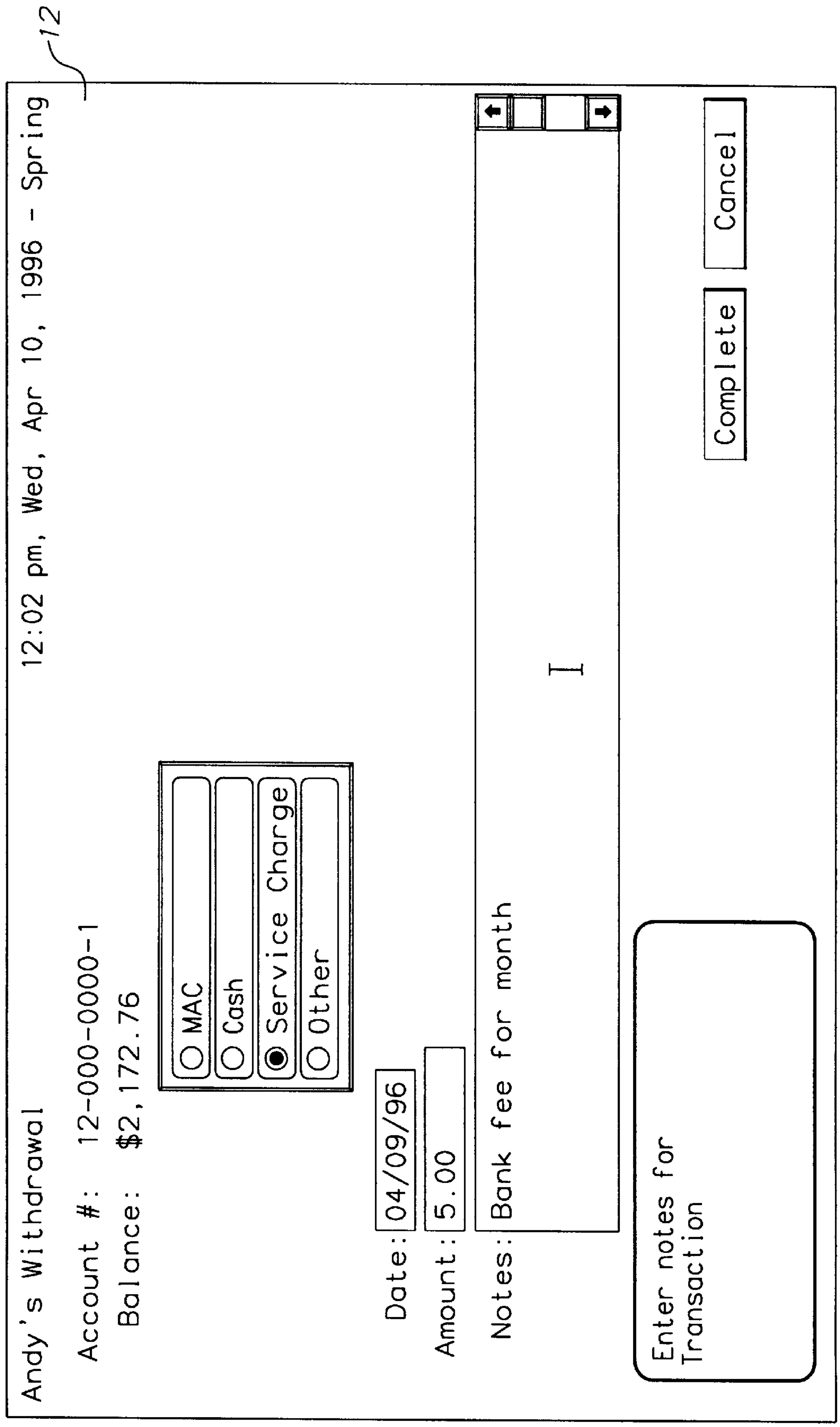

FIGS. 37–39 depict the selection of the "Withdraw" subfunction button and the screen displayed for entry of a withdraw due to a service charge rather than a withdraw by check, as previously discussed.

Figure 39A:
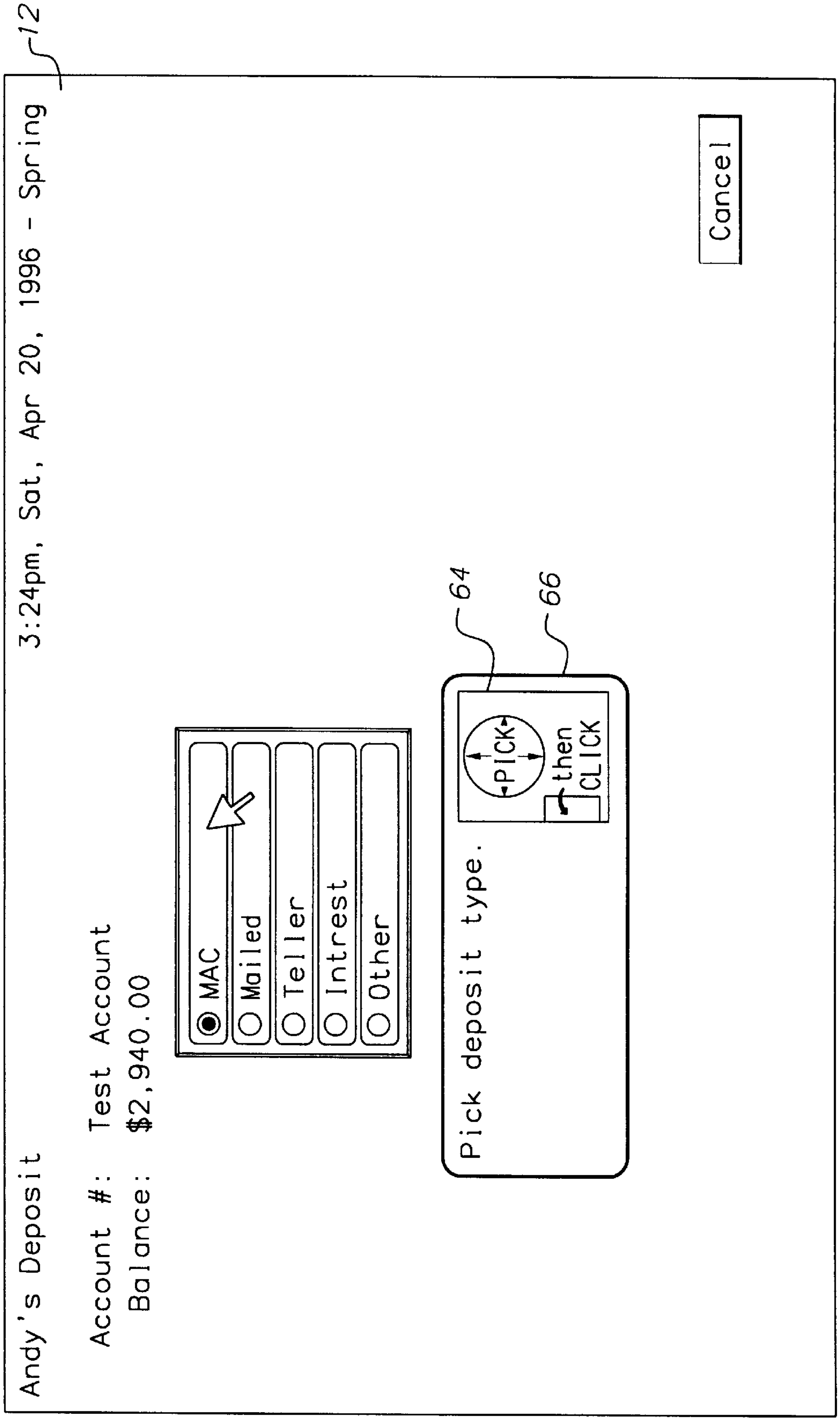
FIGS. 39A–39D is the Deposit subfunction of the Checking Ledger.
Figure 39B:
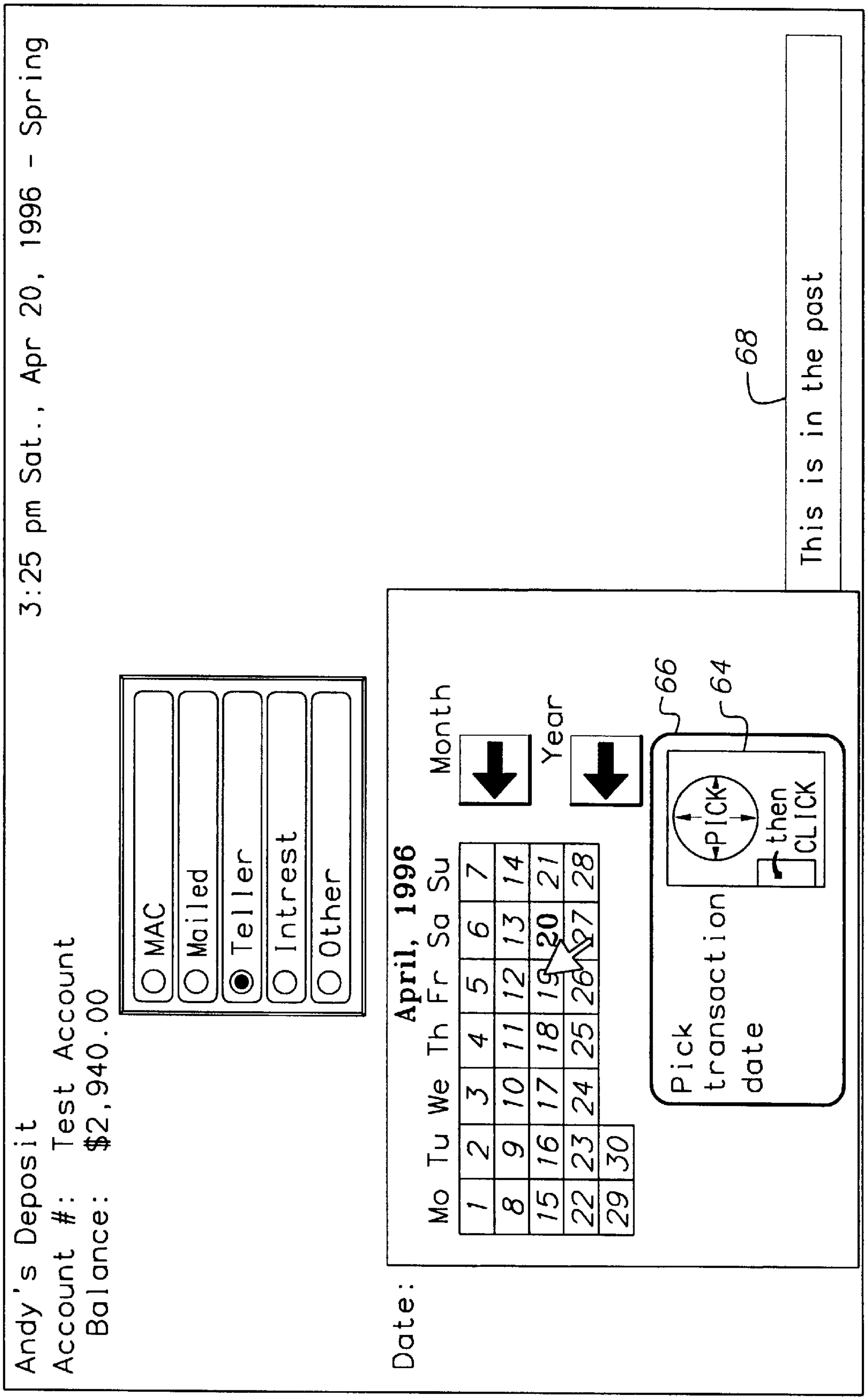
Figure 39C:
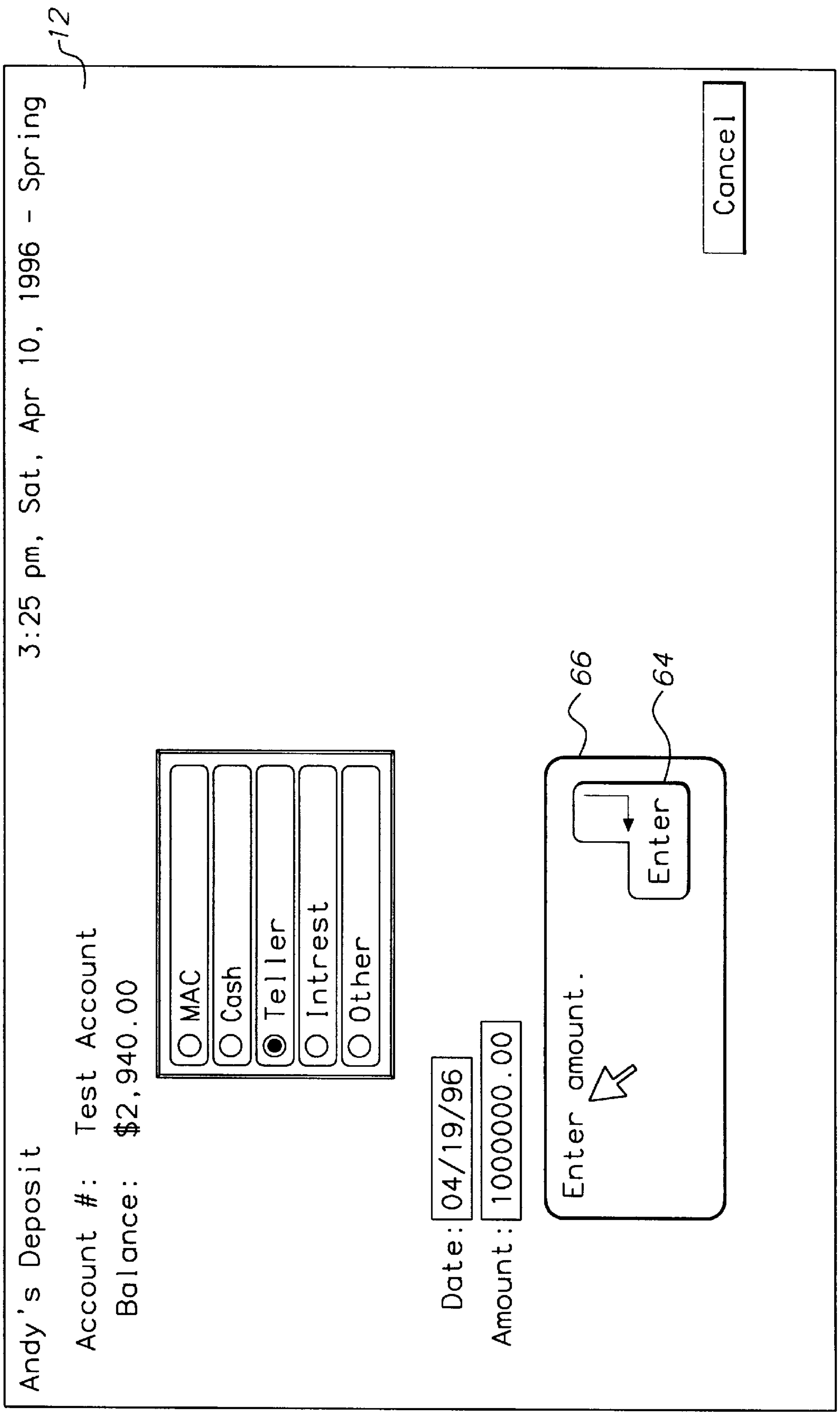
Figure 39D:
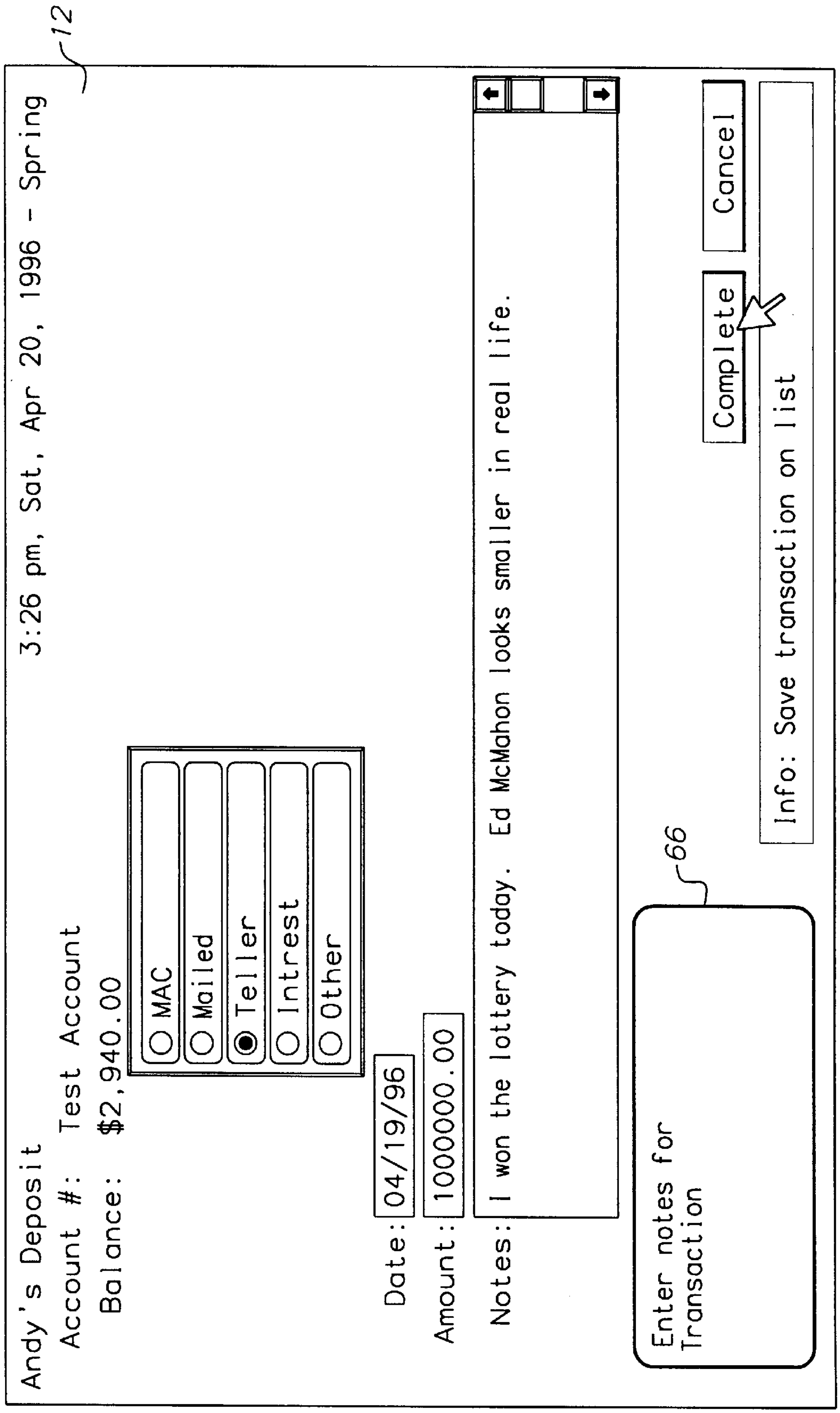

To make a deposit, the user points/clicks on the "Deposit" subfunction button (FIG. 27) and enters a first Deposit screen (FIG. 39A), with account number and balance at the top. A display of radio buttons offers a selection of deposit types including: MAC; Mailed; Teller; Interest; Other. After the user points/clicks on the deposit type, a Calendar screen (FIG. 39B) appears (with future days in a dull color, past weekdays in a white color, and past weekends in bright color, e.g., magenta), with instructions to "Pick transaction date". The user can only point to Present and Past transactions and, as such, the future dates are blanked out. The pointer is automatically positioned on the current date (i.e., the date as it appears in the upper right of the screen display 12), which is visually distinct because of color. After selecting the appropriate date, the user is automatically brought to the next screen (FIG. 39C), which instructs the user to "Enter Amount" in an "Amount" field. If no amount is entered and the "Enter" key is pressed, the "Amount must be greater than zero" message appears. The user must type in a monetary amount; if no decimal is manually entered by the user, hitting the "Enter" key automatically inserts a decimal point with zero change (e.g., $##.00). The next screen (FIG. 39D) includes a "Notes" field, as in the check writing section, with the message to "Enter notes for transaction" for entering notes related to the deposit. As discussed previously, "Complete" and "Cancel" subfunction buttons are available at the bottom right of the screen. If the user selects the "Complete" button the deposit is recorded in the Checking Ledger (FIG. 27) and the user is returned to the Checking Ledger screen (FIG. 27). As discussed previously, selection of the "Cancel" subfunction button prevents entry of all previous data up to that point and returns the user to the Checking Ledger screen (FIG. 27).

Automatic deposits (e.g., a social security check-direct deposit) are set up in the Maintenance Menu 232, for the specific date, with record of the funding source. On the designated date the user receives a message indicating that an Automatic Deposit should have occurred. Upon attempting any checking transaction, the first screen indicates that a deposit has occurred and prompts the user to contact his bank, with the name and phone number of the bank contact person. When the deposit is confirmed, the user points/clicks the "Yes" subfunction button and the deposit is entered into the Checking Ledger (FIG. 27). If the "No" subfunction button is selected by the user, then the user is permitted to proceed into the Checking file folder 262 and a reminder cue re-occurs upon each subsequent entry into the Checking file folder 262 until the user indicates confirmation of the deposit.

As stated earlier, selection of the "Modify" subfunction in the Checking Ledger screen (FIG. 27) permits the user to change deposits and withdrawals only, but is not available for checks recorded in the Checking Ledger; this ensures that the user cannot modify any check already prepared and sent.

Selection of the "Void" subfunction in the Checking Ledger screen (FIG. 27) permits the user to void a transaction entry, that has not been previously voided. Once all of the associated data is displayed to the user (e.g., account #, account balance, check #, payee, date of check, amount of check and the notes associated with that check), the user is then asked if he/she wants to void the withdrawal by selecting either a Yes or No subfunction button. If the Yes subfunction button is selected, the user is returned to the Checking Ledger screen (FIG. 27) where all of the check data for that entry appears in italicized form in the Checking Ledger screen (FIG. 27). If the No subfunction button is selected, the user is returned to the Checking Ledger screen (FIG. 27) with the check entry intact.

Figure 40:
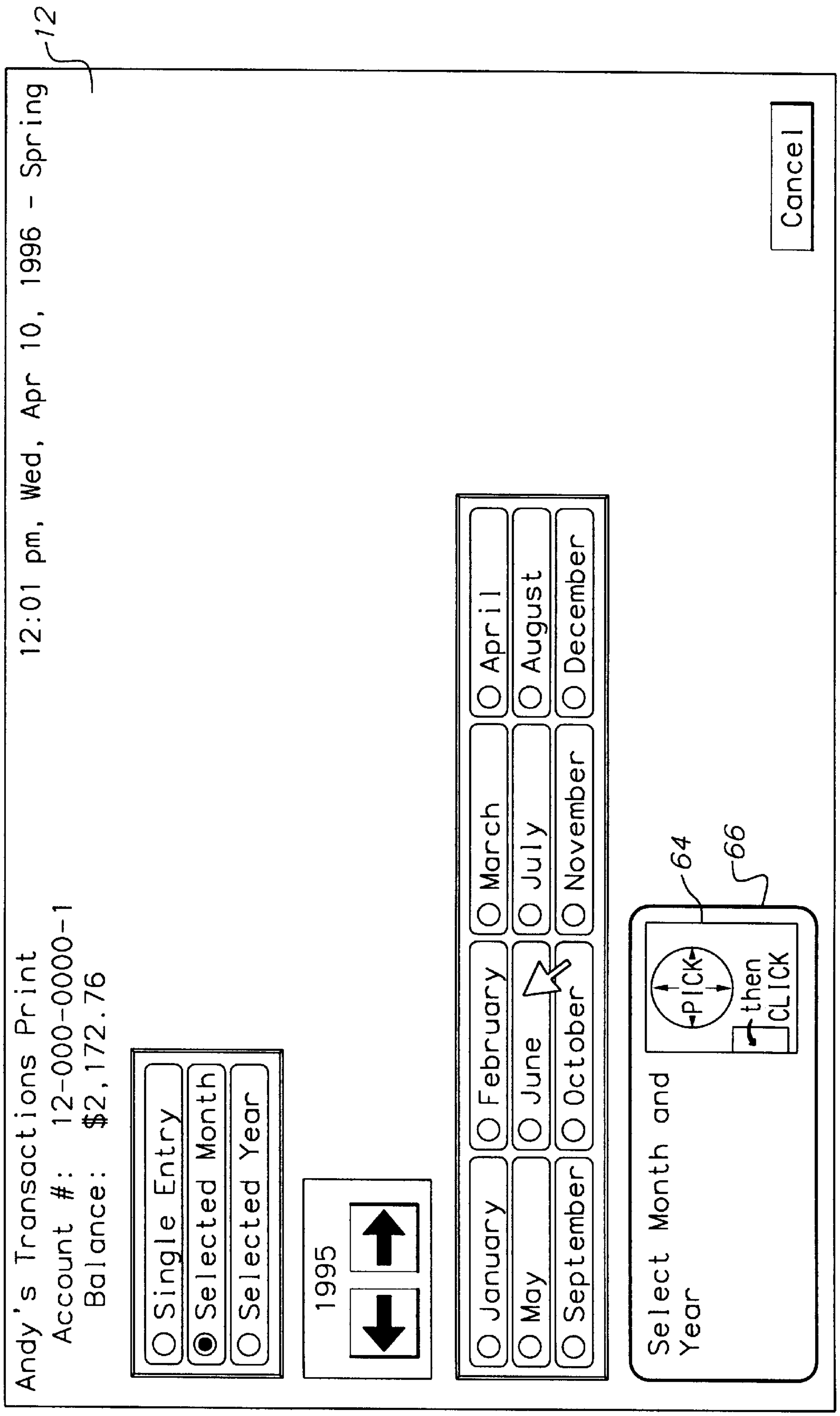
FIG. 40 is the Print subfunction of the Checking Ledger.

Selection of the "Print" subfunction in the Checking Ledger screen (FIG. 27) brings the user to a print control screen (FIG. 40) for generating a printout of transactions regarding the selected account for a particular time period requested by the user.

Figure 41:
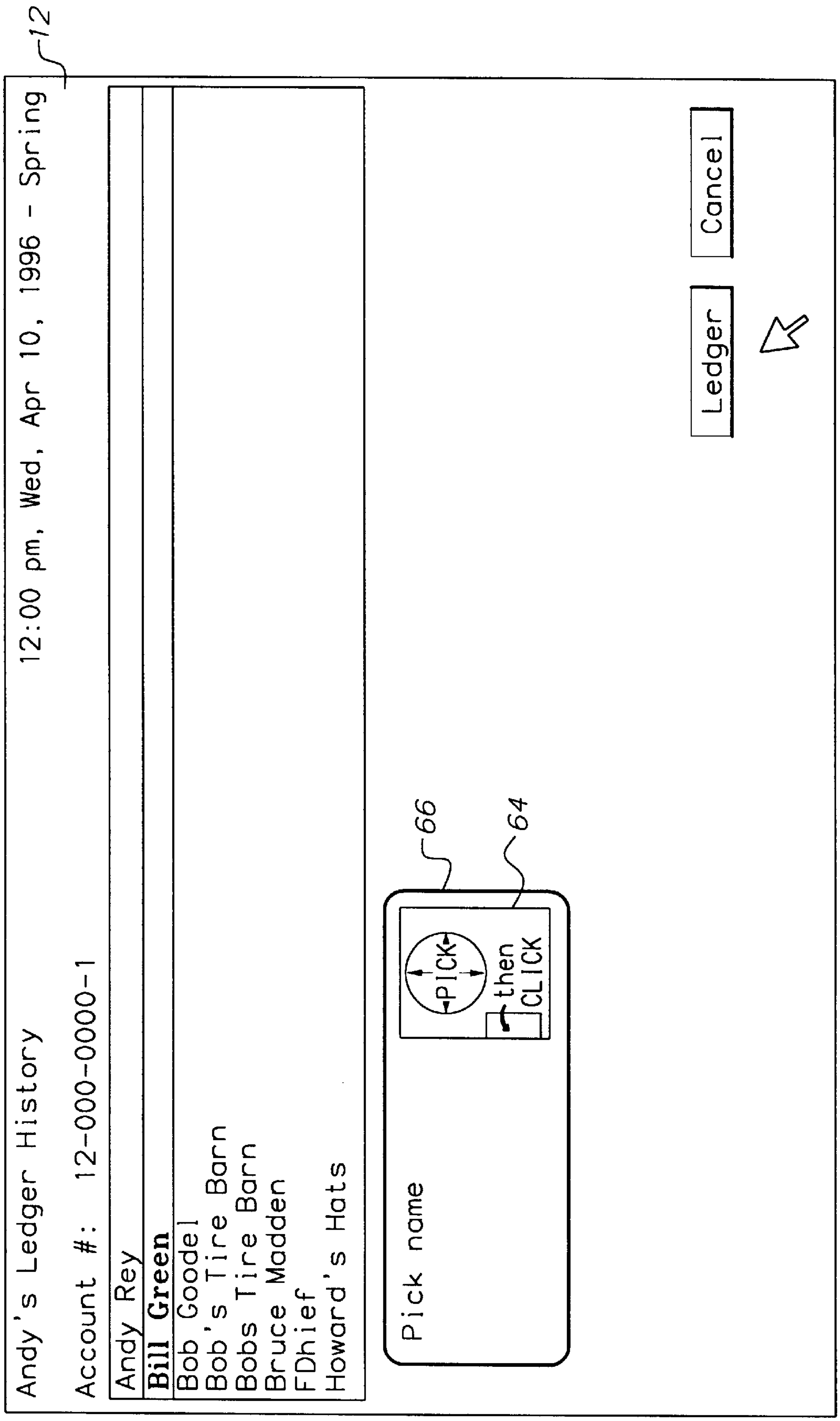
FIGS. 41–42 is the History subfunction of the Checking Ledger.
Figure 42:
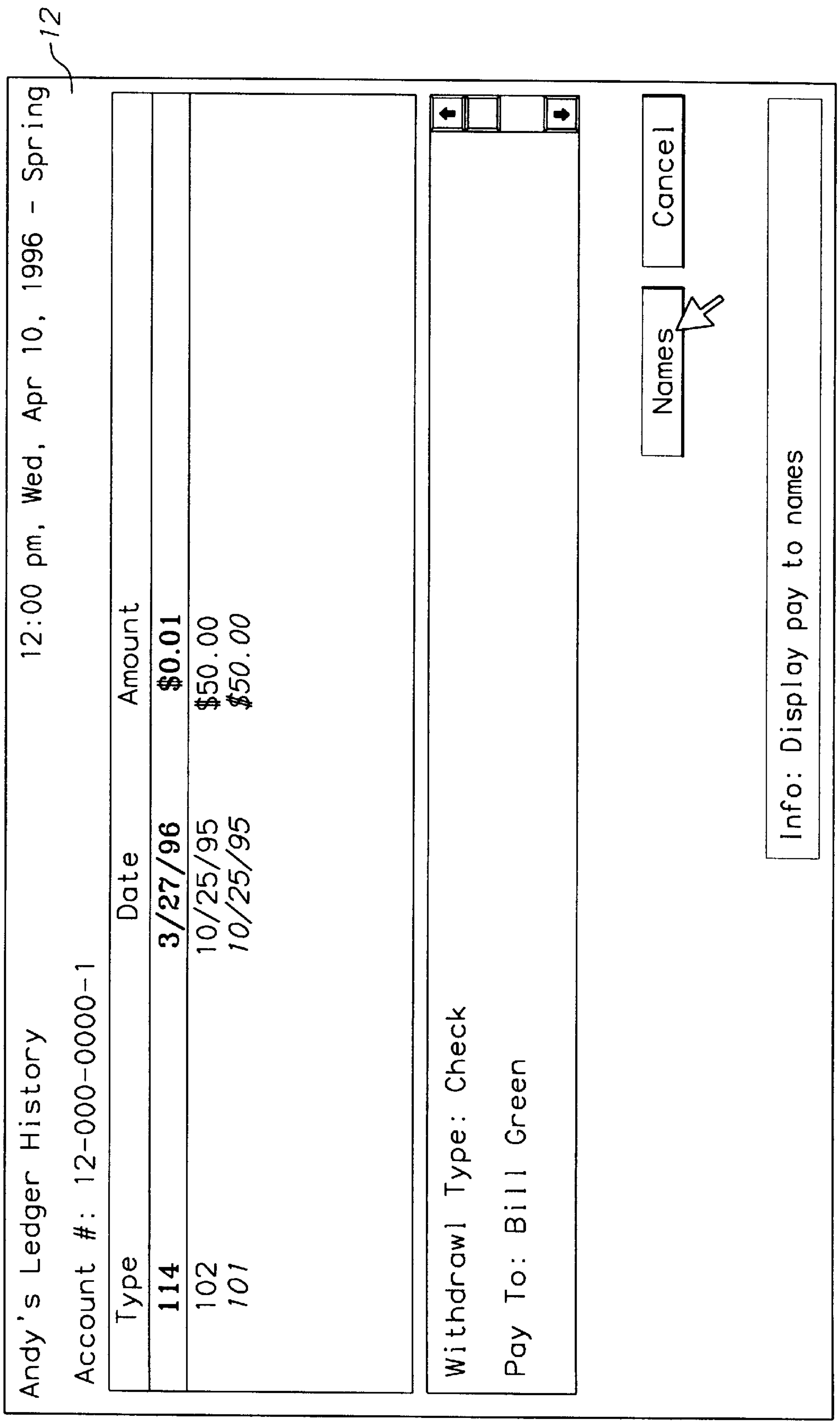

Selection of the "History" subfunction in the Checking Ledger screen (FIG. 27) brings the user to a screen (FIG. 41) comprising a list of payees (e.g., vendors who are listed in the Names file folder 238) of previous checks and instructing the user to select one of the listed names. Once the user selects a desired payee by highlighting that desired name, the user selects a View (presently "Ledger") subfunction button (FIG. 41), the user is brought to a payee ledger screen (FIG. 42) that lists all of the checks that the user has issued to that particular payee by date and amount. The user can return to the list of payees (FIG. 41) by selecting the Names subfunction button. The selection of the Cancel subfunction button in either of these screens (FIGS. 41 and 42) returns the user to the Checking Ledger screen (FIG. 27).

Figure 43:
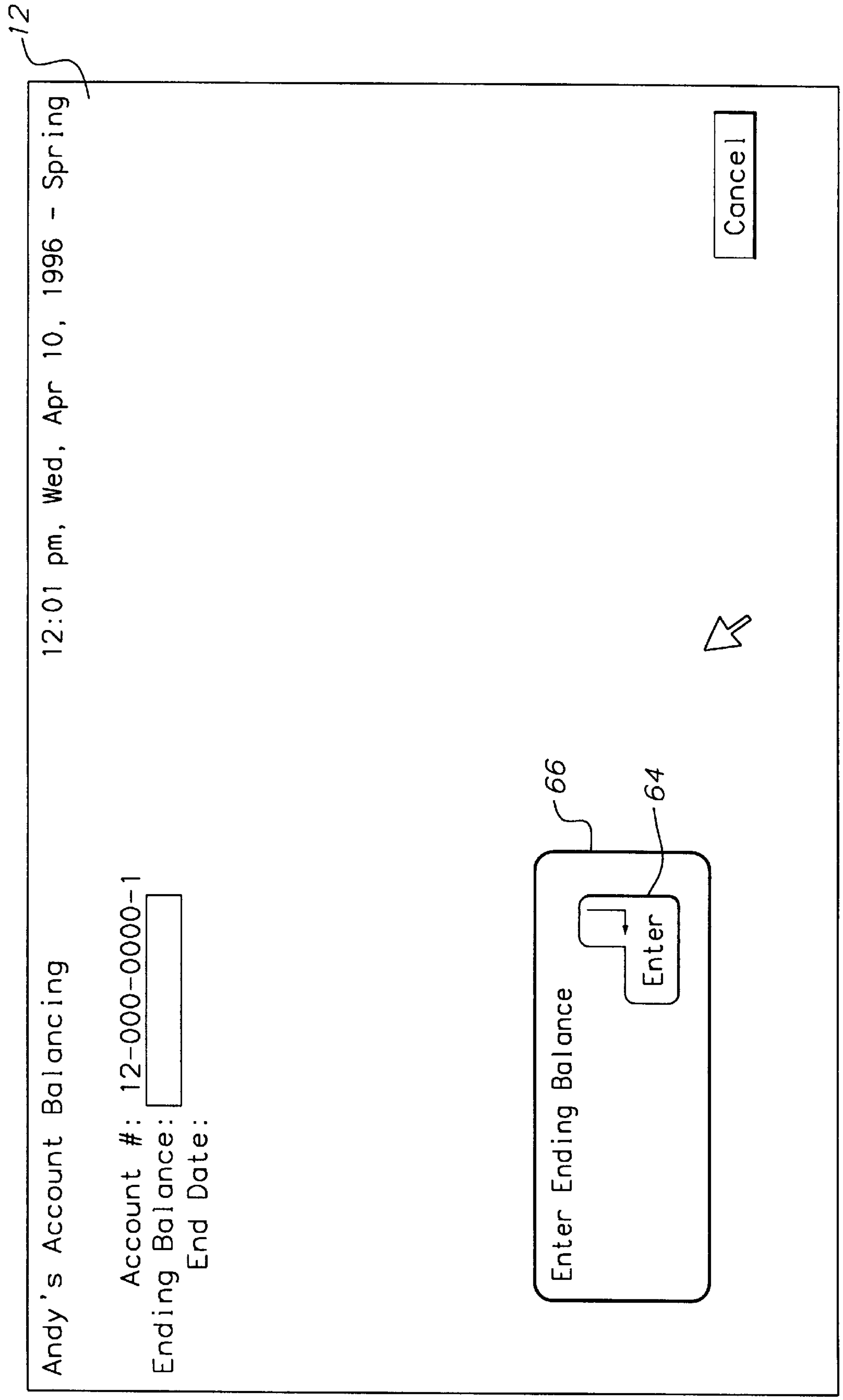
FIGS. 43–47 is the Balance subfunction of the Checking function.
Figure 44:
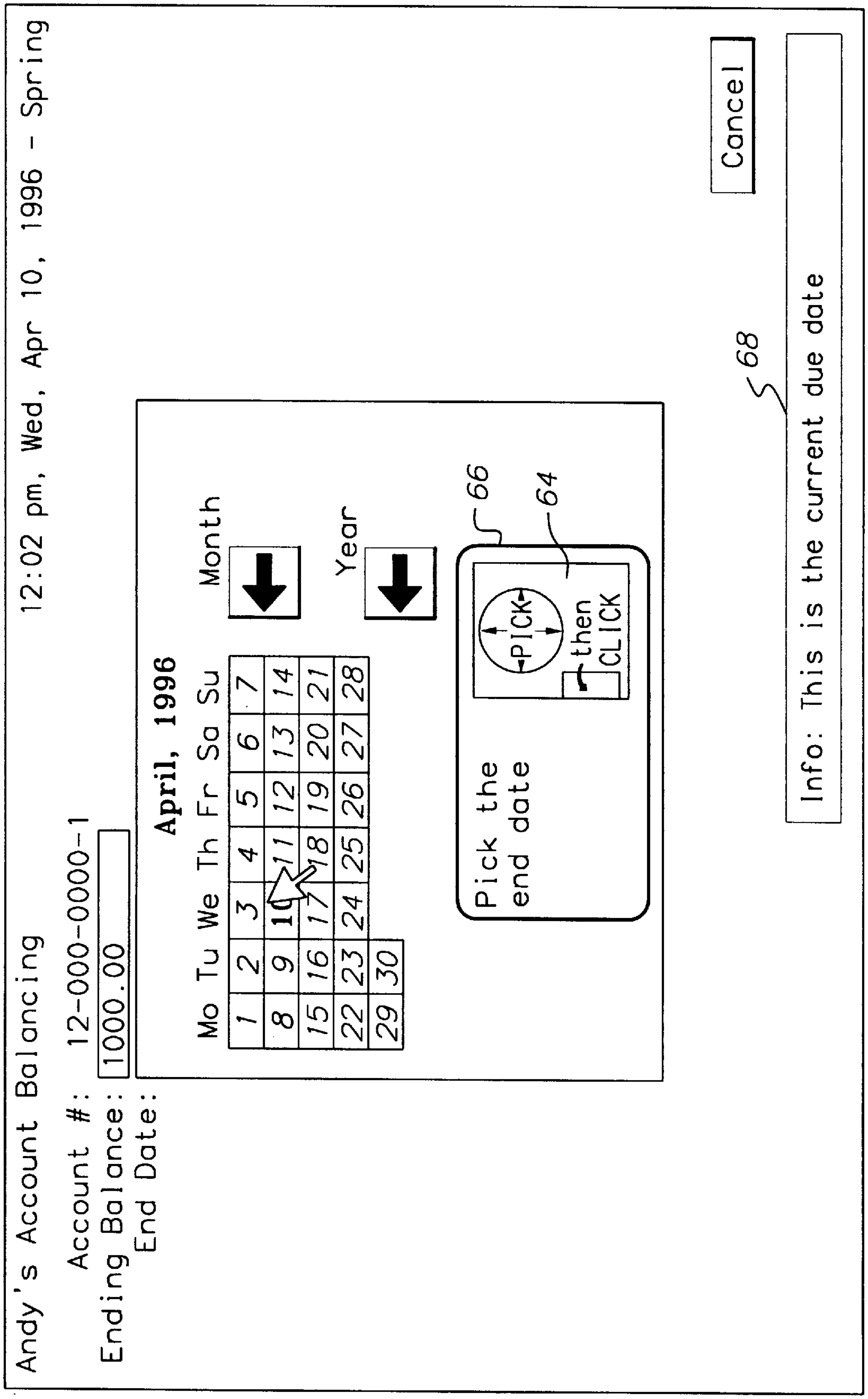
Figure 45:
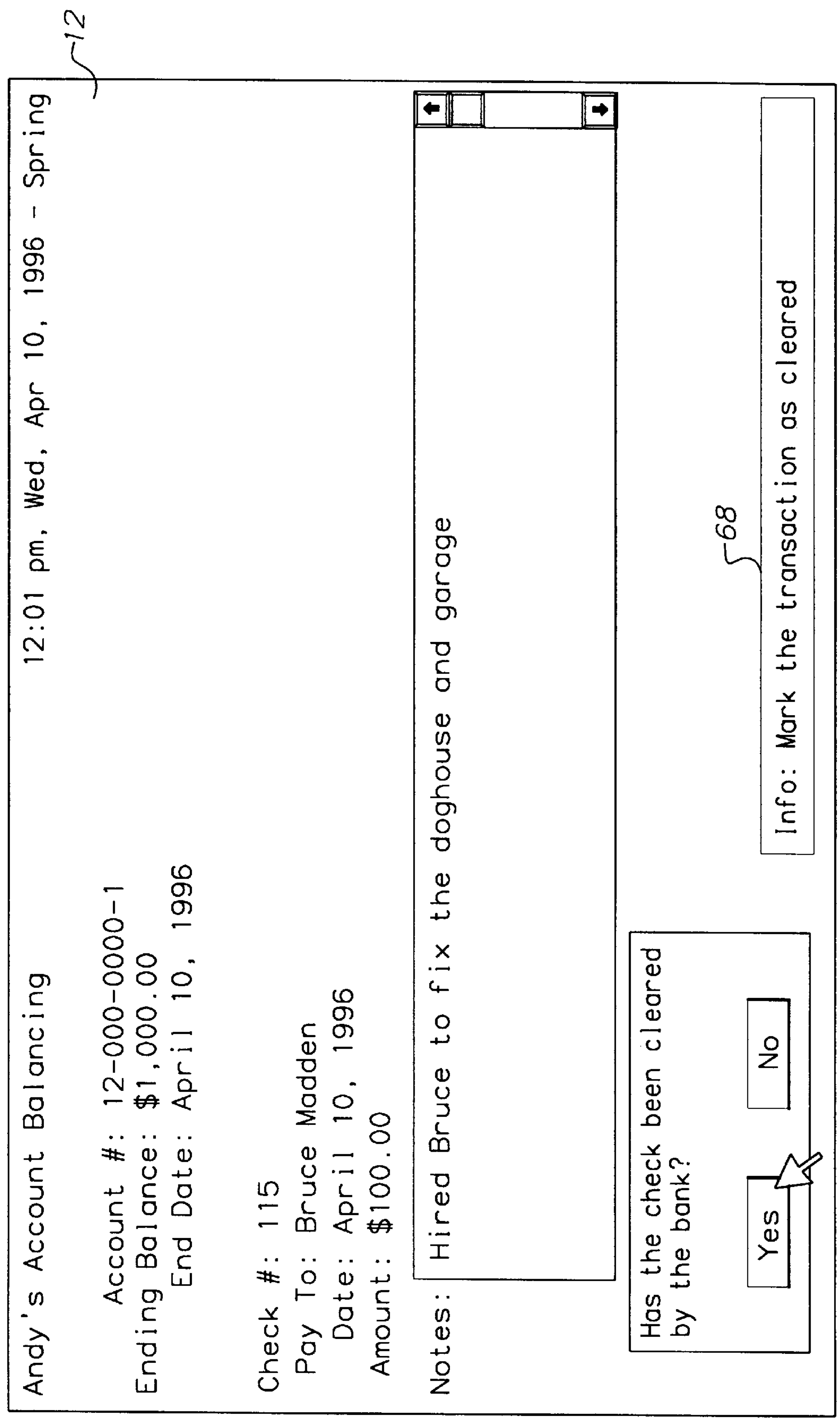
Figure 46:
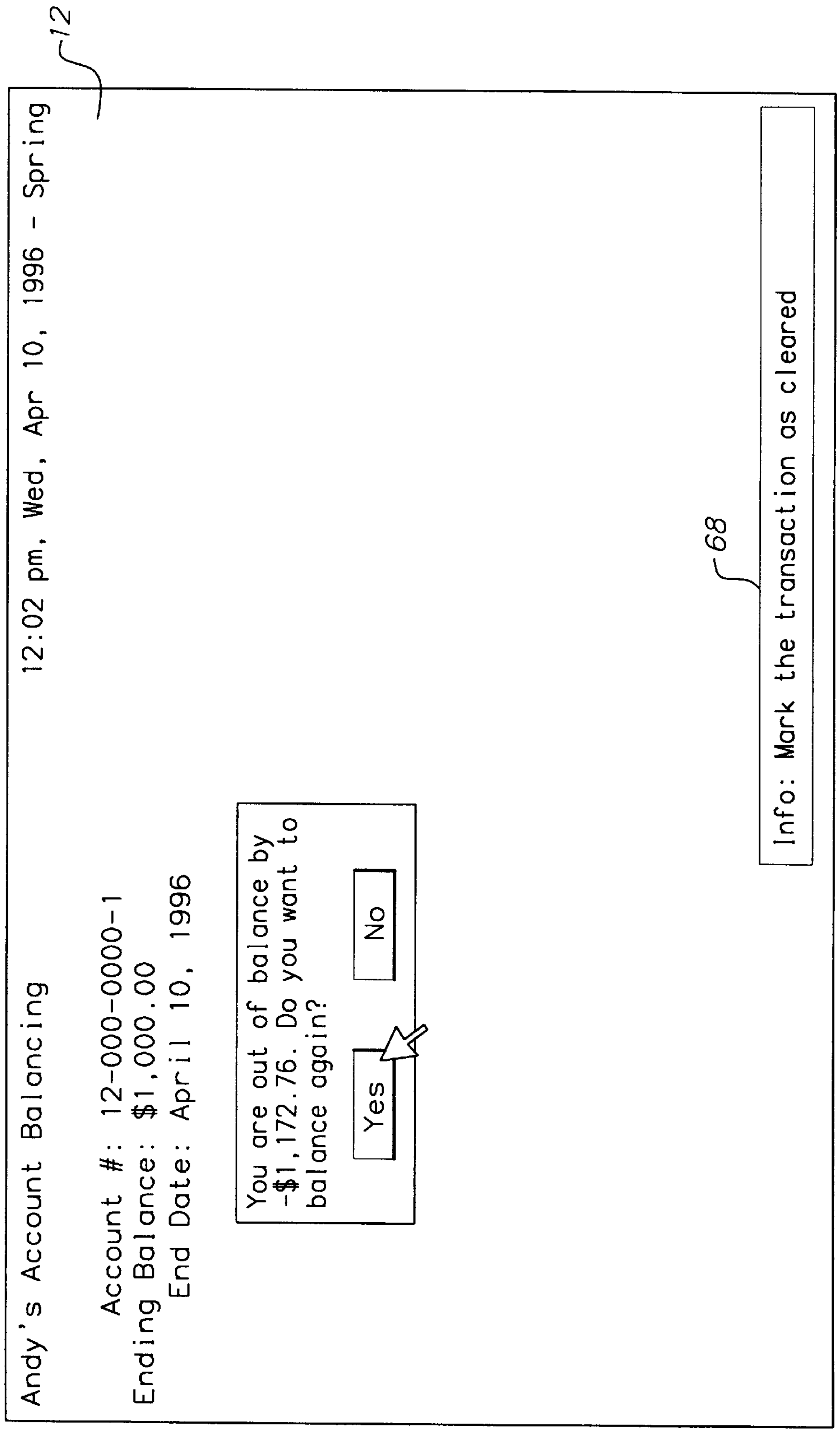

Selection of the "Balance" subfunction in the Checking Ledger screen (FIG. 27) provides a check-off system for cleared checks, as follows: a screen (FIG. 43) comes up with account number, balance and calendar (FIG. 44) with future dates appearing to the user as being dull in color to limit the user to only checks already drawn; the user is then instructed to select an end date for account balancing; next, a screen is displayed which contains the account number, the balance, the end date, check number, vendor paid, date of check, amount of check and memo note (Fig. 44). In a red box below the memo field, the user is then asked whether the check has been cleared by the bank and is required to select either a "Yes" or "No" subfunction button. If the "Yes" subfunction button is selected, the cleared check is listed in the Checking Ledger (FIG. 27); if the "No" subfunction button is selected, the subject check is not listed in the Checking Ledger (FIG. 27). The next check entry automatically comes onto the screen and the "Yes/No" process proceeds until there are no more checks in the targeted time interval. If an out-of-balance determination is made by the Balance subfunction, the user is informed of the out-of-balance amount as shown in FIG. 46; the user is then asked if he/she wants to re-do the balance. If the user chooses not to re-balance, the user is brought to another screen (FIG. 47) which instructs him/her to contact their respective support person. If a balanced account is achieved, then the user is informed that "All open transactions have been viewed" and must confirm this by pointing/clicking on the "Continue" subfunction button. Selecting the "Continue" button returns the user to the Checking Ledger (FIG. 27). This version of the "Balance" module is hereinafter known as the basic version of Balance.

Figure 47:
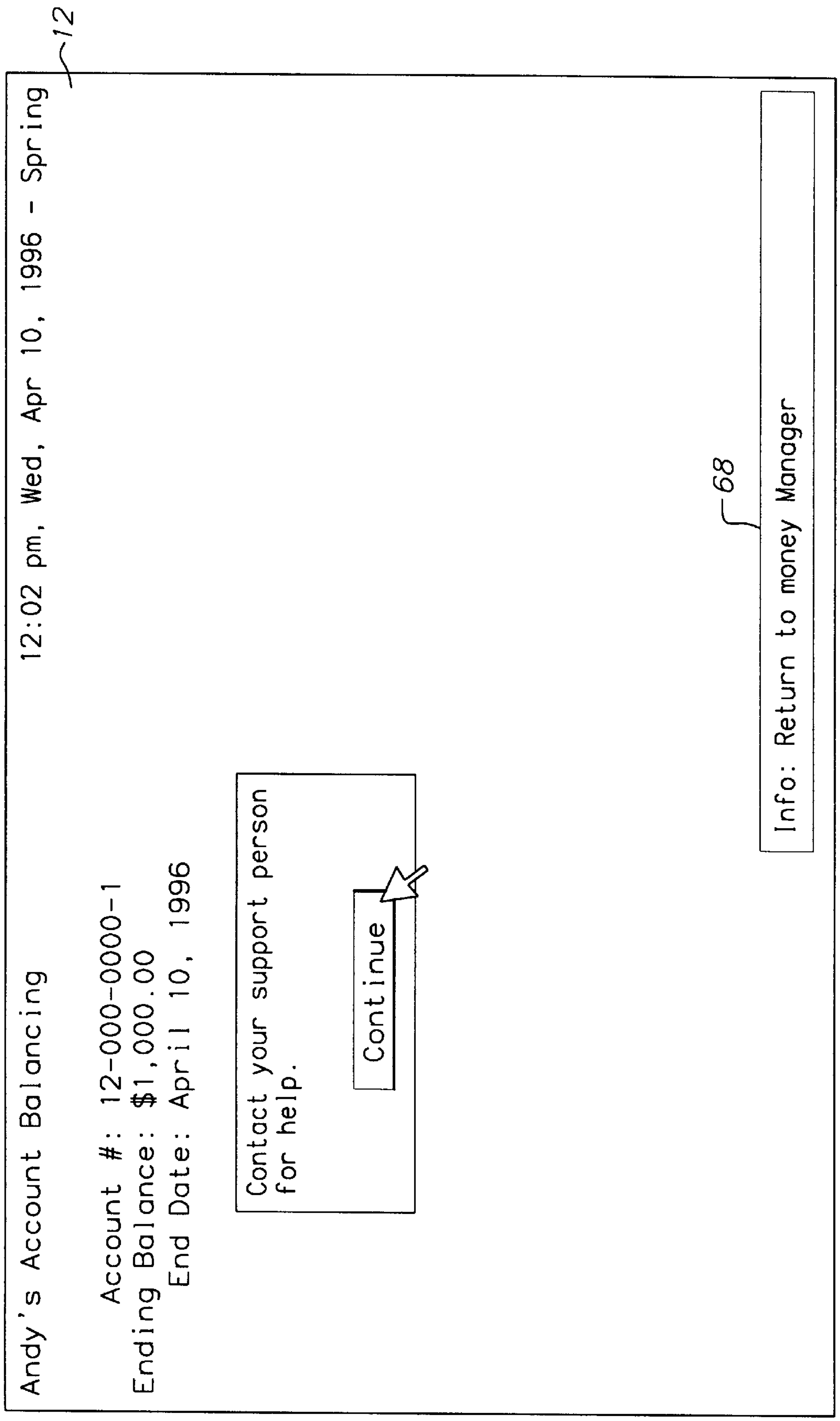

An alternative Balance module (hereinafter known as the reconciliation version of Balance) comprises a more complete method of reconciling the account. In particular, the user checks off cleared checks and is then stepped through the same process for confirming deposits, and for entering interest and bank charges. When all entries within the designated time are completed, the user is given a message that the account is balanced, accompanied by a musical cue or auditory tone (e.g., first measure of Hallelujah Chorus; old mechanical cash register sound). If the reconciliation is not successful, the user is offered the opportunity to retry. If the user decides to retry, the process is repeated from the very first step. If the user decides not to retry, he is instructed to contact his clinician/support person for user assistance (FIG. 47). In the Maintenance Menu 232 the clinicians are able to select either the basic version of the Balance module or the more extensive reconciliation version. The clinicians may choose to begin with the basic version and then progress to the reconciliation version, as an intervention strategy.

It should be noted that a Balance Reminder prompt 263 appears on the Main Menu (FIG. 4) whenever an checking account has not been balanced by the user within a predetermined time (e.g., 30 days). The prompt informs the user of the particular checking account number. The secondary user programs this prompt via the Maintenance Menu 232.

Figure 48:
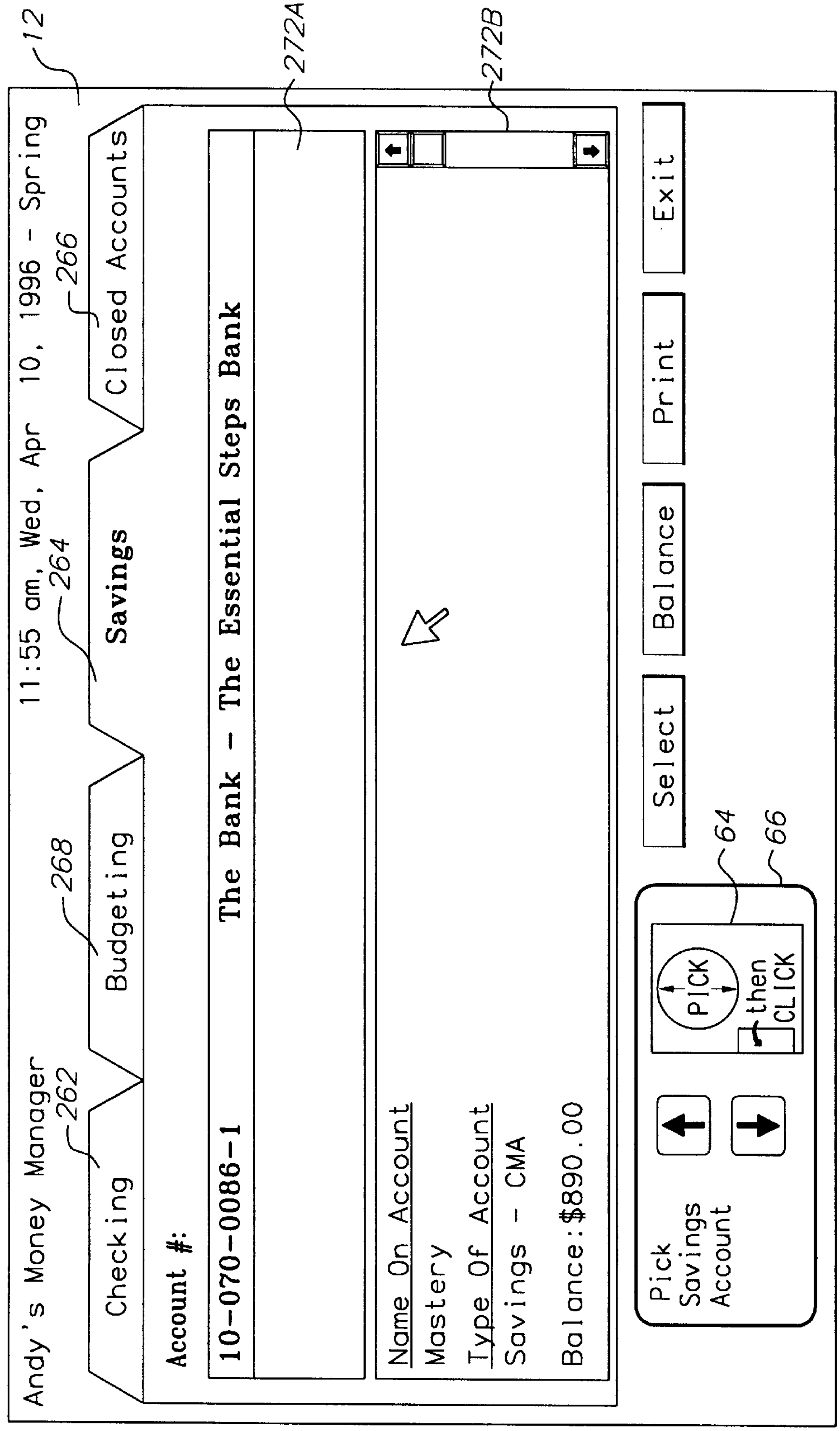
FIG. 48 is the Savings function of the Money Manager.

The Savings file folder 264, shown in FIG. 48, comprises an upper portion 272A and a lower portion 272B. The upper portion 272A comprises a list of bank(s) where savings accounts exist for the user; the bank data are entered via the Maintenance Menu 232 by the secondary user. The lower portion 272B comprises a list of the name(s) on the account, the type of account (e.g., Primary Savings) and the available balance. All of these particulars are entered by the secondary user through the Maintenance Menu 232, except for the balance which is provided by the Savings function software for the running account. The subfunction buttons available in the Savings file folder 264 are: "Select", "Balance", "Print" and "Exit".

Figure 49:
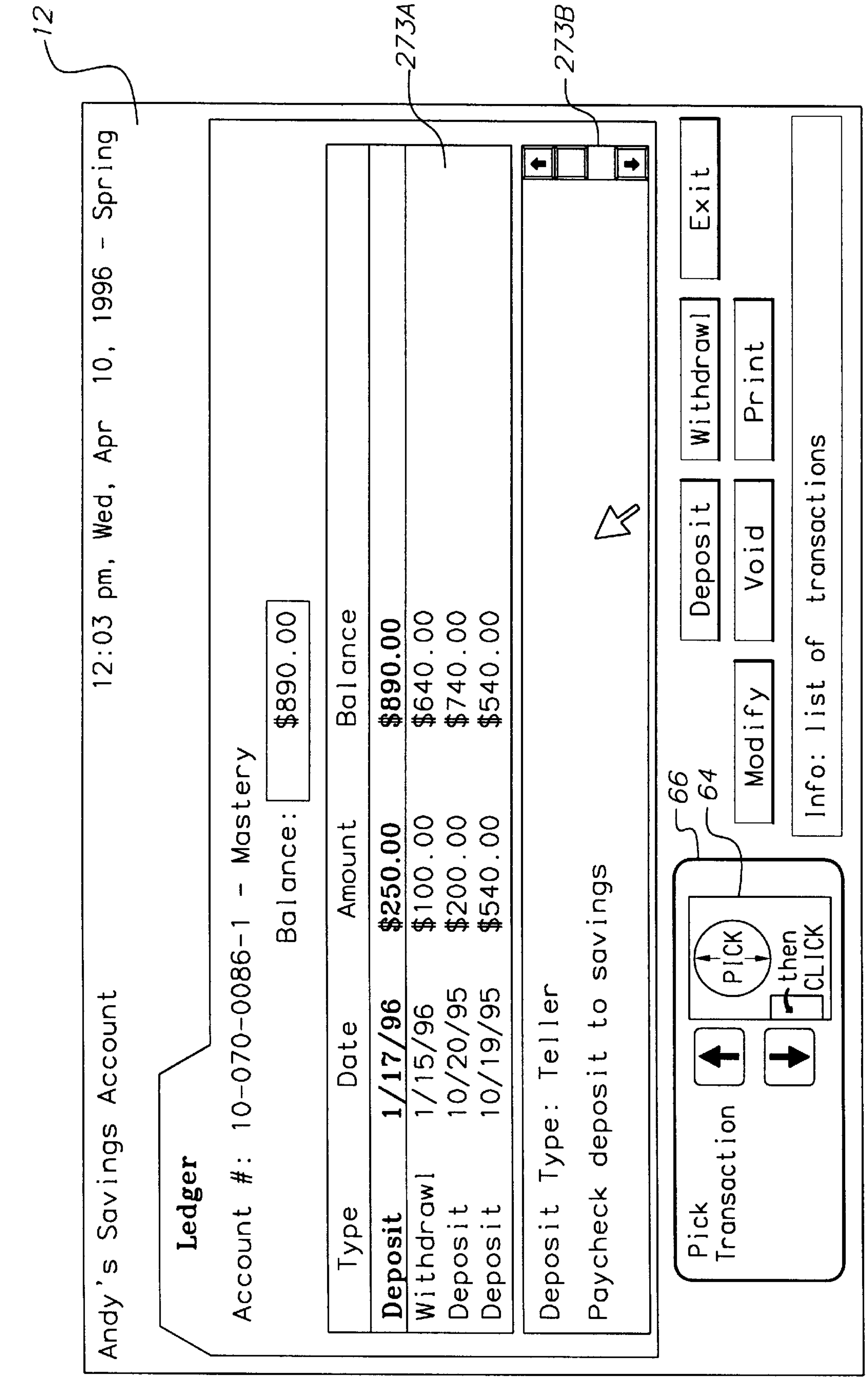
FIG. 49 is the Savings Ledger.

To perform any savings transaction, the user points/clicks on the bank account in the upper portion 272A (as instructed by the message in the instruction box 66), and then points/clicks on the "Select" subfunction button. Activation of the "Select" subfunction causes a savings Ledger (FIG. 49) screen to be displayed. The Savings Ledger screen (FIG. 49) also comprises an upper portion 273A and a lower portion 273B. The upper portion 273A displays the account number, running balance, and a chart of transactions organized chronologically, with the most recent being at the top. Information in the first column concerns the type of transaction that occurred, whether it was a deposit, withdrawal (e.g., service charge). The second column displays the transaction date while the third column displays the amount involved in the transaction. The account balance is displayed in the fourth column. The lower portion 273B in the Savings Ledger display (FIG. 49) contains information about the type of transaction, e.g., Withdraw or Deposit, and a memo written by the user regarding the transaction. For example, if a deposit was previously made, the lower portion 273B displays information that a deposit was made by MAC, Mail, Teller, Interest or Other and also includes a memo regarding that deposit. If a withdraw was previously made, the lower portion 273B displays that a withdraw was made by MAC, Cash, Service Charge or Other.

Figure 50:
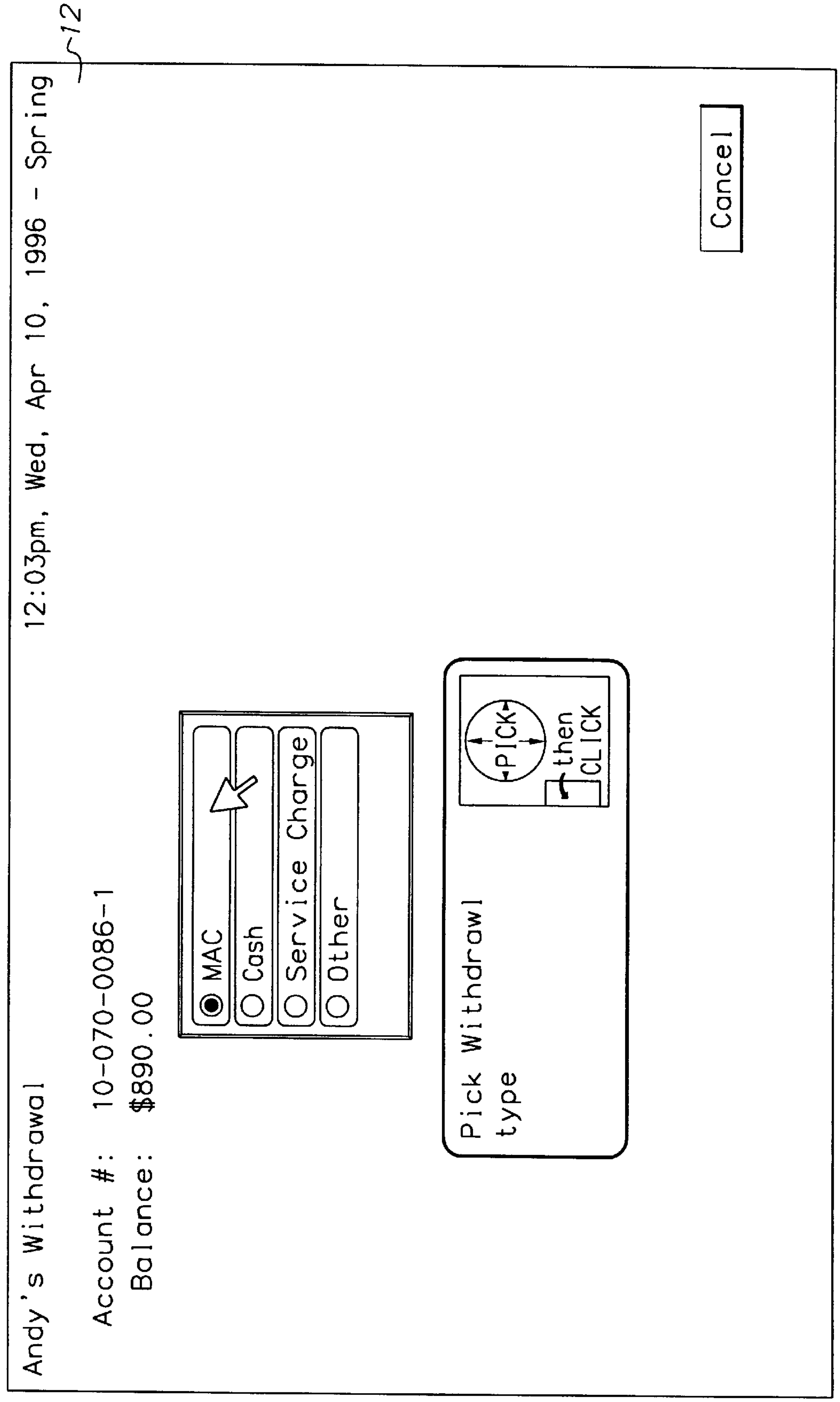
FIGS. 50–52 is the Withdrawal subfunction of the Savings Ledger.
Figure 51:
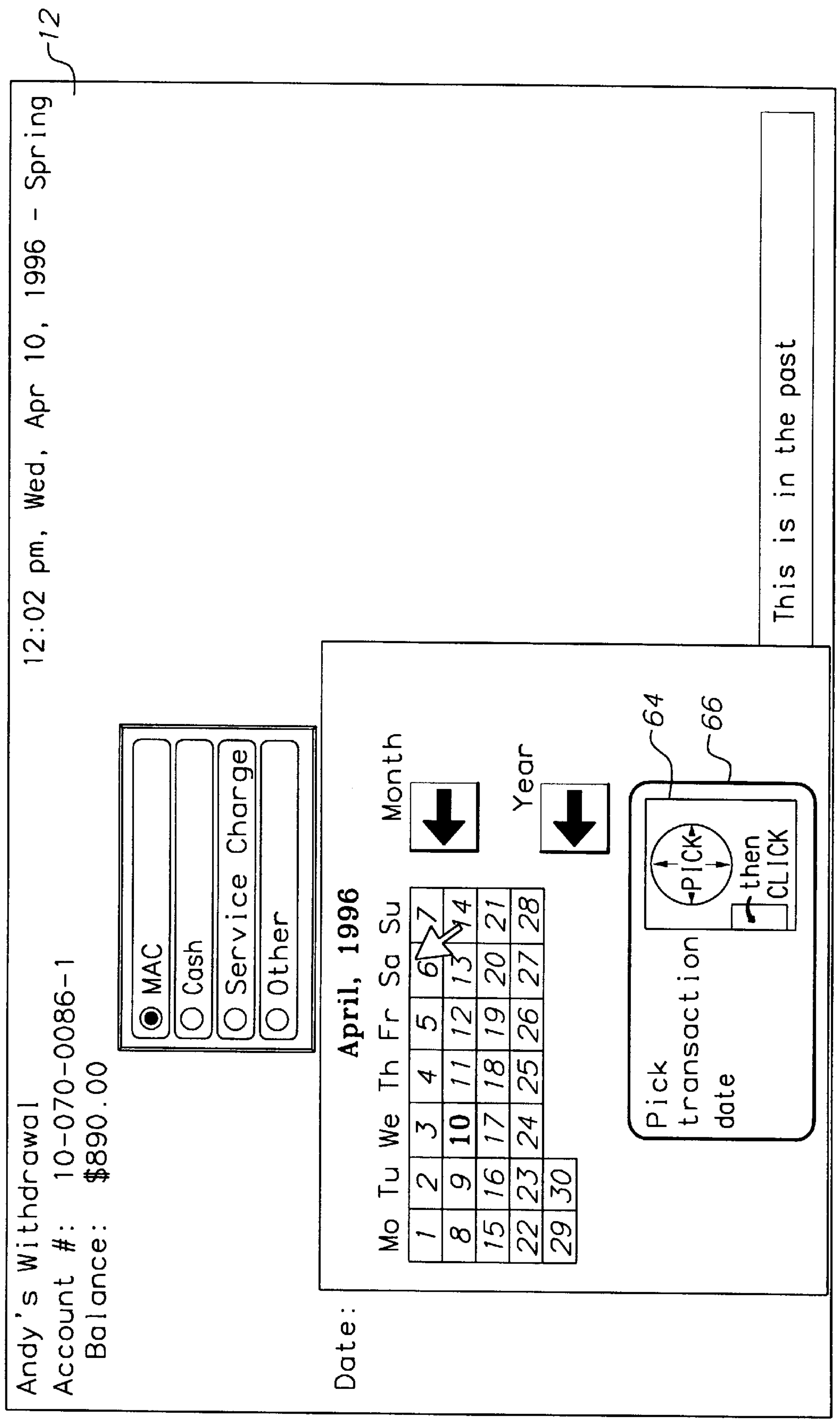
Figure 52:
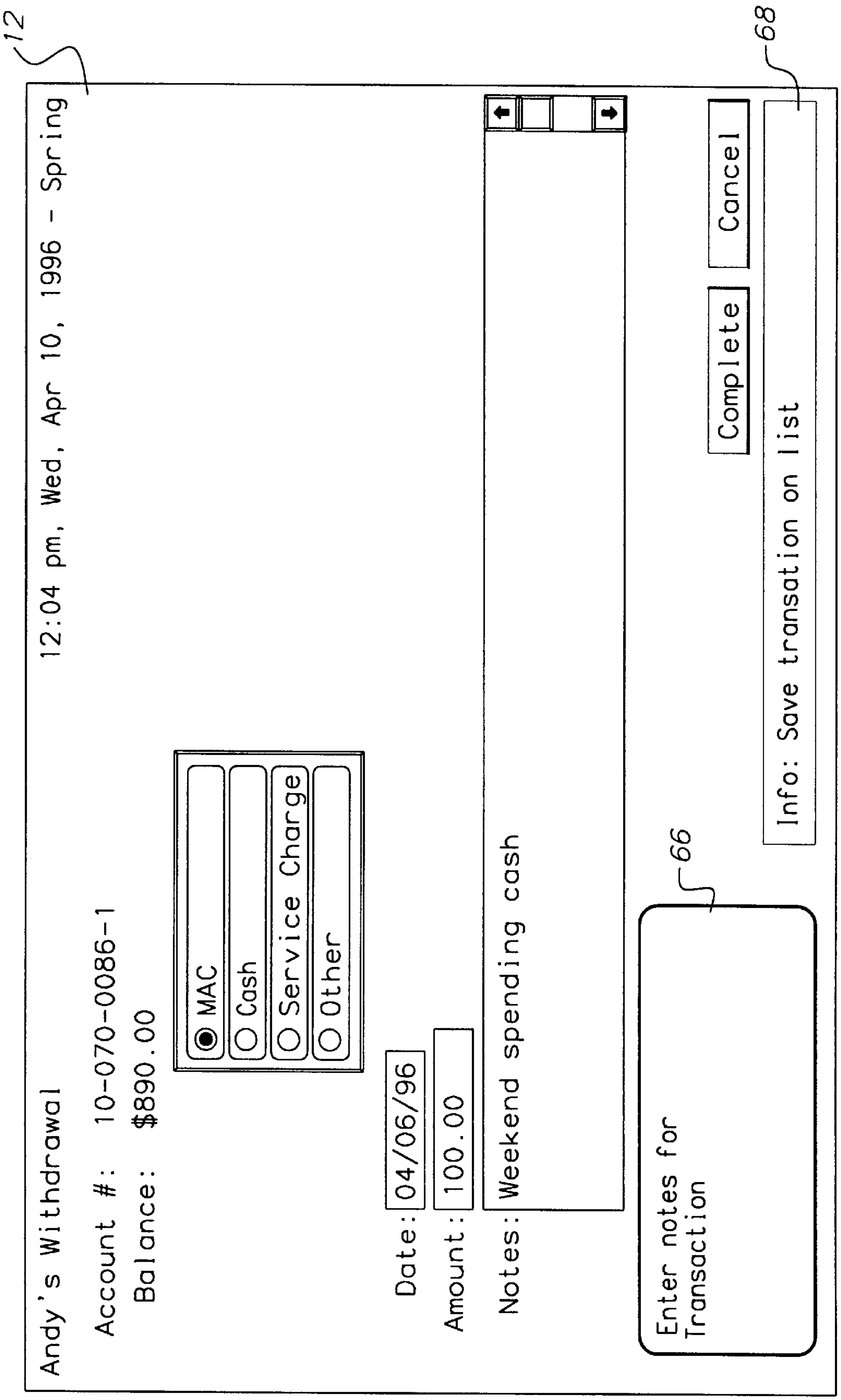

The Savings Ledger display (FIG. 49) includes the following subfunctions at the bottom of the screen: "Deposit", "Withdrawal", "Modify", "Void" "Print" and "Exit". It should be noted that selection of the Exit subfunction button in the Savings Ledger screen returns the user to the Savings file folder 264. FIGS. 50–52 depict the selection of the "Withdraw" subfunction button and the screen displayed for entry of a withdraw due to a service charge, as previously discussed.

Selection of the "Print" subfunction in the Savings Ledger screen (FIG. 49) operates similar to the "Print" subfunction for the Checking Ledger (FIG. 40) to generate a printout of a the selected savings account's transactions over a user-requested period of time.

Selection of the "Modify" and "Void" subfunction buttons permit the user to correct ("Modify") or cancel ("Void") any deposit or withdrawal except for any deposit or withdrawal that has been previously voided.

Figure 53:
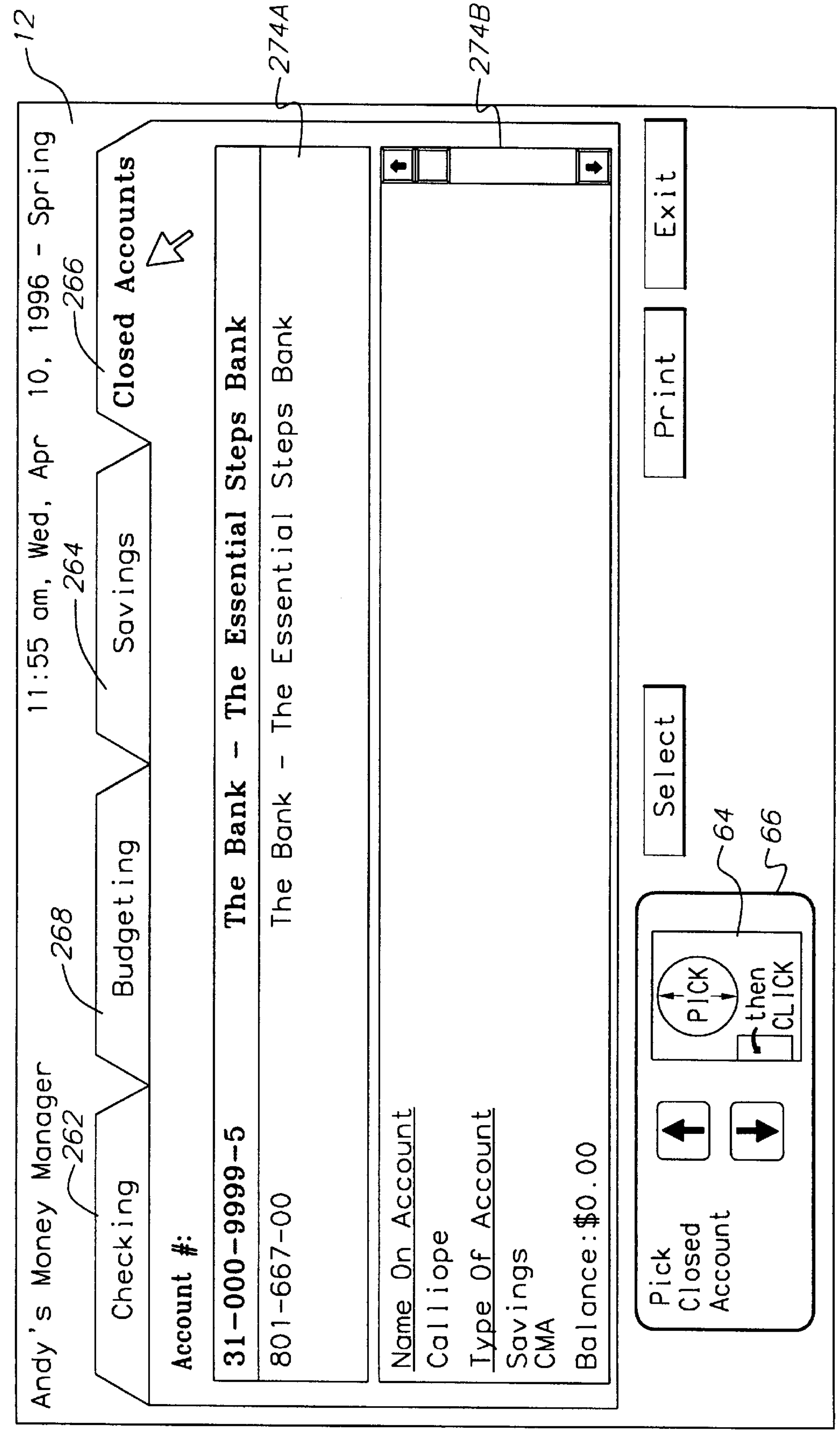
FIG. 53 is the Closed Accounts function.
Figure 53A:
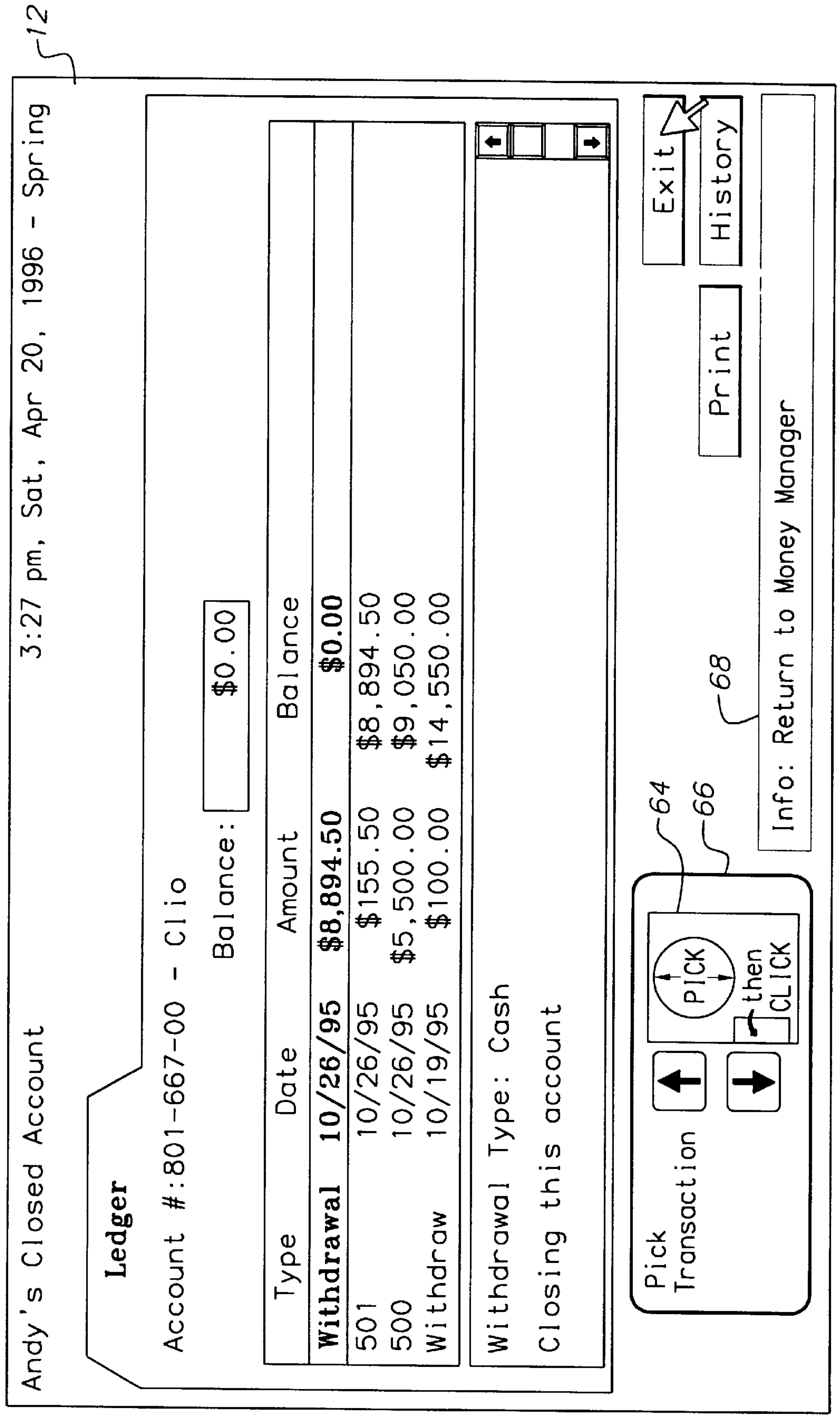
FIG. 53A is the Closed Checking Accounts Ledger.
Figure 53B:
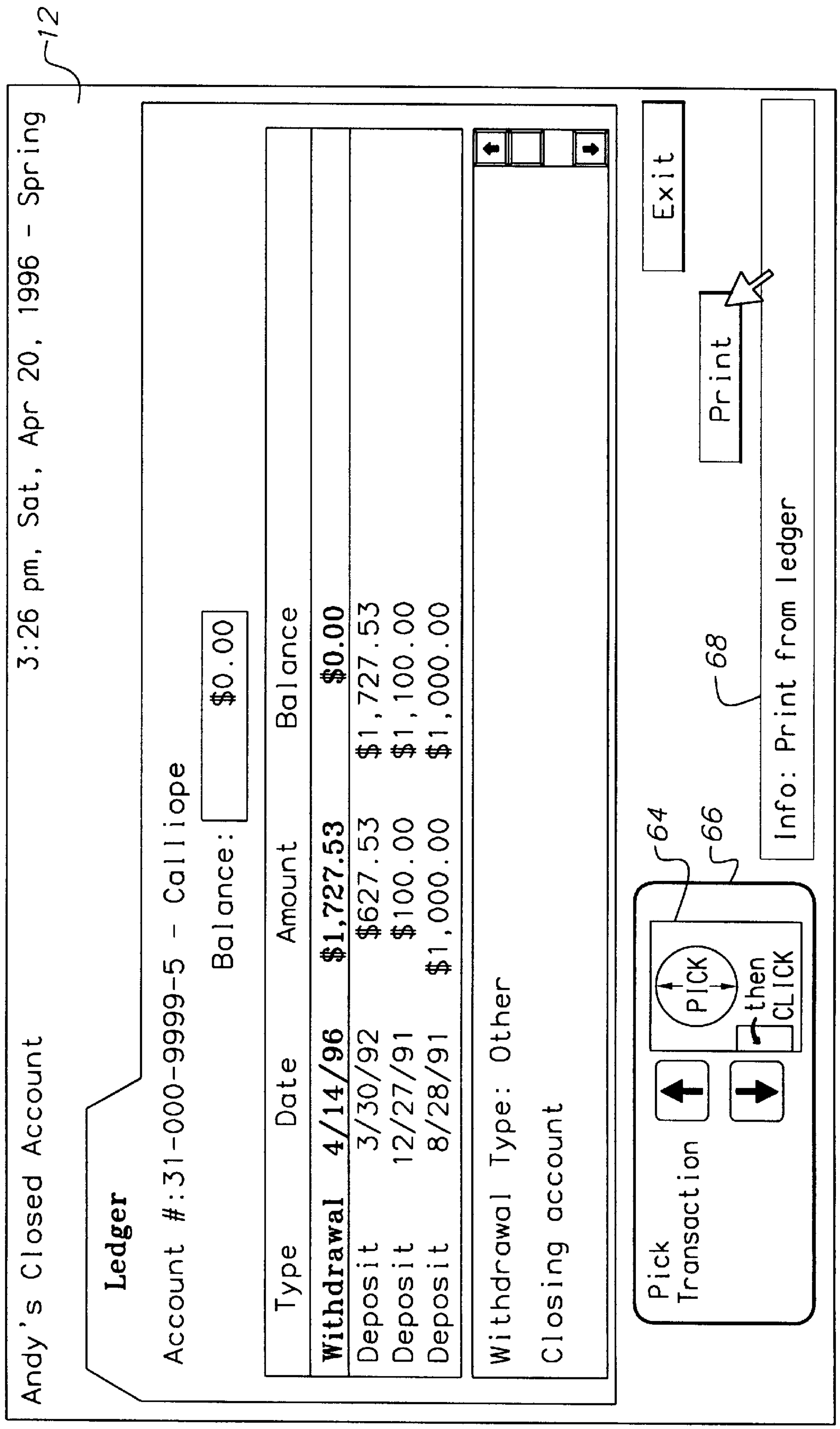
FIG. 53B is the Closed Savings Accounts Ledger.

The "Closed Accounts" file folder 266, as shown in FIG. 53, also comprises a upper portion 274A and a lower portion 274B. The upper portion 274A comprises a list of bank(s) where closed checkings and savings accounts existed for the user. The Closed Accounts file folder 266 is a file folder where closed bank accounts (checking and savings) are archived. This is accomplished through the Maintenance Menu 232. Archived accounts can be reviewed and printed on a Closed Account Ledger (e.g., a Closed Checking Account Ledger FIG. 53A and a Closed Savings Account Ledger FIG. 53B), but no changes to any of the archived account entries is permitted. In fact, the only subfunction buttons available in the Closed Accounts file folder 266 are: "Select", "Print" and "Exit". Selecting the "Select" button brings the user to either the Closed Checking Account Ledger (FIG. 53A) or the Closed Savings Account Ledger (FIG. 53B). Both of these ledgers have only "Print" and "Exit" subfunction buttons; only the Closed Checking Account Ledger has a "History" subfunction button which is similar to the "History" subfunction described previously with regard to the Checking Ledger (FIG. 41). Selecting the "Print" button in the Closed Accounts Ledger provides the user with a printout of the selected archived account; selecting the "Exit" button in the Closed Accounts Ledger brings the user back to the Closed Accounts file folder 266 (FIG. 53).

The "Budgeting" file folder 268 is the last file folder of the Money Manager 224. The "Budgeting" file folder 268 is a relational data base which is set up in the Maintenance Menu 232 by the therapist, who labels categories for budgeting, assigns amounts for each category in relation to a selected time framework (e.g., $350.00/months for food; $2000.00/year for Christmas) and specifies any vendors where the expenditures are specific to the budgeted area (e.g., ACME for food). In the Budgeting file folder 268 appears a listing of the categories and displays the available balance for the month. The displayed balance, generally available in the Checking file folder 262, has the budgeted amounts already deducted. In addition, the budget balance for a particular category is displayed when the user selects a vendor from that category in the Checking file folder 262. Although a person can always write a check as if the name were not on a vendor on the directory list, there must be a conscious decision to "get around" the structure and support of the Budgeting file folder 268.

Figure 54:
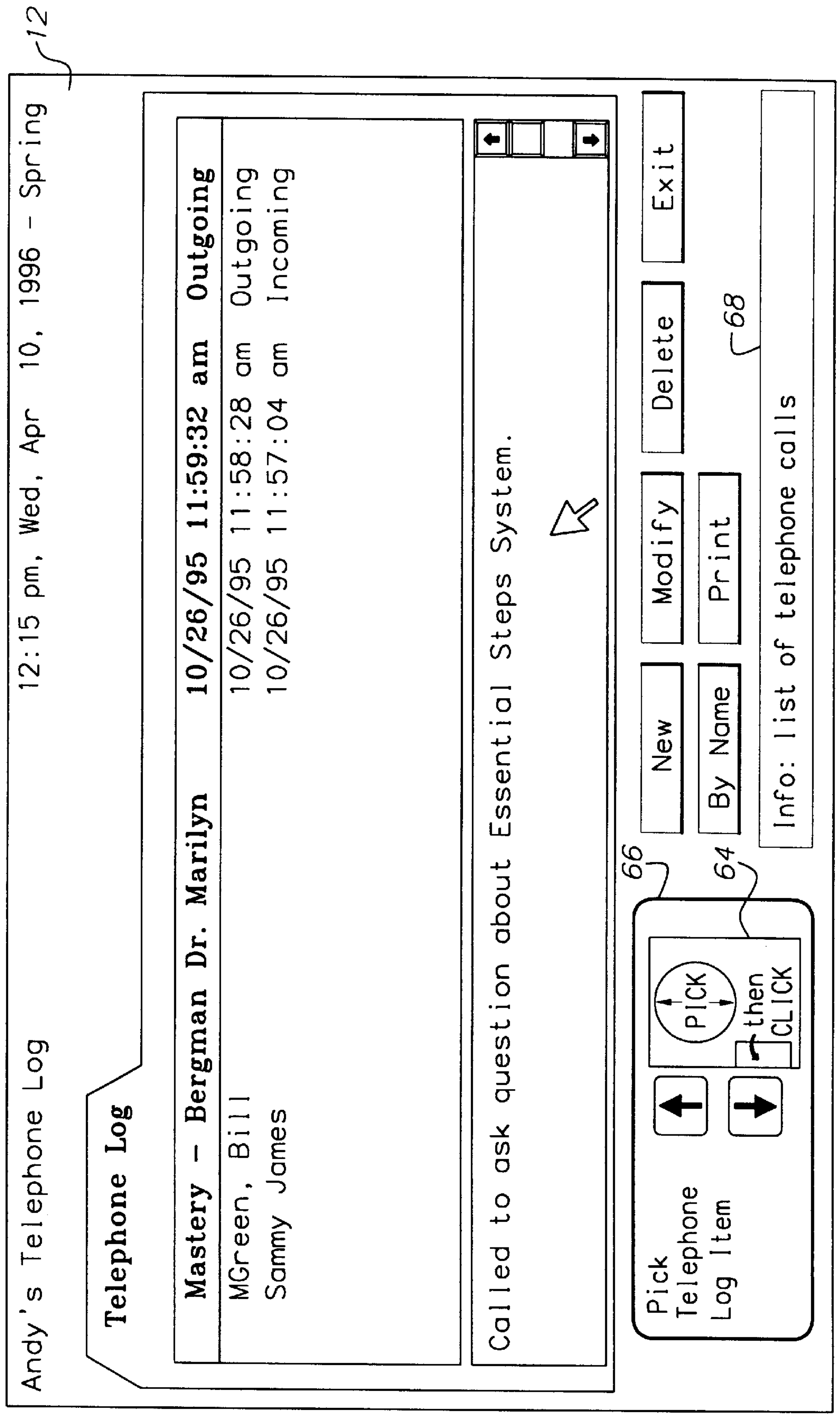
FIGS. 54–57 is the Phone Log module.

The Phone Log module 230 (FIGS. 132–135) is for the recording of phone conversation content, with automatic dialing for outgoing calls. By pointing/clicking on the Phone Log icon on the Main Menu (FIG. 1), the user enters the Telephone Log file folder (FIG. 54). As with the other previously described modules, the Phone Log module (FIG. 54) comprises an upper portion 276A and a lower portion 276B with listings of all entered phone contacts listed by List Name with Given Name, the date and time of the call, and whether the call was "incoming" or "outgoing". In the lower portion 276B notes, taken about the phone call, are stored. Previously loaded listings can be selected by the user pointing/clicking on a desired listing in the upper portion 276A while the corresponding memo appears in the lower portion 276B (FIG. 54). The available subfunction buttons at the bottom of the screen are: "New", "Modify", "Delete", "By Name", "Print", and "Exit".

Figure 55:
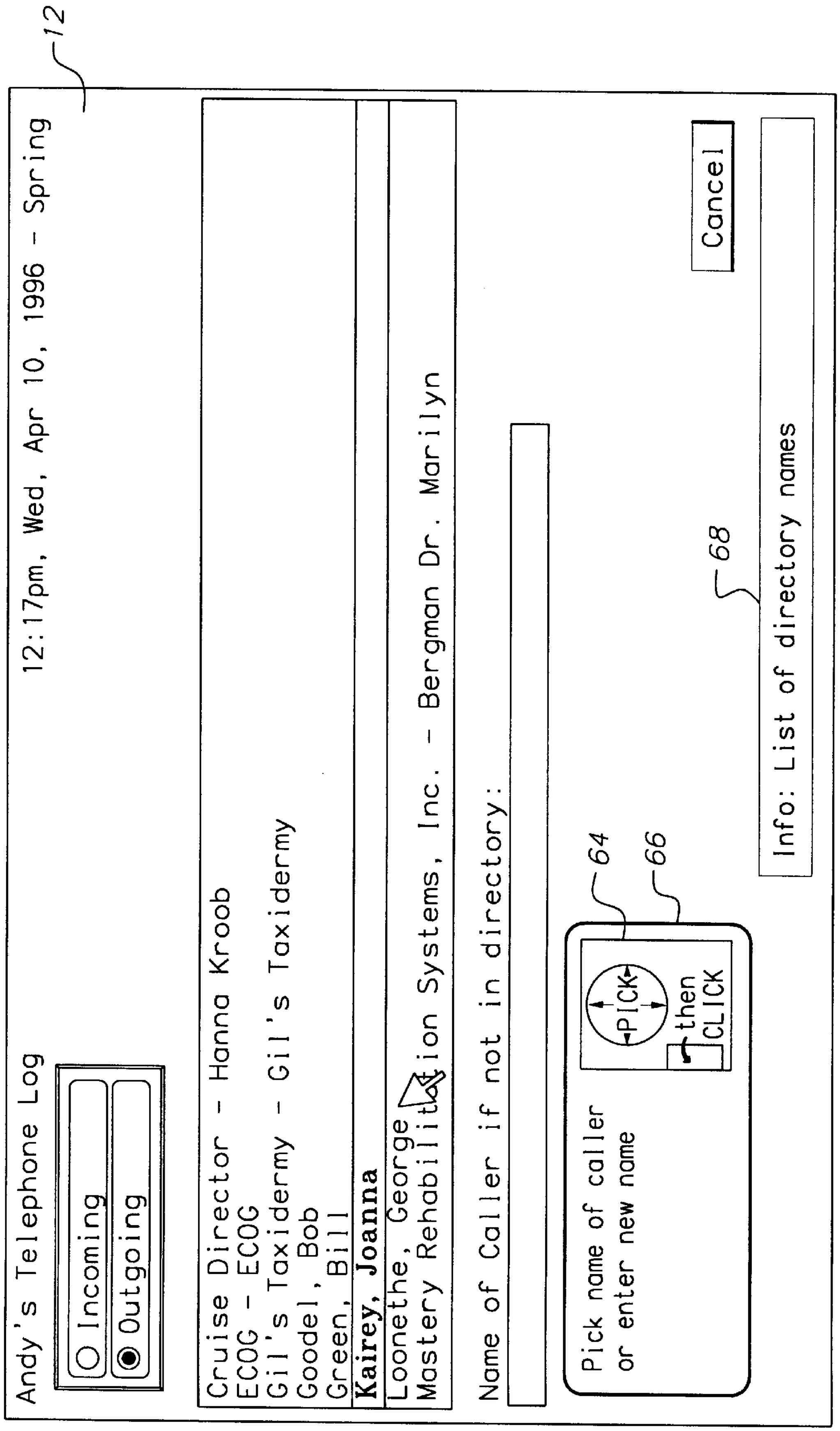
Figure 56:
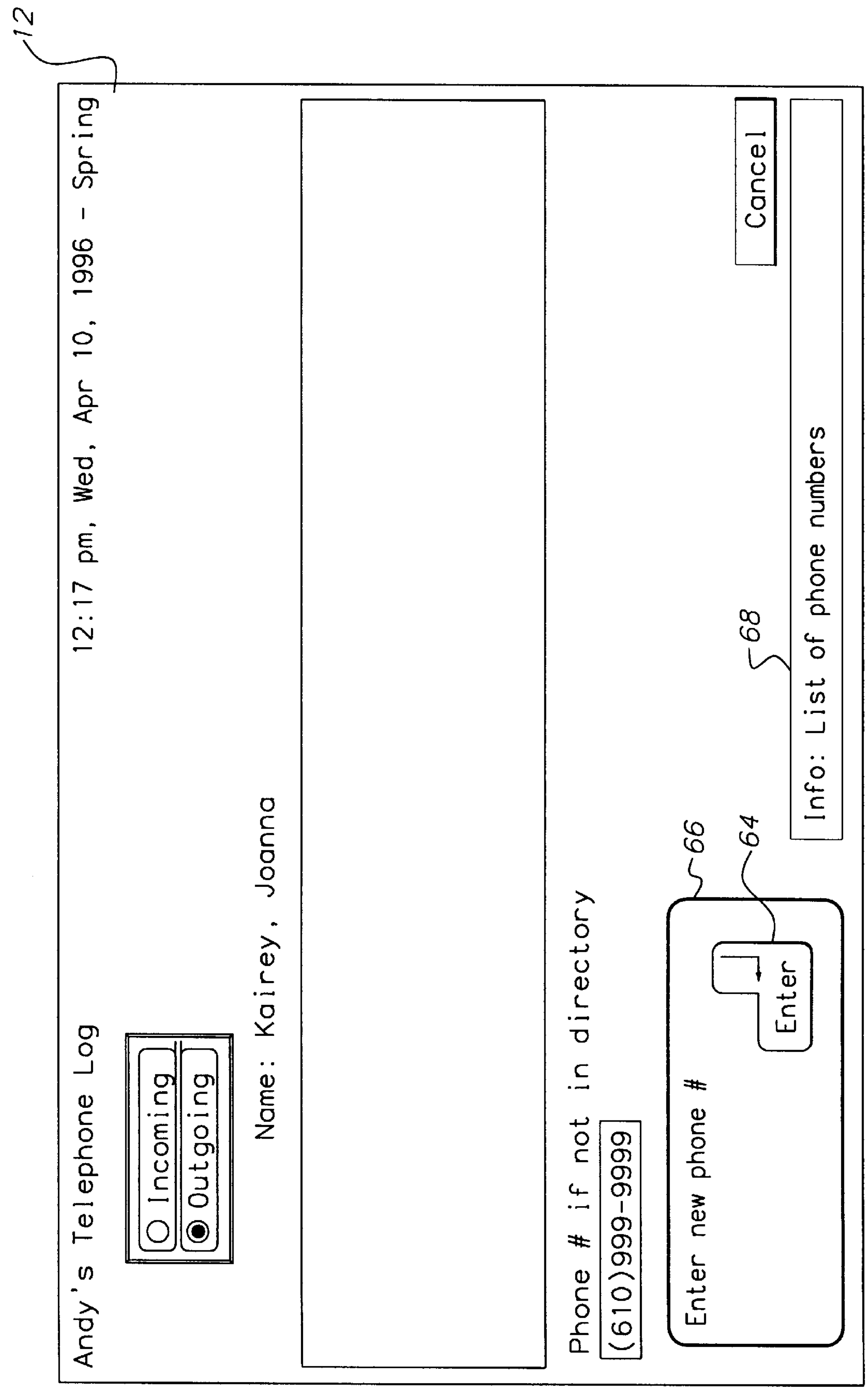

When the user selects the "New" subfunction button, the user is brought to a screen comprising a box of two radio buttons, one for "Incoming", one for "Outgoing" calls (FIG. 55). If the user selects the "Incoming" radio button, the next screen (FIG. 55) presented to the user is the Names file folder 238 List names with Given names. As shown in FIG. 55, a "Name of caller if not in directory" field is also available beneath this name listing for user entry per the instruction "Pick name of caller or enter new name" and then pressing the "Enter" key, as instructed by the guidance icon 64 in the instruction box 66. After selection/entry of a name, the user is brought to a screen (FIG. 56) that permits the user to enter the phone number of the person in a "Phone # if not in directory" field; the area code has a blocked appearance (i.e., white numbers in a black rectangle within the "Phone # if not in directory" field) indicating the default number; if the phone number is correct, the user presses the "Enter" key; if the phone number needs to be corrected, the user can enter the correction and there is no need for the user to erase the default entry. Both displays in FIG. 55 and 56 comprise a "Cancel" subfunction button that eliminates all of the user's manually-entered data and returns him/her to Phone Log screen (FIG. 54) if selected. After that is accomplished, the user is brought to the next screen (FIG. 57) that includes a "Notes" field for entering notes about the phone conversation (as instructed by the instruction box 66 "Enter notes for phone call") and also displays the previously entered/selected information of the incoming/outgoing choice, name of caller, and date/time of the call. The subfunction buttons at the bottom of the screen (FIG. 57) include a "Dial" subfunction as well as the "Complete" and "Cancel" subfunction buttons. Selection of the "Dial" subfunction by the user activates the user's modem line 13 to call up the selected person for a telephone conversation and cues the user to pick up the telephone receiver. Selection of the "Complete" subfunction button by the user records the entry and returns the user to the Phone Log screen (FIG. 54); selection of the "Cancel" button also returns the user to screen (FIG. 54) with no change. The latest recorded entry is saved automatically and is always at the top of the list (chronological order) in the Phone Log (FIG. 54). The "Modify", "Delete", "Print" and "Exit" subfunction buttons (FIG. 54) work the same as in all the other previously discussed modules. The "By Name" subfunction button displays the list of telephone log entries according to name (in alphabetical order), rather than by chronological order, so that the user can search all contacts with a particular individual without scrolling backwards in time for years. Once the "By Name" subfunction button is selected, the listings displayed are in alphabetical order. A "By Date" subfunction button appears at the bottom of the screen, thereby allowing the user to return to the chronological listing should the "By Date" subfunction button be selected. In other words, the "By Name" and "By Date" subfunction buttons are toggled.

Figure 57:
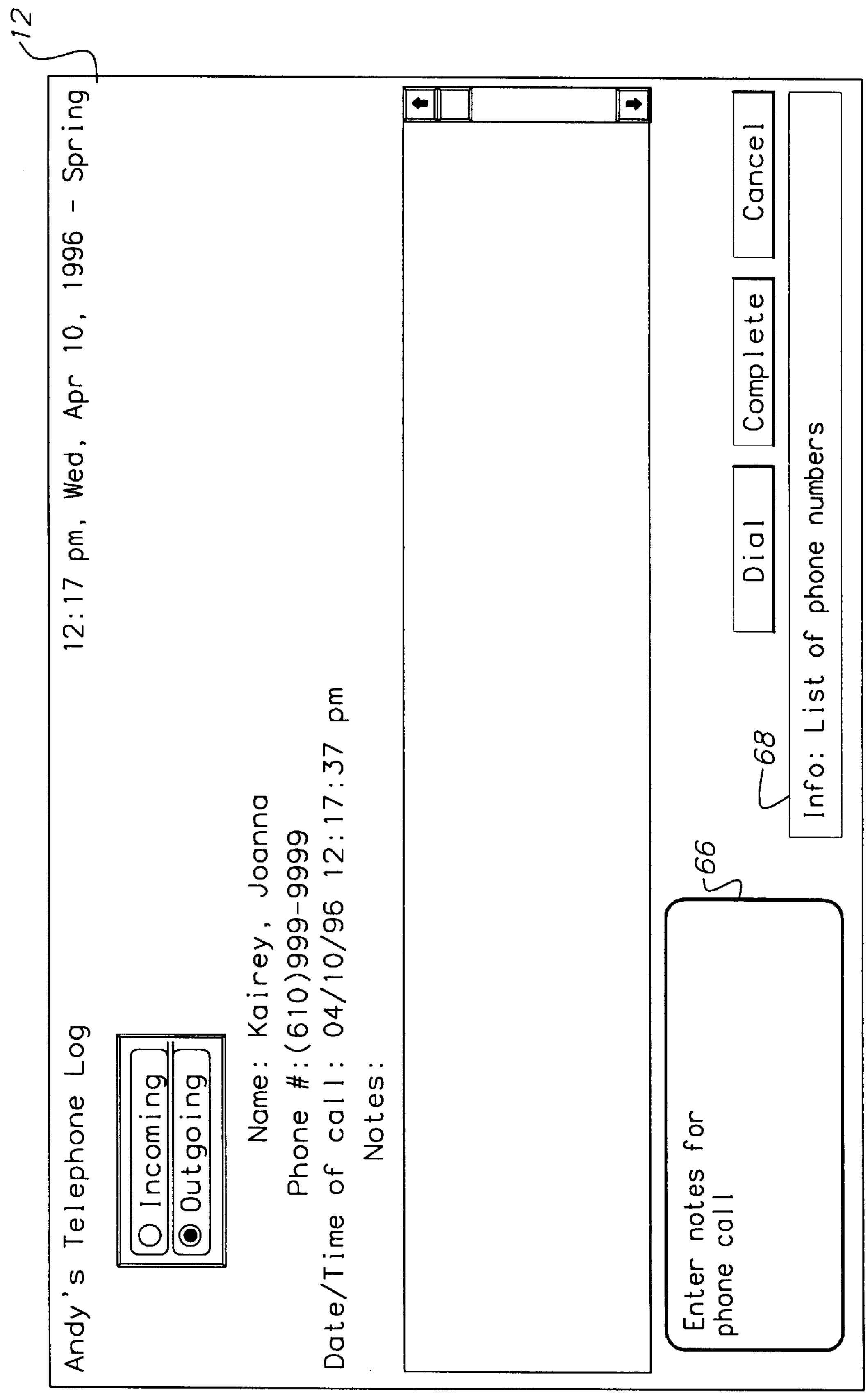
Figure 57A:
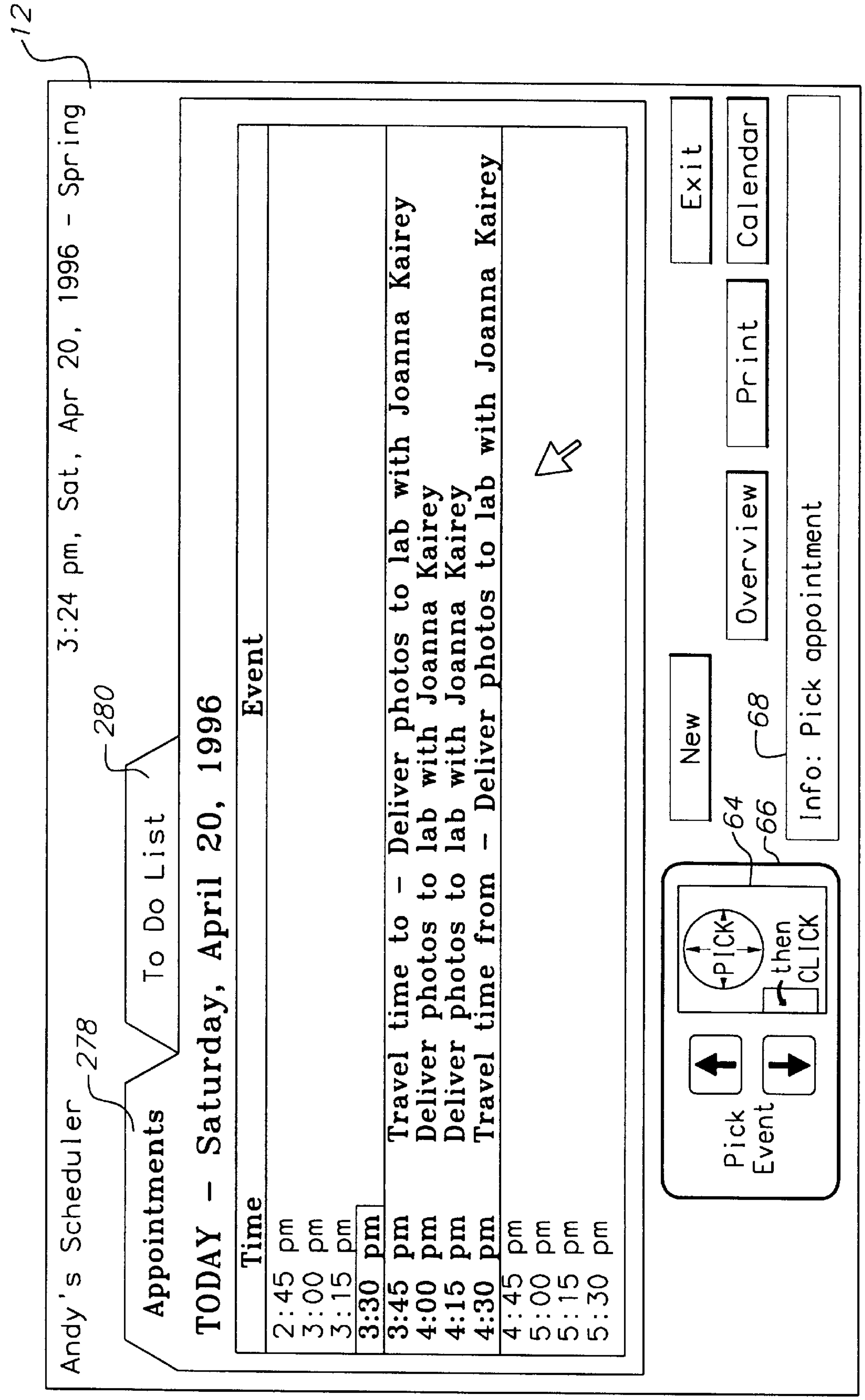
FIGS. 57A–57H is the New subfunction of the Appointments function.

The Scheduler module 226 (FIGS. 136–150) provides time organization, reminders and tracking of appointments for the user. The user selects this module in the Main Menu by pointing/clicking on the option containing the clock with the word "Time." As shown in FIG. 57A, the Scheduler module 226 comprises an Appointments file folder 278 and a To Do List file folder 280, with the Appointments folder 278 being the default display. As shown in FIG. 57A, a column of time indications, in 15 minute intervals, appears in the left margin of the display. The current time is always displayed second to the top time indication, and is highlighted in a contrasting color (e.g., green). Time indications into the past, i.e., the 15 minute interval just prior to the current and all prior entry time indications, appear in a dull gray color. This is to indicate to the user that the time in the past is "used up"; the system 220 does not permit the user to make any appointments in the past, although the user is permitted to browse and to print past days and past entries. As shown in FIG. 57A, the subfunction buttons at the bottom of the display include "New", "Overview", "Print", "Calendar", and "Exit". Once a scheduled appointment is entered and then re-selected, the "Modify" and "Delete" subfunctions also appear at the bottom of the screen (FIG. 58) with the other subfunction buttons.

Figure 57B:
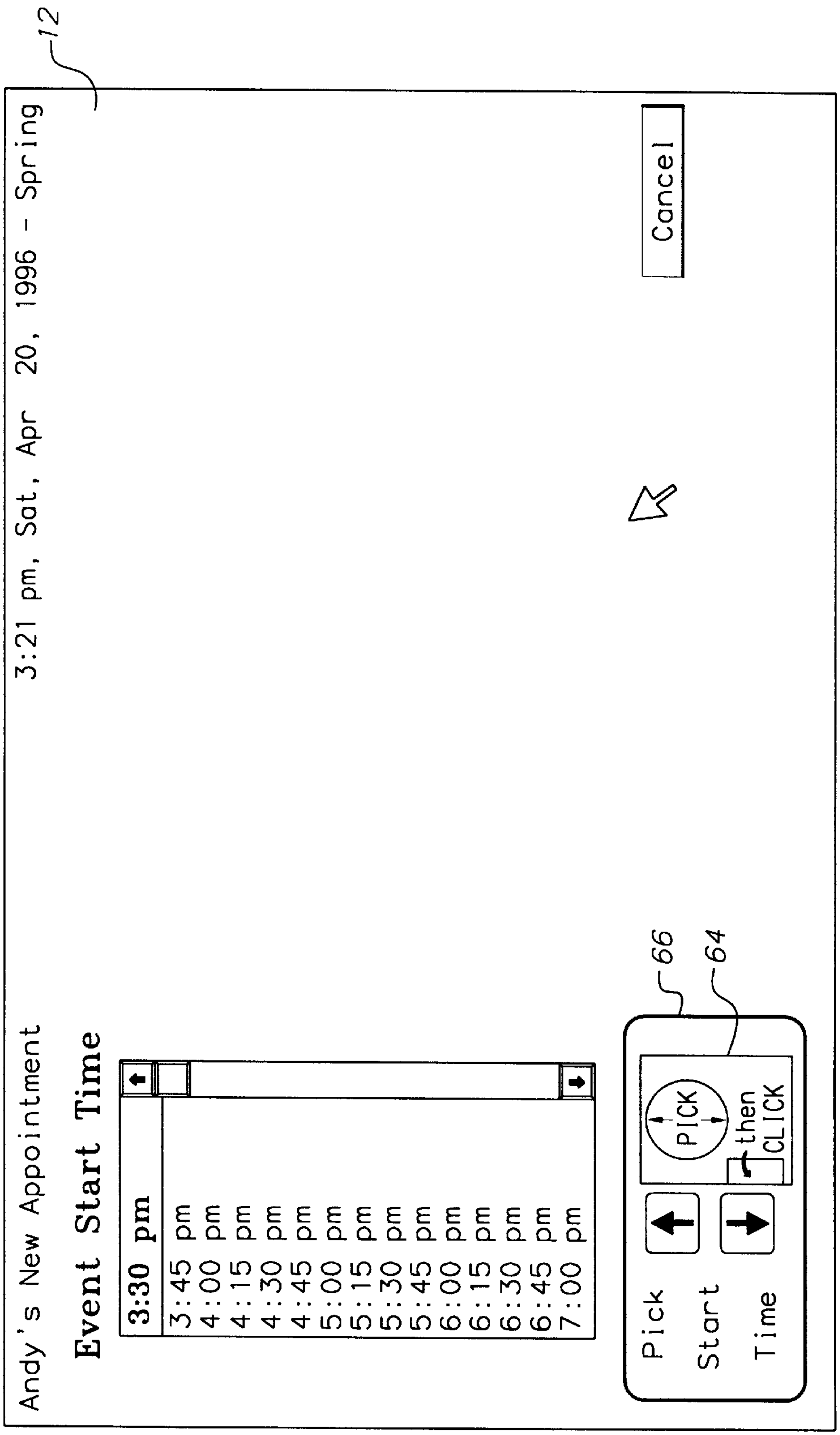
Figure 57C:
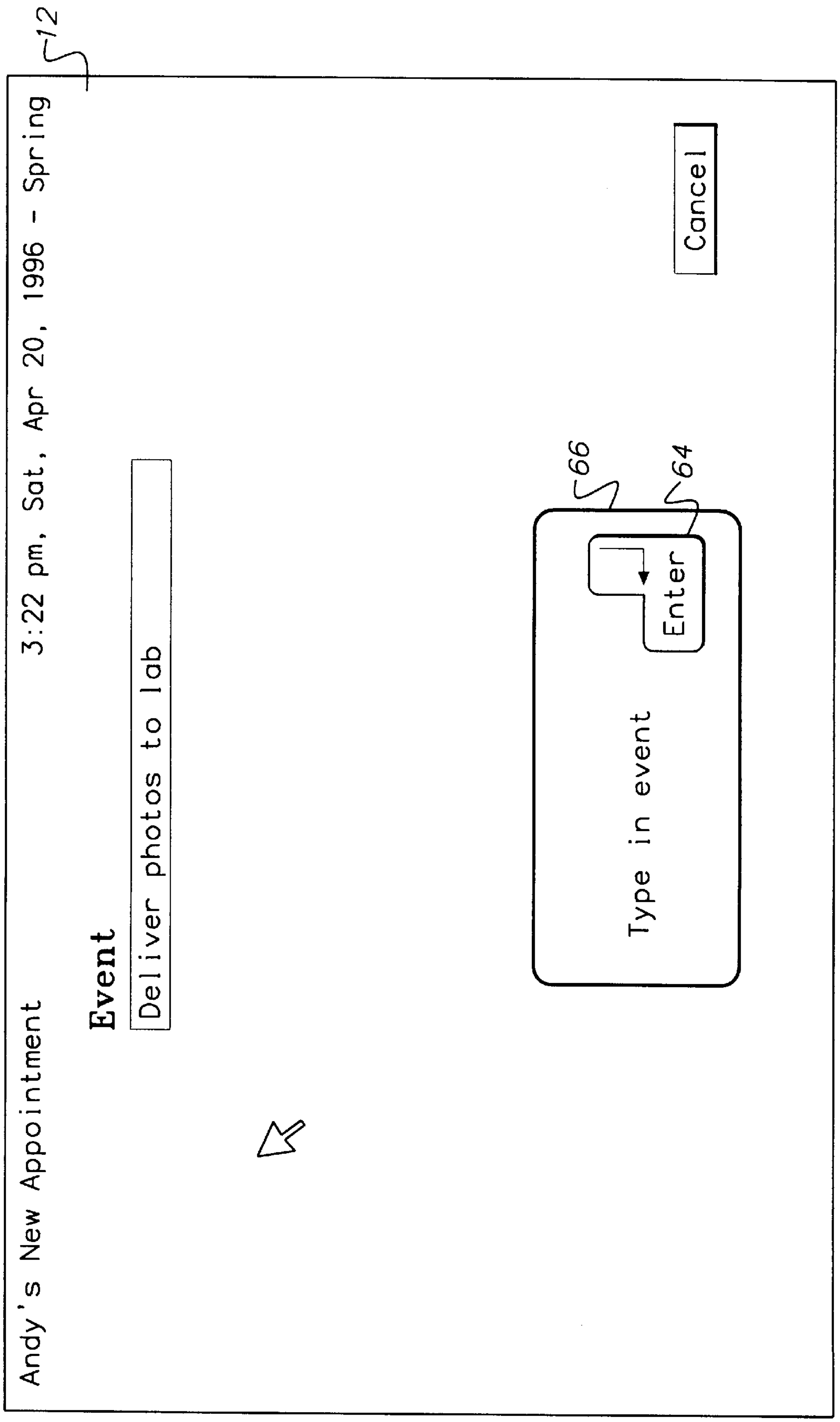
Figure 57D:
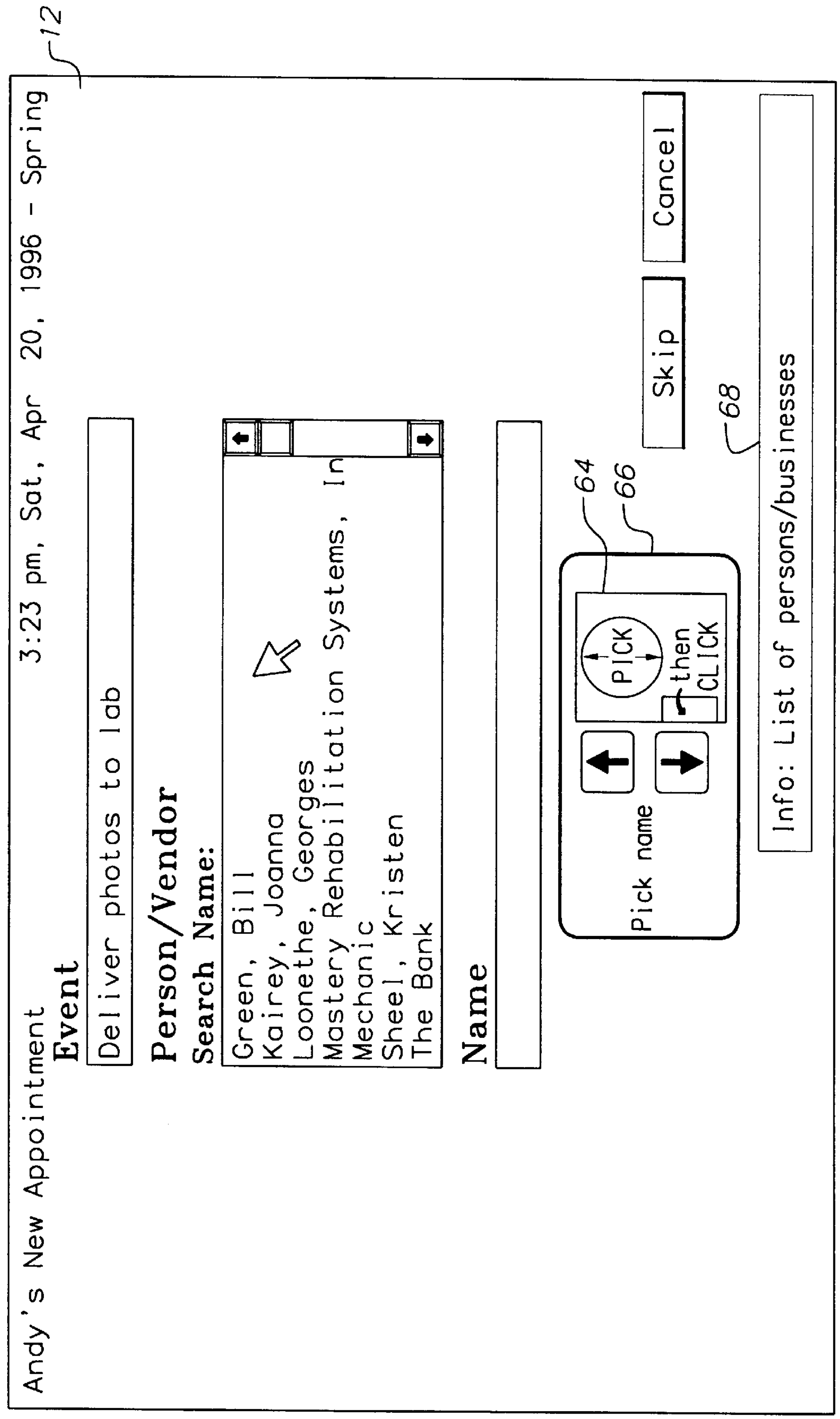
Figure 57E:
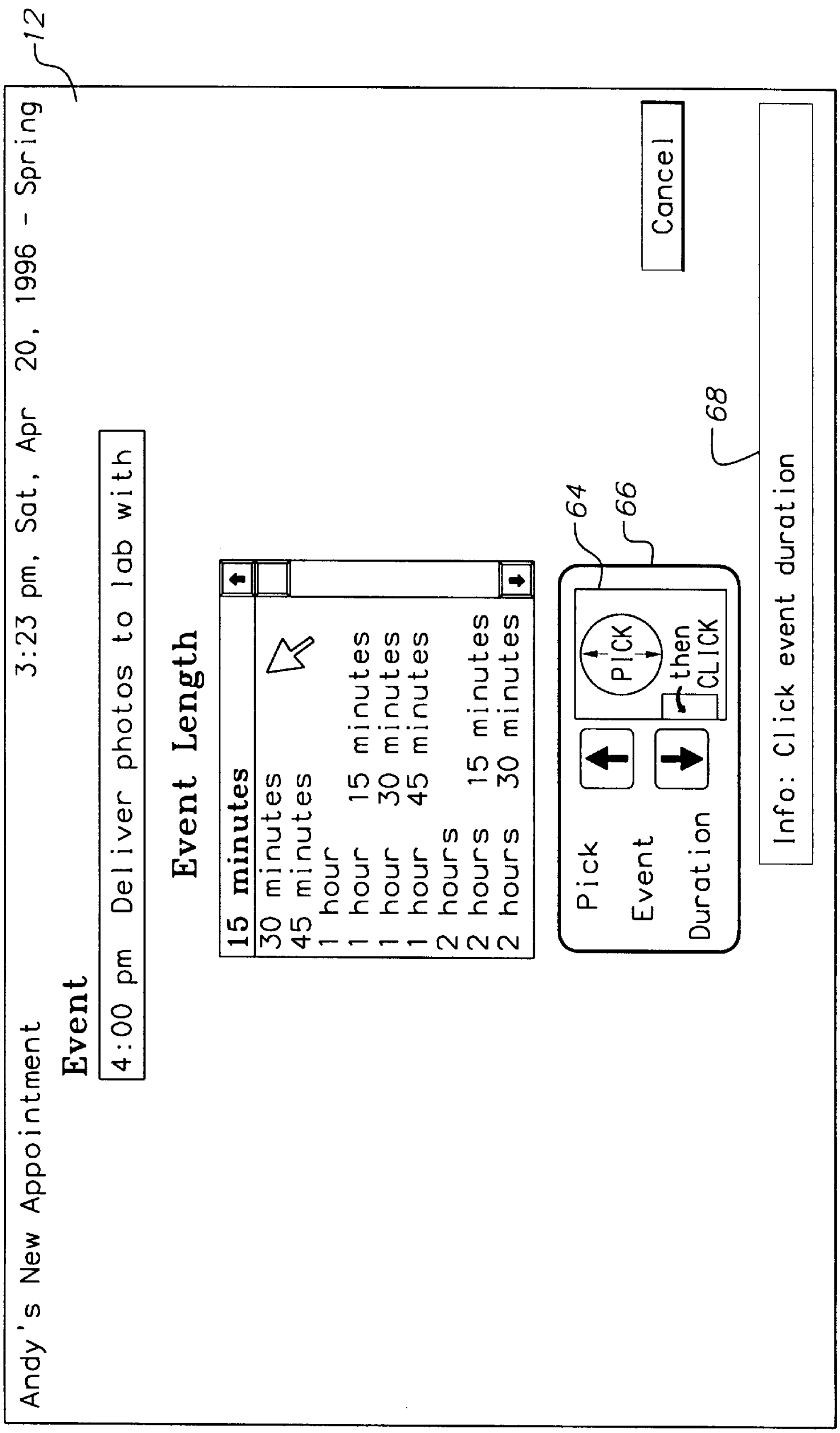
Figure 57F:
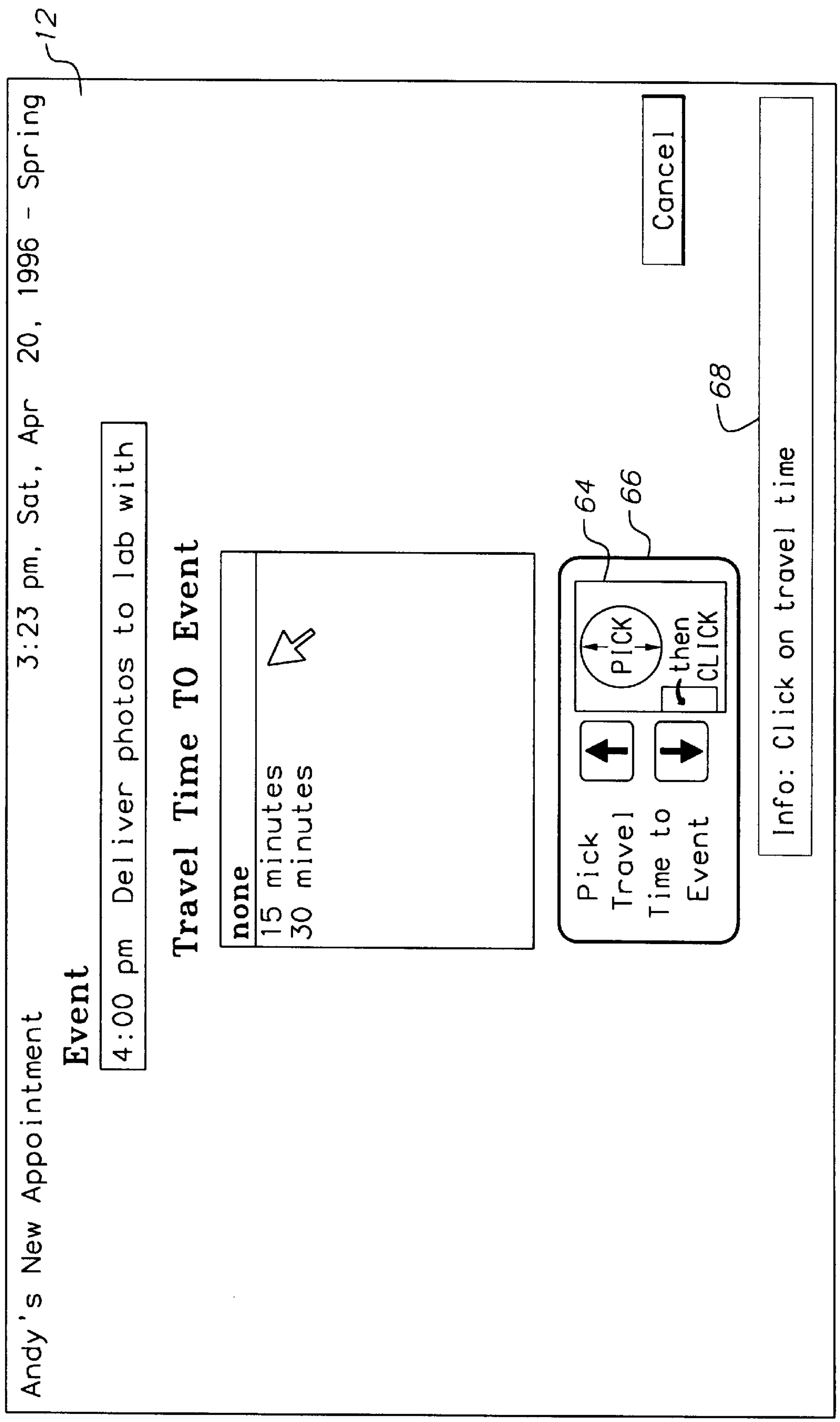
Figure 57G:
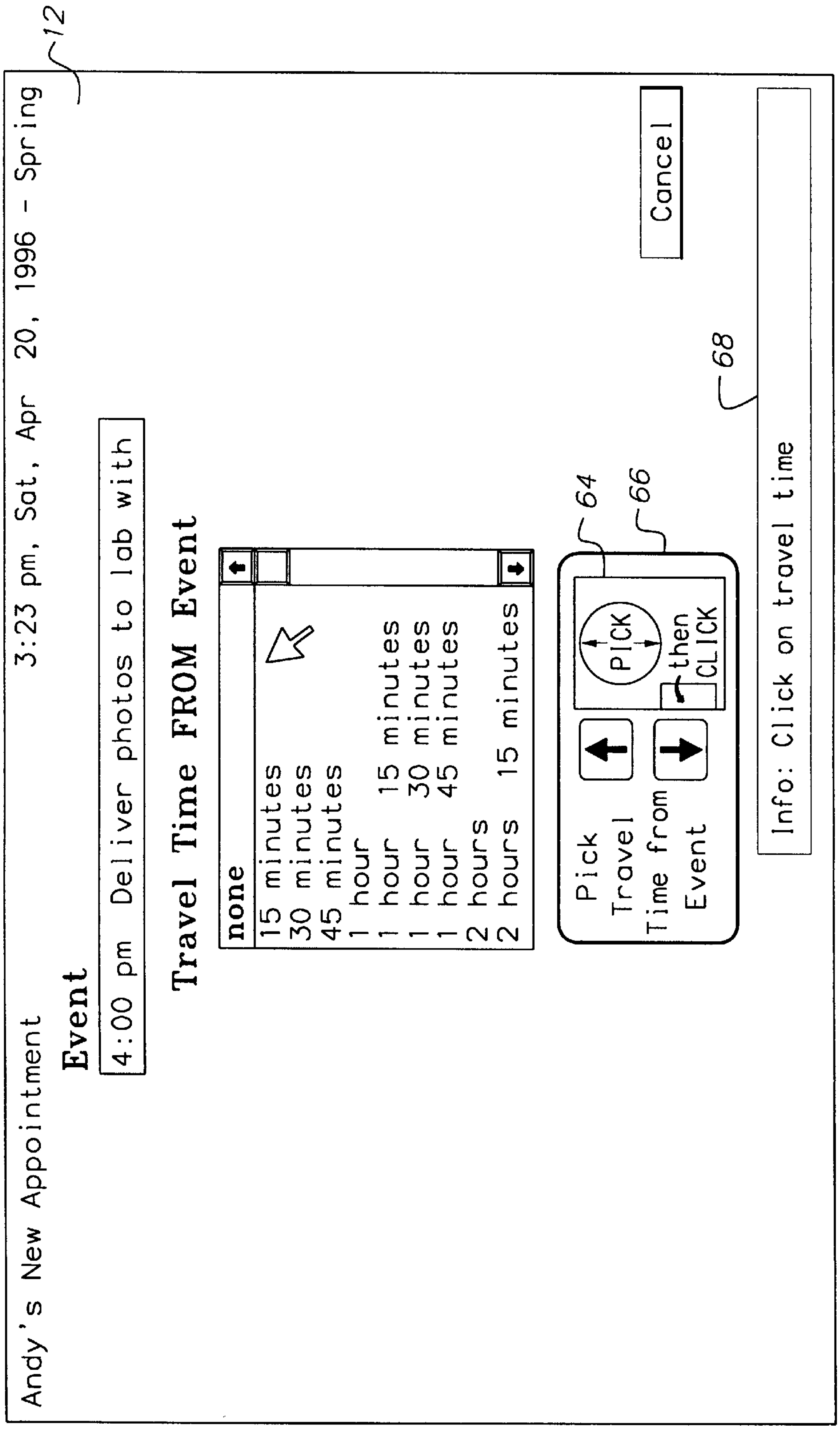
Figure 57H:
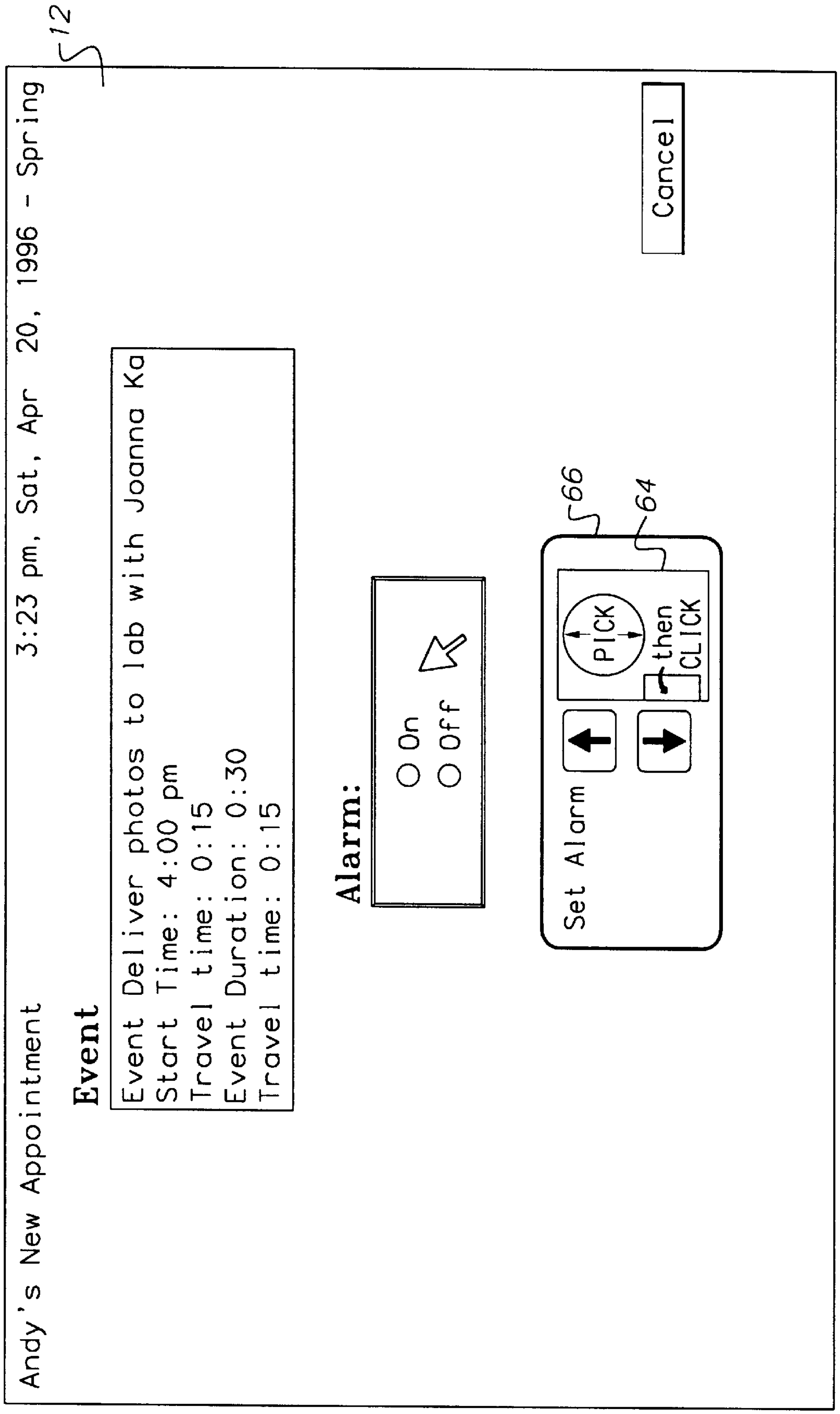

To record an appointment, the user must point/click on the "New" subfunction button and then select an Event Start Time from the column of available times (FIG. 57B). As discussed with other functions, a "Cancel" subfunction button is available at the bottom of the display, should the user change his/her mind about recording the appointment. Having selected the time, the user is brought to the next screen (FIG. 57C) having an "Event" field available for entering an event, as instructed in the instruction box 66. Once the event is entered, the user is brought to the next screen (FIG. 57D) which displays a list of names in a "Person/Vendor Search Name" field and another "Name" field to enter a new name, if the user desires to enter a unique person (i.e., a person not previously listed in the Directory module 222; as discussed previously, that list of names is particularly from the Names file folder 238 in the Directory module 222 and the user can easily select a particular name without having to type it in). Should the appointment involve no other person, other than the user himself/herself, the user can select the "Skip" subfunction (FIG. 57D) button to move to the next display. As discussed previously, the "Cancel" subfunction button is always available to the user to eliminate any previously entered data and to return the user to the Scheduler screen (FIG. 57D). The next screen (FIG. 57E) displays an "Event Length" field with time and event and beneath a listing of available event lengths, again in 15 minute intervals. There is only the amount of time available until the next appointment. If there is not enough time for the activity that needs to be scheduled, the user can cancel and select another time. Otherwise, the user points/clicks on the length of time desired to indicate "event duration." The next screen (FIG. 57F) appears and works just like the previous display (FIG. 57E), but now the time selection is for "Travel Time TO Event", again in 15 minute intervals; "none" is the first option, however, because a person could have an appointment in their home or office. After selecting the travel time TO an appointment, the next screen (FIG. 57G) is the travel time FROM an appointment. Note, if there is not enough travel time to get to or from the desired location, the user does not have enough time offered as an option and needs to cancel and start over. After time, Event, Event duration, travel time To and From are selected, the next screen (FIG. 57H) displays all these facts in an "Event" field, beneath which is a box with radio buttons for an Alarm. The instructions in the instruction box 66 are "Set Alarm" and the radio buttons are for "On" and "Off". Selecting the "Off" radio button permits the audible alarm to be turned off; selecting the "On" radio button permits the audible alarm to be turned on. When the alarm is turned on, an audible alarm sounds at predetermined times before the appointment, e.g., 15 minutes prior to the appointment, again on a random schedule and, finally, at the time of the appointment. The audible alarm may is a sound cue (e.g., man's or woman's voice saying you have an appointment; a rooster crowing; chimes). In addition, a visual alarm, e.g., a red REMINDER message field (not shown) with the appointment time, person and event appears in the display regardless of the module that the user is presently operating within. When the red REMINDER message field appears, the pointer 60 is restricted to remain within the REMINDER field only until the user acknowledges the cue by pointing/clicking on the "Continue" subfunction button. In the Maintenance Menu 232 the therapist selects the sound cue, the interval for reminders (e.g., 15 minutes), and the number of repeated reminders needed for the given user.

Figure 58:
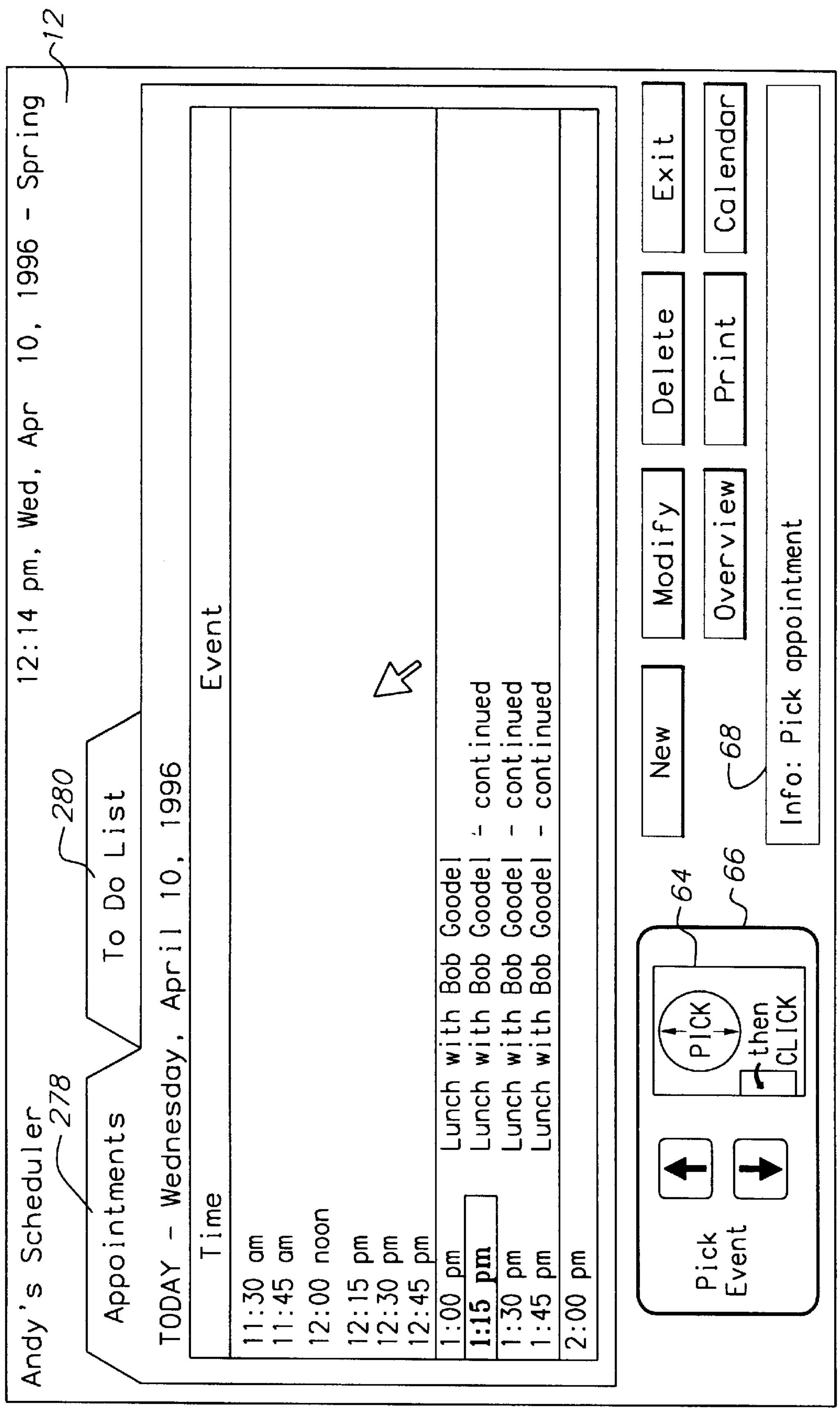
FIGS. 58–60 is the Modify subfunction of the Appointments function.
Figure 59:
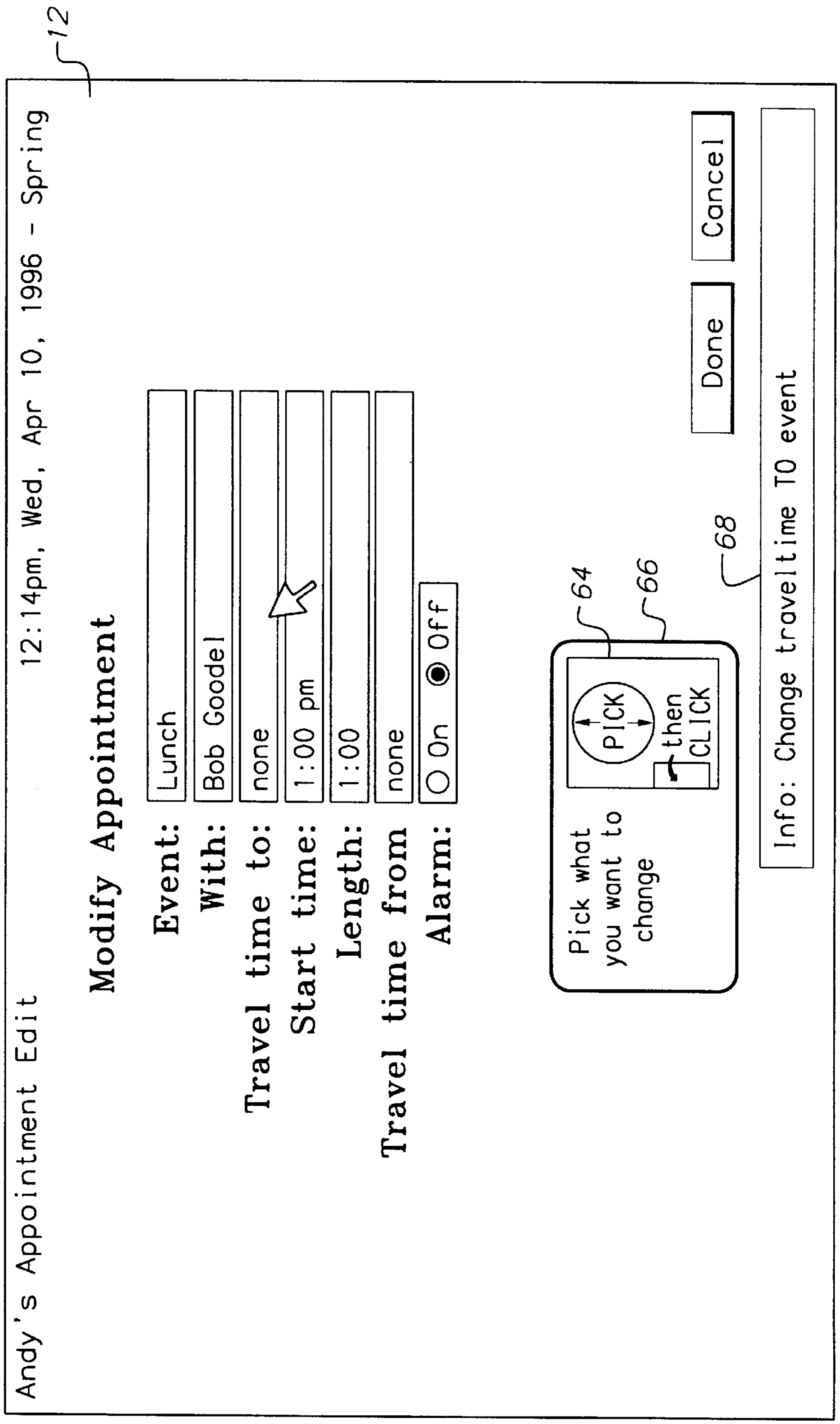

After entering an appointment, the user is returned to the Appointment file folder (FIG. 58). The newly-added appointment is exhibited in a bright contrasting hue, with duller adjoining time rows blocked out for travel time to and from. Note, that the subfunction buttons "Modify" and "Delete" are now also available since an appointment entry has now been entered and re-selected (e.g., 1:15 pm) and, as such, can be modified or deleted. If the user were to select the "Modify" subfunction button, the user is brought to a screen (FIG. 59) that displays all of the appointment data that the user can modify.

Figure 60:
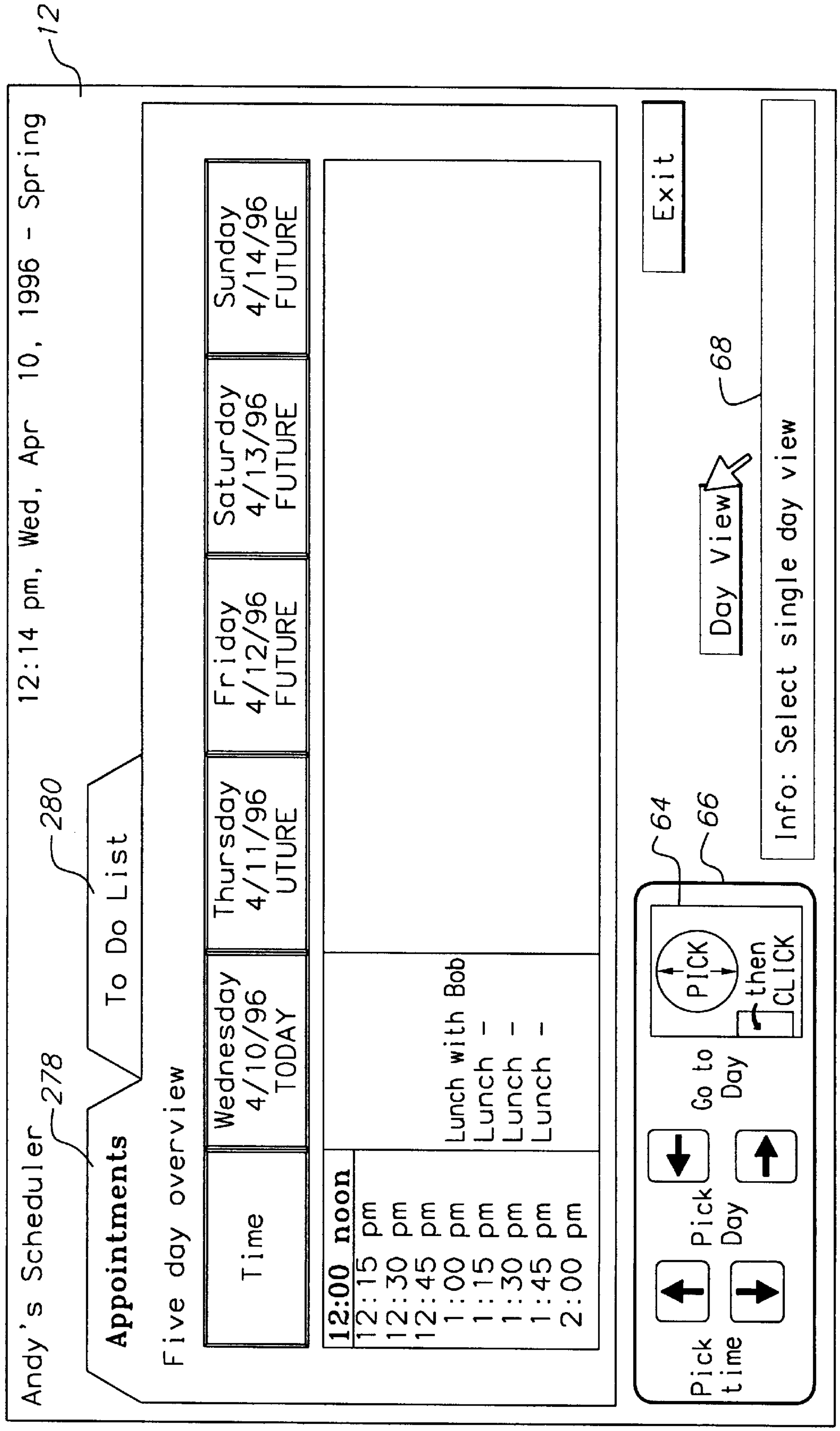

The "Overview" subfunction button (FIG. 58) at the bottom of the screen provides entry into a five (5) day overview, with the Day, date and "Today" or "Future" or "Past" (not shown) at the top of each of the five columns (FIG. 60). The first column in the left margin of the display is the time indications in the 15 minute intervals. Again, time in the past is dull gray, but past appointments are visible. Current and future appointments are indicated in colored time blocks with the event displayed. Once the "Overview" subfunction button is selected, up and down arrows permit time selection, and left—right arrows permit movement from day to day, into the past or the future. As with the "By Name" and the "By Date" subfunction buttons, the "Overview" and "Day View" subfunction buttons form a toggle button. That is, the user can return to "Day View" by pointing/clicking on the same subfunction button that allowed "Overview" (see FIGS. 58 and 60), or the user may select any given day by clicking at the top of the column where the day, date and Past/Today/Future designations are displayed.

When the user selects the "Day View" subfunction button, the user is returned to the screen shown in FIG. 58. If the user selects the "Calendar" subfunction button, the system 220 displays a calendar, similar to the calendar displayed in the Journal module of application Ser. No. 08/376,965. Days in the past are indicated by a dull appearance whereas future weekdays are displayed in white and future weekends are displayed in a magenta color. Here, however, the user can move into the Past to review past appointments but he/she is unable to enter new appointments in the Past. He/she is able to select any date into the future and make an appointment for the Future.

Figure 61:
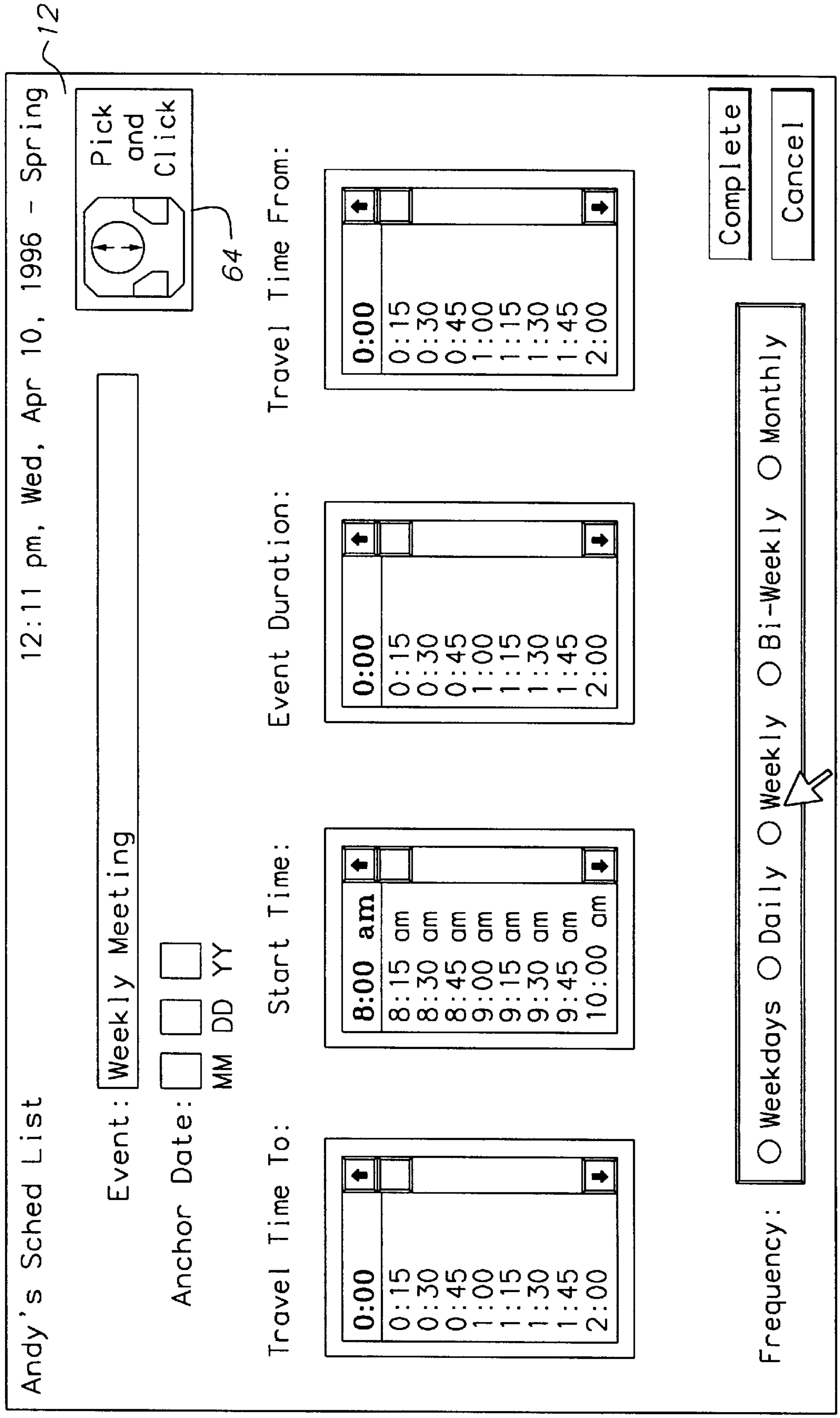
FIG. 61 is the Maintenance Menu screen for the Scheduler.
Figure 65:
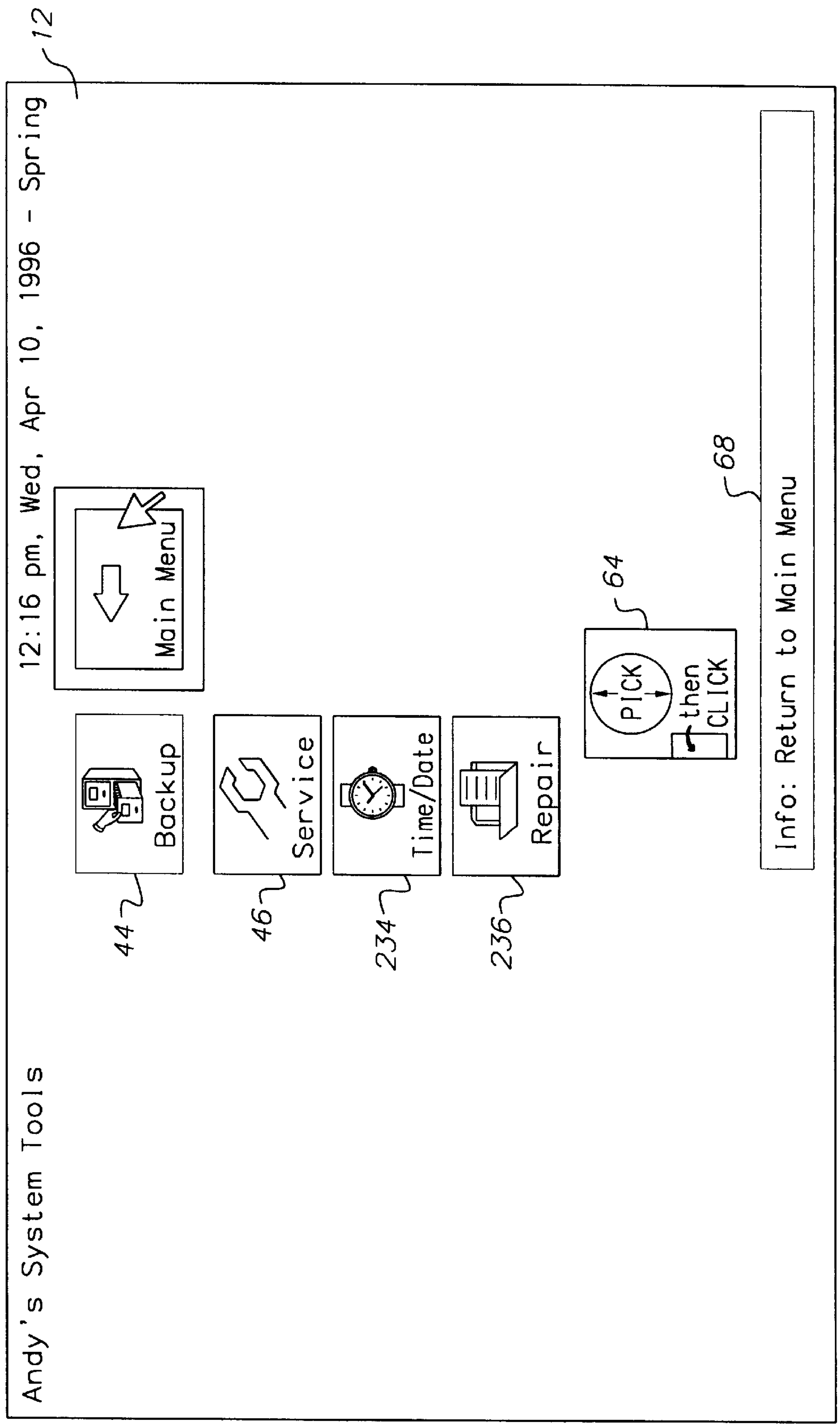
FIG. 65 is the Tools module of the present invention.
Figure 66:
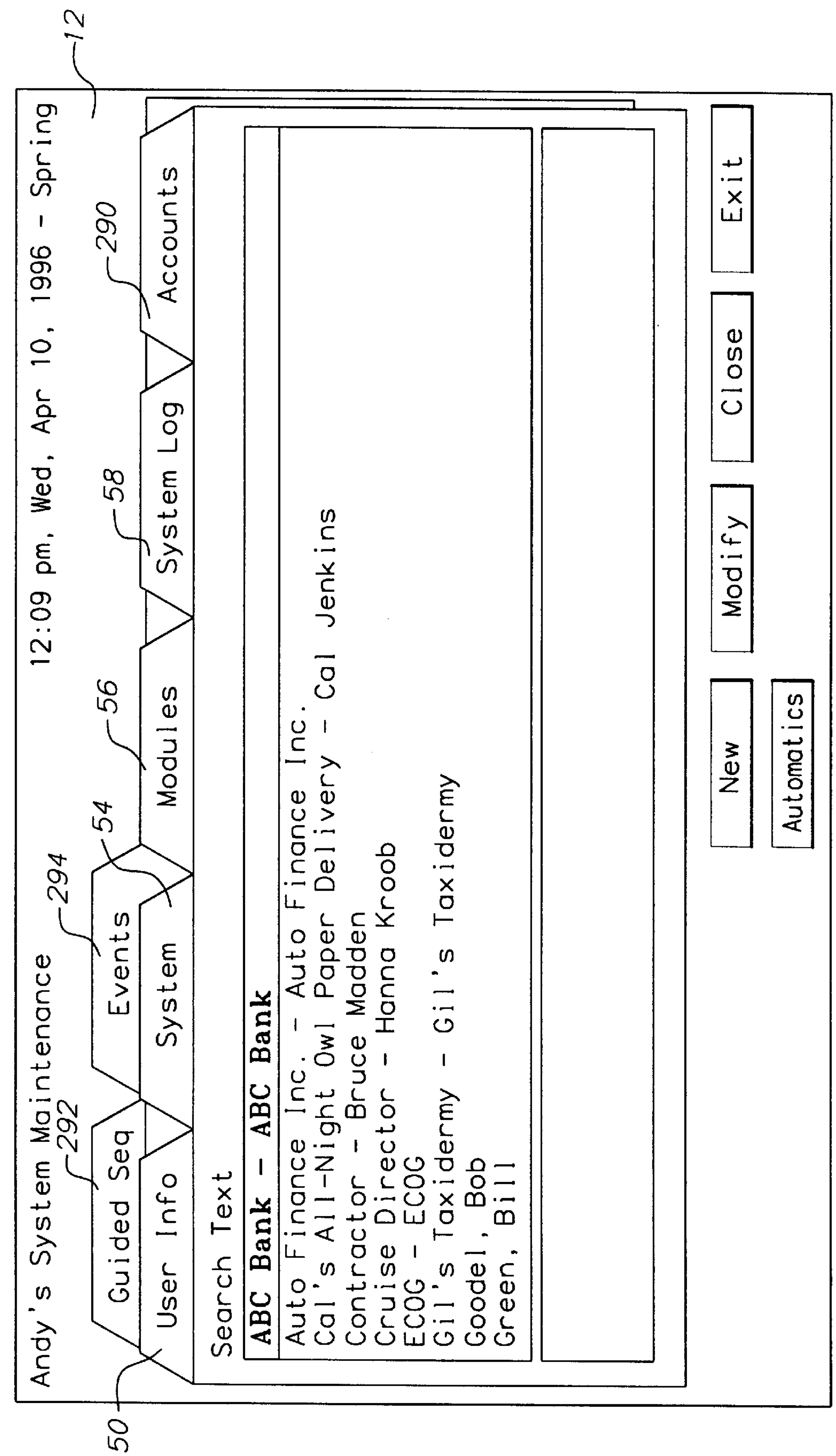
FIGS. 66–73 is the Maintenance Menu for the various modules.

Through the Maintenance Menu 232, secondary users (therapists) can also enter recurring appointments which are weekdays, weekly, monthly, etc (FIG. 61). If there is an unanticipated conflict for the recurring appointment, the secondary user is notified of the date and time, so that the conflict can be rescheduled. For recurring appointments which show automatically in the Appointment file folder 278, the user is able to cancel a specific date. If the recurring appointment is permanently re-scheduled or discontinued, a secondary user has to make these changes through the Maintenance Menu 232. (FIGS. 65–66).

Figure 62:
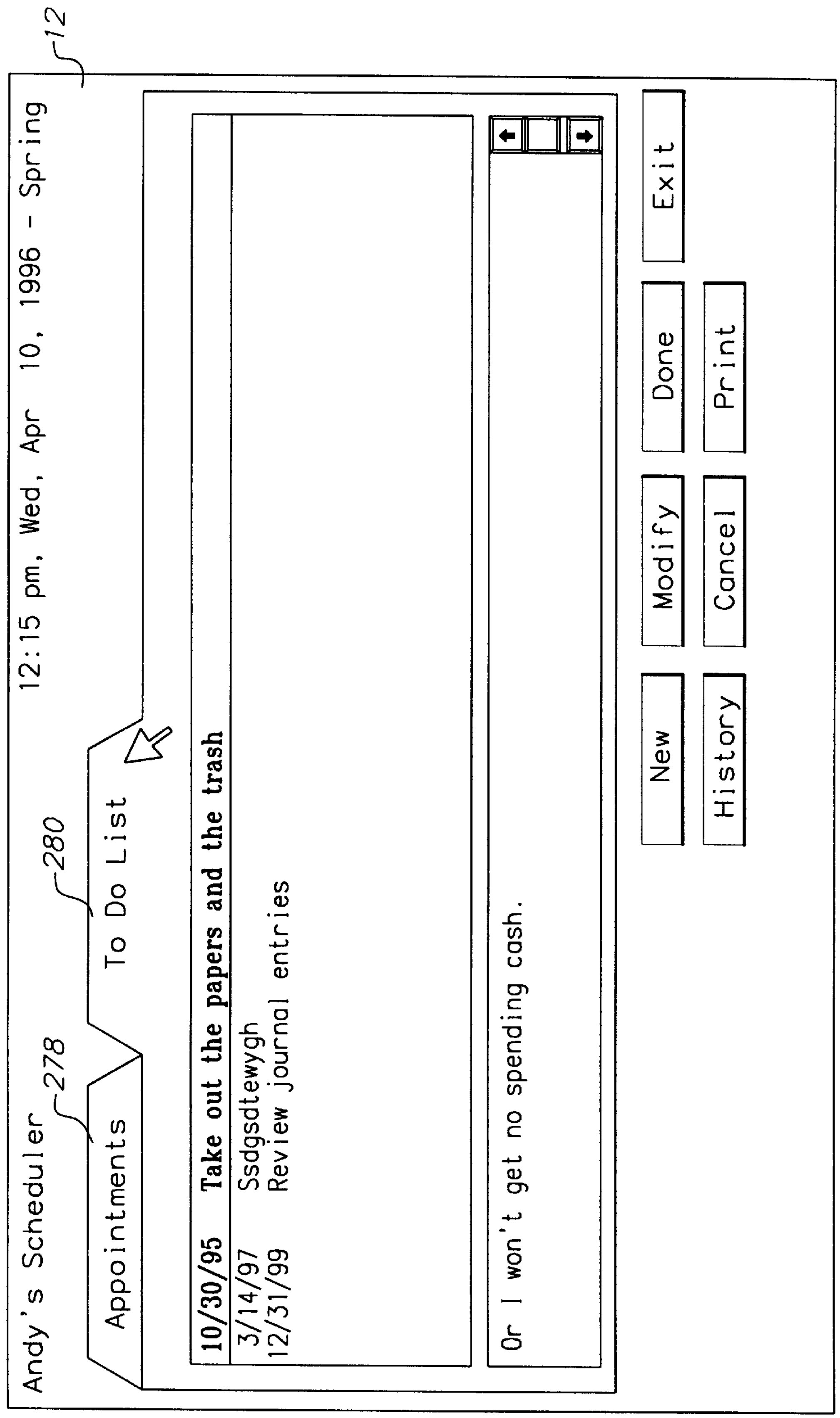
FIGS. 62–63 is the To Do List function of the Scheduler module.
Figure 63:
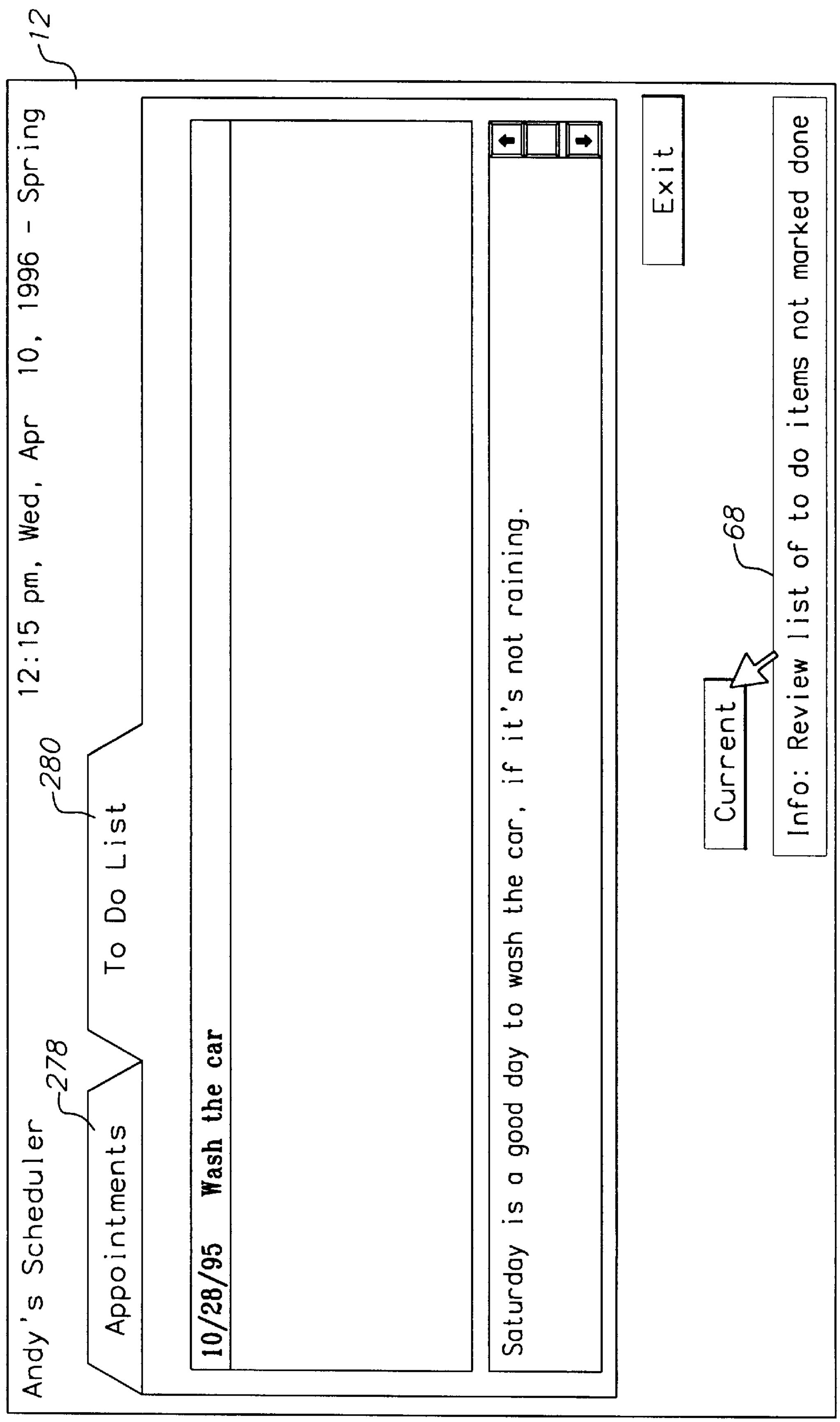

The "To Do List" file folder 280 (also known as "task list") is accessed by selecting the "Time" option 226 on the Main Menu, and then by pointing/clicking on the file folder tab titled "To Do List." The To Do List file folder 280 (FIG. 62) basically comprises a list of things which the person needs to do and operates similarly, in structure and organization, to the Homework Module of application Ser. No. 08/376,965, with color changes to indicate deadline urgency (e.g., green-colored text indicates approaching deadline, red-colored text indicates imminent deadline and black-colored text indicates past-due deadlines). The subfunction buttons available in the "To Do List" file folder 280 include: "New" (which utilizes a calendar as in the Appointments function or Homework function with only the present or future dates available from which the user can select), "Modify", "Done", "History", "Cancel", "Print", and "Exit". One major difference is that in the Homework module of the Educational Organizer 20 of application Ser. No. 08/376,965, tasks could be broken down into steps whereas the To Do List file folder 280 of the present invention does not have this capability. In particular, in the Homework module, once an assignment is entered, the user can enter subgoals or steps. In the To Do List file folder 280, the subgoals option is not available. Also, the "Sort" subfunction of the Educational Organizer 20 of application Ser. No. 08/376,965 is not included in the To Do List file folder 280.

Figure 64:
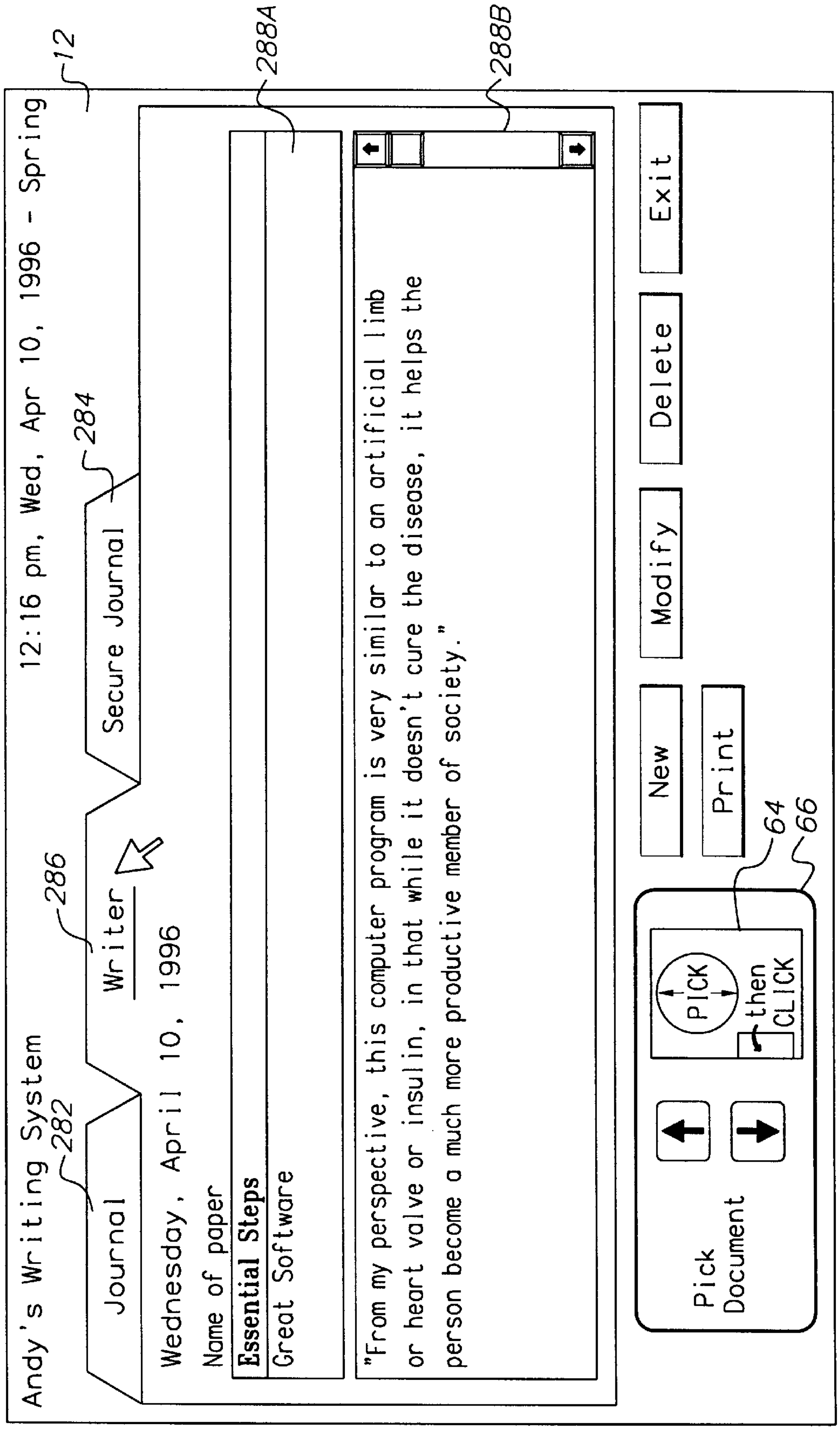
FIG. 64 is the Writer function of the Writing module.

The Writing module 228 comprises a Journal file folder 282, a Secure Journal folder 284 and a Writer folder 286 (FIGS. 151155). The Journal file folder 282 operates in the same manner as the School Journal 24 of application Ser. No. 08/376,965; the Secure Journal file folder 284 operates in the same manner as the Personal Journal 36 of application Ser. No. 08/376,965 wherein a user password must be entered before entrance into the Personal Journal 36 is granted. As such, the Journal file folder 282 and the Secure Journal file folder 284 are not discussed any further. The Writer file folder 286 (FIG. 64) comprises an upper portion 288A that lists the titles of documents created by the user while a lower portion 288B displays the text of the selected title in the upper portion 288A. The user has the "New", "Modify", "Delete", "Print" and "Exit" subfunction buttons available for working on the selected document. The Writer file folder 286 also includes a spell checking subfunction. As such, the Writer folder 286 operates in the same manner as the Writer function of application Ser. No. 08/376,965.

The Information Station module 231 (FIGS. 156–159) is a repository for varied incidental particulars (e.g., where the picture hooks are stored; how to feed goldfish). The Information Station module 231 provides added structure and organization required by the cognitively-challenged user. The Information Station module combines the feature of the Writing module 228 and the Telephone Log module 230. When the user selects the Information Station module from the Main Menu ("INFO" in FIG. 3), the user is presented with a split screen (i.e., an upper portion and a lower portion) that has the appearance of the Writer function display screen (FIG. 64); the "New", "Modify", "Delete", "Print" and "Exit" subfunction buttons appear at the bottom of the Information Station 231 split screen. To enter new information into the Information Station module 231, the user selects the "New" subfunction button and is prompted to enter a name (i.e., title) for this information; the name is then added to a list, in alphabetical order, of other information titles. The user is then presented with another screen display that has the appearance of the "Notes" field in the Phone Log Module (FIG. 57). The "Complete" and "Cancel" subfunction buttons are also available to the user. The instruction box 66 is displayed in the screen, as well as the information help text box 68 which informs the user of the pointer 60 location. The user then enters the Information Notes in the "Notes" field. When done, the user selects the "Complete" subfunction button and the entry into the Information Station 231 is completed. As such, the user can select information titles (in alphabetical order) in the upper portion of the Information Station 231, with the corresponding information text displayed in the lower portion, as is done in the Writer function 286 and the Phone Log 230.

Figure 160:
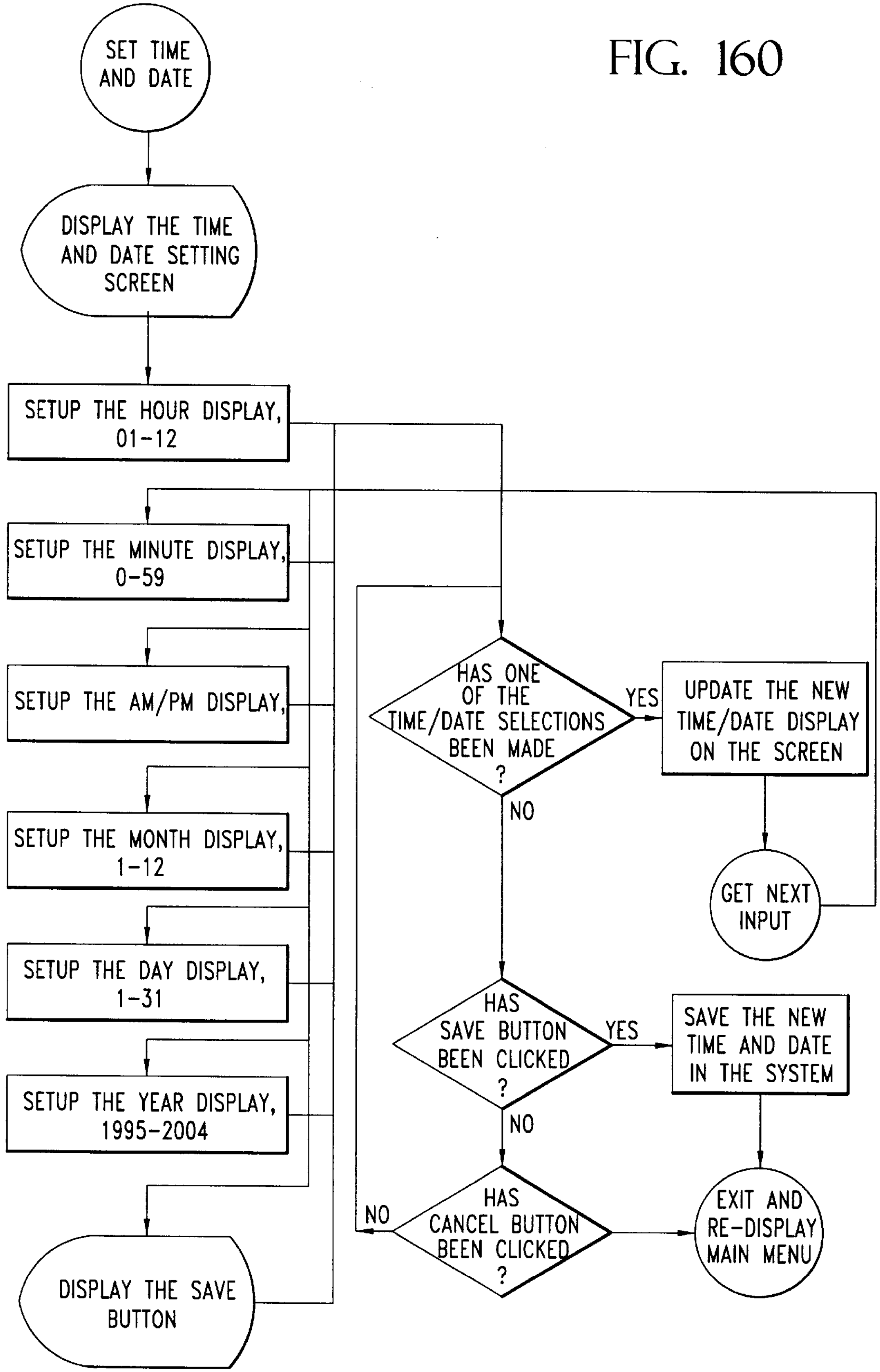
FIGS. 160–161 are the flow charts for the Time/Date function and Repair function of the Tools module.
Figure 161:
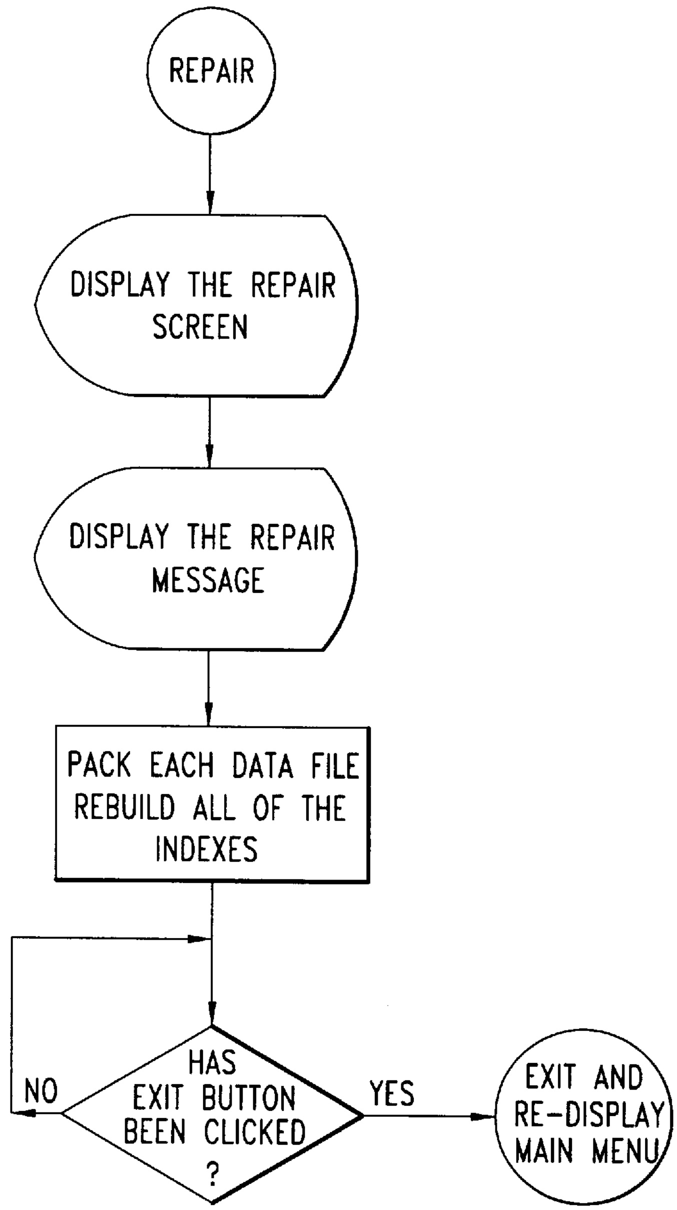

The Tools module 28 of the present invention has two additional functions, "Time/Date" function 234 and "Repair" function 236 (FIG. 65). The Time/Date function 234 (FIG. 160) permits the user to reset the time and date displays (e.g., Daylight Savings Time). The Repair function 236 (FIG. 161) permits the re-indexing of data files which provides an easy fix to problems that may occur when the user may have exited the system 220 improperly or where there are hard drive problems. The Repair function 236 permits the user to easily execute a re-index on his particular system 220 without the need for the secondary user to be present to execute the re-indexing.

As mentioned throughout the above discussion, the Maintenance Menu 232 (FIGS. 2A–2B) provides the means for the secondary users to program the primary users' individualized Educational & Life Skills Organizer/Memory Aid 220. The Maintenance Menu 232, as its predecessor Maintenance Menu 22 of application Ser. No. 08/376,965, can only be accessed by the secondary users using a command known only to them in the Main Menu (FIG. 3). The Maintenance Menu 232 of the present invention comprises the Maintenance Menu 22 of application Ser. No. 08/376,965 with the addition of new options: Accounts option 290, Guided Sequence option 292, and Events option 294 (FIG. 66). Furthermore, two of the existing options, namely system 54 option and the Modules option 56 of the Maintenance Menu 22, now include additional functions: the System module 54 now includes PC Anywhere Location function 296, Last Back-Up Date function 298, Days Between Back-Up function 300 and a Communications Port function 302; the Modules option 56 now includes an Options 304.

Figure 2A:
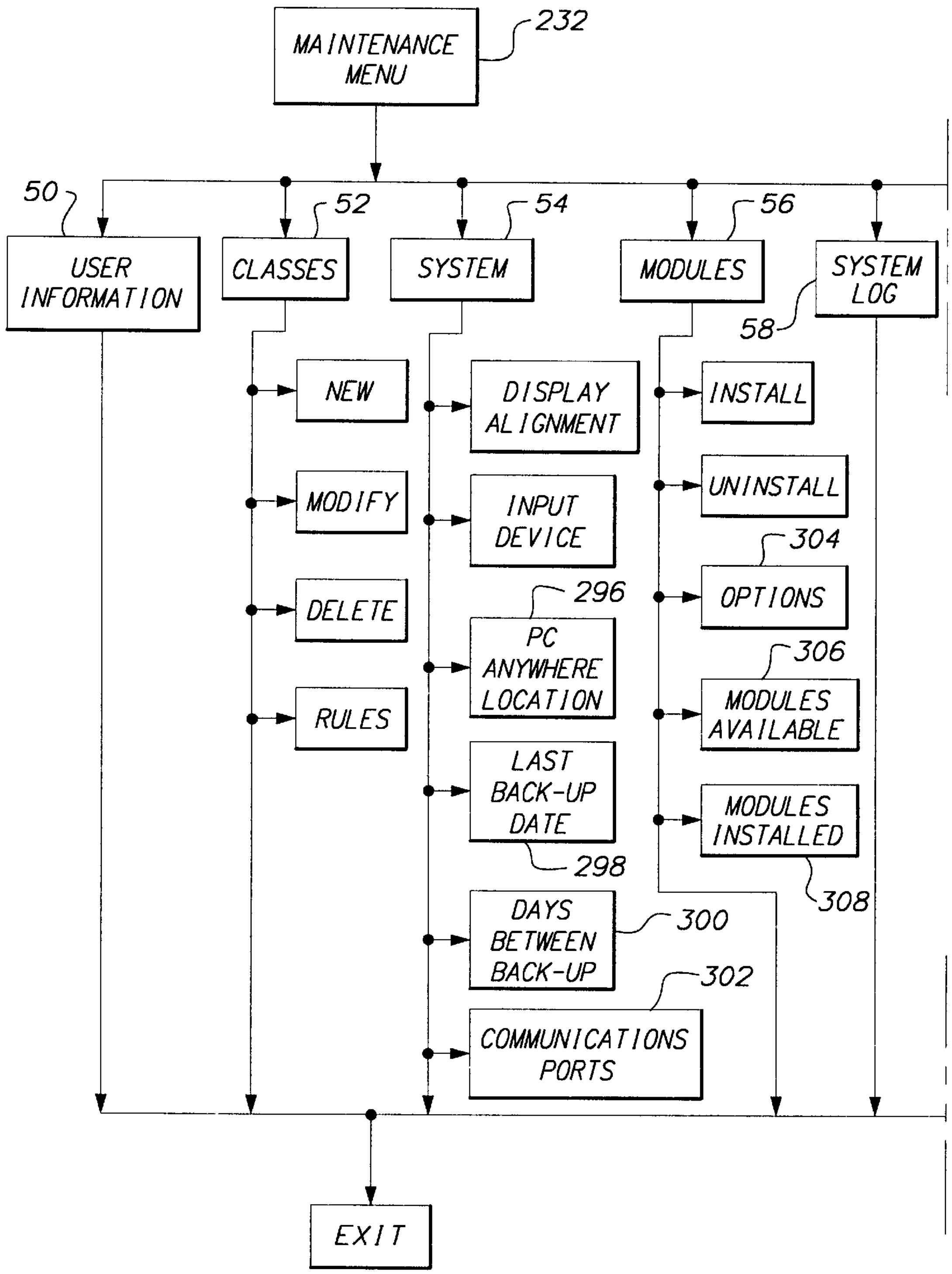
FIGS. 2A–2B is a block diagram of the Maintenance Menu of the Educational & Life Skills Organizer/Memory Aid.
Figure 2B:
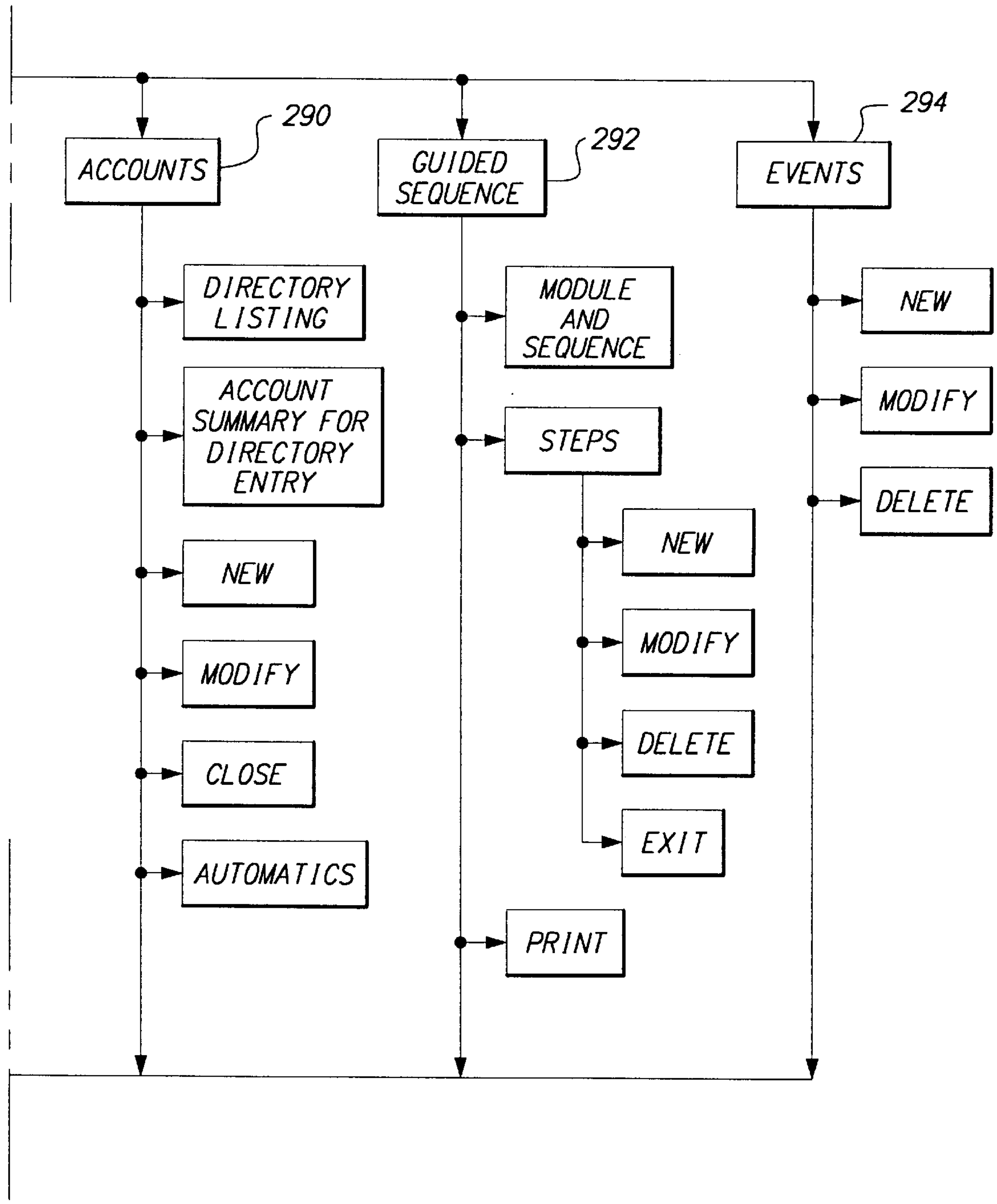

The PC Anywhere Location function 296 is used by the Back-Up option 44 and the Service option 46 in the Tools option 28 (FIG. 1A). The Back-Up option 44 uses the PC Anywhere Location function 296 to accomplish file transfers from/to the user's Educational & Life Skills Organizer/ Memory Aid 220 while the Service option 46 uses the PC Anywhere Location function 296 to permit remote control of the user's Educational & Life Skills Organizer/Memory Aid 220. The Last Back-Up Date function 298 is used by the secondary user to confirm when the primary user conducted the last back-up. The Days Between Back-Up function 300 permits the secondary user the ability to adjust the number of days that pass until the Back-Up Remind prompt 48 on the Main Menu appears again. The Communications Port function 302 indicates on which port the modem hardware is to be found.

Figure 65A:
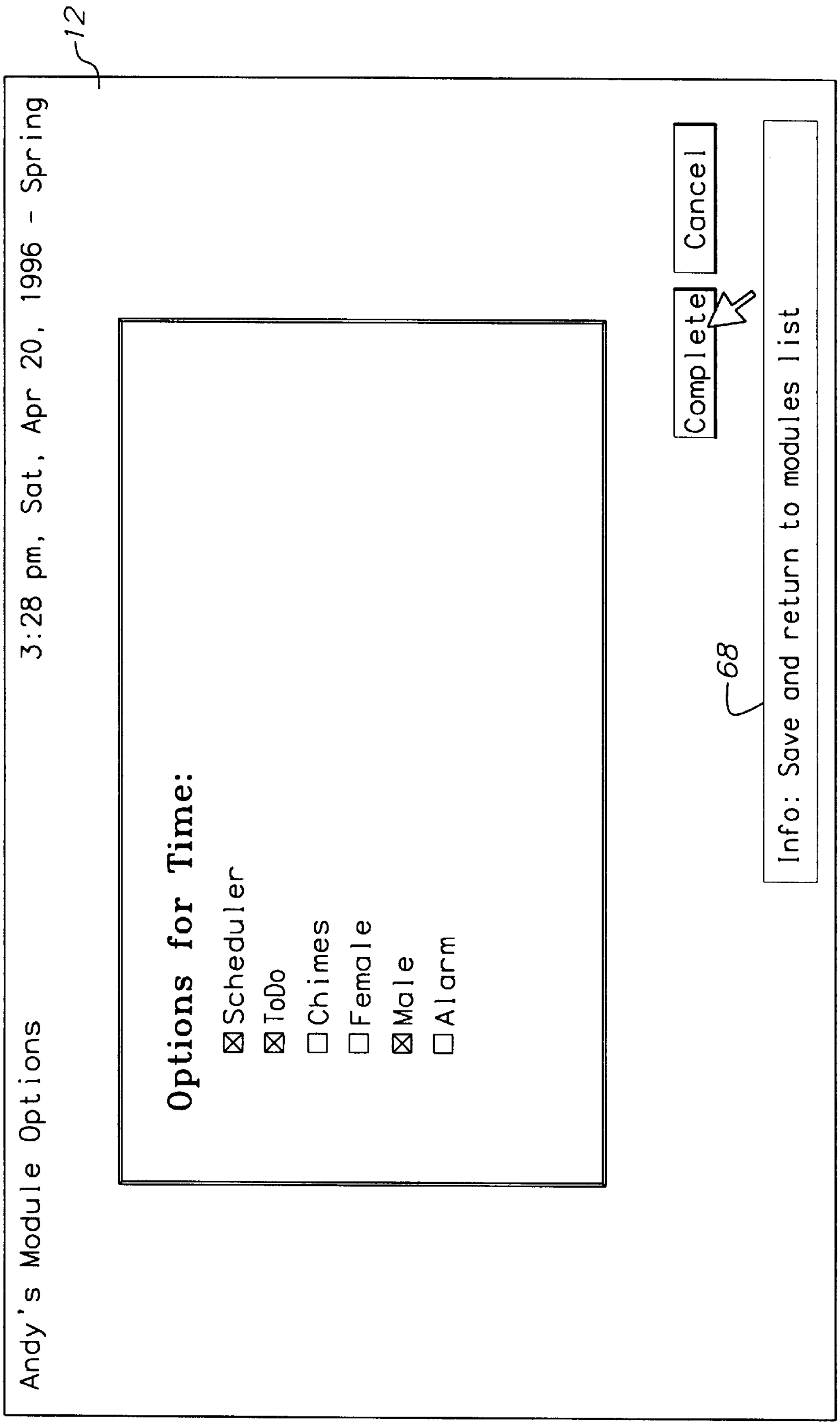
FIG. 65A is the Options portion of the Modules of the Maintenance Menu.
Figure 162:
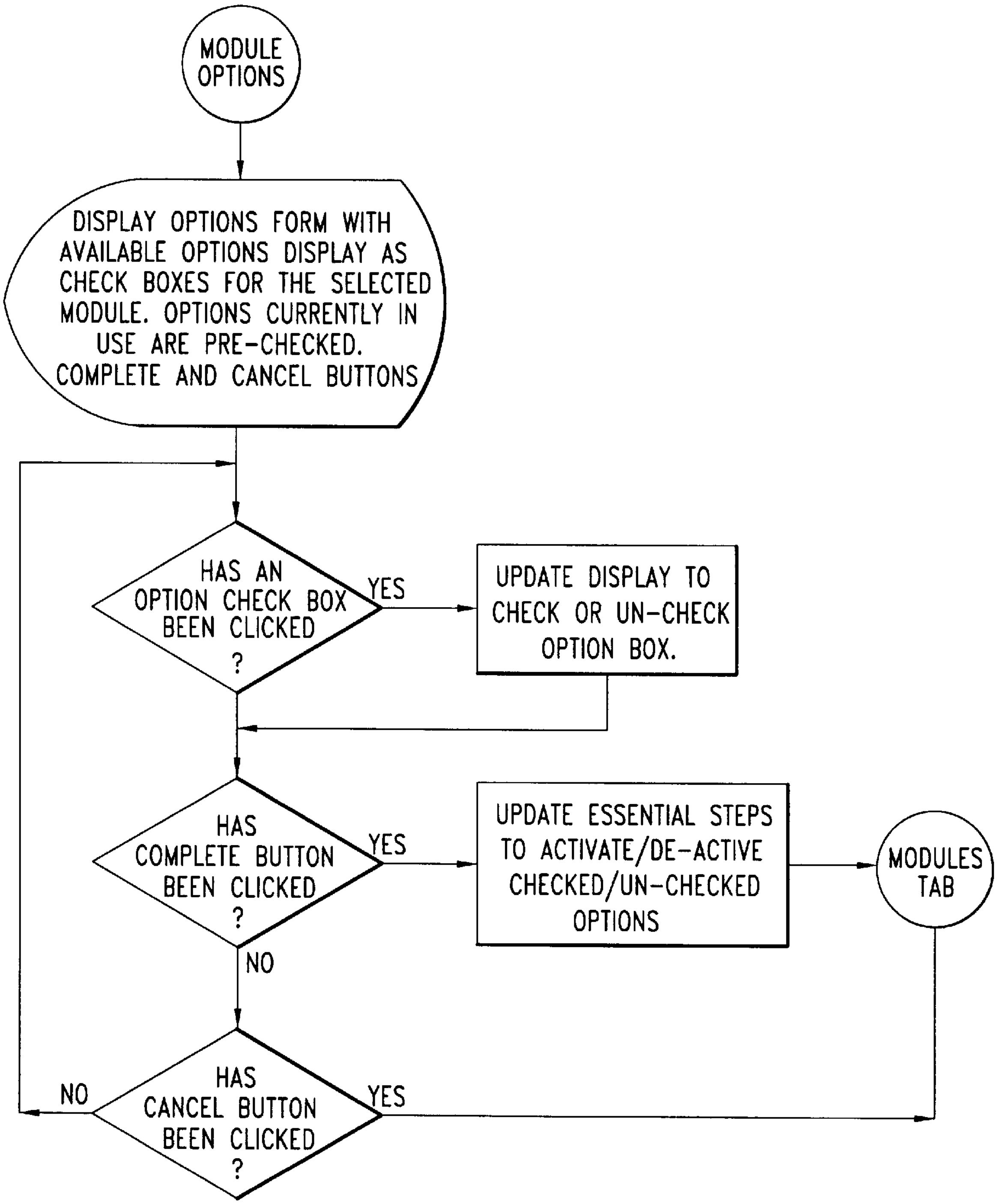
FIG. 162 is the flow chart for the Options function in the Modules of the Maintenance Menu.
Figure 163:
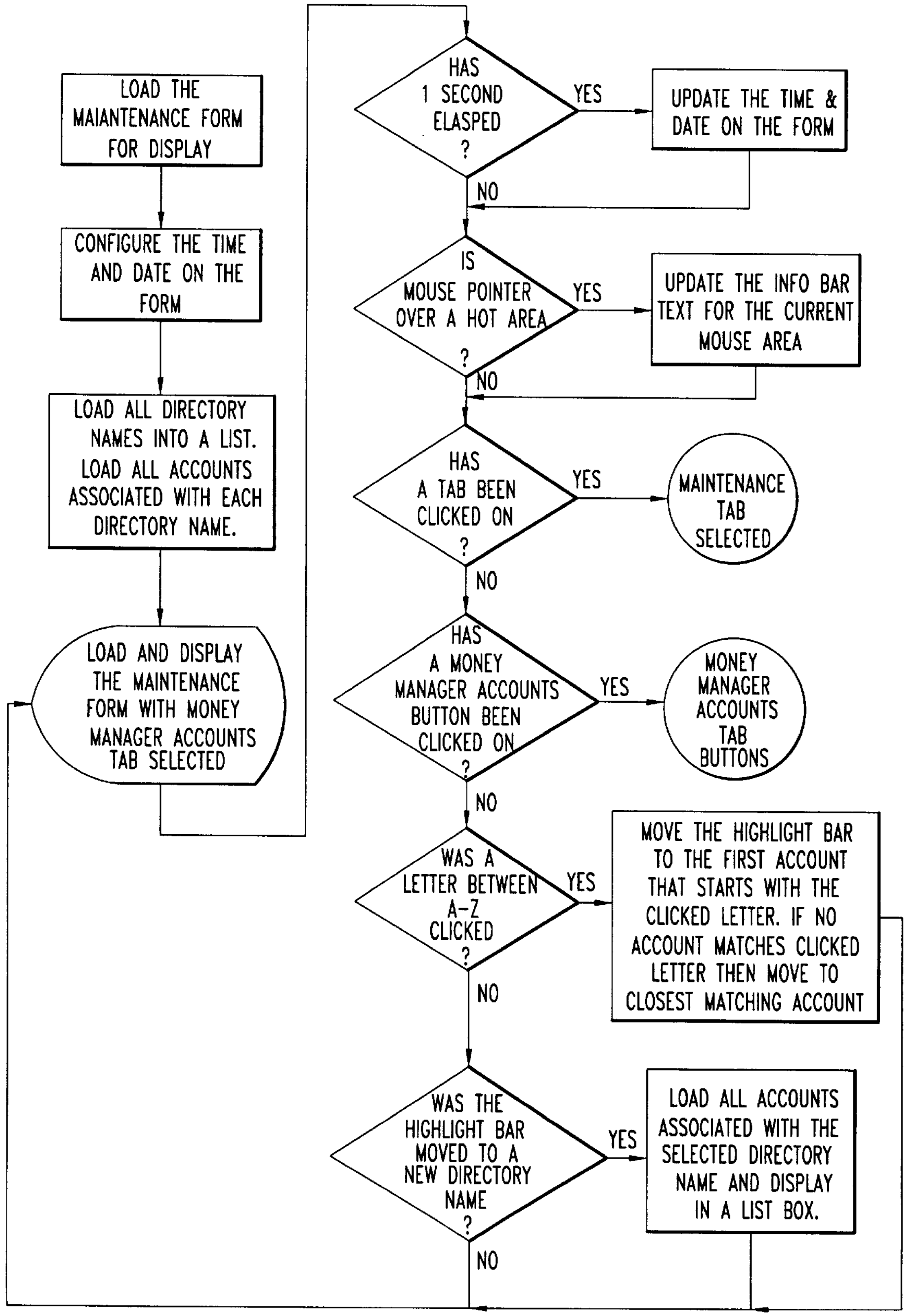
FIGS. 163–177 constitute the flow chart for the Accounts option of the Maintenance Menu.
Figure 164:
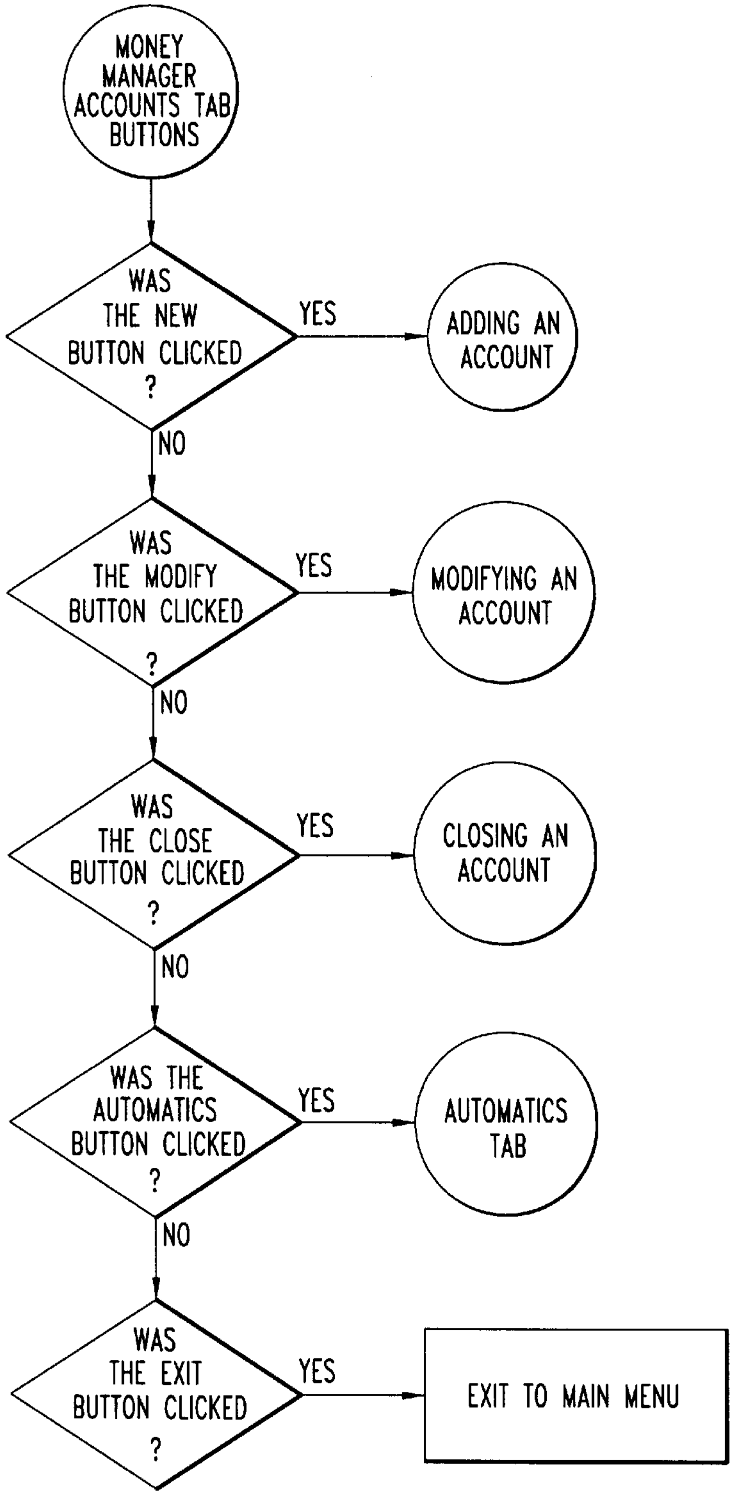
Figure 165:
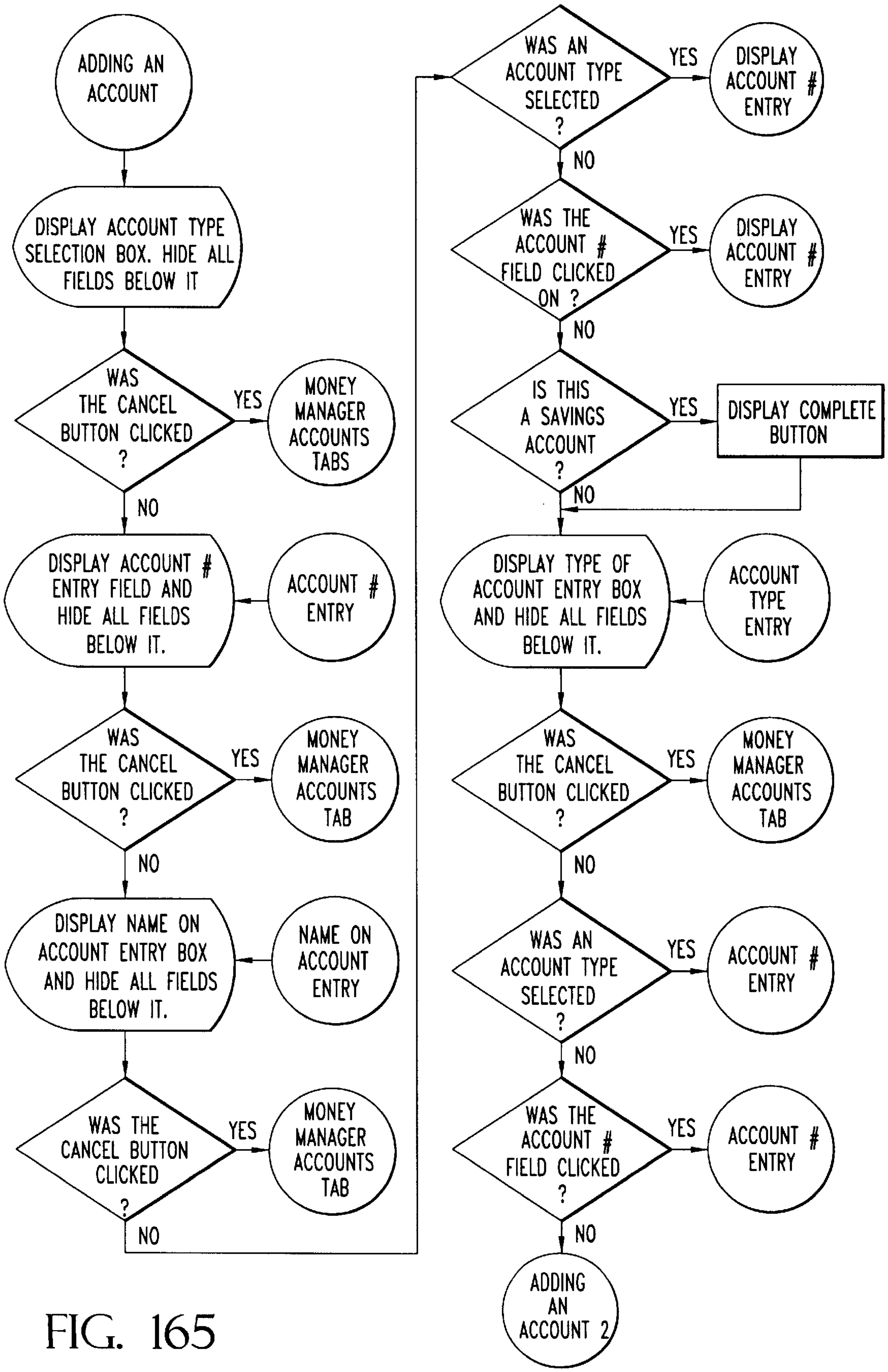
Figure 166:
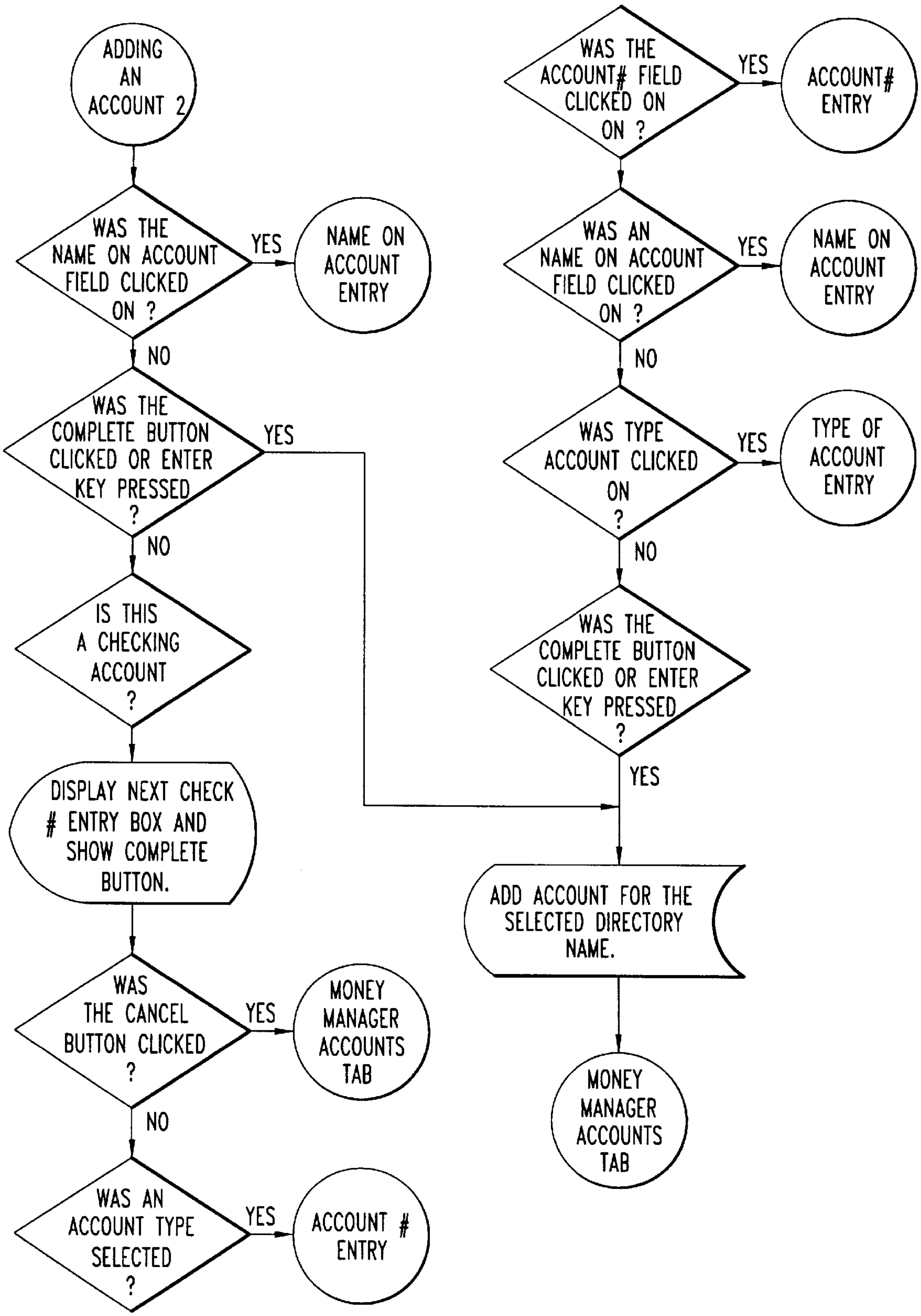
Figure 167:
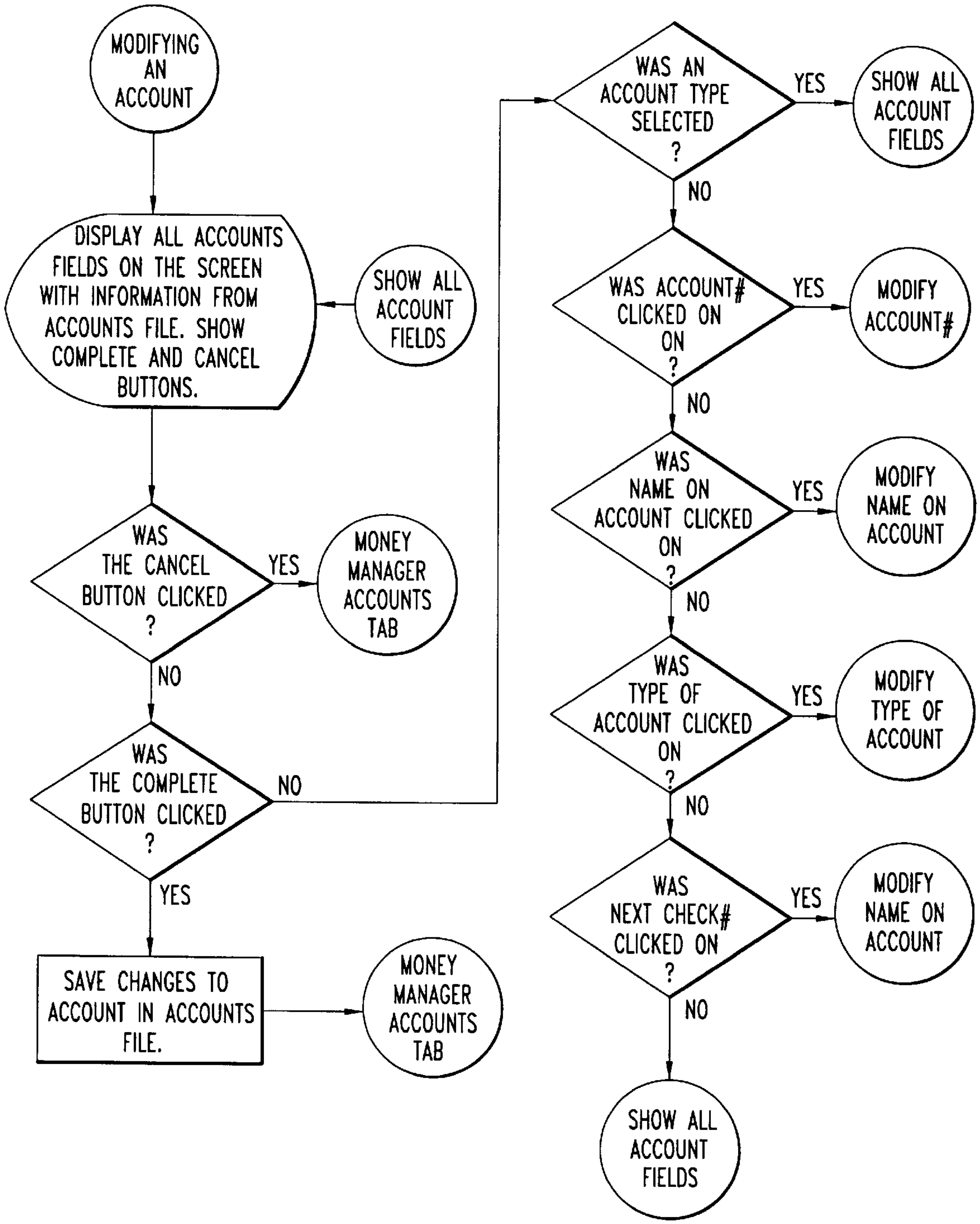
Figure 168:
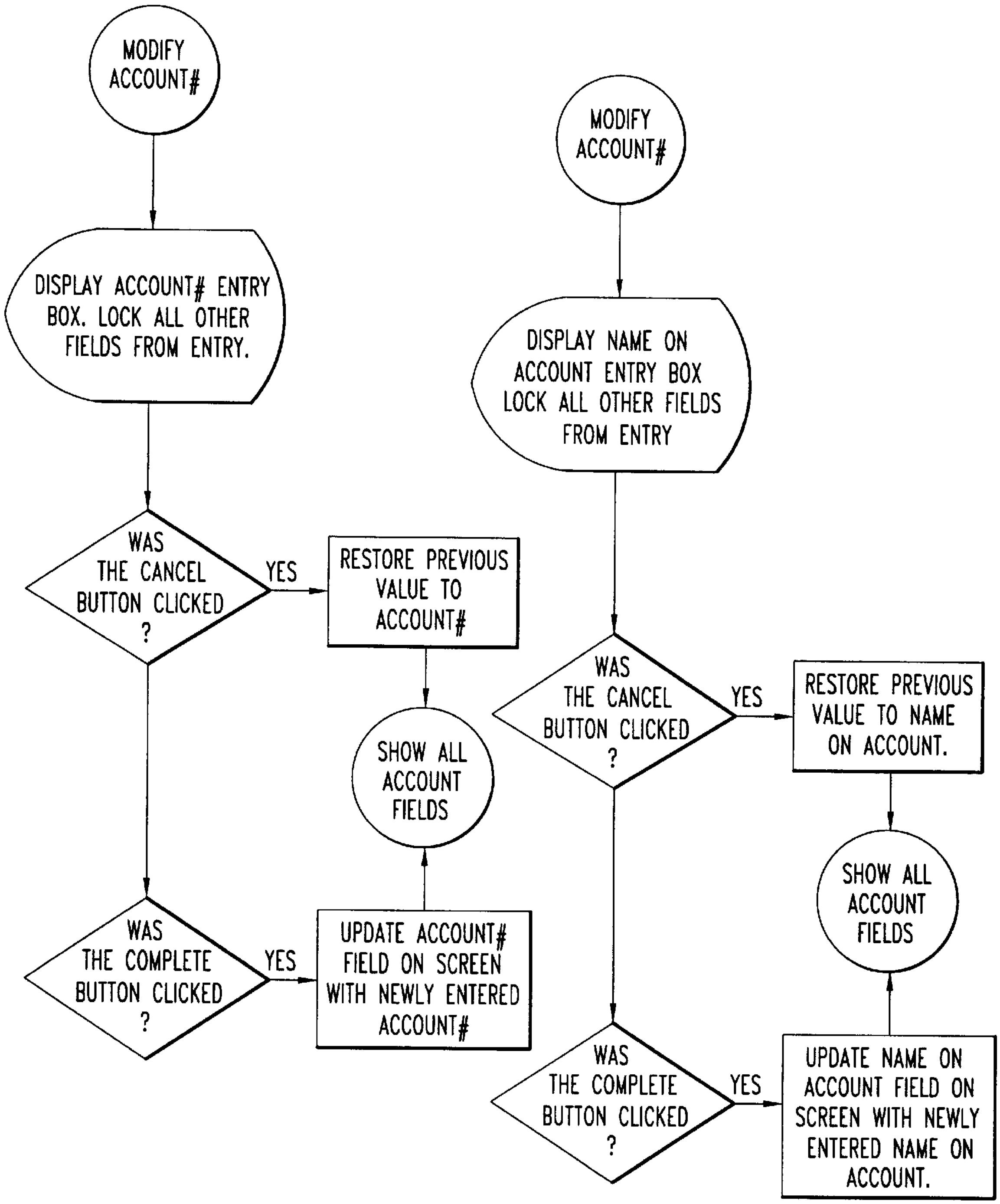
Figure 169:
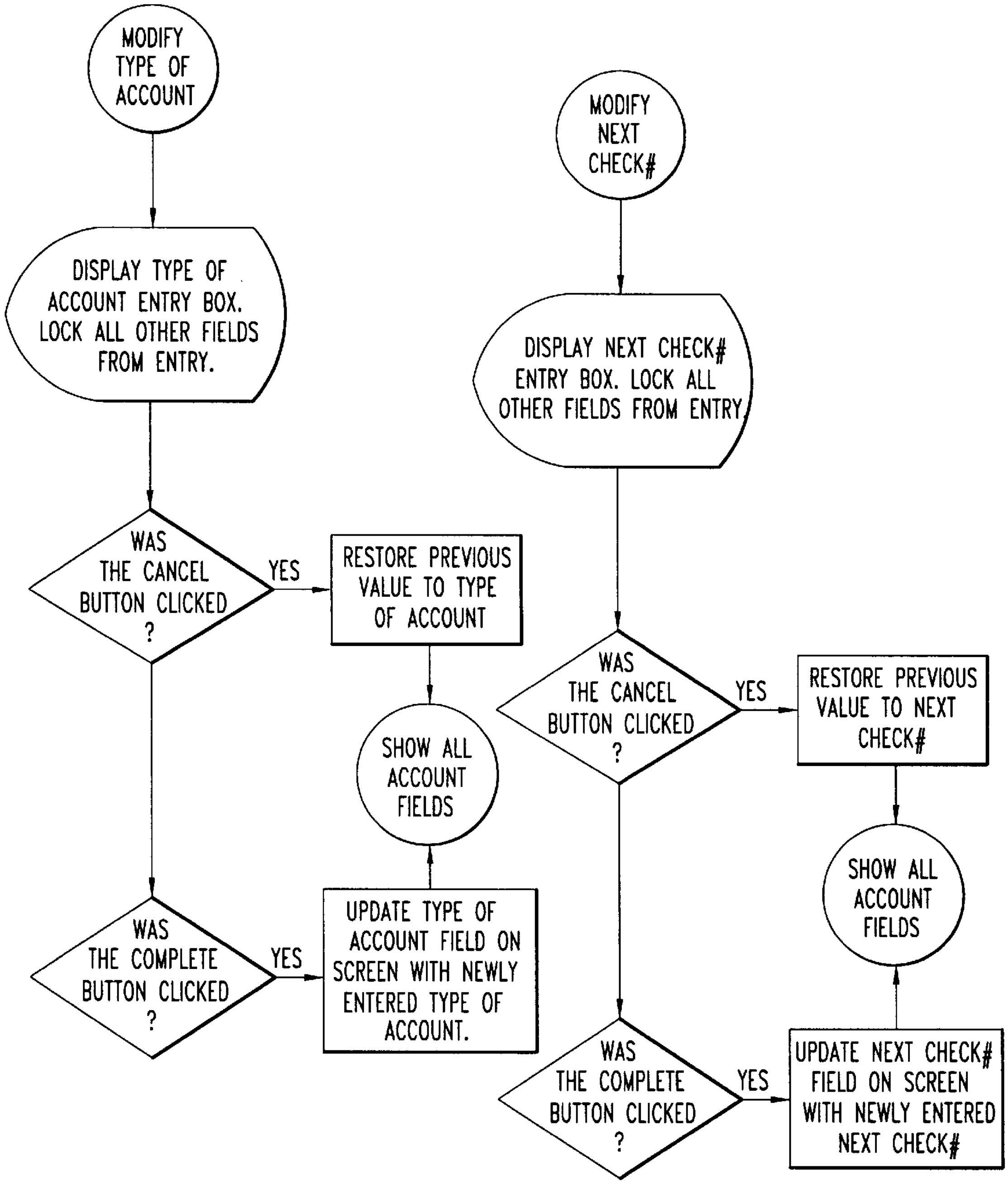
Figure 170:
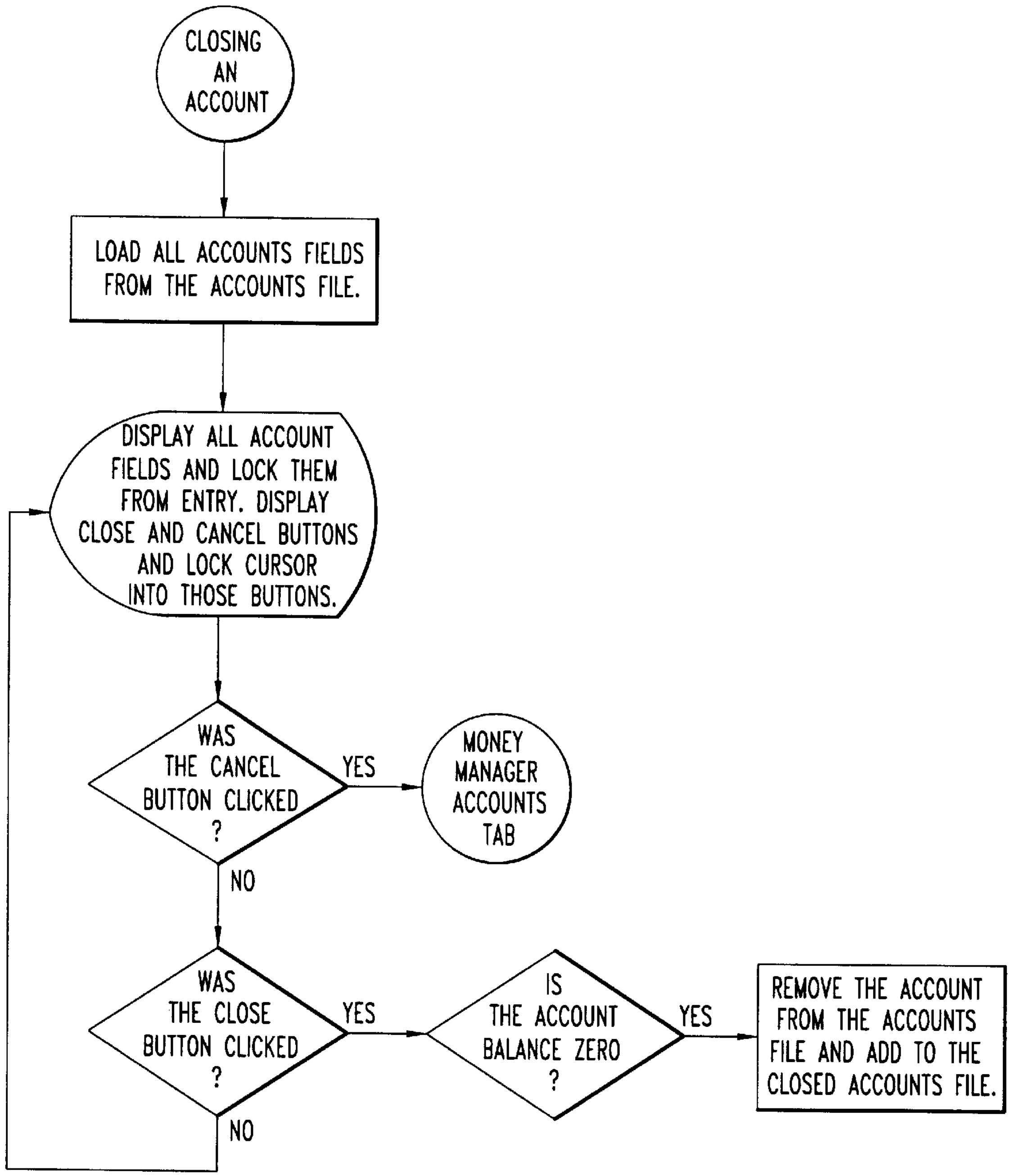
Figure 171:
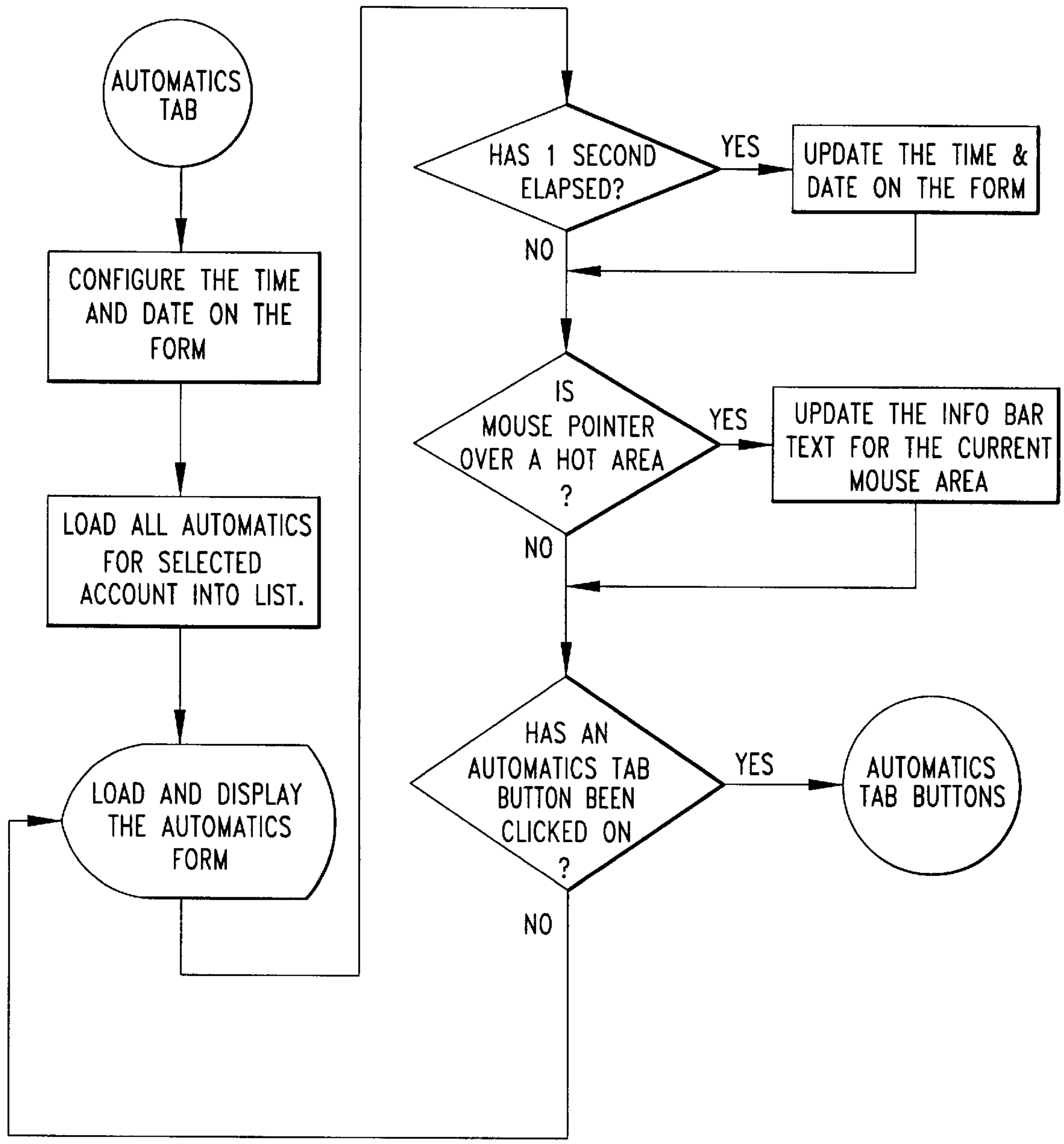
Figure 172:
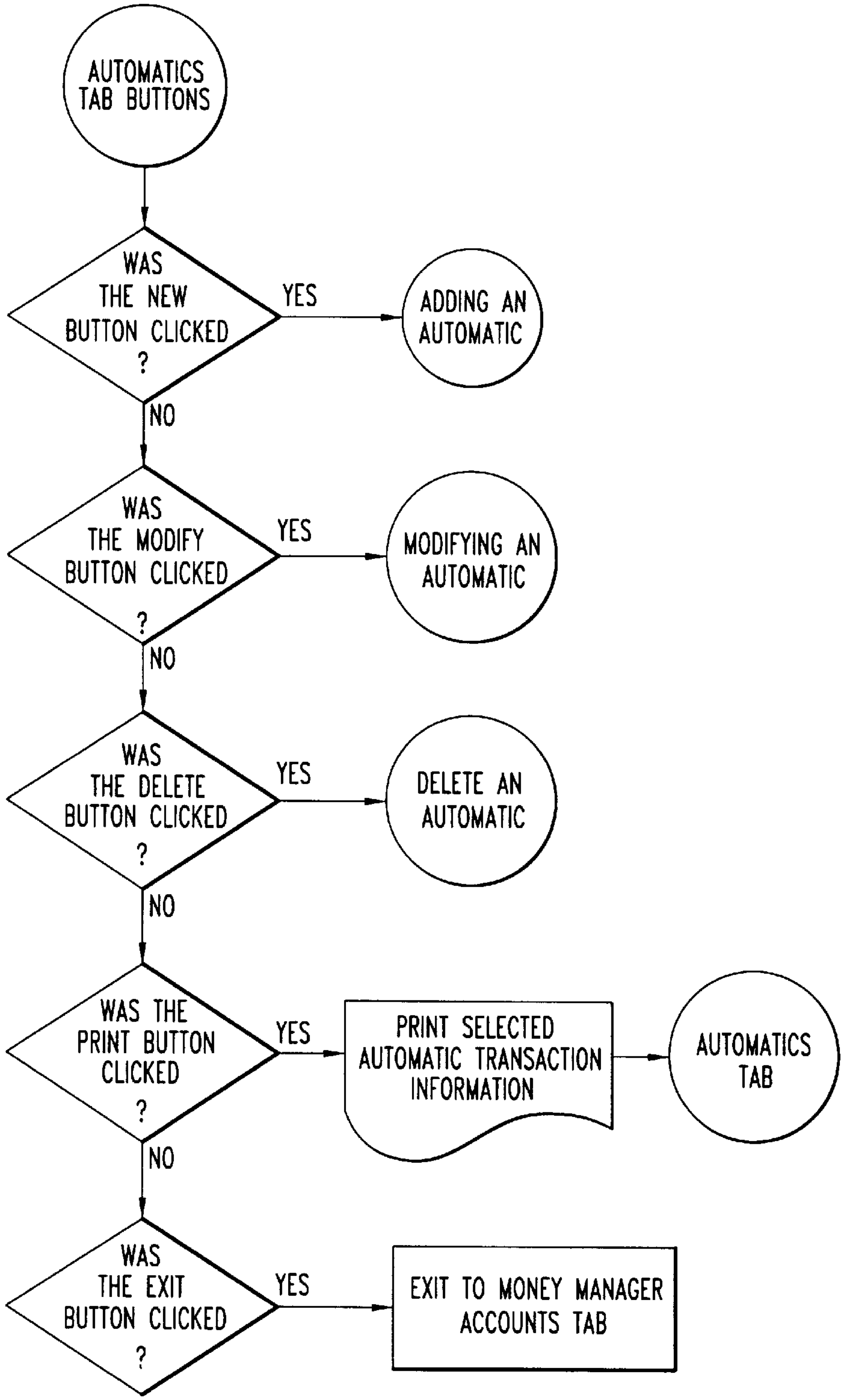
Figure 173:
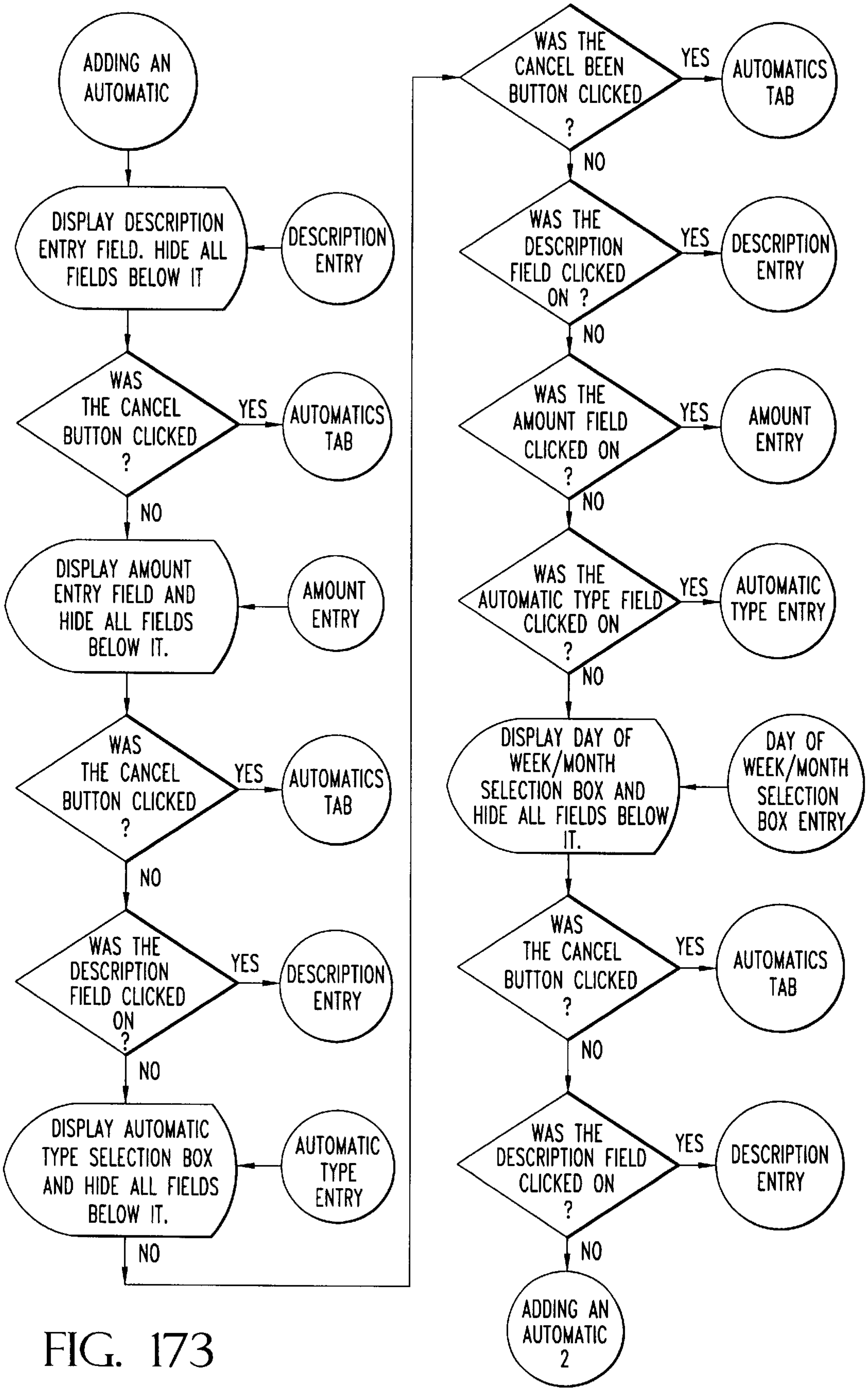
Figure 174:
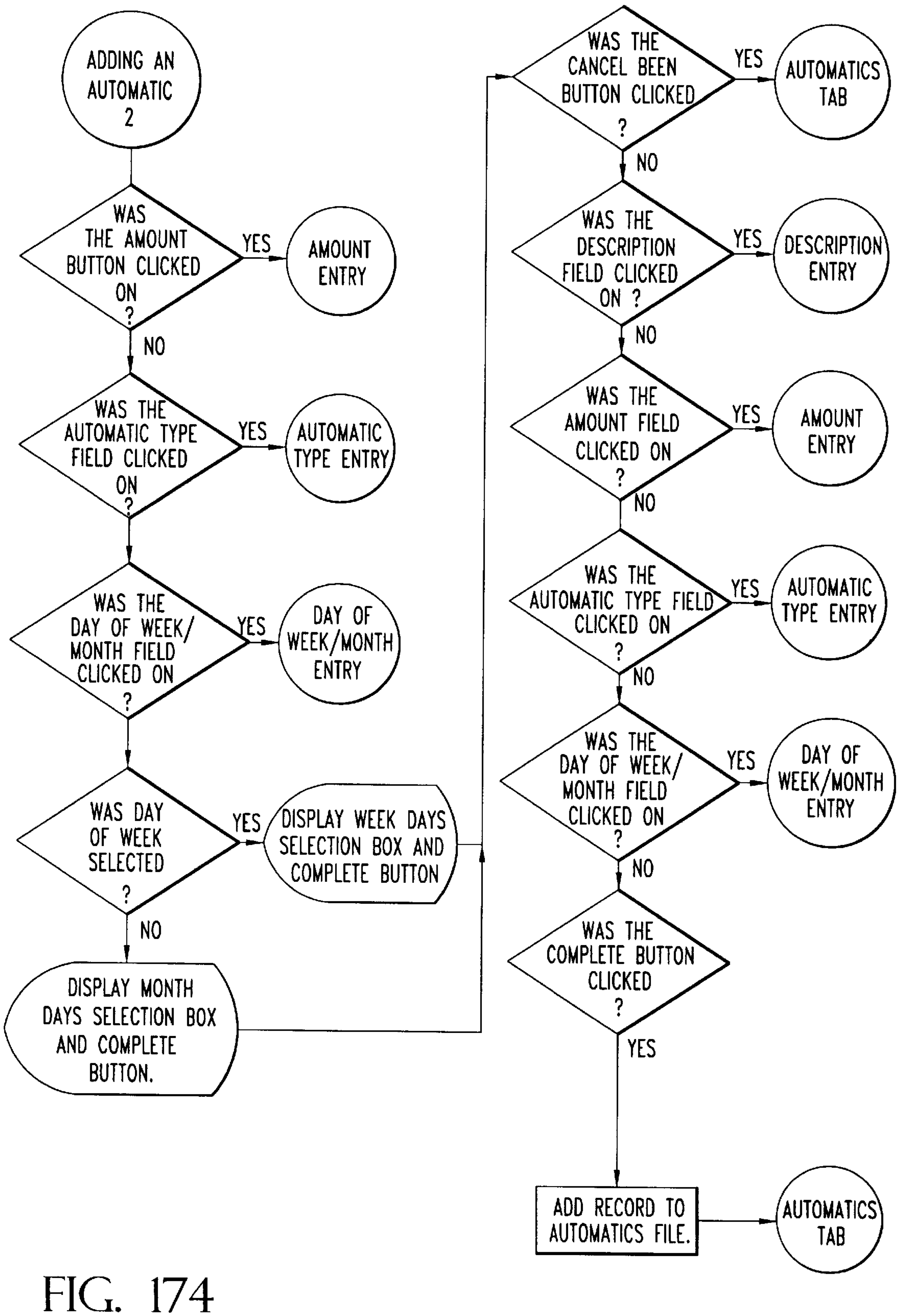
Figure 175:
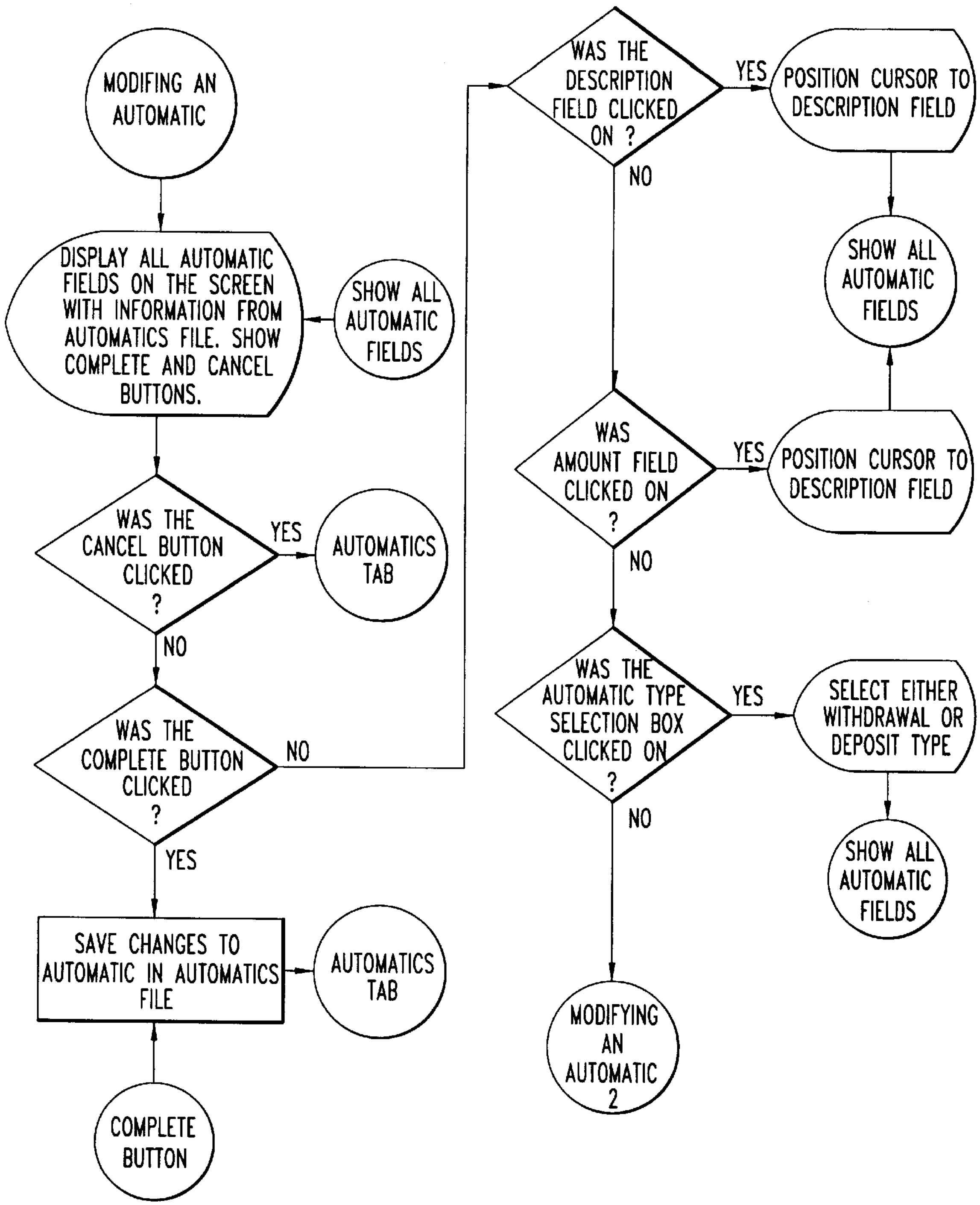
Figure 176:
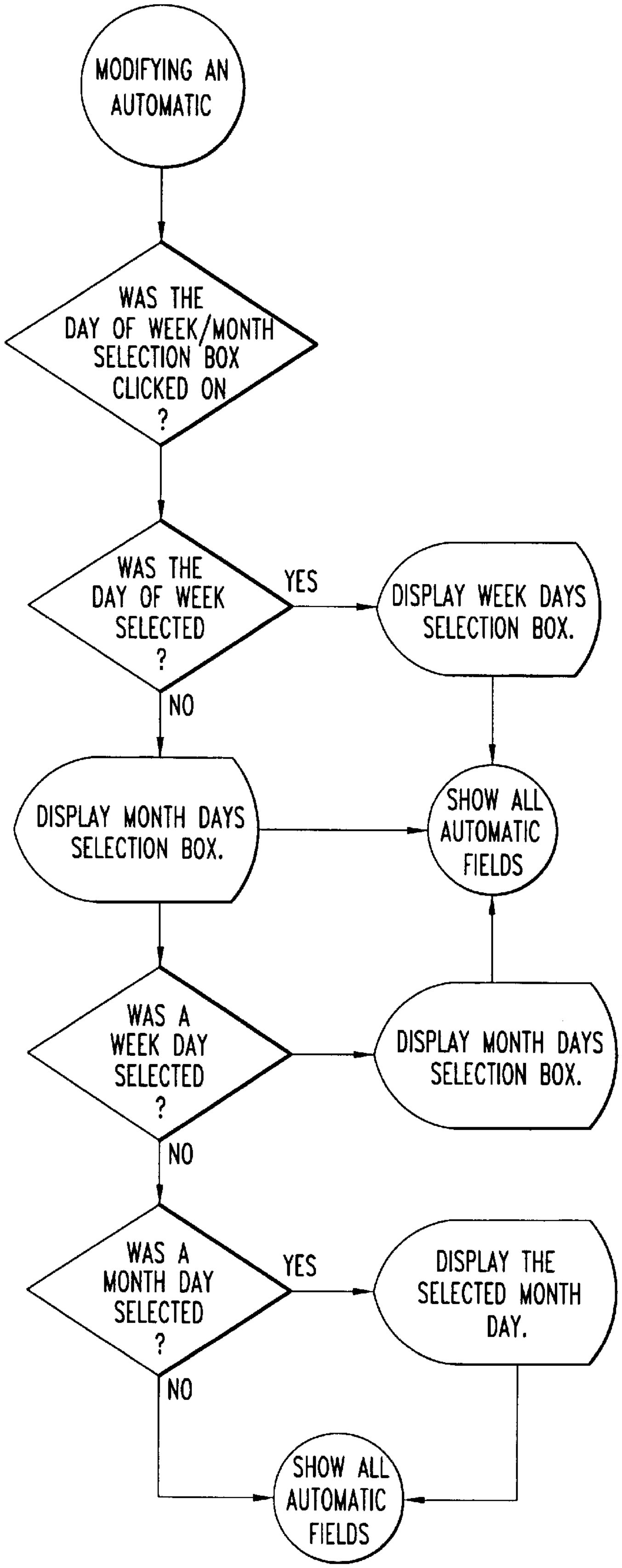
Figure 177:
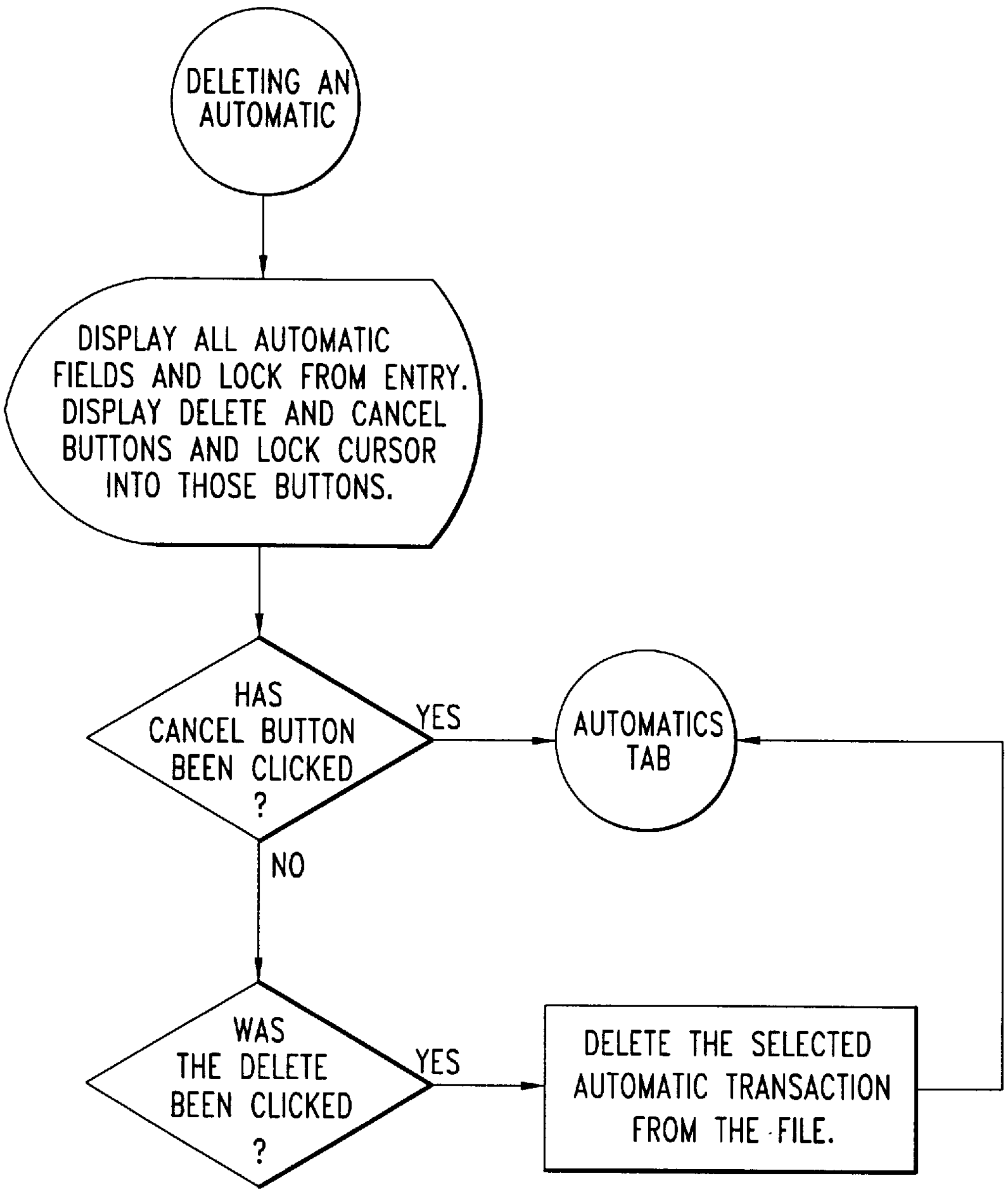
Figure 178:
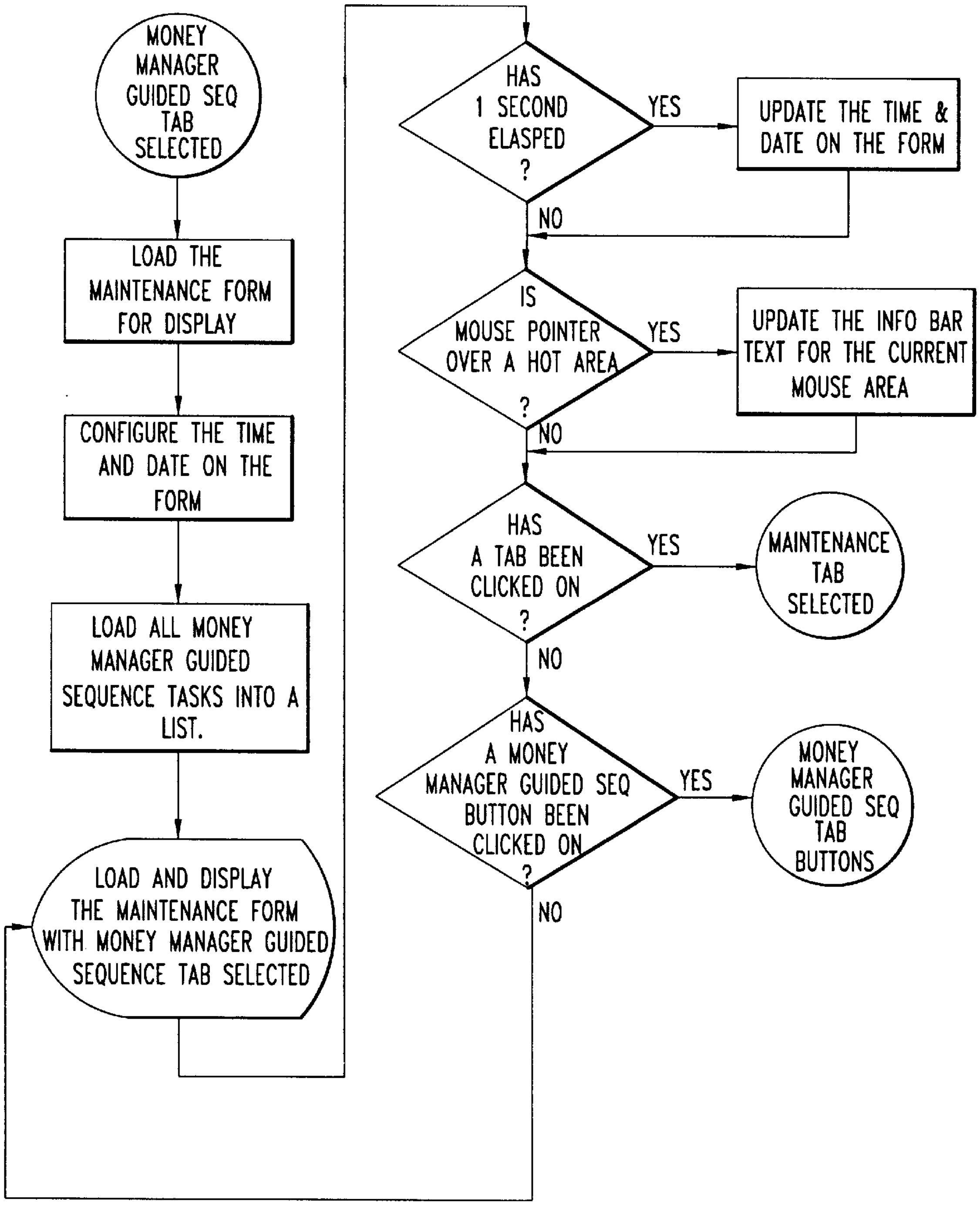
FIGS. 178–186 constitute the flow chart for the Guided Sequence option of the Maintenance Menu.
Figure 179:
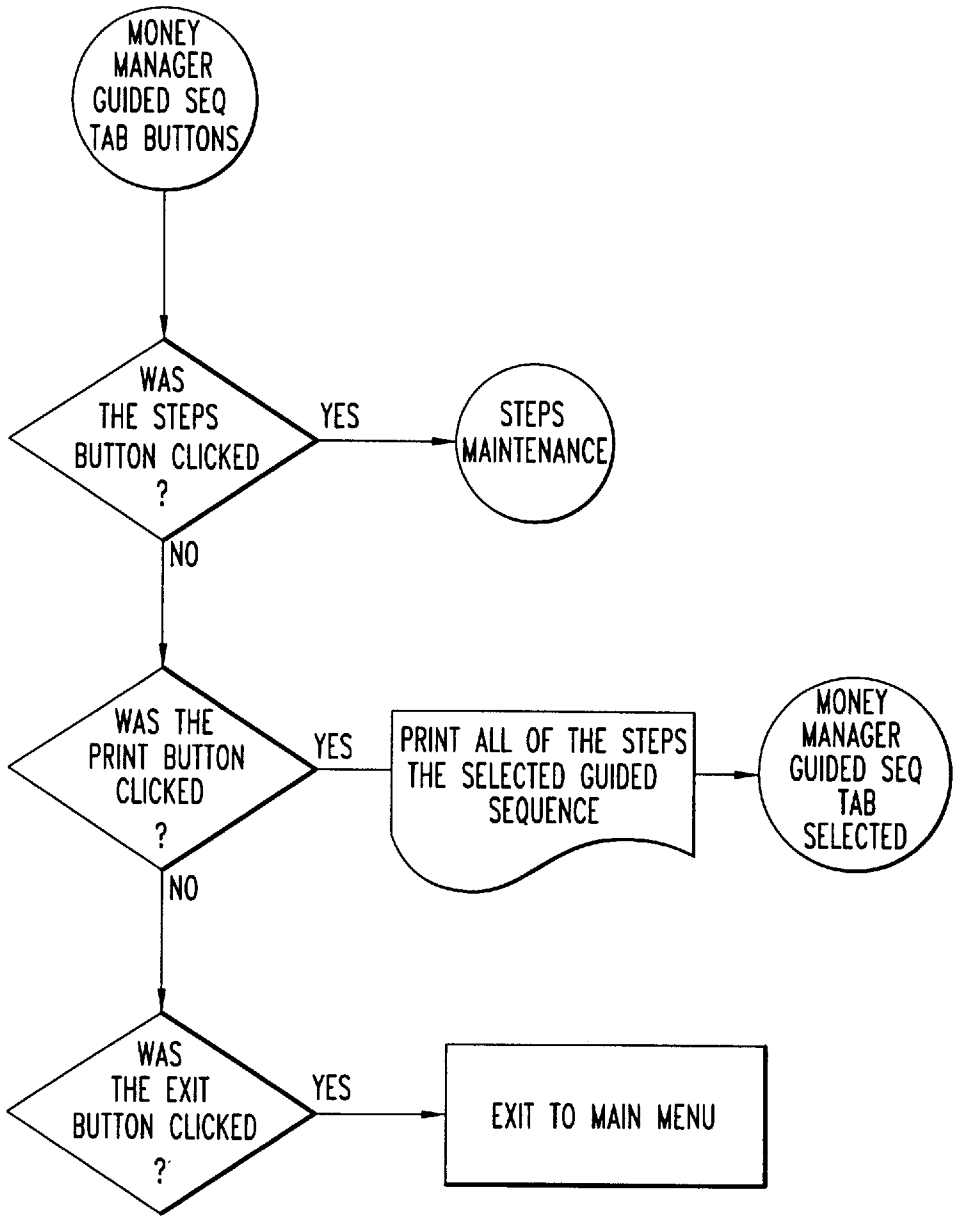
Figure 180:
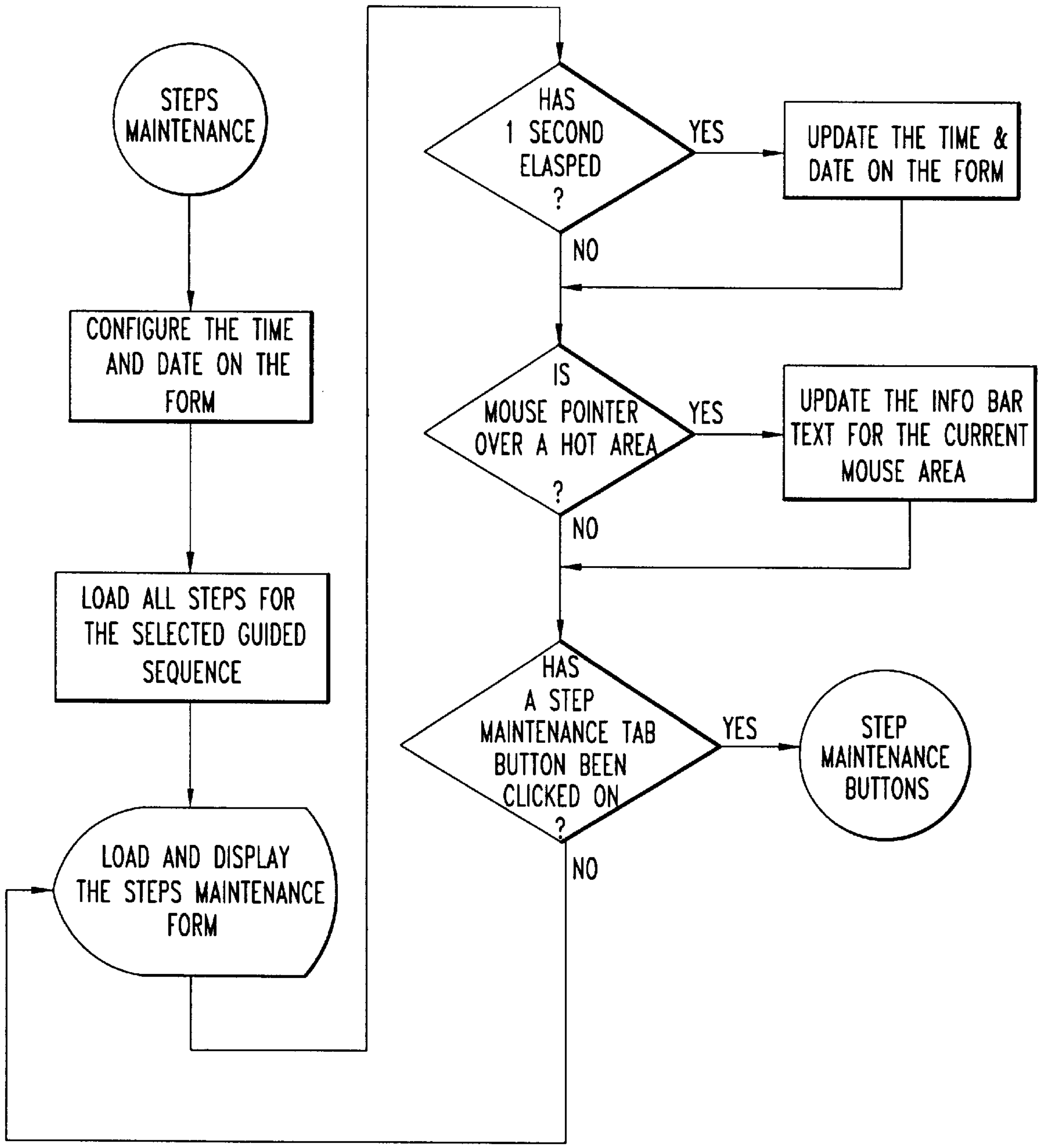
Figure 181:
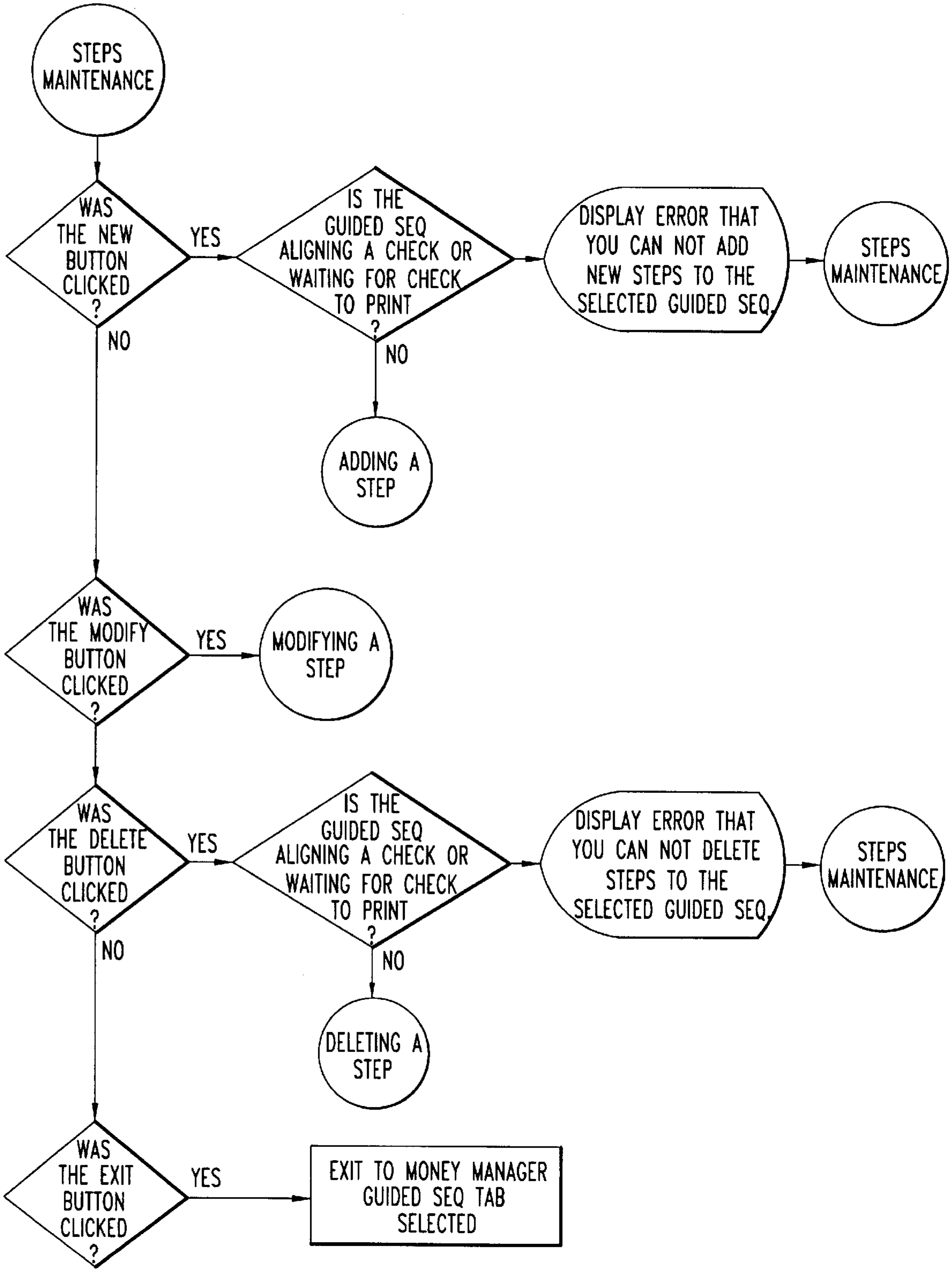
Figure 182:
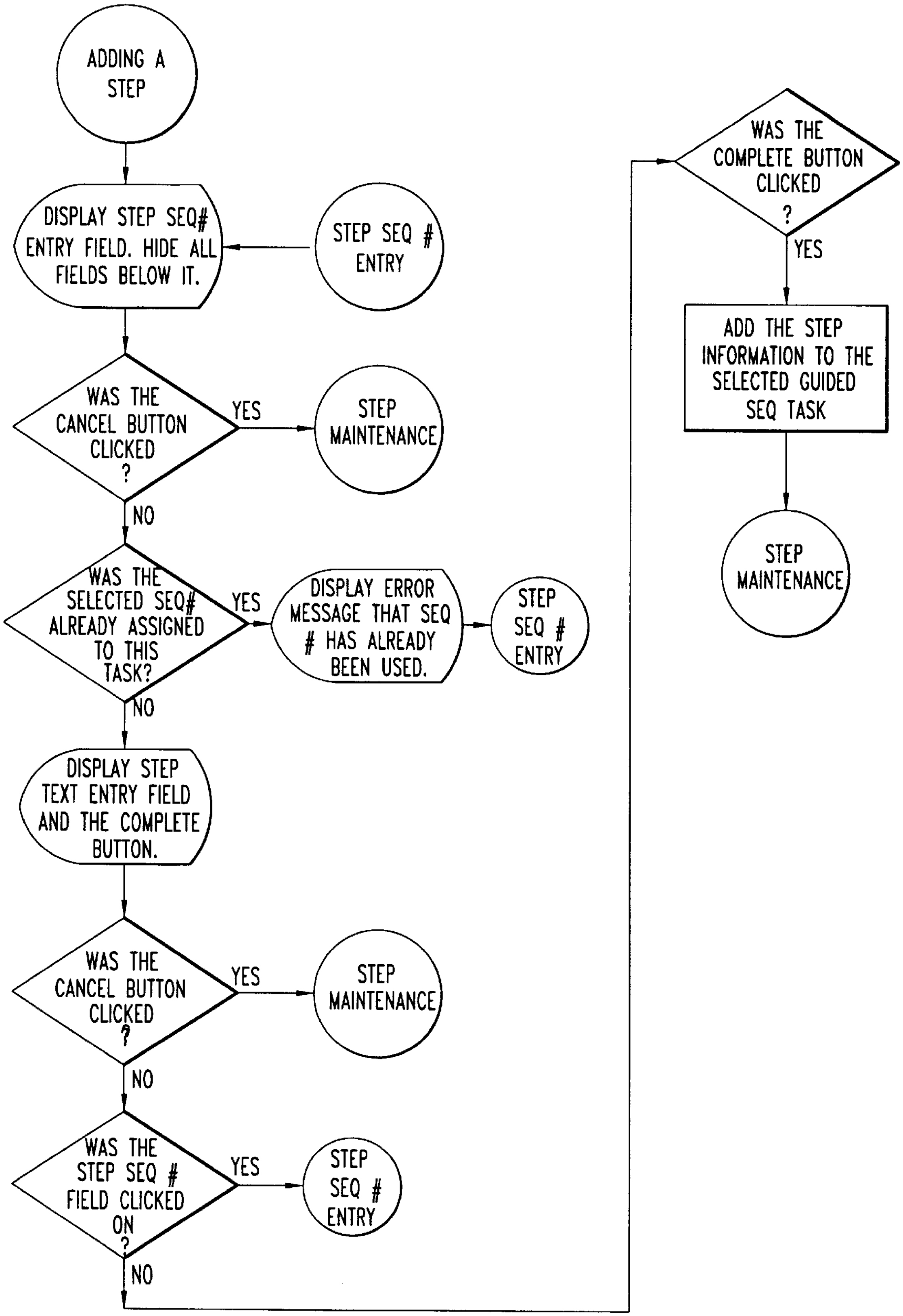
Figure 183:
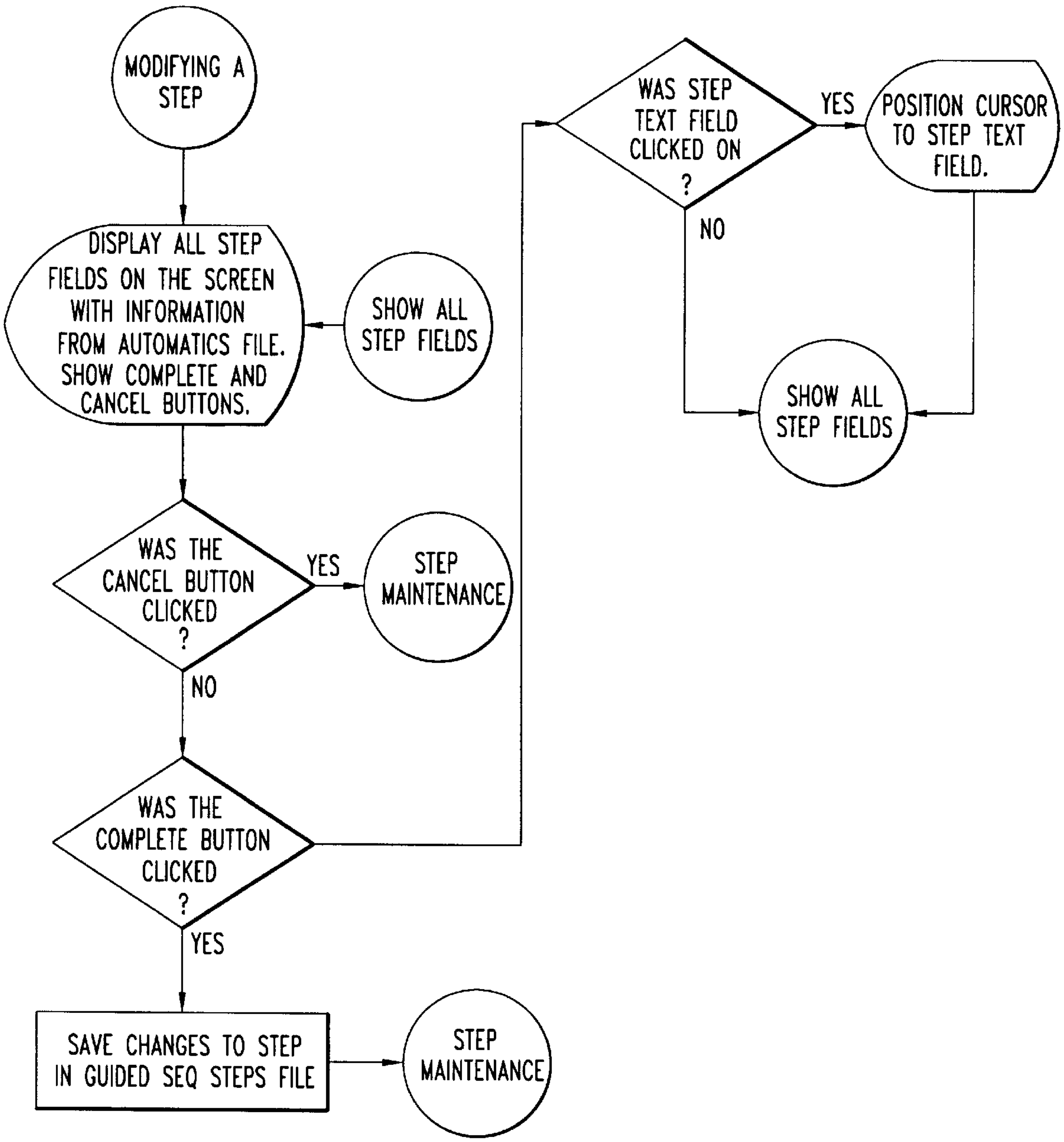
Figure 184:
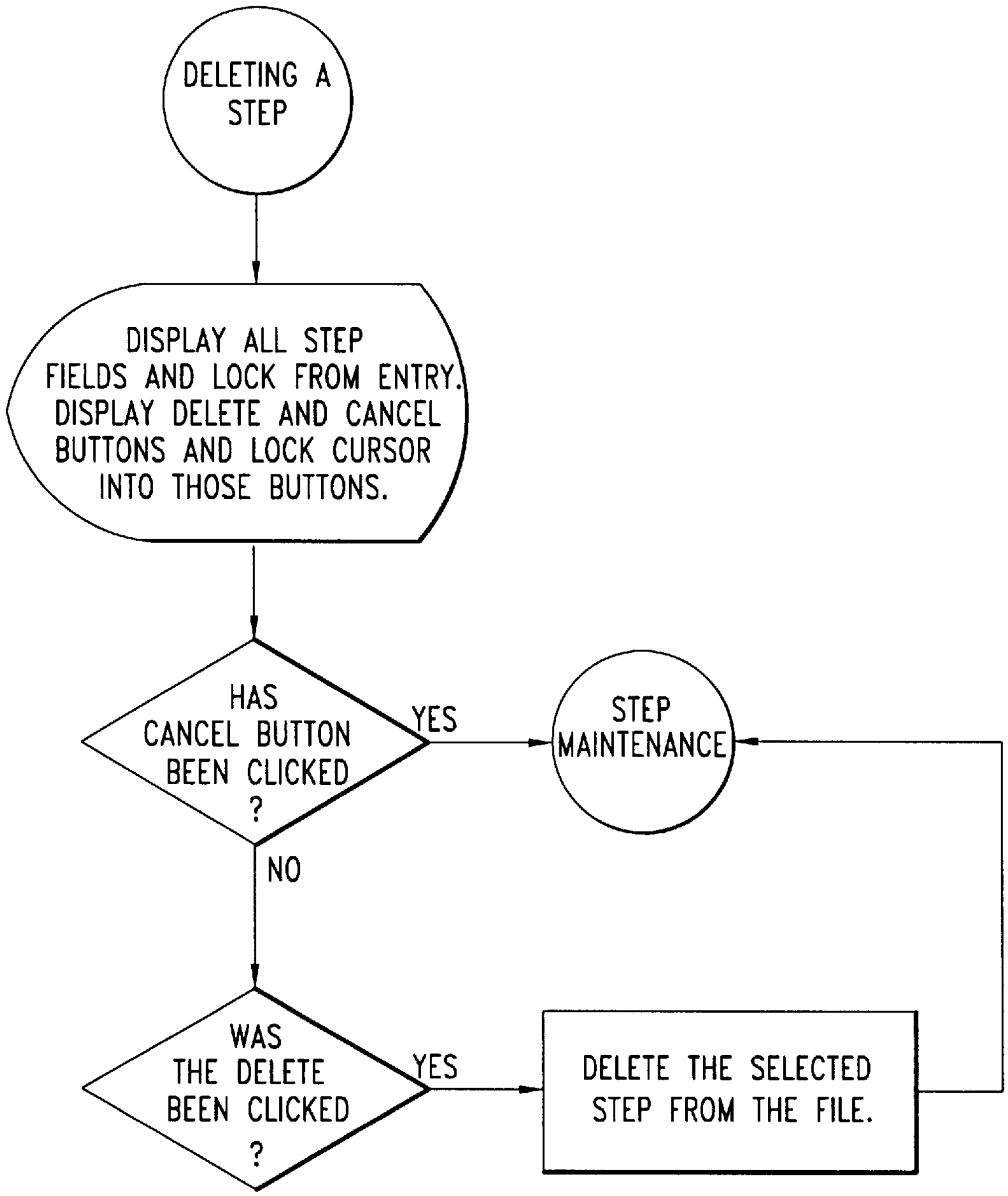
Figure 185:
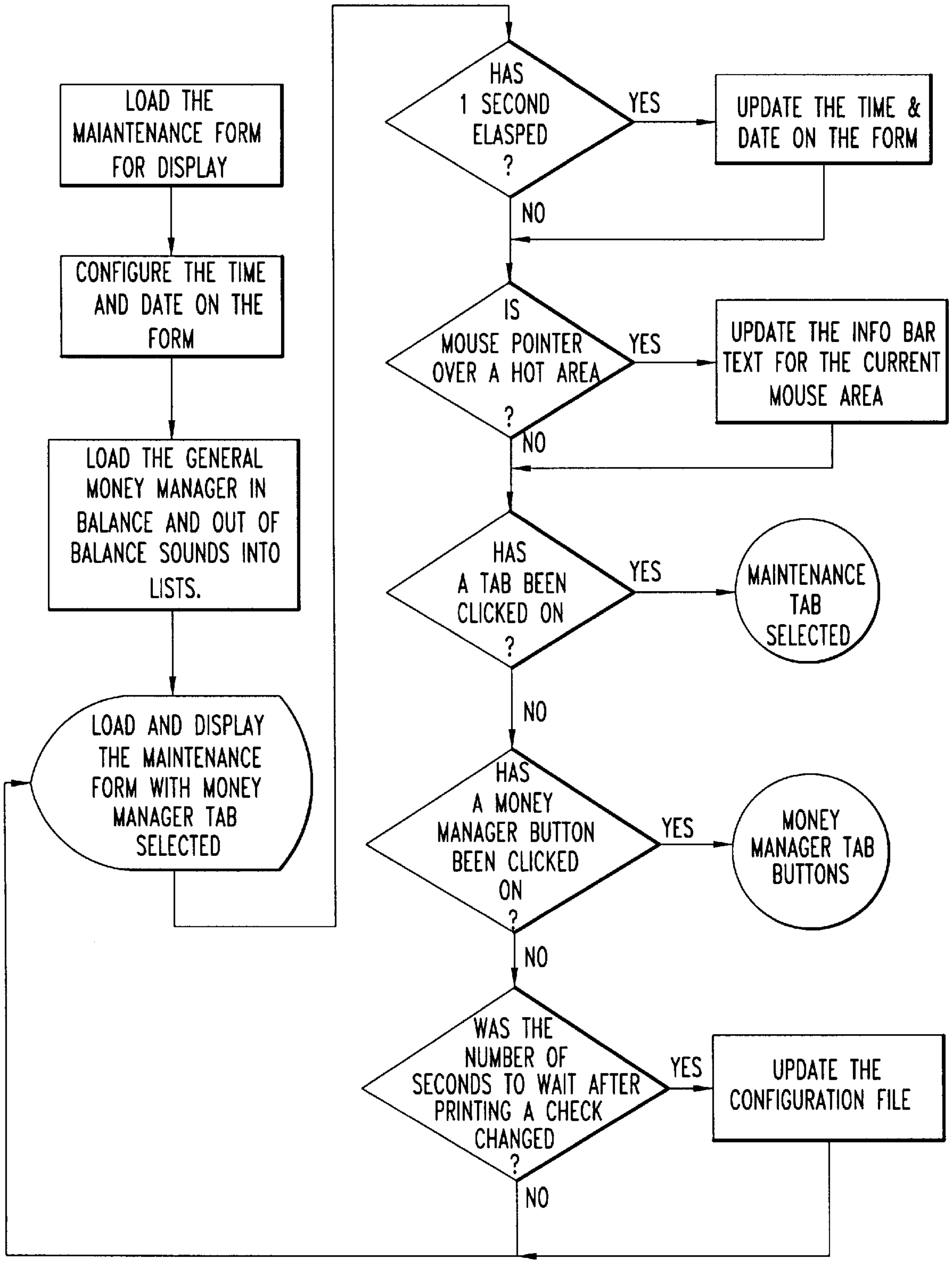
Figure 186:
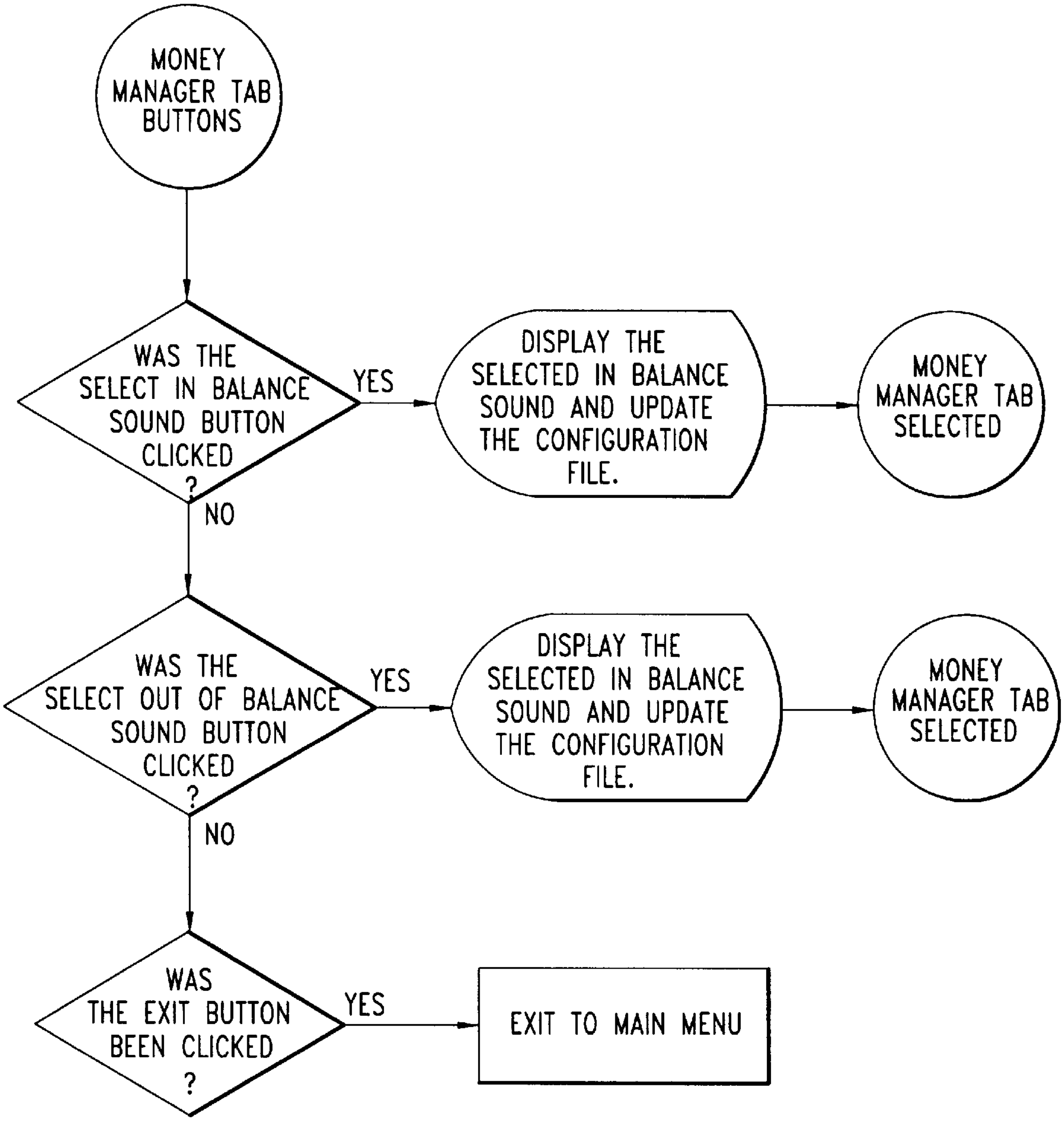
Figure 187:
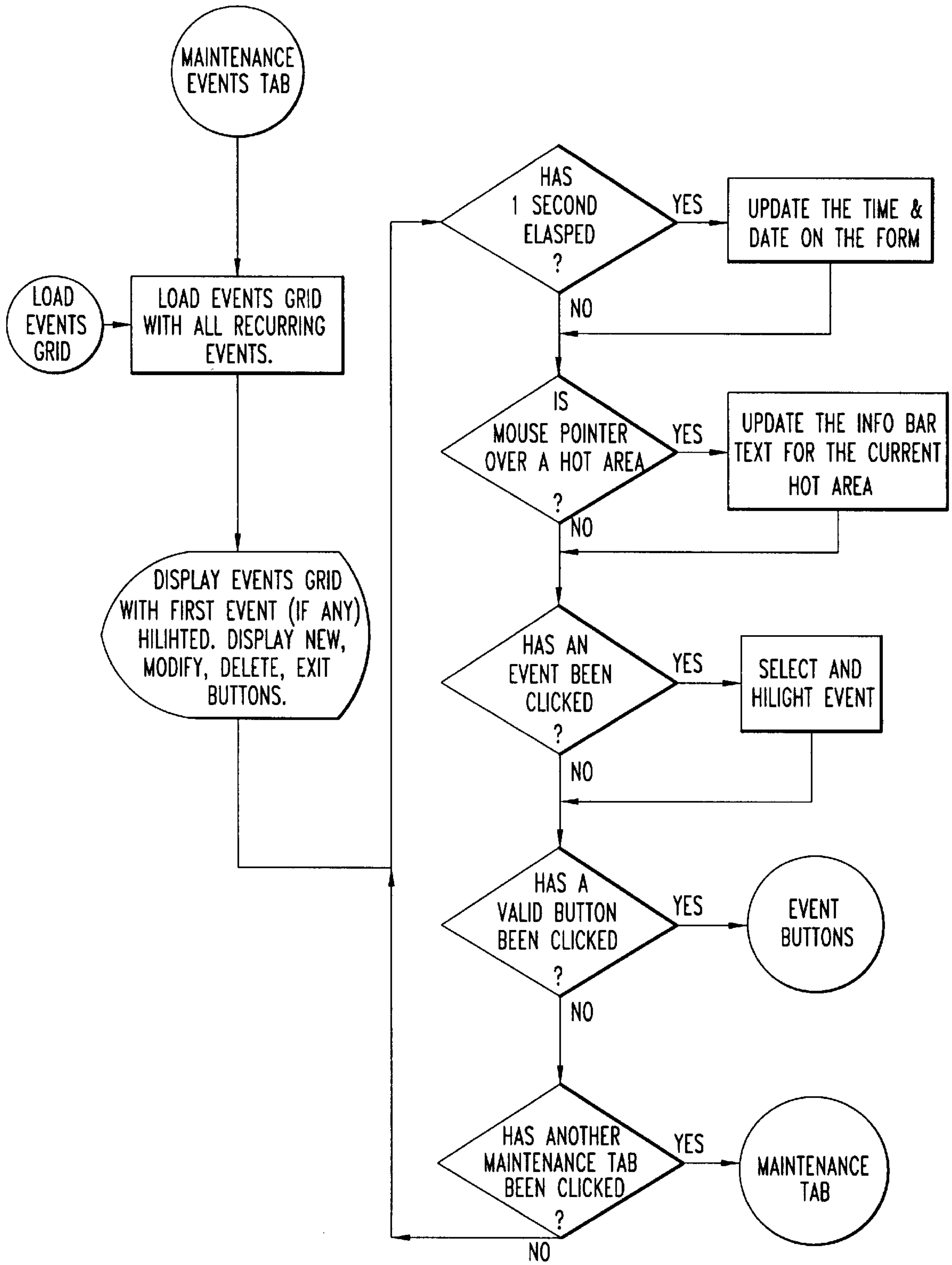
FIGS. 187–190 constitute the flow chart for the Events option of the Maintenance Menu.
Figure 188:
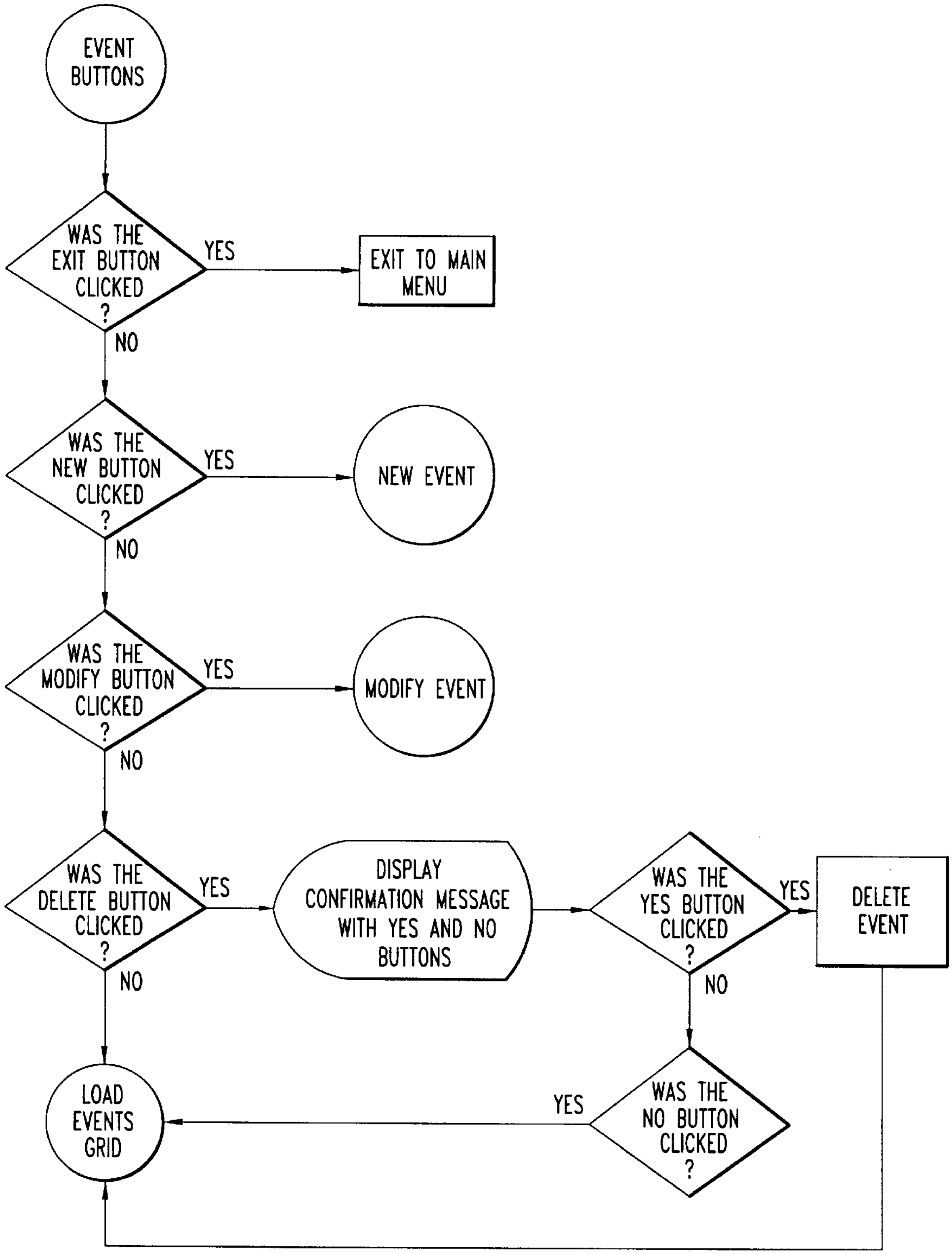
Figure 189A:
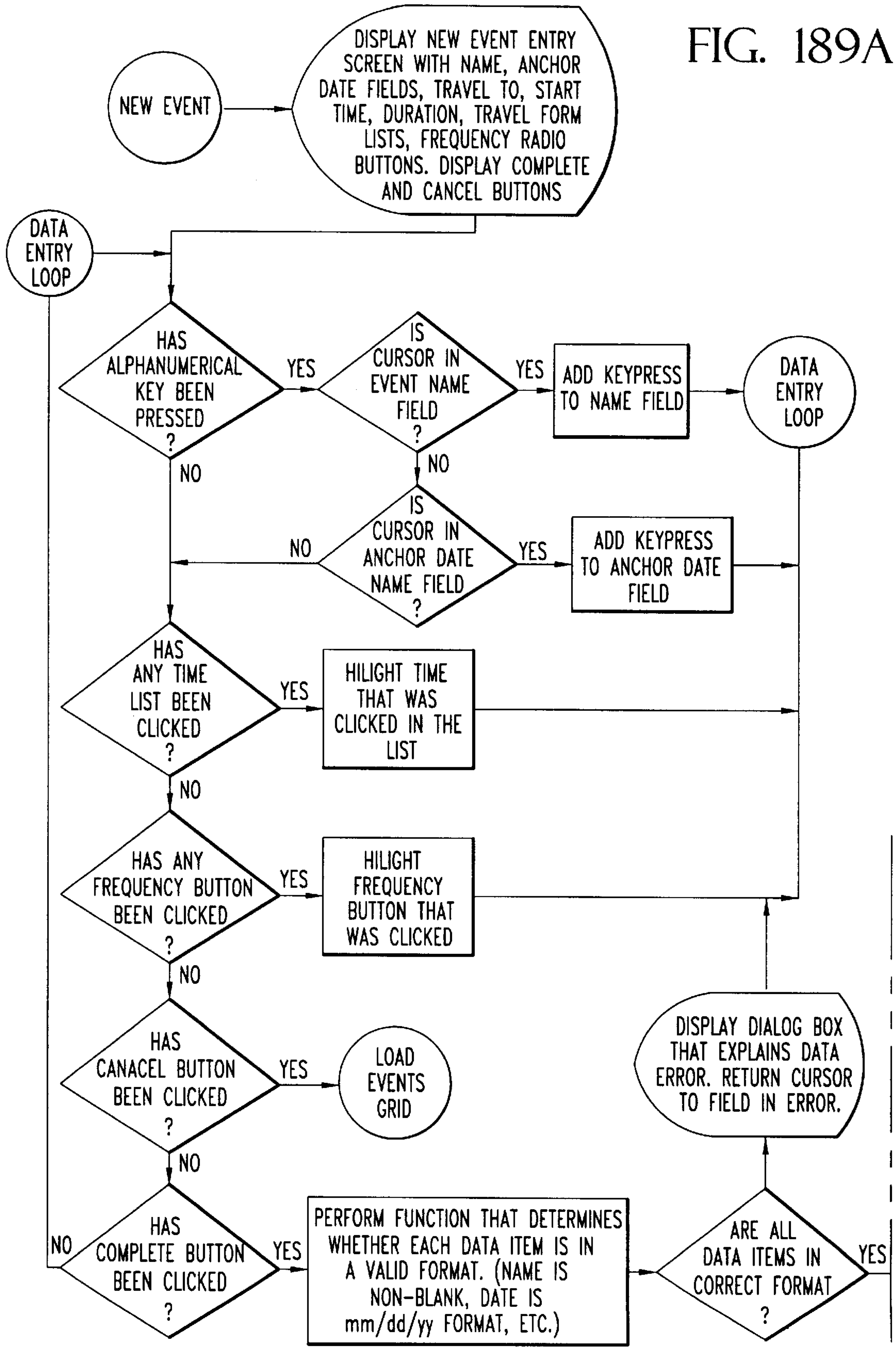
Figure 189B:
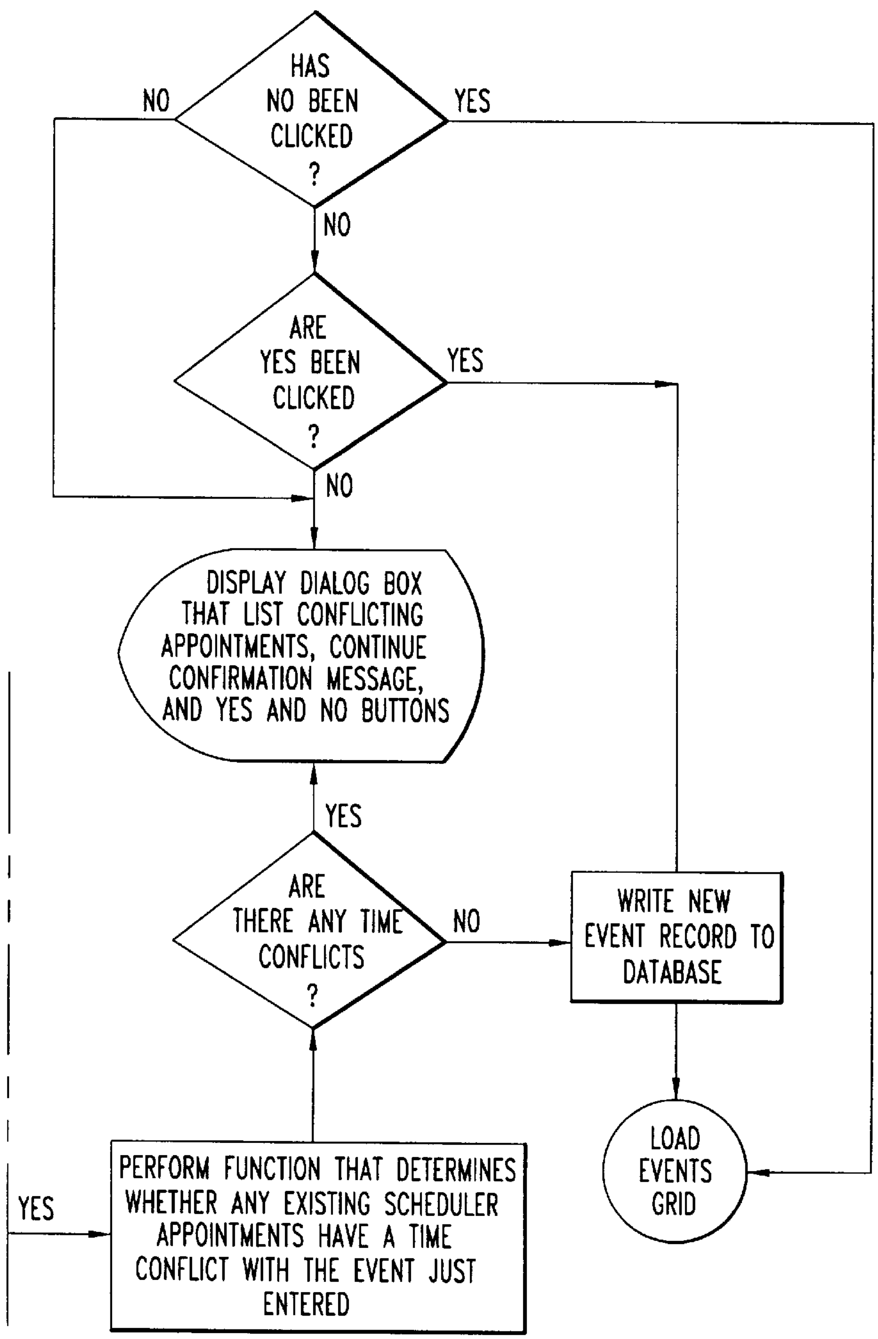

The Options 304 (FIG. 65A and FIG. 162) allows the secondary user to enable/disable features of the different modules, e.g., enabling the alarm in the Scheduler Module 226 to have either a male or female voice or even a rooster sound to remind the user of an upcoming appointment.

Figure 67:
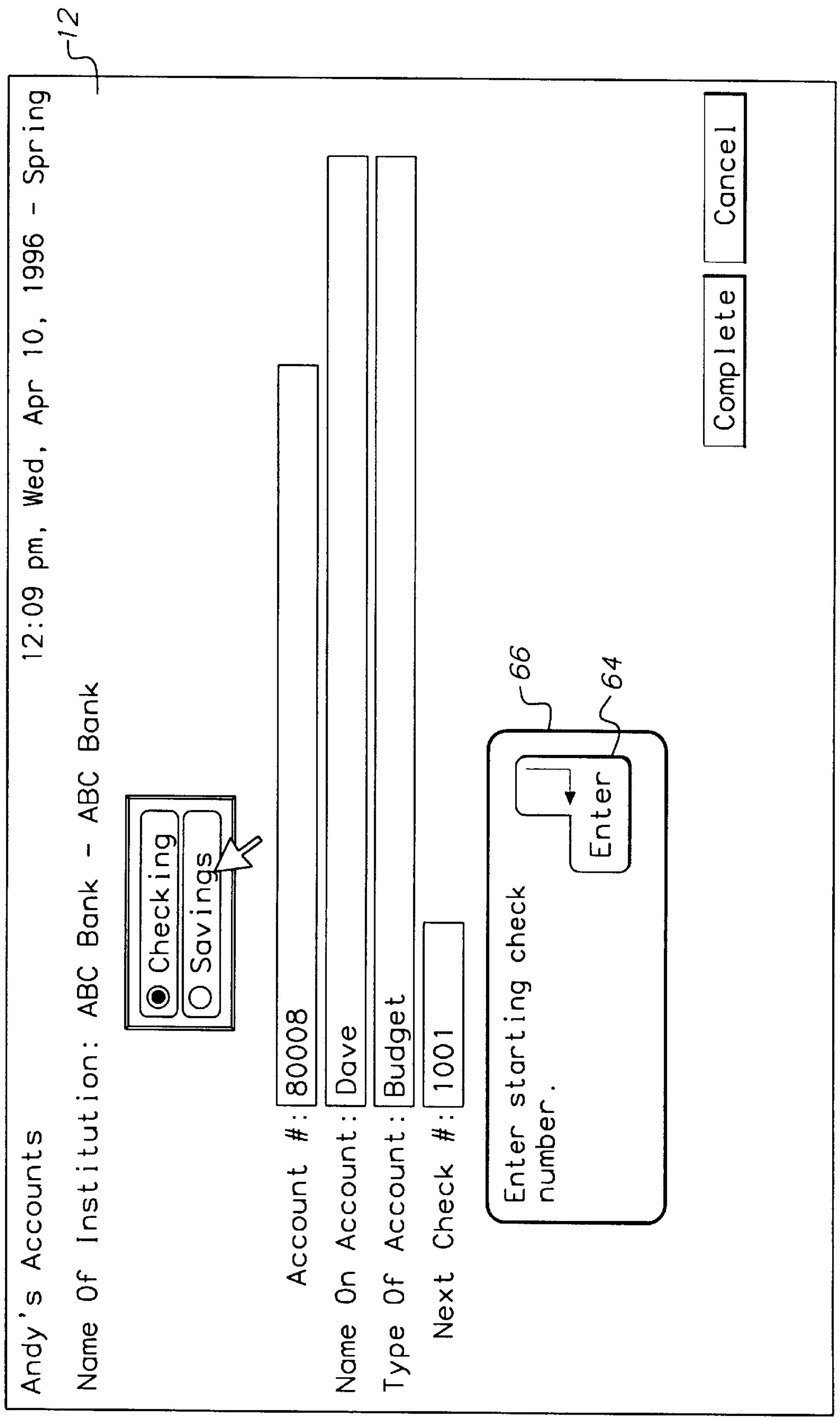
Figure 68:
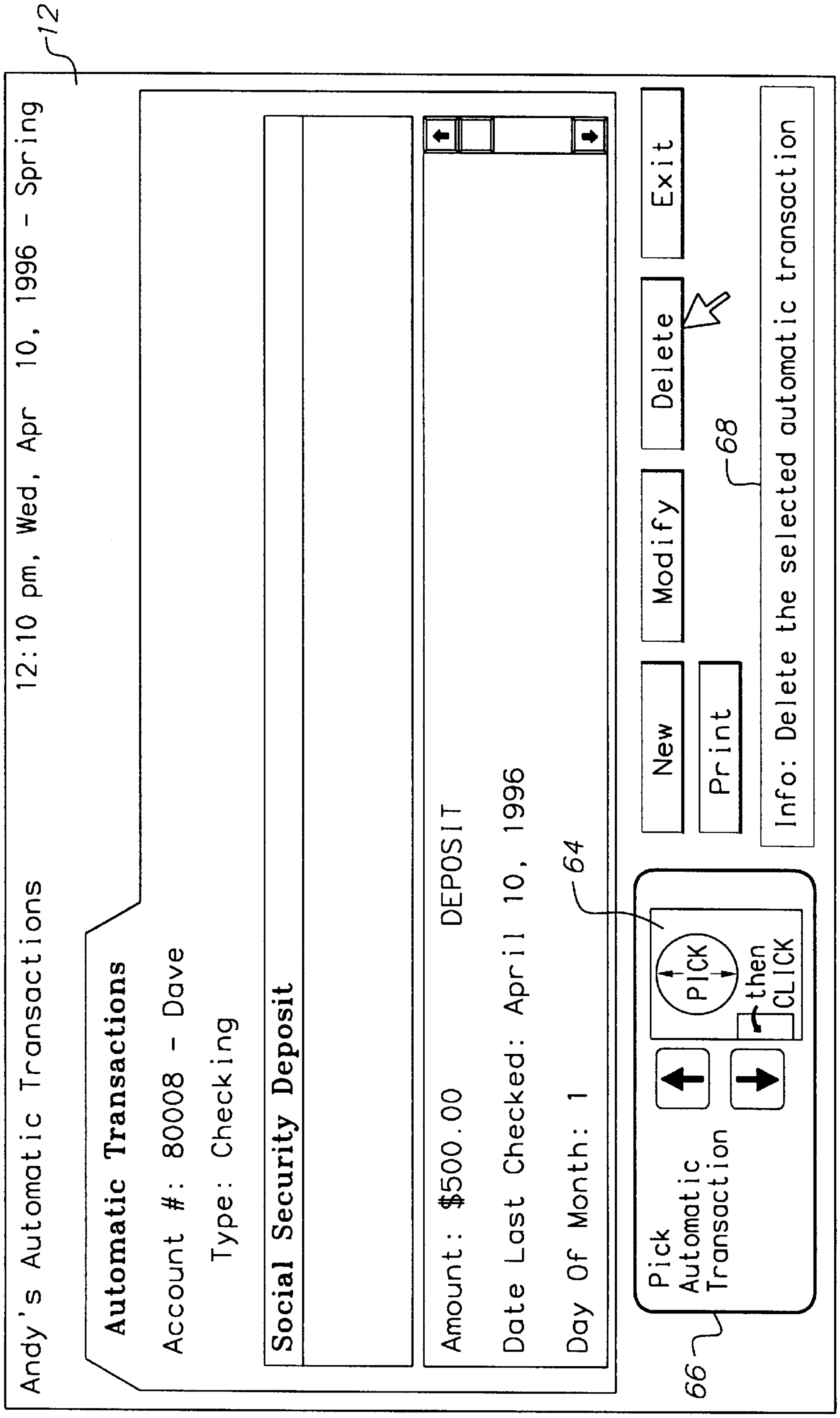
Figure 69:
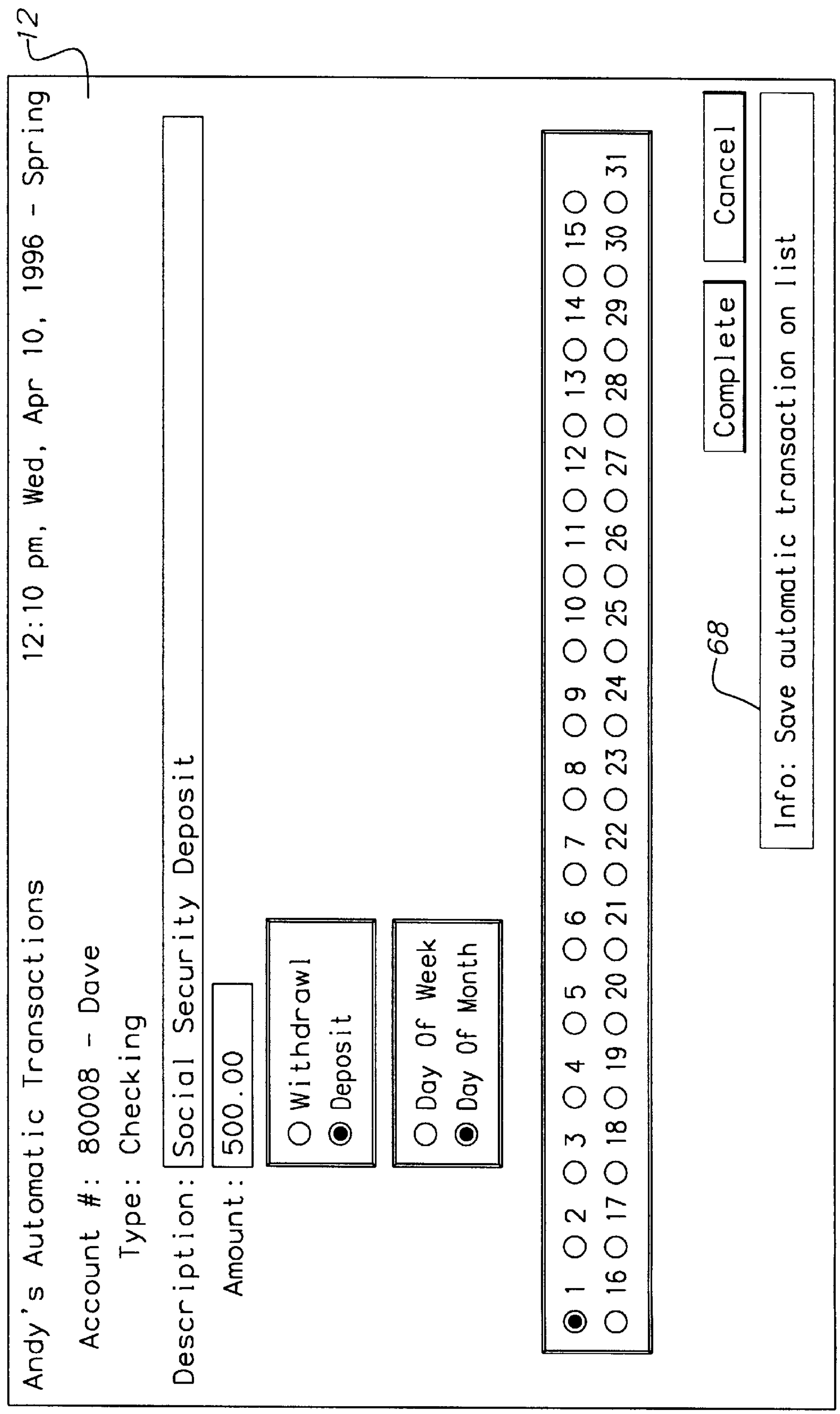

The Accounts option 290 (FIGS. 163–177) permits the secondary user to configure the Money Manager module 224 for the individual primary user, i.e., to create the various bank accounts with all of the associated data, as shown in FIGS. 66–67. In addition, by selecting the "Automatics" subfunction button as shown in FIG. 66, the secondary user can set up, for example, the automatic deposit of a social security deposit into the primary user's checking account (FIGS. 68–69). With the automatic deposit configuration made, the primary user's Money Manager module 224 accounts for the deposit and automatically prompts the user to verify that his/her bank statement reflects that the planned automatic deposit was, in fact, made or not.

Figure 70:
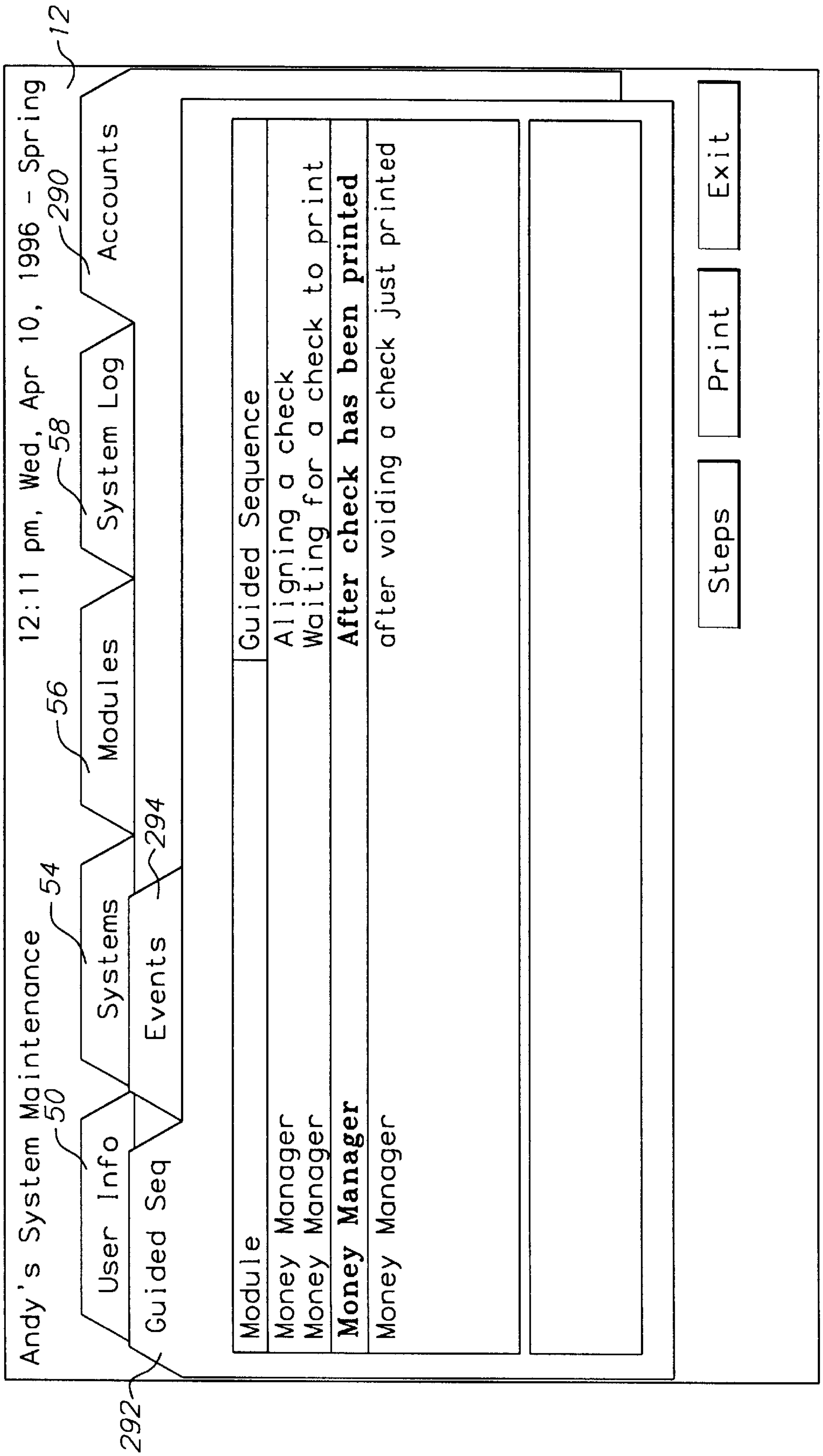
Figure 71:
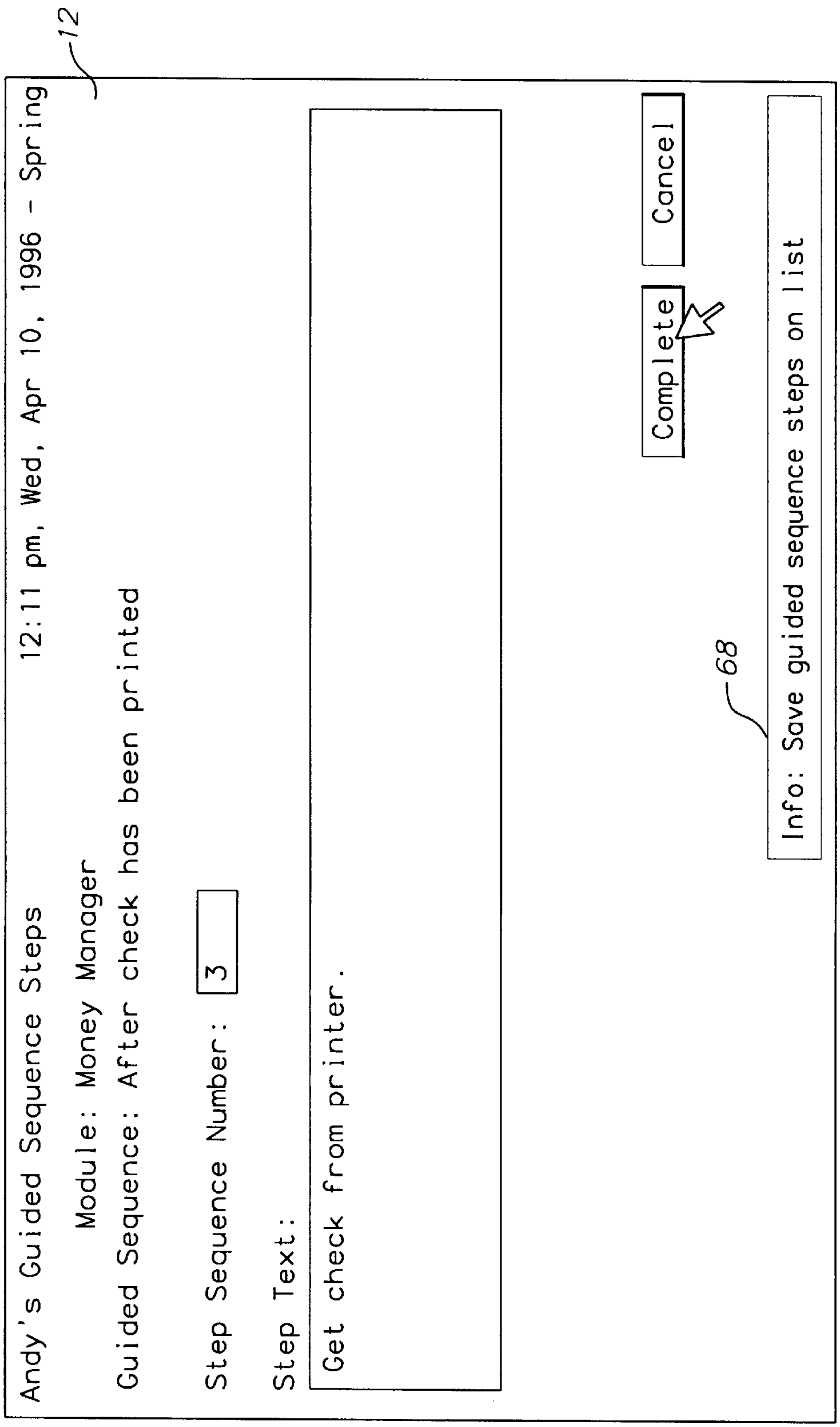

The Guided Sequence option 292 (FIGS. 178–186) permits the secondary user to introduce guided steps into the different modules of, and tailored to, the individual primary user in completing a task. As an example, in FIGS. 70–72, there is shown a series of screen displays that the secondary user uses to set up the check writing process to facilitate the primary user from deciding to even write a check until the check is deposited into the mailbox, discussed earlier with regard to FIGS. 33–36. It should be noted that the usefulness of the Guided Sequence option 292 may require a different option title so as to distinguish its use among the various modules; as such, the phrase "Guided Sequence", as it appears in the screens 12 and the present application is exemplary only.

Figure 73:
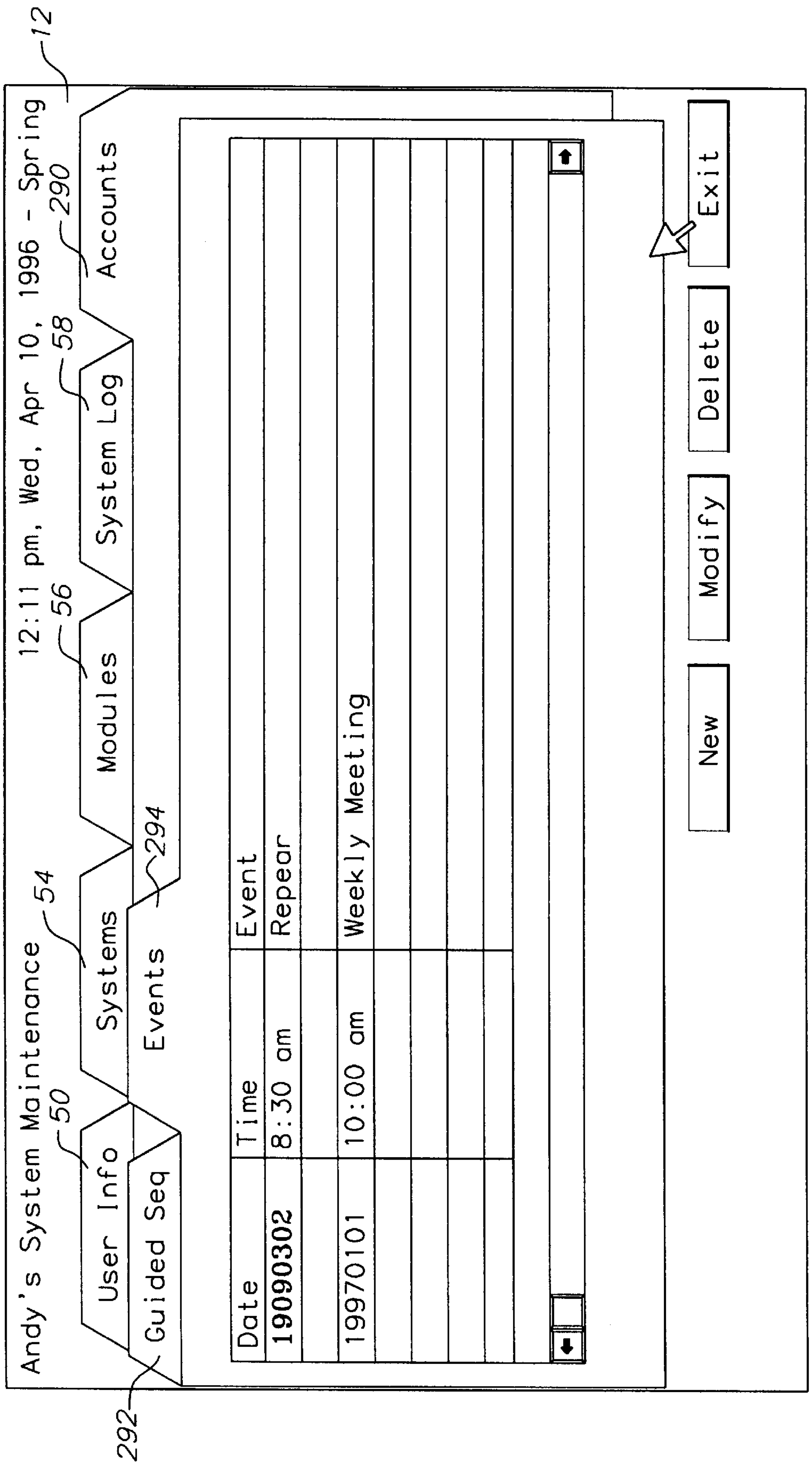

The Events option 294 (FIGS. 187–190) permits the secondary user to configure the Scheduler module 226 of the individual primary user. As an example that was discussed earlier, the Scheduler module 226 in conjunction with the Maintenance Menu 232, permits the simultaneous entry of a recurring event (e.g., a weekly staff meeting). FIG. 61 and FIG. 73 are Maintenance Menu 232 screens used by the secondary user in the Events option 294 to configure the weekly staff meeting into the primary user's Scheduler module 226.

It should be noted that in the accompanying flow charts, where certain functions (e.g., date and time updating to display the date and time on every screen 12) are repeated, these functions are excluded from the flow charts for brevity. For example, a list search function, i.e., where the user is presented with a list of entries to select from (e.g., the Name file folder name list) and can search this list by hitting one letter key on the keyboard 4, the system 220 can advance to the general area where the entry, that the user is seeking, is located; since this function occurs everywhere that such a database search is available, the flow charts do not repeat this function for brevity. Similarly, with regard to the pointer 60 and the information help text box 68, the system 220 always checks to see if the pointer 60 is over a "hot" area that corresponds to a specific information help text box 68 message (e.g., when the pointer 60 is on an "Exit" button, a "hot" area, the message in the information help text box 68 indicates "Exit to Main Menu"); hence, the flow diagram of the "check to see if pointer is over a hot area" is also not repeated for brevity. Furthermore, one other example of certain functions being omitted from the flow charts for brevity is the following: where certain subfunction buttons are needed at times and not at other times e.g., in the Scheduler 226, if a scheduled item is not selected by the user, there is no need to display the "Modify" and "Delete" subfunction buttons, since there is nothing selected that can be either modified or deleted; only when an entry is made do the "Modify" and "Delete" subfunction buttons appear in the screen.

It should be noted that the Educational & Life Skills Organizer/Memory Aid 220 can be configured for the particular user so that not every possible module is available to that user. For example, one user may need only the Educational Organizer 20 of application Ser. No. 08/376,965, another user may need only the Directory module 222 and the Money Manager 224 and yet another user may need the Educational Organizer 20 of application Ser. No. 08/376,965, the Directory module 222 and the Scheduler module 226. As such, the Educational & Life Skills Organizer/ Memory Aid 220 of the particular user is configured to grant access only to those modules appropriate for him/her.

Without further elaboration, the foregoing will so fully illustrate my invention that others may, by applying current or future knowledge, readily adopt the same for use under various conditions of service.

I claim:

1. A compensatory assistance apparatus for use by a user with cognitive impairment which allows the user to make entries and files therein, said apparatus comprising:

a first computer having a monitor and a graphical user interface that displays only one application on the monitor at any time, said graphical user interface requiring the exiting of said application before entering another application, each application displaying on said monitor a predetermined number of user prompts and working information at predetermined locations on the monitor using predetermined colors;

said graphical user interface using a movable pointer, said graphical user interface restricting said movable pointer in displacement in all directions in said displayed application so as to always remain in the view of the user;

said graphical user interface displaying a guidance icon that graphically instructs the user what the user must do to respond;

said graphical user interface automatically saving all files and entries created by the user to said first computer without user intervention;

said graphical user interface further comprising a money managing module that allows the user to manage bank accounts;

input means for inputting data to said first computer and for controlling said movable pointer; and output means for outputting data from said first computer.

2. The compensatory assistance apparatus of claim 1 wherein said money managing module comprises a checking account function that assists the user in preparing, executing and mailing at least one check from at least one checking account.

3. The compensatory assistance apparatus of claim 2 wherein said checking account function assists the user in recording funds entered and withdrawn from said at least one checking account.

4. The compensatory assistance apparatus of claim 3 wherein said checking account function permits the user to enter data regarding every fund entered or withdrawn from said at least one checking account.

5. The compensatory assistance apparatus of claim 4 wherein said checking account function assists the user in balancing said at least one account.

6. The compensatory assistance apparatus of claim 1 wherein said money managing option further comprises a savings account function that assists the user in recording funds entered and withdrawn from at least one savings account.

7. The compensatory assistance apparatus of claim 6 wherein said saving account function permits the user to enter data regarding every fund entered or withdrawn from said at least one savings account.

8. The compensatory assistance apparatus of claim 7 wherein said savings account function assists the user in balancing said at least one savings account.

9. A compensatory assistance apparatus for use by a user with cognitive impairment which allows the user to make entries and files therein, said apparatus comprising:

a first computer having a monitor and a graphical user interface that displays only one application on the monitor at any time, said graphical user interface requiring the exiting of said application before entering another application, each application displaying on said monitor a predetermined number of user prompts and working information at predetermined locations on the monitor using predetermined colors;

said graphical user interface using a movable pointer, said graphical user interface restricting said movable pointer in displacement in all directions in said displayed application so as to always remain in the view of the user;

said graphical user interface displaying a guidance icon that graphically instructs the user what the user must do to respond;

said graphical user interface automatically saving all files and entries created by the user to said first computer without user intervention;

said graphical user interface further comprising a directory module that allows the user to record and amend information about at least one person by a name, by a phone number or, by a relationship of the at least one person;

input means for inputting data to said first computer and for controlling said movable pointer; and output means for outputting data from said first computer.

10. The compensatory assistance apparatus of claim 9 wherein said directory module further comprises a function for recording and amending direction information about the at least one person.

11. The compensatory assistance apparatus of claim 9 wherein said directory module further comprises a function for recording and amending occasion information about the at least one person.

12. The compensatory assistance apparatus of claim 11 wherein said means for recording and amending occasion information about the at least one person further comprises a calendar subfunction for selecting an occasion date therefrom.

13. The compensatory assistance apparatus of claim 9 wherein said directory module further comprises a function for recording and amending general information about the at least one person.

14. A compensatory assistance apparatus for use by a user with cognitive impairment which allows the user to make entries and files therein, said apparatus comprising:

a first computer having a monitor and a graphical user interface that displays only one application on the monitor at any time, said graphical user interface requiring the exiting of said application before entering another application, each application displaying on said monitor a predetermined number of user prompts and working information at predetermined locations on the monitor using predetermined colors;

said graphical user interface using a movable pointer, said graphical user interface restricting said movable pointer in displacement in all directions in said displayed application so as to always remain in the view of the user;

said graphical user interface displaying a guidance icon that graphically instructs the user what the user must do to respond;

said graphical user interface automatically saving all files and entries created by the user to said first computer without user intervention;

said graphical user interface comprising a telephone log that allows the user to record and track telephone conversation content by person or time;

input means for inputting data to said first computer and for controlling said movable pointer; and output means for outputting data from said first computer.

15. The compensatory assistance apparatus of claim 14 further comprises an automatic dial subfunction that dials a telephone number automatically for the user.

16. A compensatory assistance apparatus for use by a user with cognitive impairment which allows the user to make entries and files therein, said apparatus comprising:

a first computer having a monitor and a graphical user interface that displays only one application on the monitor at any time, said graphical user interface requiring the exiting of said application before entering another application, each application displaying on said monitor a predetermined number of user prompts and working information at predetermined locations on the monitor using predetermined colors;

said graphical user interface using a movable pointer, said graphical user interface restricting said movable pointer in displacement in all directions in said displayed application so as to always remain in the view of the user;

said graphical user interface displaying a guidance icon that graphically instructs the user what the user must do to respond;

said graphical user interface automatically saving all files and entries created by the user to said first computer without user intervention;

said graphical user interface comprising a scheduler module that allows the user to track appointments or tasks;

input means for inputting data to said first computer and for controlling said movable pointer; and output means for outputting data from said first computer.

17. The compensatory assistance apparatus of claim 16 wherein said scheduler module further comprises an appointment function that displays time available for making appointments in one color and time unallowed for making appointments in a second color.

18. The compensatory assistance apparatus of claim 17 wherein said appointment function displays time in predetermined intervals.

19. The compensatory assistance apparatus of claim 18 wherein said predetermined intervals are 15 minute intervals.

20. The compensatory assistance apparatus of claim 19 wherein appointment function requires the user to reserve time for traveling from an appointment and time for traveling to an appointment whenever an appointment is scheduled by the user.

21. The compensatory assistance apparatus of claim 17 wherein said appointment function further comprises a calendar subfunction that displays a monthly calendar from which the user can select appointment dates only in the present and future.

22. The compensatory assistance apparatus of claim 18 wherein said appointment function further comprises a recurring appointment function for use by a secondary user for scheduling a recurring event for the user.

23. The compensatory assistance apparatus of claim 16 wherein said scheduler module further comprises a task list function that permits the user to select task dates in the present and future only to record and amend tasks to be done.

24. The compensatory assistance apparatus of claim 23 wherein said task list function displays approaching task dates in different colors according to their imminence.

25. A compensatory assistance apparatus for use by a user with cognitive impairment which allows the user to make entries and files therein, said apparatus comprising:

a first computer having a monitor and a graphical user interface that displays only one application on the monitor at any time, said graphical user interface requiring the exiting of said application before entering another application, each application displaying on said monitor a predetermined number of user prompts and working information at predetermined locations on the monitor using predetermined colors;

said graphical user interface using a movable pointer, said graphical user interface restricting said movable pointer in displacement in all directions in said displayed application so as to always remain in the view of the user; said graphical user interface displaying a guidance icon that graphically instructs the user what the user must do to respond;

said graphical user interface automatically saving all files and entries created by the user to said first computer without user intervention;

said graphical user interface comprising a writing module that allows the user to create documents;

input means for inputting data to said first computer and for controlling said movable pointer; and output means for outputting data from said first computer.

26. The compensatory apparatus of claim 25 wherein said writing module comprises a writer function for providing the user with a text writer for preparing a document having a title and text.

27. The compensatory apparatus of claim 26 wherein said writer function displays a listing of documents by title and wherein a user can select one document by title in order to display said selected document's text.

28. The compensatory apparatus of claim 26 wherein said writing module further comprises a journal function for providing the user with a journal to record and amend information.

29. The compensatory apparatus of claim 26 wherein said writing module further comprises a secure journal function for providing the user with a journal that only the user can gain access to.

30. A compensatory assistance apparatus for use by a user with cognitive impairment which allows the user to make entries and files therein, said apparatus comprising:

a first computer having a monitor and a graphical user interface that displays only one application on the monitor at any time, said graphical user interface requiring the exiting of said application before entering another application, each application displaying on said monitor a predetermined number of user prompts and working information at predetermined locations on the monitor using predetermined colors;

said graphical user interface using a movable pointer, said graphical user interface restricting said movable pointer in displacement in all directions in said displayed application so as to always remain in the view of the user;

said graphical user interface displaying a guidance icon that graphically instructs the user what the user must do to respond;

said graphical user interface automatically saving all files and entries created by the user to said first computer without user intervention;

said graphical user interface comprising an information module that allows the user to create files of information notes and to assign a user-selected title to each of said information notes;

input means for inputting data to said first computer and for controlling said movable pointer; and output means for outputting data from said first computer.

31. The compensatory apparatus of claim 30 wherein said information module displays a listing of information notes by title and wherein a user can select one information note by said respective title in order to display said selected information note.

32. A compensatory assistance apparatus for use by a user with cognitive impairment which allows the user to make entries and files therein, said apparatus comprising:

a first computer having a monitor and a graphical user interface that displays only one application on the monitor at any time, said graphical user interface requiring the exiting of said application before entering another application, each application displaying on said monitor a predetermined number of user prompts and working information at predetermined locations on the monitor using predetermined colors;

said graphical user interface using a movable pointer, said graphical user interface restricting said movable pointer in displacement in all directions in said displayed application so as to always remain in the view of the user;

said graphical user interface displaying a guidance icon that graphically instructs the user what the user must do to respond;

said graphical user interface automatically saving all files and entries created by the user to said first computer without user intervention;

said graphical user interface further comprising a directory module that allows the user to record and amend information about at least one person by a name of the at least one person;

input means for inputting data to said first computer and for controlling said movable pointer; and output means for outputting data from said first computer.

33. The compensatory assistance apparatus of claim 32 wherein said graphical user interface further comprises a money managing module that allows the user to manage bank accounts in connection with the at least one person.

34. The compensatory assistance apparatus of claim 32 wherein said graphical user interface further comprises a scheduler module that allows the user to track appointments with the at least one person.

35. The compensatory assistance apparatus of claim 32 wherein said graphical user interface further comprises a telephone log that allows the user to track telephone conversations in connection with the at least one person.

* * * * *